(12) United States Patent
Thi et al.

(10) Patent No.: US 7,933,295 B2
(45) Date of Patent: *Apr. 26, 2011

(54) CABLE MODEM WITH VOICE PROCESSING CAPABILITY

(75) Inventors: James C. Thi, New Port Coast, CA (US); Theodore F. Rabenko, Duluth, GA (US); David Hartman, Laguna Hills, CA (US); Robert M. Lukas, Burnaby (CA); Kenneth J. Unger, Surrey (CA); Ramin Borazjani, Suwanee, GA (US); Shane P. Lansing, Mission Viejo, CA (US); Robert J. Lee, Lawrenceville, GA (US); Todd L. Brooks, Laguna Beach, CA (US); Kevin L. Miller, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 1174 days.

This patent is subject to a terminal disclaimer.

(21) Appl. No.: 09/949,811

(22) Filed: Sep. 12, 2001

(65) Prior Publication Data

US 2002/0061012 A1 May 23, 2002

Related U.S. Application Data

(63) Continuation-in-part of application No. 09/737,175, filed on Dec. 13, 2000, now Pat. No. 7,023,868, which is a continuation-in-part of application No. 09/548,400, filed on Apr. 13, 2000, now Pat. No. 6,765,931.

(60) Provisional application No. 60/129,134, filed on Apr. 13, 1999, provisional application No. 60/136,685, filed on May 28, 1999, provisional application No. 60/160,124, filed on Oct. 18, 1999, provisional application No. 60/170,595, filed on Dec. 13, 1999, provisional application No. 60/170,592, filed on Dec. 13, 1999, provisional application No. 60/242,657, filed on Oct. 23, 2000, provisional application No. 60/232,181, filed on Sep. 11, 2000, provisional application No. 60/296,895, filed on Jun. 8, 2001.

(51) Int. Cl.
| | |
|---|---|
| H04J 1/02 | (2006.01) |
| H04L 12/66 | (2006.01) |
| H04M 9/08 | (2006.01) |
| H04N 7/173 | (2011.01) |

(52) U.S. Cl. .................. 370/493; 370/352; 379/406.01; 725/111

(58) Field of Classification Search .................. 370/352, 370/389, 39.07, 465, 94.4, 406.01, 395.62, 370/503, 509, 419, 359, 463, 494, 495; 348/14.01; 379/410; 725/119
See application file for complete search history.

(56) References Cited

U.S. PATENT DOCUMENTS 4,453,259 A 6/1984 Miller
(Continued)

FOREIGN PATENT DOCUMENTS

EP 0 627 840 A2 12/1994
(Continued)

OTHER PUBLICATIONS

Minassian, "Home Phone Line Networks: The Next Networking Challenge," Electronic Product Design, IML Publication, GB, vol. 19, No. 11, dated Nov. 1998, pp. C15-C16, C18, C21.
(Continued)

Primary Examiner — Warner Wong
(74) Attorney, Agent, or Firm — McAndrews, Held & Malloy, Ltd.

(57) ABSTRACT

A network gateway is configured to facilitate on line and off line bi-directional communication between a number of near end data and telephony devices with far end data termination devices via a hybrid fiber coaxial network and a cable modem termination system. The described network gateway combines a QAM receiver, a transmitter, a DOCSIS MAC, a CPU, a voice and audio processor, a voice synchronizer, an Ethernet MAC, and a USB controller to provide high performance and robust operation.

103 Claims, 61 Drawing Sheets

U.S. PATENT DOCUMENTS

| | | | | |
|---|---|---|---|---|
| 4,918,688 | A * | 4/1990 | Krause et al. | 370/257 |
| 5,307,405 | A * | 4/1994 | Sih | 379/406.08 |
| 5,473,676 | A * | 12/1995 | Frick et al. | 379/93.09 |
| 5,555,244 | A | 9/1996 | Gupta et al. | |
| 5,566,167 | A * | 10/1996 | Duttweiler | 370/290 |
| 5,583,922 | A * | 12/1996 | Davis et al. | 379/93.09 |
| 5,598,468 | A | 1/1997 | Ammicht et al. | |
| 5,711,012 | A * | 1/1998 | Bottoms et al. | 455/557 |
| 5,719,872 | A | 2/1998 | Dubberly et al. | 370/487 |
| 5,768,351 | A * | 6/1998 | England | 379/93.37 |
| 5,774,527 | A * | 6/1998 | Handelman et al. | 379/93.07 |
| 5,790,538 | A | 8/1998 | Sugar | |
| 5,815,503 | A * | 9/1998 | Li | 370/471 |
| 5,896,443 | A | 4/1999 | Dichter | 379/93.08 |
| 5,896,452 | A * | 4/1999 | Yip et al. | 379/406.01 |
| 5,912,896 | A * | 6/1999 | Beighe et al. | 370/463 |
| 6,018,767 | A * | 1/2000 | Fijolek et al. | 709/218 |
| 6,075,787 | A * | 6/2000 | Bobeck et al. | 370/395.2 |
| 6,091,932 | A * | 7/2000 | Langlais | 725/111 |
| 6,169,747 | B1 * | 1/2001 | Sartain et al. | 370/468 |
| 6,185,624 | B1 * | 2/2001 | Fijolek et al. | 709/239 |
| 6,216,171 | B1 * | 4/2001 | Isono et al. | 709/250 |
| 6,236,653 | B1 * | 5/2001 | Dalton et al. | 370/352 |
| 6,252,851 | B1 * | 6/2001 | Siu et al. | 370/236 |
| 6,266,348 | B1 * | 7/2001 | Gross et al. | 370/493 |
| 6,285,768 | B1 * | 9/2001 | Ikeda | 381/71.11 |
| 6,314,102 | B1 * | 11/2001 | Czerwiec et al. | 370/395.6 |
| 6,363,079 | B1 * | 3/2002 | Barzegar et al. | 370/465 |
| 6,396,531 | B1 * | 5/2002 | Gerszberg et al. | 348/14.01 |
| 6,598,231 | B1 * | 7/2003 | Basawapatna et al. | 725/120 |
| 6,600,734 | B1 * | 7/2003 | Gernert et al. | 370/352 |
| 6,618,701 | B2 * | 9/2003 | Piket et al. | 704/233 |
| 6,704,302 | B2 * | 3/2004 | Einbinder et al. | 370/352 |
| 6,765,931 | B1 * | 7/2004 | Rabenko et al. | 370/493 |
| 6,804,350 | B1 * | 10/2004 | Siqueira | 379/406.01 |
| 6,829,244 | B1 * | 12/2004 | Wildfeuer et al. | 370/412 |
| 6,868,157 | B1 * | 3/2005 | Okuda | 379/406.01 |
| 6,879,602 | B1 * | 4/2005 | Sugita et al. | 370/503 |
| 6,889,385 | B1 * | 5/2005 | Rakib et al. | 725/119 |
| 6,904,110 | B2 * | 6/2005 | Trans et al. | 375/350 |
| 6,987,821 | B1 * | 1/2006 | Li | 375/345 |
| 6,990,195 | B1 * | 1/2006 | LeBlanc et al. | 379/406.08 |
| 7,017,176 | B1 * | 3/2006 | Lee et al. | 725/111 |
| 7,173,962 | B2 * | 2/2007 | Dowling | 375/222 |
| 2001/0043701 | A1 * | 11/2001 | Farra | 379/406.01 |
| 2002/0056133 | A1 * | 5/2002 | Fung et al. | 725/118 |

FOREIGN PATENT DOCUMENTS

| | | |
|---|---|---|
| EP | 0 746 134 A2 | 12/1996 |
| EP | 0 817 398 A2 | 1/1998 |
| EP | 0 851 653 A2 | 7/1998 |
| WO | WO 97/44947 | 11/1997 |
| WO | WO 99/39541 | 8/1999 |
| WO | WO 00/48420 | 8/2000 |

OTHER PUBLICATIONS

International Search Report issued Sep. 6, 2002 for Appln. No. PCT/US01/28323, 6 Pages.

Ikram, M.Z., et al., "Design and Implementation of IIR Filters in STLC7545 Analog Front-End for Voice Communication," IEEE Tencon, *Speech and Image Technologies for Computing and Telecommunications* 65-67 (Dec. 1997).

Model, M. J., et al., "Power Considerations for Cable Telephony Networks," IEEE, 304-310 (2000).

"STMicroelectronics and Netergy Networks Demonstrate Cablelabs Standard Integrated Voice/Data Over Cable Network," pp. 1-3, May 15, 2000, Retrieved from the Internet: <URL:http://eu.st.com/stonline/press/news/year2000/t863p.htm> retrieved on Jan. 31, 2003.

Seo, G. et al., "An Implementation of VoIP Cable Modem," IEEE Tencon, 1532-1535, (Sep. 1999).

Minassian, G., "Home phone line networks: The next networking challenge," Electronic Product Design, IML Publication, GB, vol. 19, No. 11, dated, Nov. 1998, pp. C15-C21.

International Search Report issued Feb. 25, 2003 for Appl. No. PCT/US01/28323, 12 pages.

Partial European Search Report for International Application No. 08001177.8-2416 mailed Jun. 27, 2008, nine (9) pages.

\* cited by examiner

FIG. 15

| Field | Bit Number | Bits | Description |
|---|---|---|---|
| FT | 31:24 | 8 | Frame Type: Field Set to Zero By Transmitter. Receiver Decodes Field and Discards if Anything Other Than Zero |
| RSVD | 23 | 1 | Reserved: Field Set to Zero By Transmitter Ignored by the Receiver |
| PRI | 22:20 | 3 | Priority: 0:7 |
| SI | 19:16 | 4 | Scramble Initialization |
| PE | 15:8 | 8 | Payload Encoding |
| HCS | 7:0 | 8 | Header Check Sequence |

FIG. 21

| OSI | IEEE | Function |
|---|---|---|
| Data Link | | Link Layer Signaling (Driver)<br>a) Rate Adaptation, QOS and IM8 Compatibility<br>b) LARQ Error Recovery<br>c) Link Integrity and Capability Discovery |
| | MAC Controller Layer | MAC Controller Layer Functions<br>a) Host Interface<br>b) Control & Status Register Interrupts<br>c) CMA Transfers, Data Buffering & Command List Interpretation<br>d) Performance Counters<br>e) MAC Address Filtering, Wake-On_LAN processing |
| | MII | Optional MII Interface (In PHY Only) |
| | LLC Logical Link Control | Optional Link Layer Signaling (PHY Only)<br>a) Rate Adaptation, QOS and IM8 Compatibility<br>b) LARQ Error Recovery<br>c) Link Integrity and Capability Discovery |
| | V2 MAC | Frame Processing (Transmit & Receive)<br>a) Framing (Frame Boundary Delineation and Synchronization)<br>b) Error Detection (FCS Generation and Check, Fragment Detection)<br><br>Media Access Control (MAC)<br>a) CSMA/CD<br>b) Collision Resolution (Backoff Algorithm) |
| PHY | PHY | Physical Coding Sublayer<br>a) Coding and Modulation, Carrier Sense, Collision Detection |

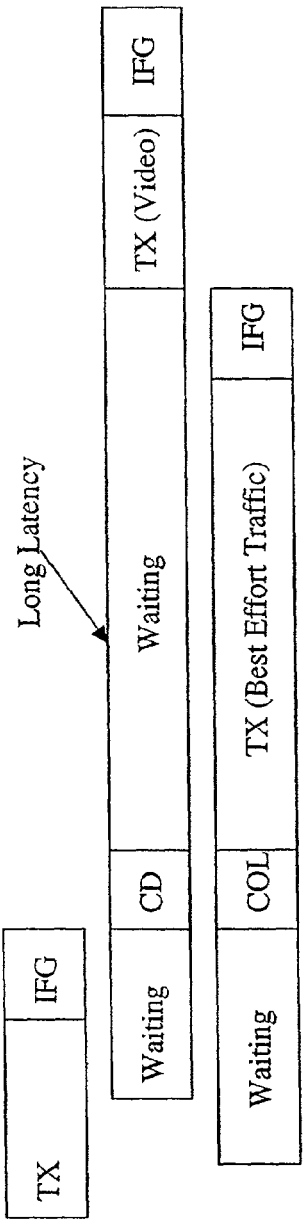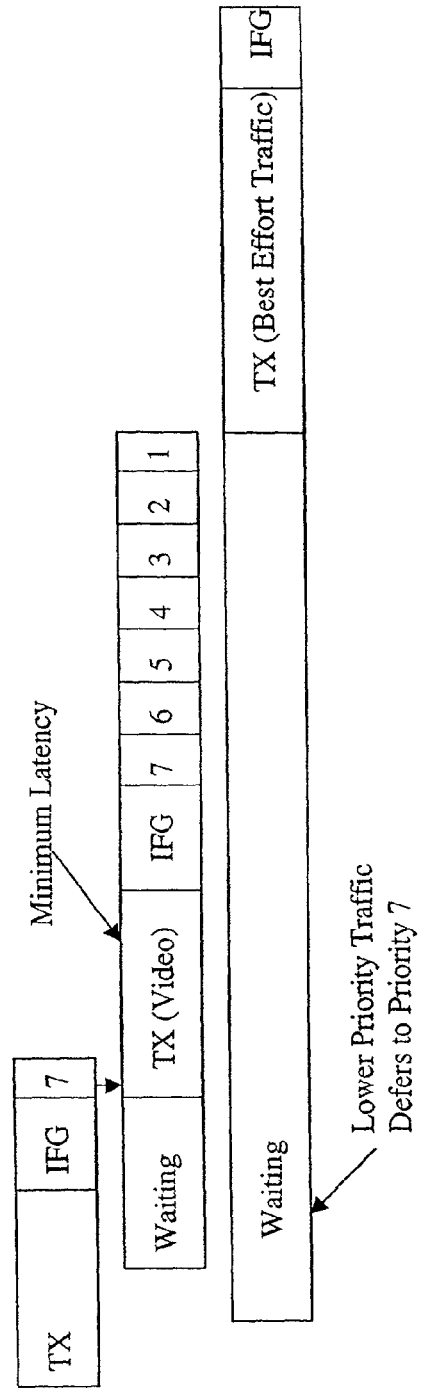
FIG. 24 Without Priority Access
FIG. 25 With Priority Access

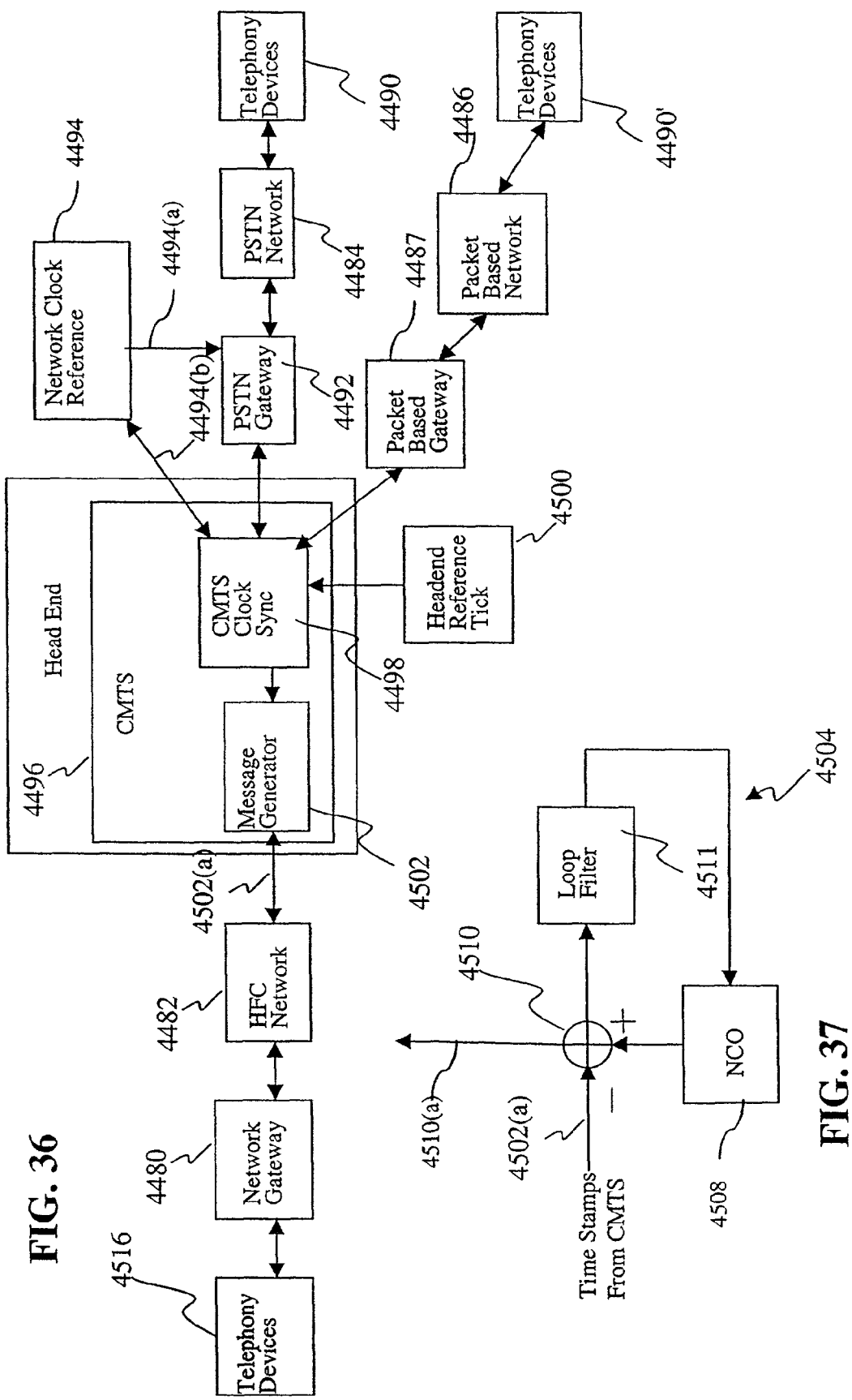

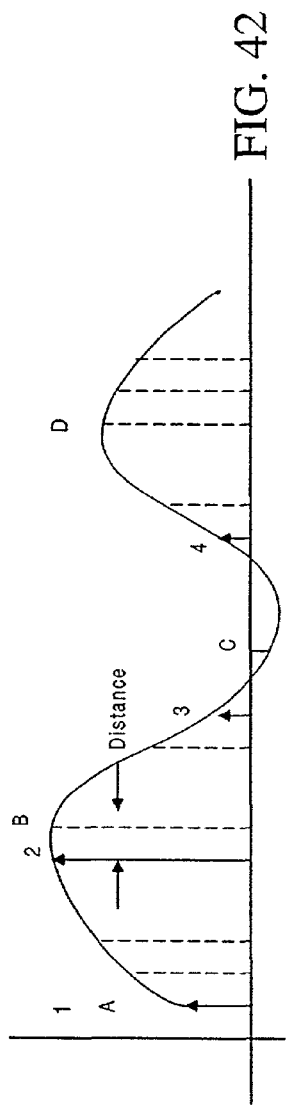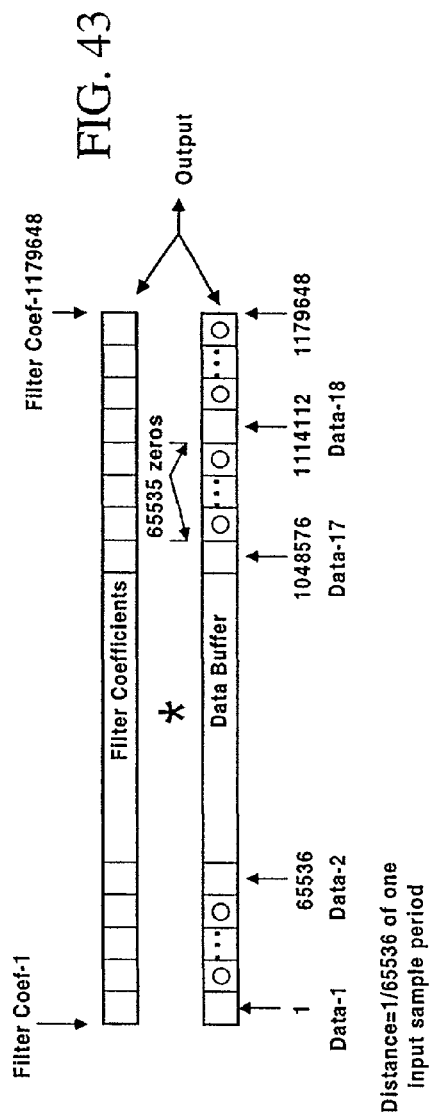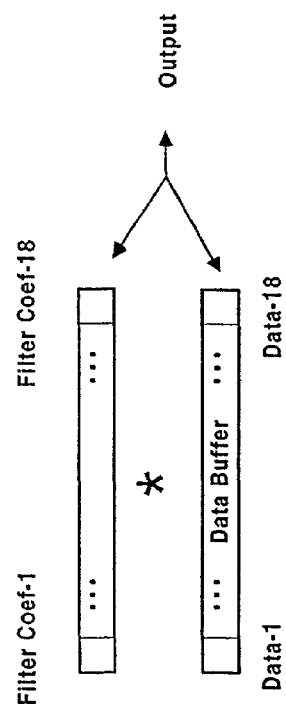

| Call State | Proxy Gateway | | Media Adapter |
|---|---|---|---|
| Idle | CAS: LCF | ↑ | |
| Offhook | | ↓ | CAS: LO (onhook) |
| | | ↓ | CAS: LC (offhook) |
| Dialtone | CAS: LCF<br>CPTONE: Dialtone | ↑ | |
| Dialing | | ↓ | CAS: LC<br>DIGIT: on |
| | CAS: LCF<br>CPTONE: off | ↑ | |
| | | ↓ | CAS: LC<br>DIGIT: off |
| | | ↓ | CAS: LC<br>DIGIT: on |
| | | ↓ | CAS: LC<br>DIGIT: off |
| Waiting | CAS: LCF<br>CPTONE: ringback | ↑ | |
| Remote Answer | CAS: LCF<br>CPTONE: off<br>MODE: G729A | ↑ | |
| Talk | CAS: LCF<br>MODE: G729A<br>VOICE:G729A | ←→ | CAS: LC<br>VOICE: G729A |

FIG. 60

CABLE MODEM WITH VOICE PROCESSING CAPABILITY

CROSS REFERENCE TO RELATED APPLICATIONS

The present application is a continuation-in-part of U.S. patent application Ser. No. 09/737,175, now U.S. Pat. No. 7,023,868, entitled "Voice Gateway with Downstream Voice Synchronization," filed Dec. 13, 2000, which is a continuation-in-part of U.S. patent application Ser. No. 09/548,400, now U.S. Pat. No. 6,765,931, entitled "Gateway with Voice", filed Apr. 13, 2000, which claims priority to the following applications: U.S. Provisional Application No. 60/129,134, filed Apr. 13, 1999, U.S. Provisional Application No. 60/136,685, filed May 28, 1999, and U.S. Provisional Application No. 60/160,124, filed Oct. 18, 1999, U.S. Provisional Application No. 60/170,595, filed Dec. 13, 1999 and U.S. Provisional Application No. 60/170,592, filed Dec. 13, 1999. Each of the above applications is incorporated by reference herein in their entireties.

The present application also claims benefit to U.S. Provisional Application No. 60/242,657. entitled, "The VoIP Broadband Home," filed Oct. 23, 2000 by Rabenko, et al., which is incorporated by reference herein in its entirety; U.S. Provisional Application No. 60/232,181, entitled "ELMAC DSP Architecture for Audio Applications," filed Sep. 11, 2000 by Borazjani et al. which is incorporated by reference herein in its entirety; and U.S. application No. 60/296,895, entitled "Advanced ELMAC DSP Core," filed Jun. 8, 2001 by Lansing et al, which is incorporated by reference herein in its entirety.

BACKGROUND OF THE INVENTION

1. Field of the Invention

The present invention relates generally to telecommunications systems, and more particularly, to a system for interfacing telephony devices with DOCSIS compatible networks.

2. Background

Traditional dial-up modems provide online access through the public telephone network at up to 56 Kbps (equal to 56,000 bits per second). A cable modem, on the other hand, provides users with high-speed Internet access through a cable television network. Cable modem is capable of providing data rates as high as 56 Mbps, and is thus suitable for high speed Internet access, digital television (such as pay-per-view) and digital telephony.

BRIEF SUMMARY OF THE INVENTION

In one aspect of the present invention a cable modem includes a network port to interface with a cable head end, a telephony port to interface with a telephony device, a data port to interface with a data terminal and a processor coupled to each of the ports.

In another aspect of the present invention a gateway includes a network port to interface with a cable head end, a telephony port to interface to a telephony device, a data port to interface to a data terminal, a processor coupled to each of the ports and a transceiver disposed between the processor and the network port, the transceiver being capable of transmitting and receiving packets of voice signals, packets of data signals, and a television signal.

In a further aspect of the present invention a method of processing signals, includes exchanging voice signals between a cable head end and a telephony device, exchanging data signals between the cable head end and a data terminal and receiving a television signal from the cable head end.

In a still further aspect of the present invention a cable modem includes a first network port to interface with a cable head end, a second network port to interface with a local area network and a processor coupled to each of the ports.

In a still further aspect of the present invention a gateway includes a first network port to interface with a cable head end a second network port to interface to a local area network, a processor coupled to each of the ports and a transceiver disposed between the processor and the first network port, the transceiver being capable of transmitting and receiving packets of voice signals, packets of data signals, and a television signal.

In a still further aspect of the present invention a method of processing signals includes exchanging voice signals between a cable head end and a local area network, exchanging data signals between the cable head end and the local area network and receiving a television signal from the cable head end.

In one aspect of the present invention, a method of synchronizing data clocked by a first clock to a second clock includes generating a clock error signal as a function of one or more data control flags, and fractionally resampling the data as a function of the offset.

In another embodiment of the present invention, a synchronization circuit, includes an error generation unit that generates a clock error signal as a function of an average far end sampling rate and a near end sampling rate and a sample tracker adapted to receive sampled data packets, wherein the sample tracker fractionally resamples the sampled data as a function of the clock error signal.

In a further aspect of the present invention, a network gateway adapted to exchange voice signals between a network line at a first clock frequency and a packet based network at a second clock frequency, includes a network port to interface with a packet based network; a telephony port to interface with a telephony device; a processor coupled to each of the ports and a voice synchronizer, coupled between the network and telephony ports. The voice synchronizer includes an error generation unit for generating a clock error signal in accordance with the ratio of the first and second clocks and a sample tracker, that receives sampled data packets, and fractionally resamples the sampled data as a function of the clock error signal.

BRIEF DESCRIPTION OF THE DRAWINGS/FIGURES

These and other features, aspects, and advantages of the present invention will become better understood with regard to the following description, appended claims, and accompanying drawings where:

FIG. 15 depicts the frame control field in accordance with an exemplary embodiment of the present invention;

FIG. 21 depicts MAC logical layers and corresponding functions in accordance with an exemplary embodiment of the present invention;

FIGS. 24 and 25 show transmission aspects without and with priority access;

FIG. 36 is a system block diagram of a network gateway for interfacing between a hybrid fiber coaxial (HFC) network, a switched circuit network and a packet based network in accordance with a preferred embodiment of the present invention;

FIG. 37 is a block diagram of a timing recovery system for synchronizing a timing regeneration circuit clock of a network gateway to a CMTS clock in accordance with a preferred embodiment of the present invention;

FIG. 42 is a timing diagram that illustrates an offset in input and output sample counts in a buffer overflow condition;

Figures 45, 46:
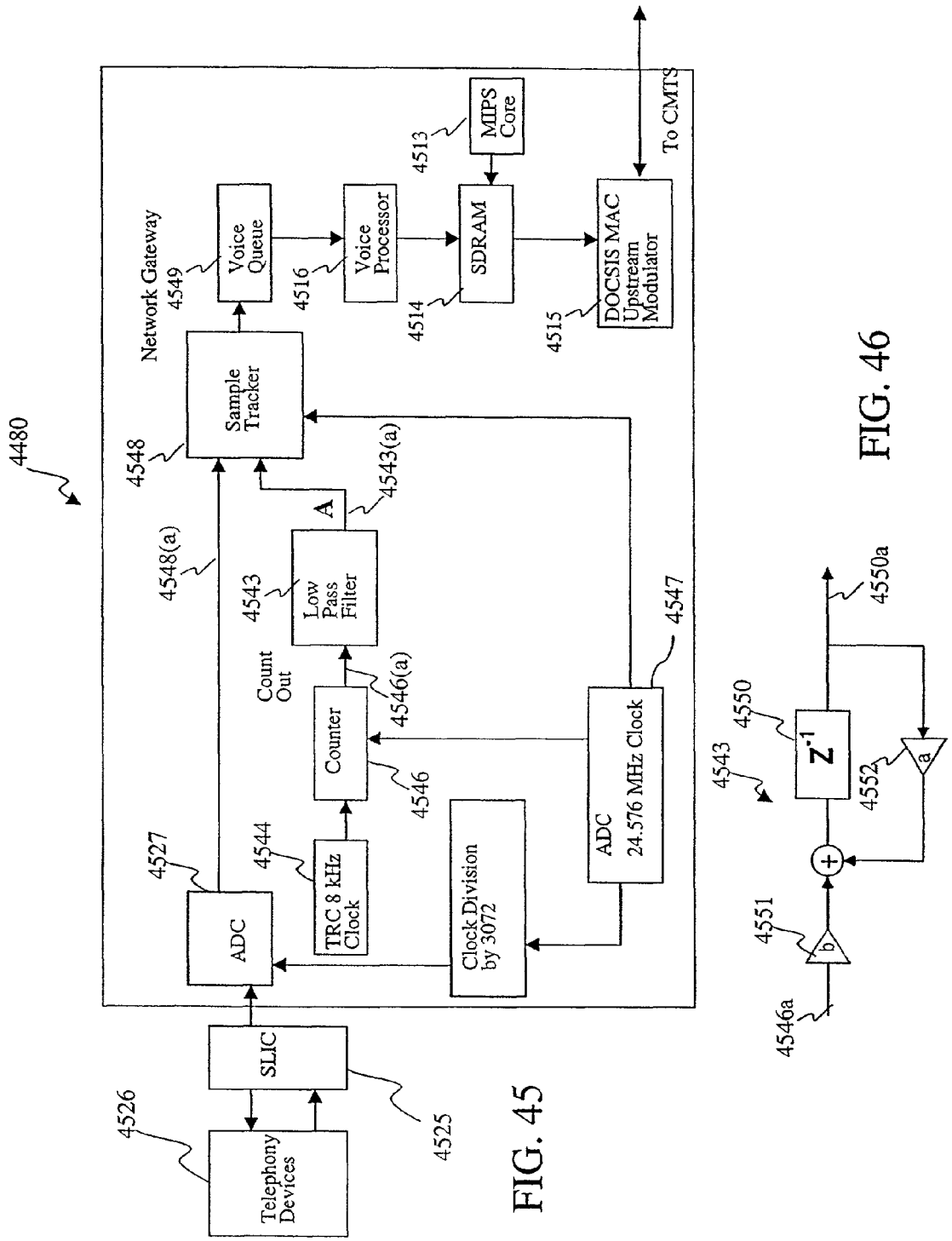
Figure 47:
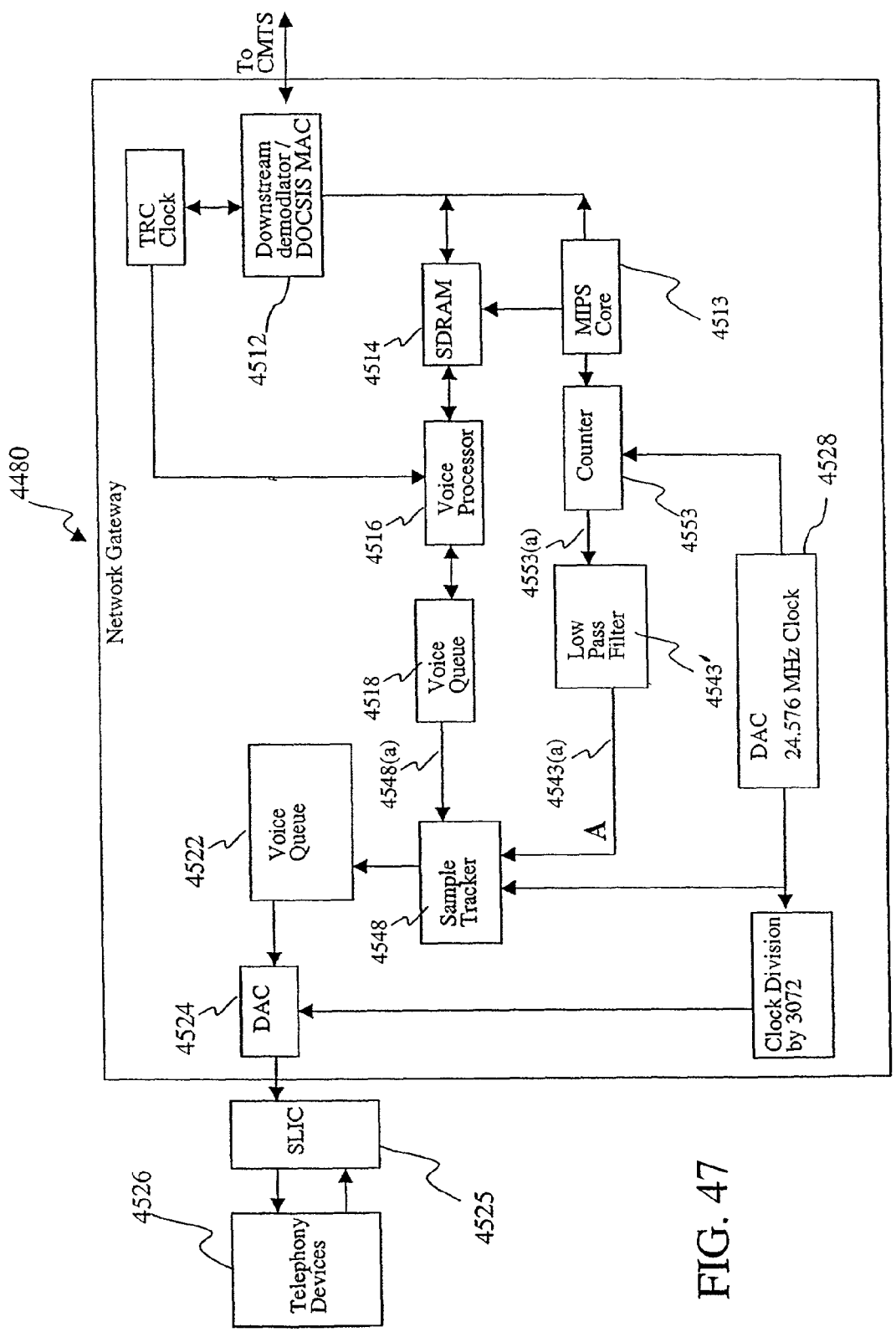
Figure 48:
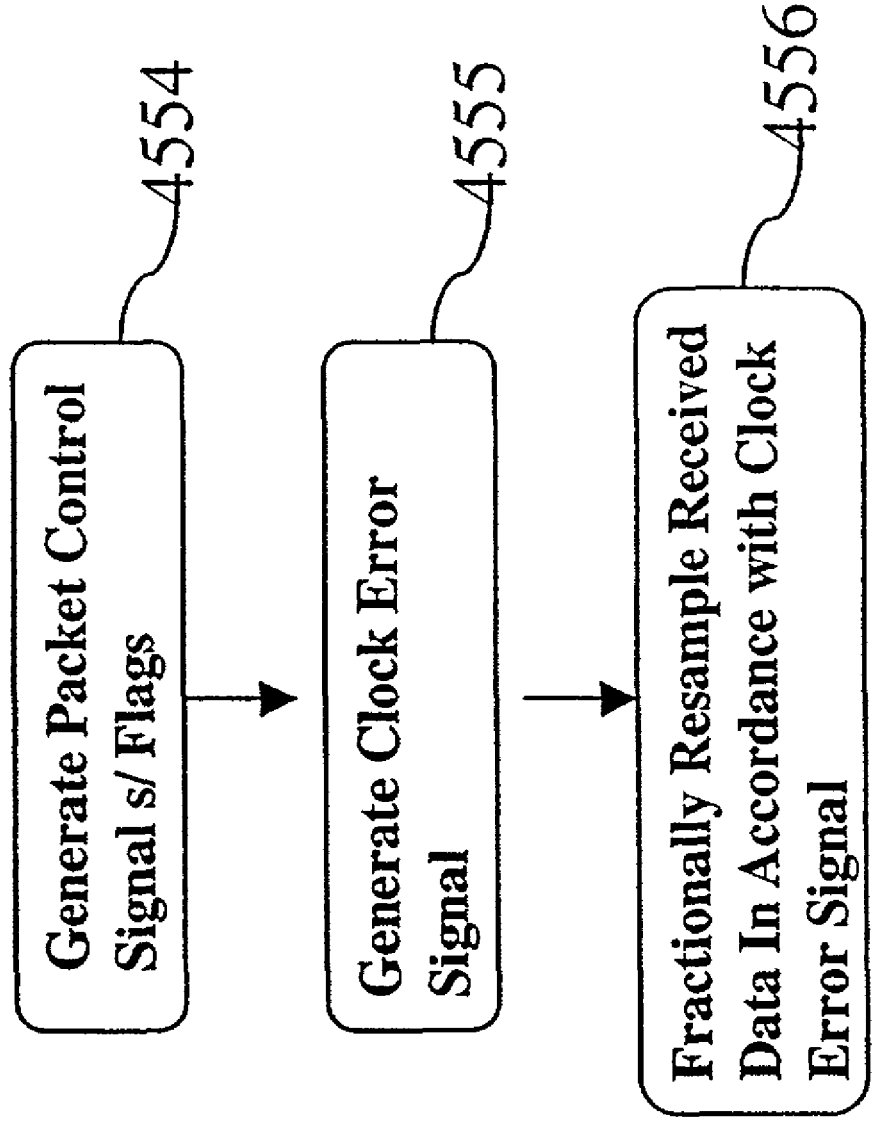
Figure 49:
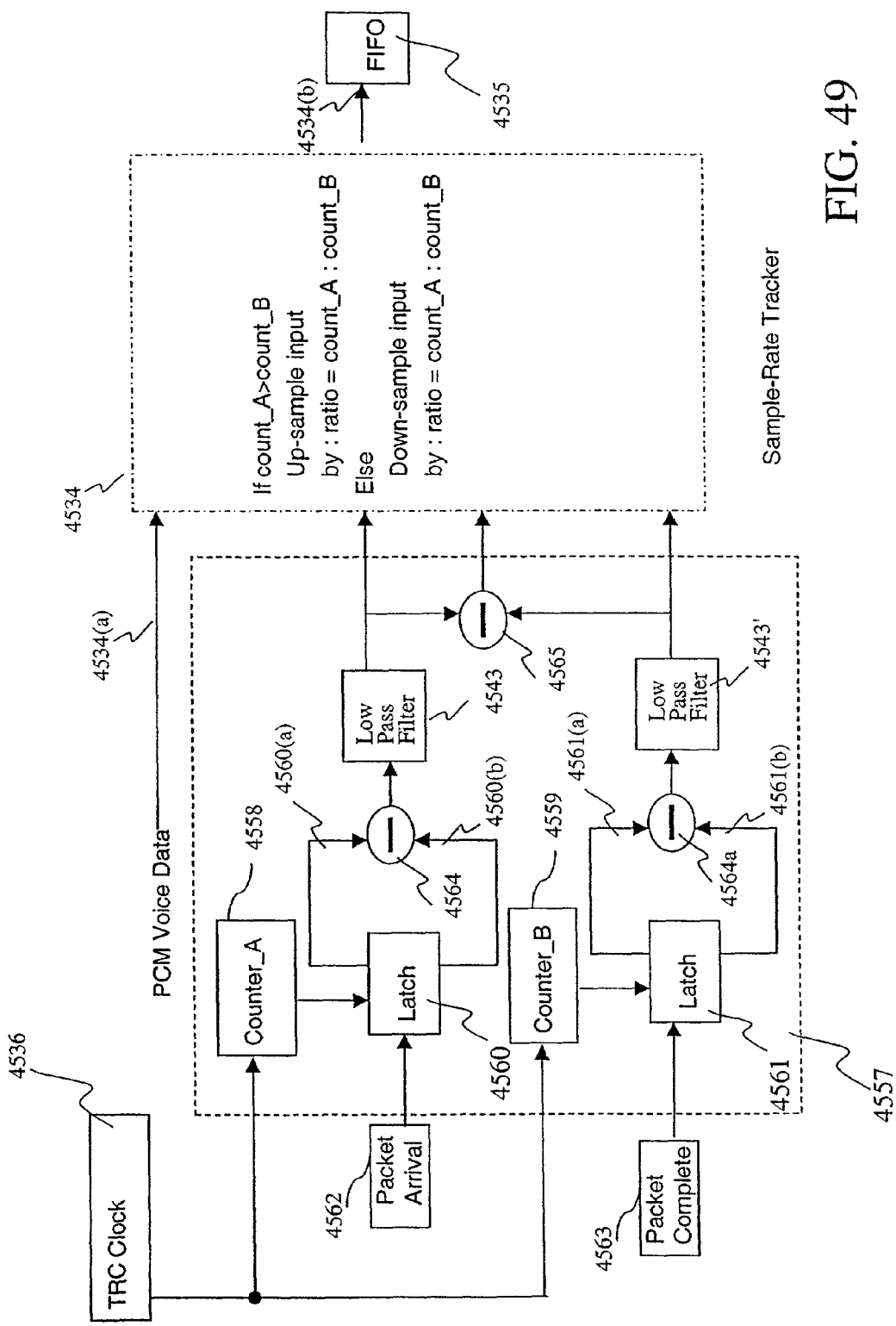
Figure 50:
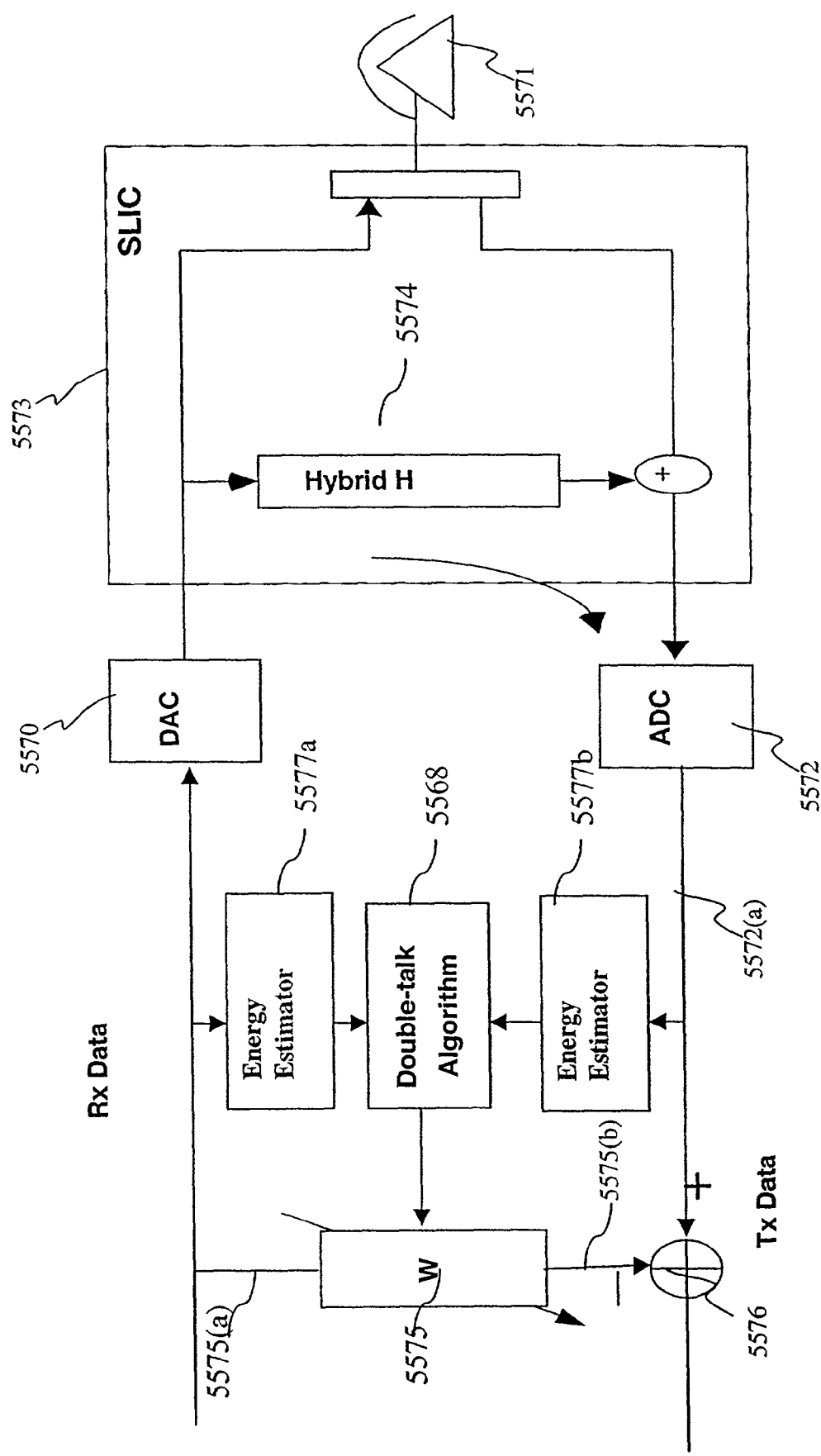
Figure 51:
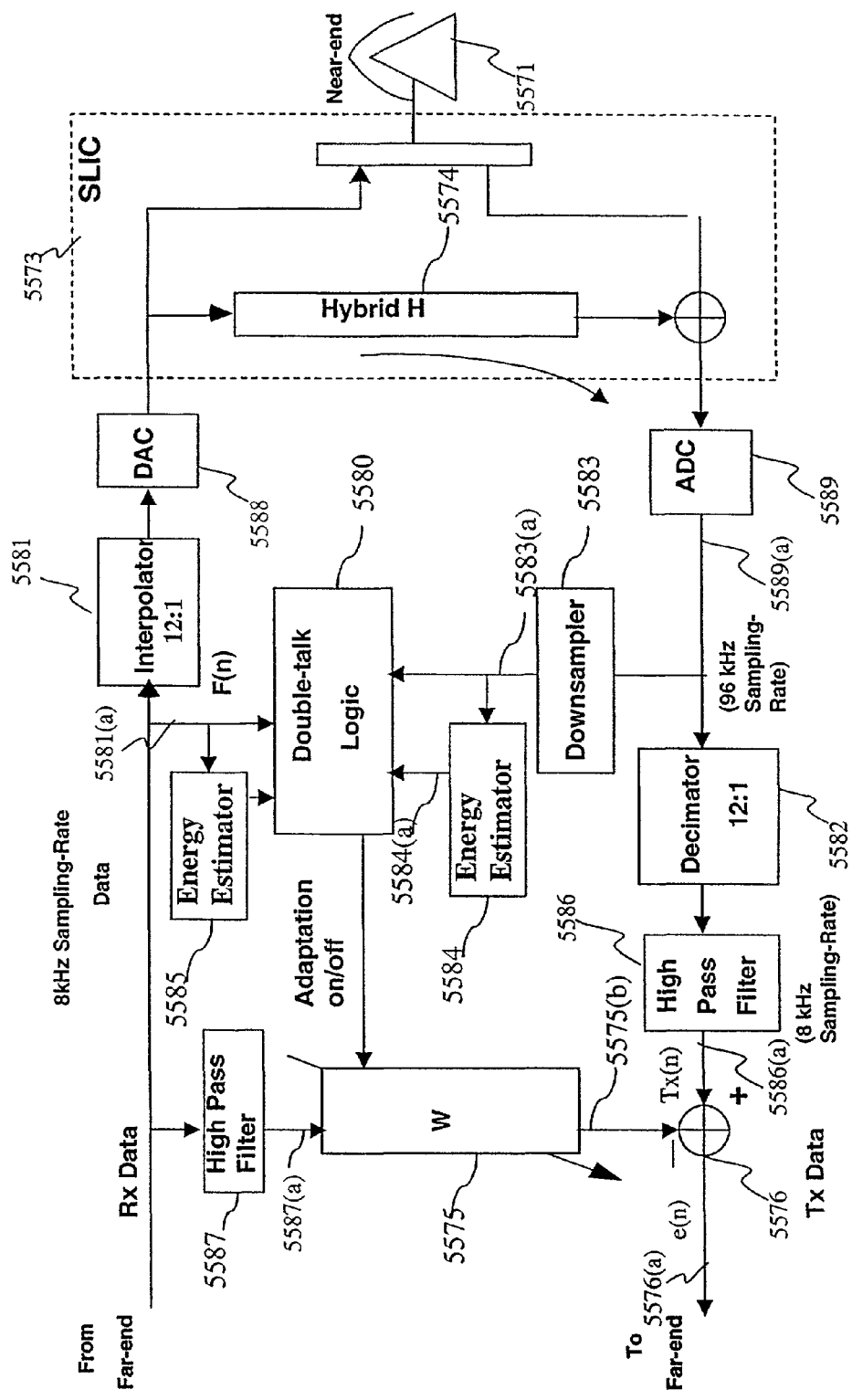
Figure 52:
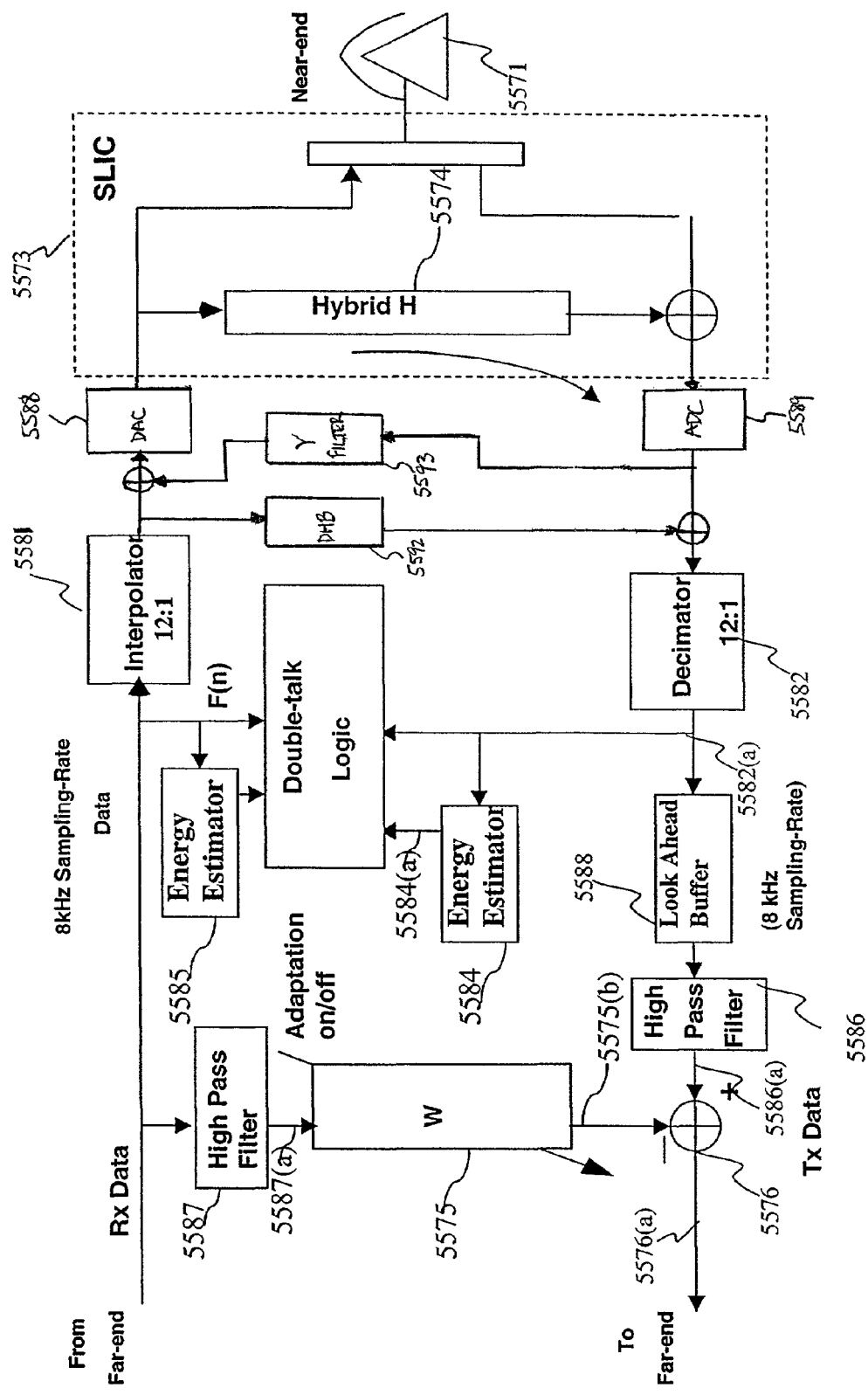
Figure 53:
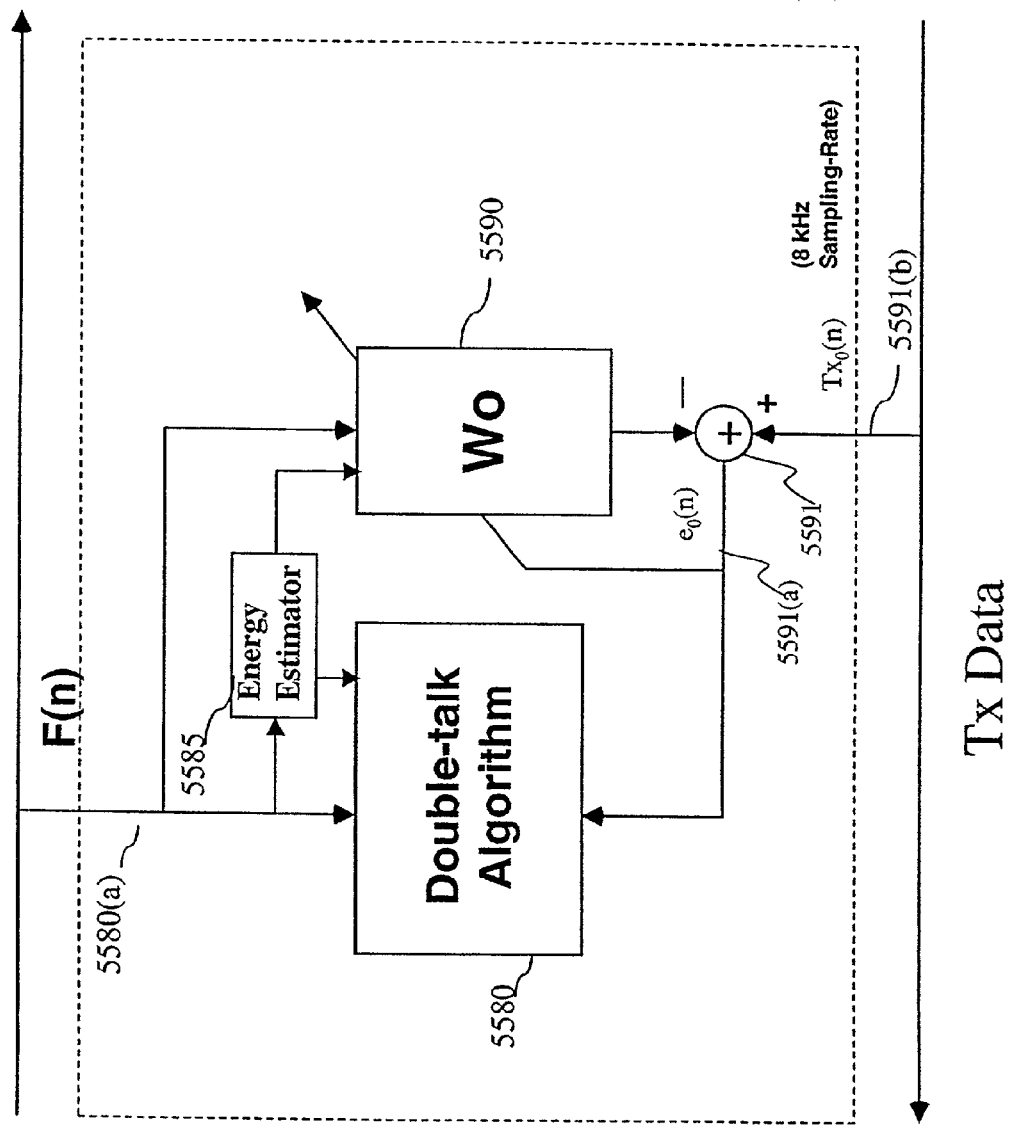
Figure 54:
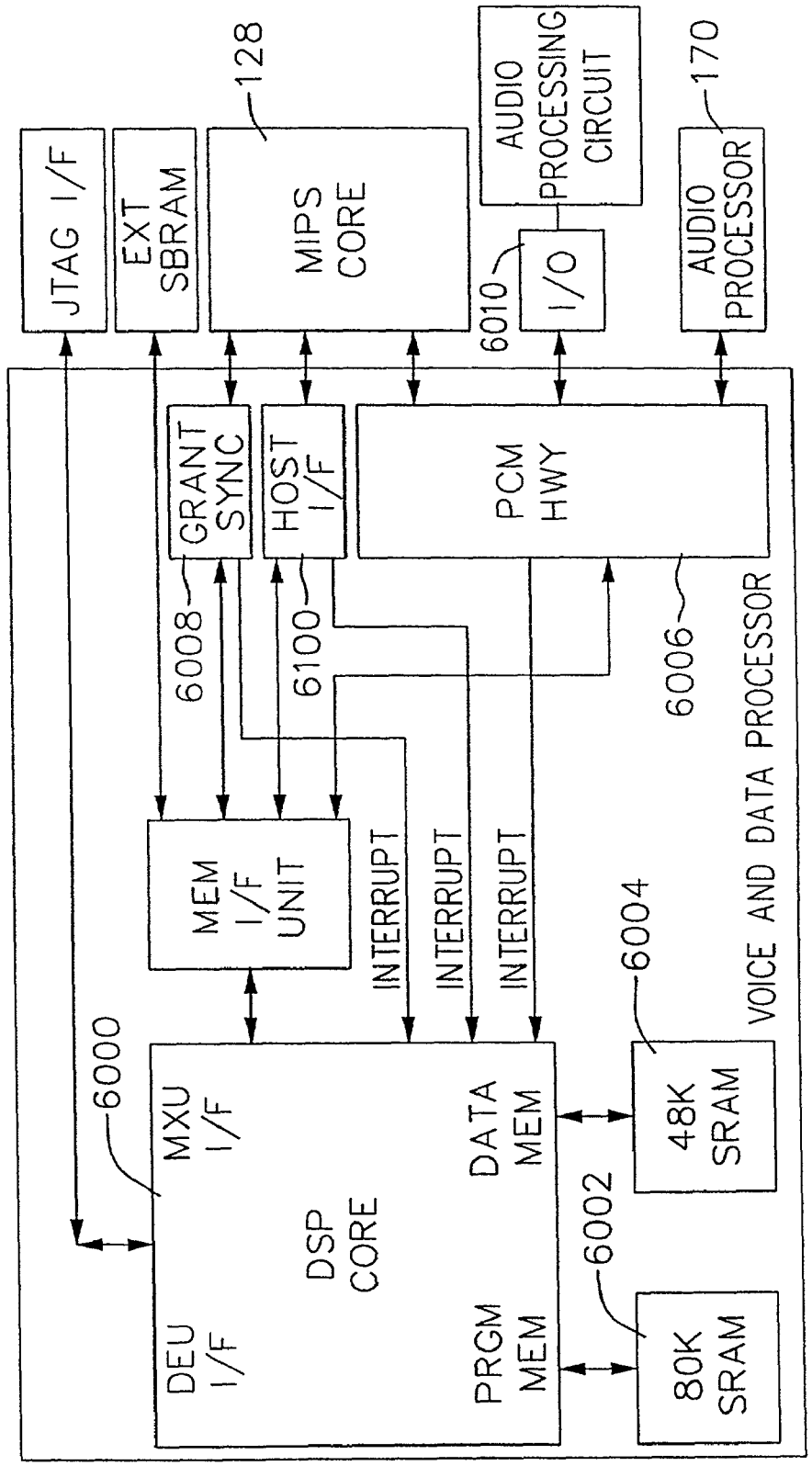
Figure 55:
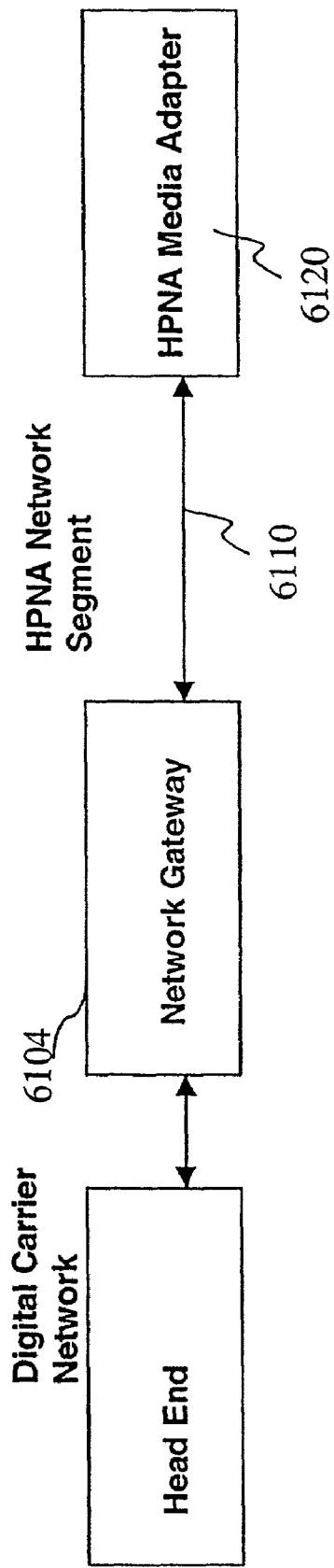
Figure 56:
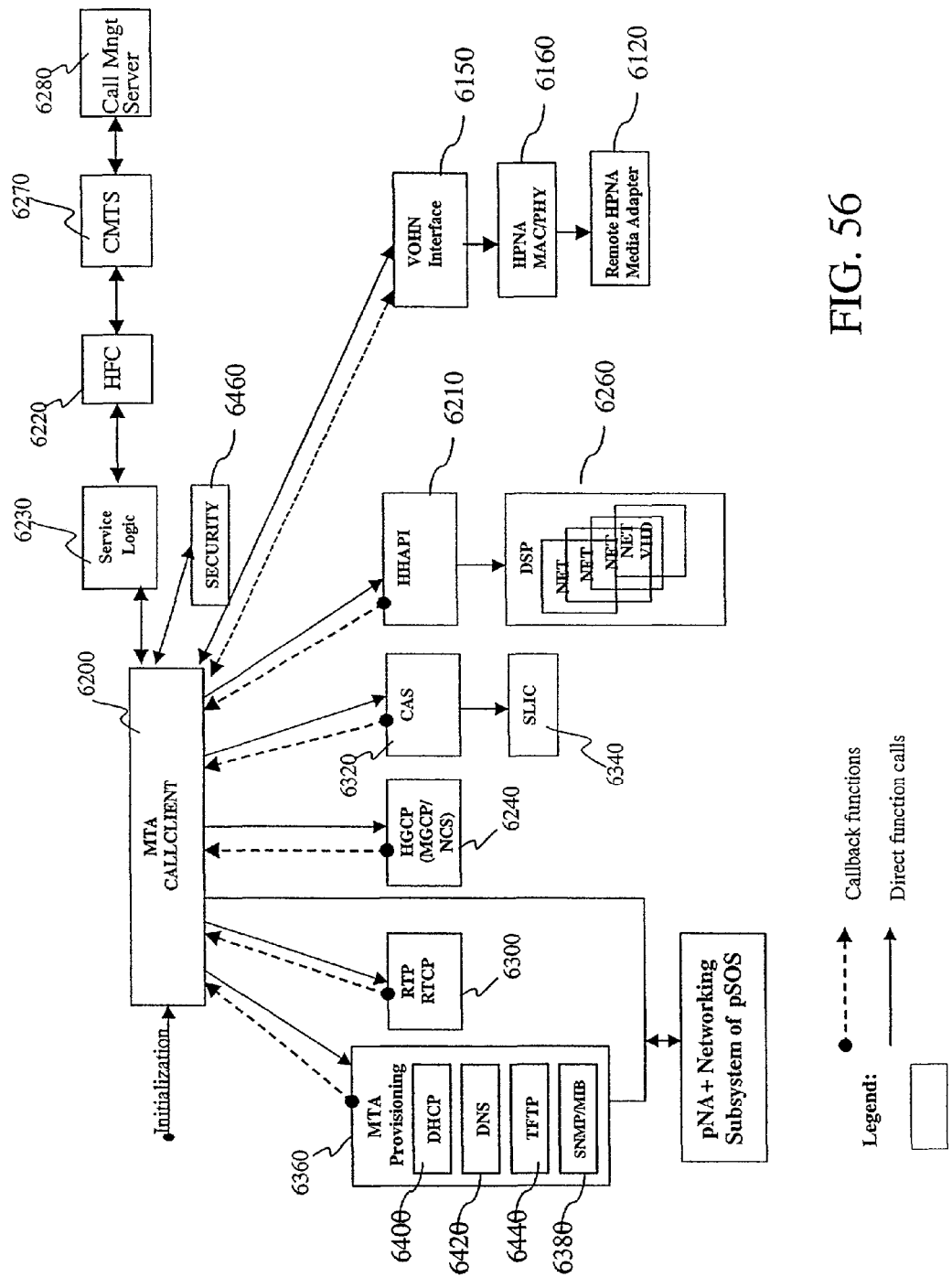
Figure 57:
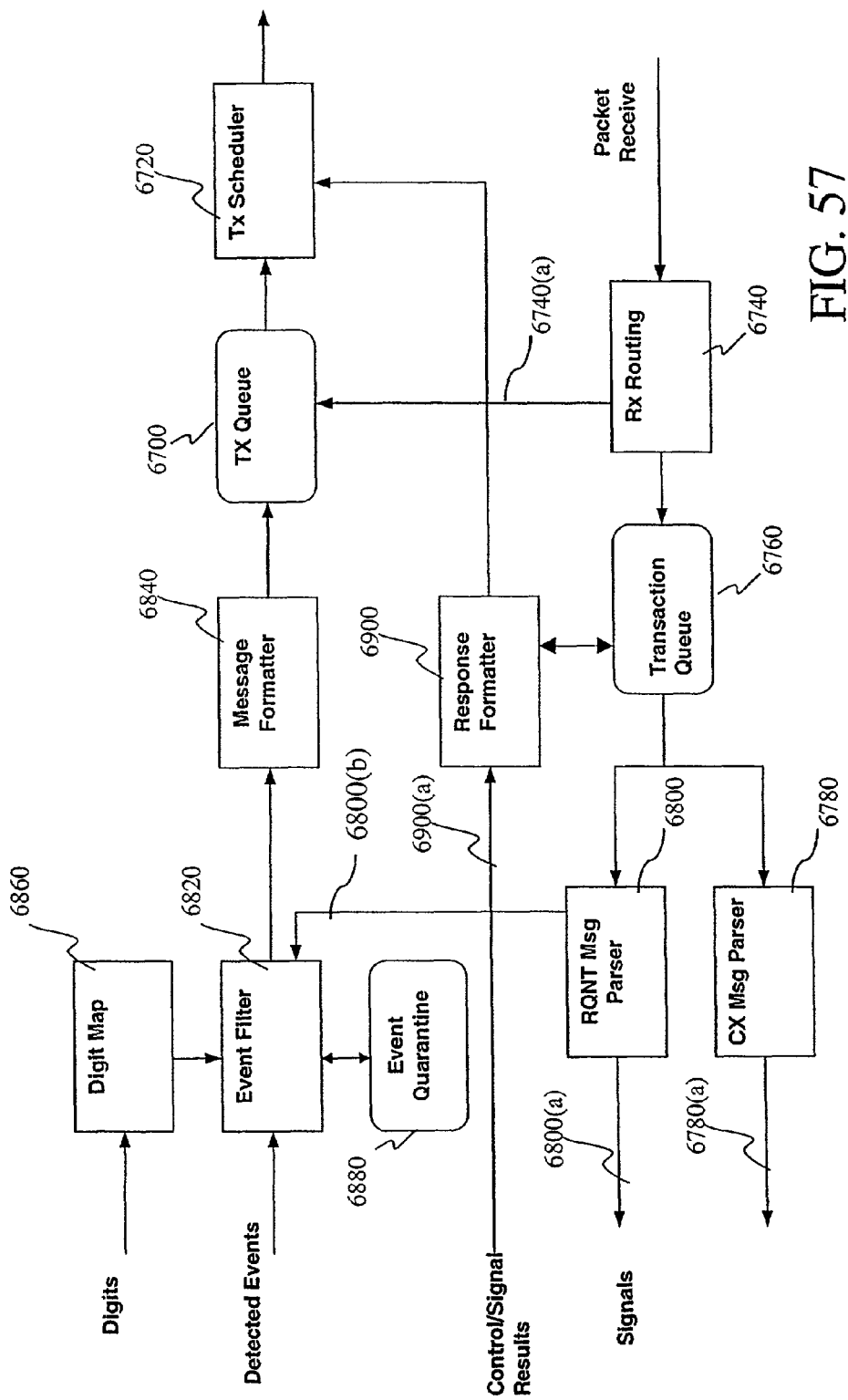
Figure 58:
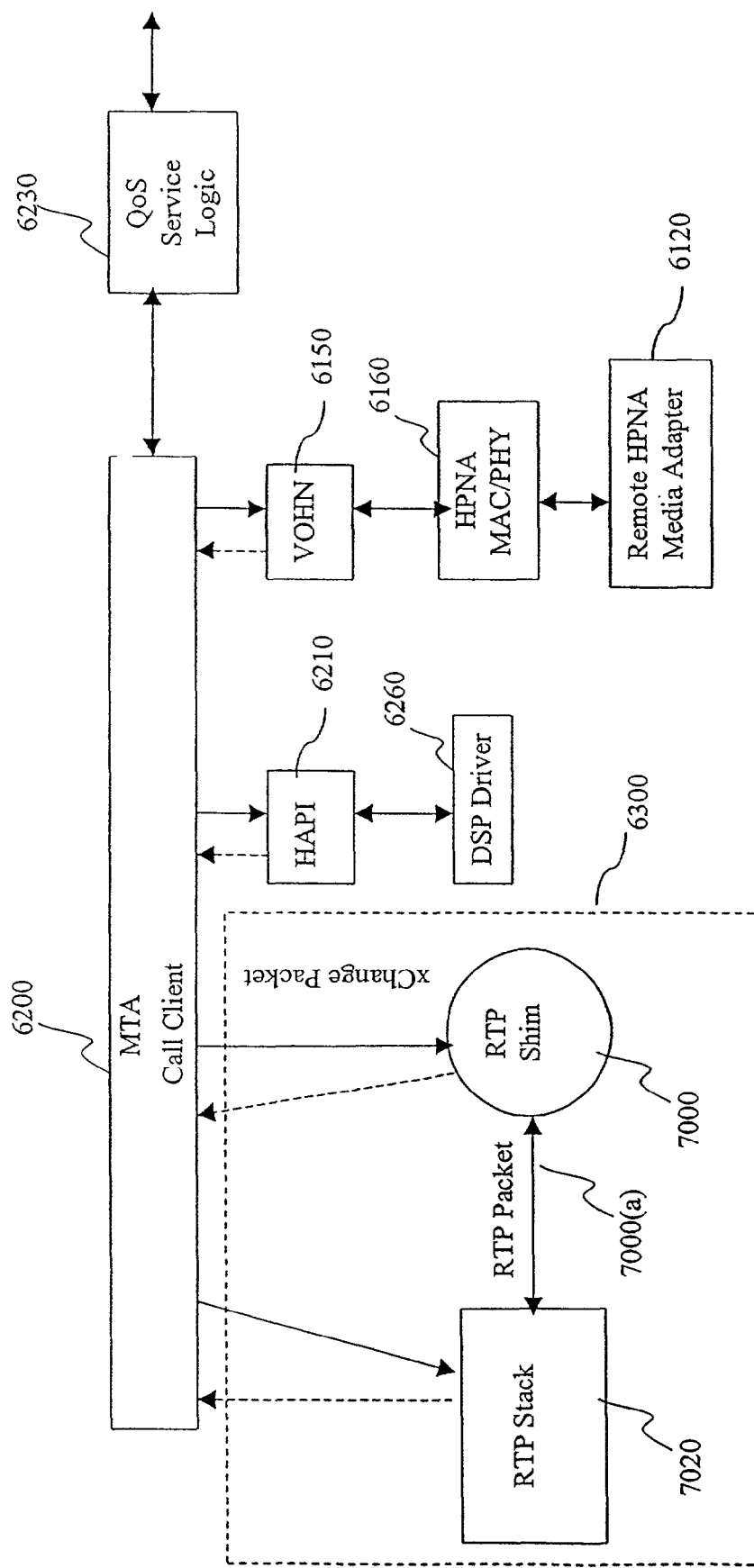
Figure 59:
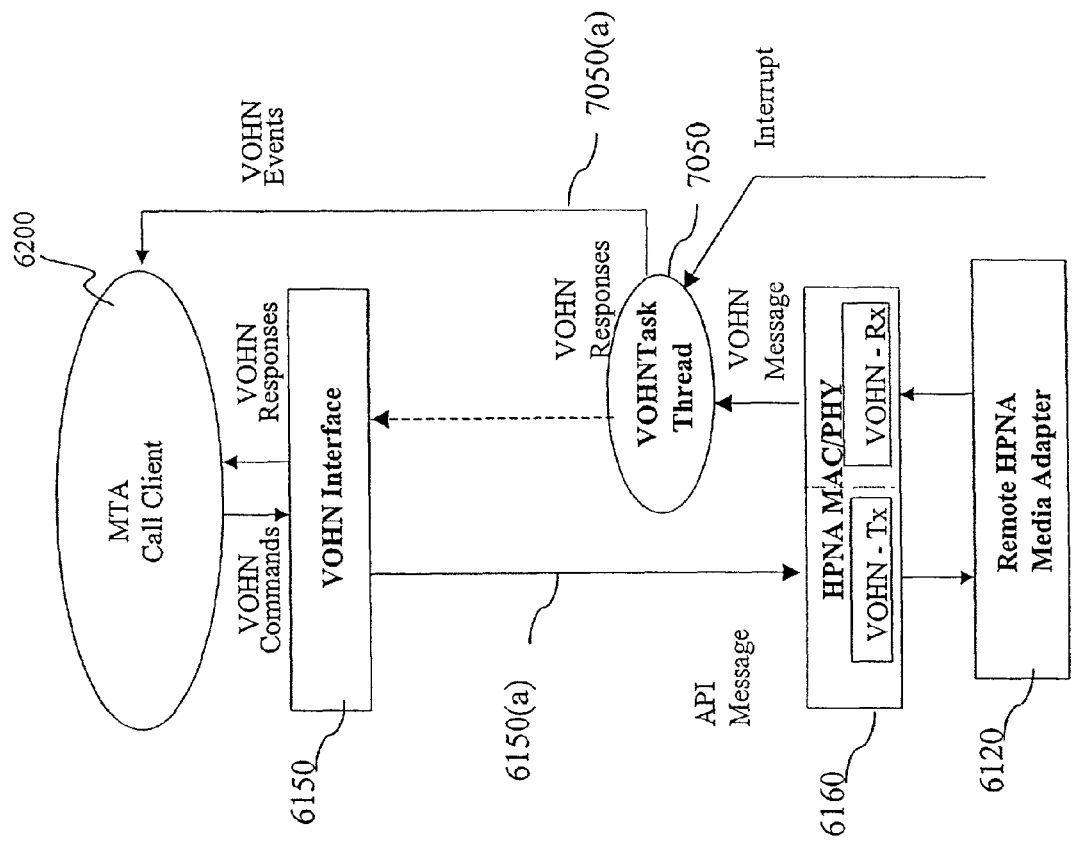
Figure 61:
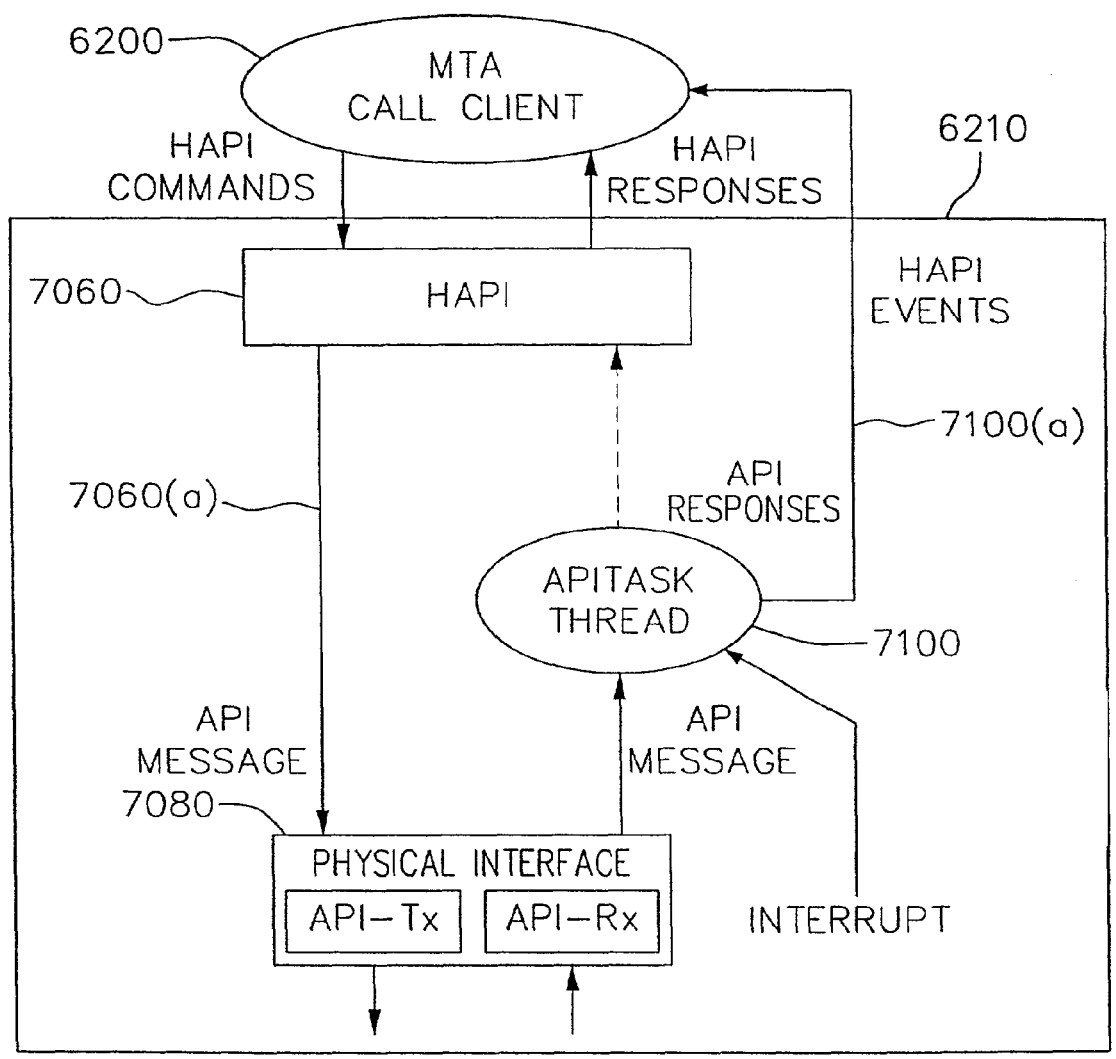
Figure 62:
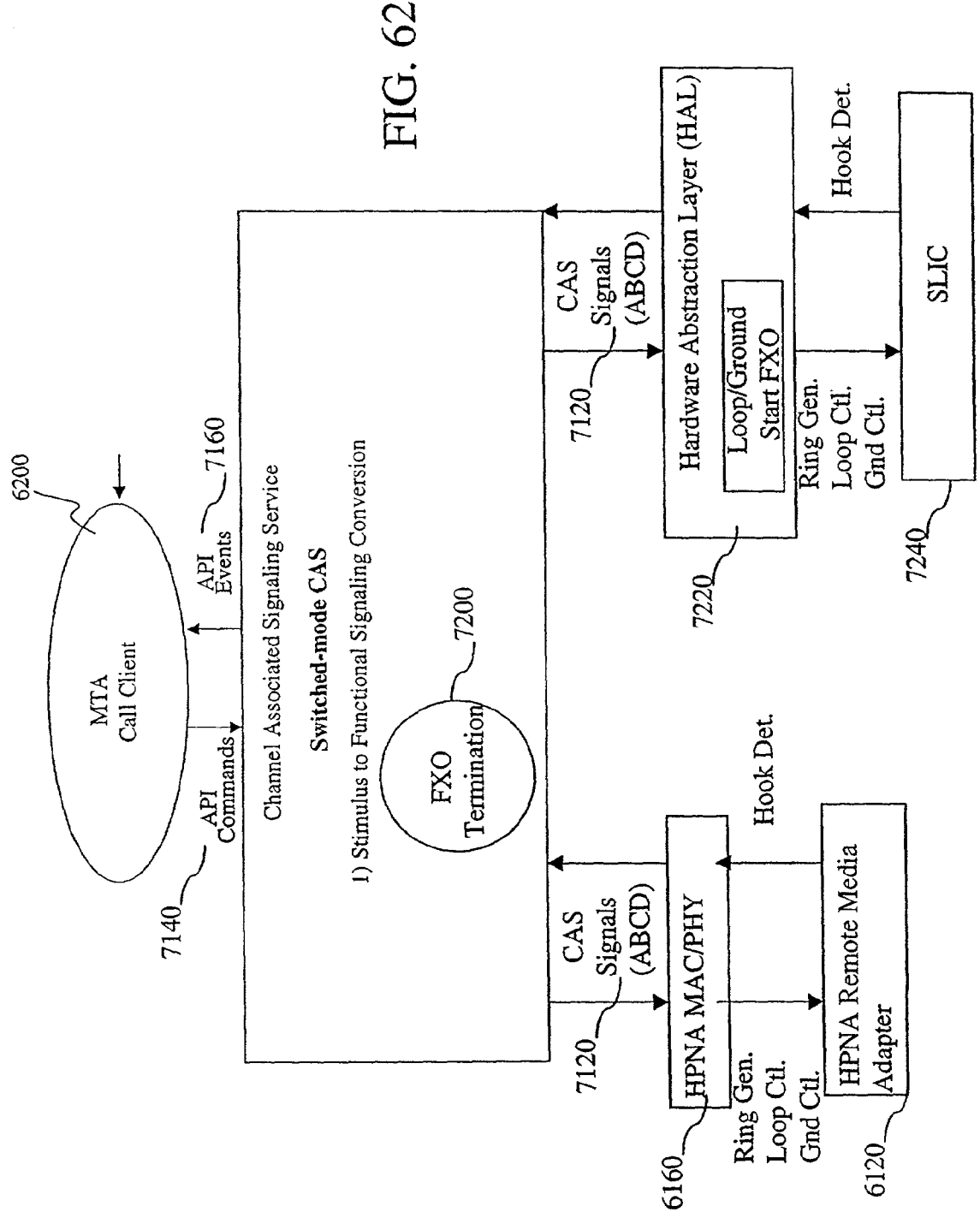
Figure 63:
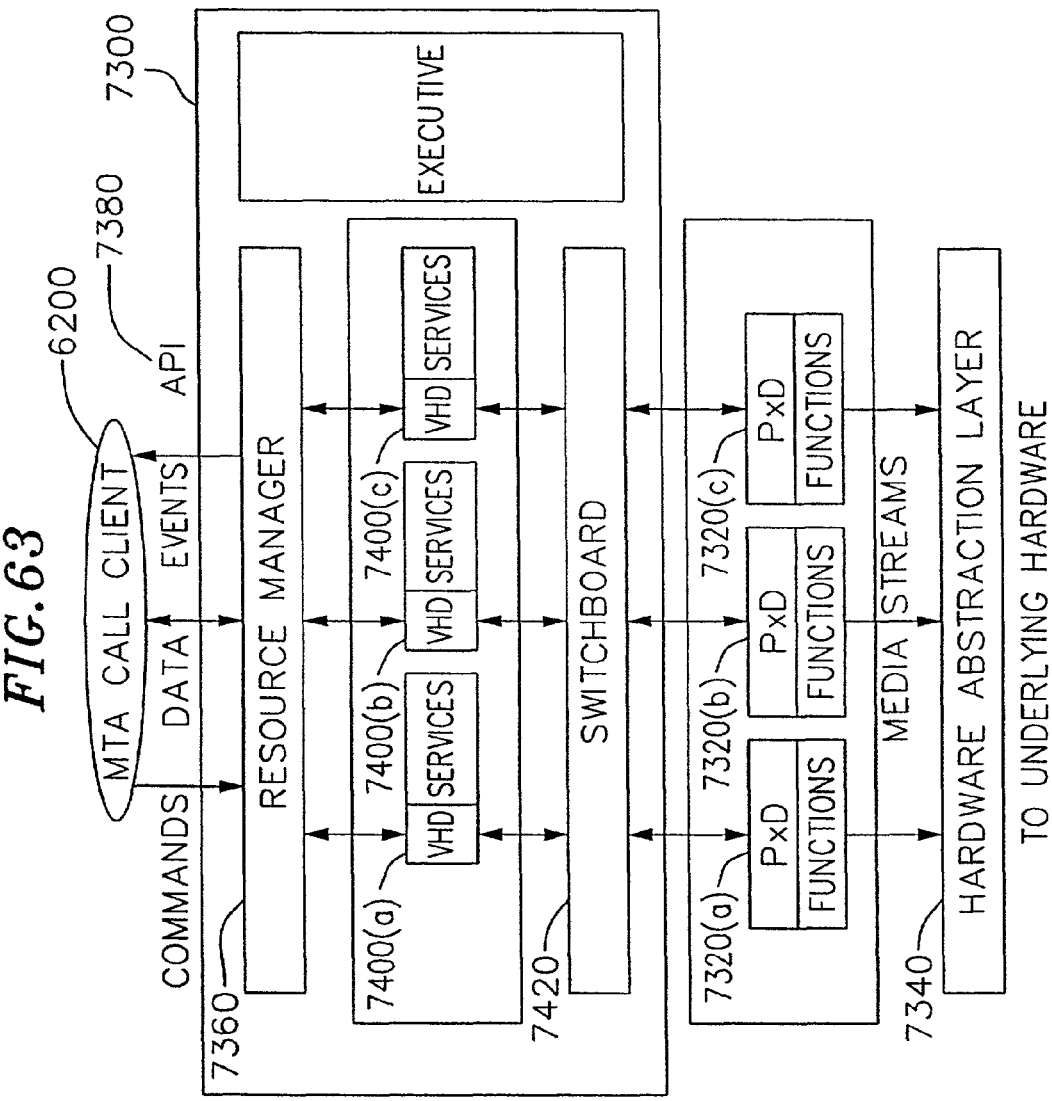
Figure 64:
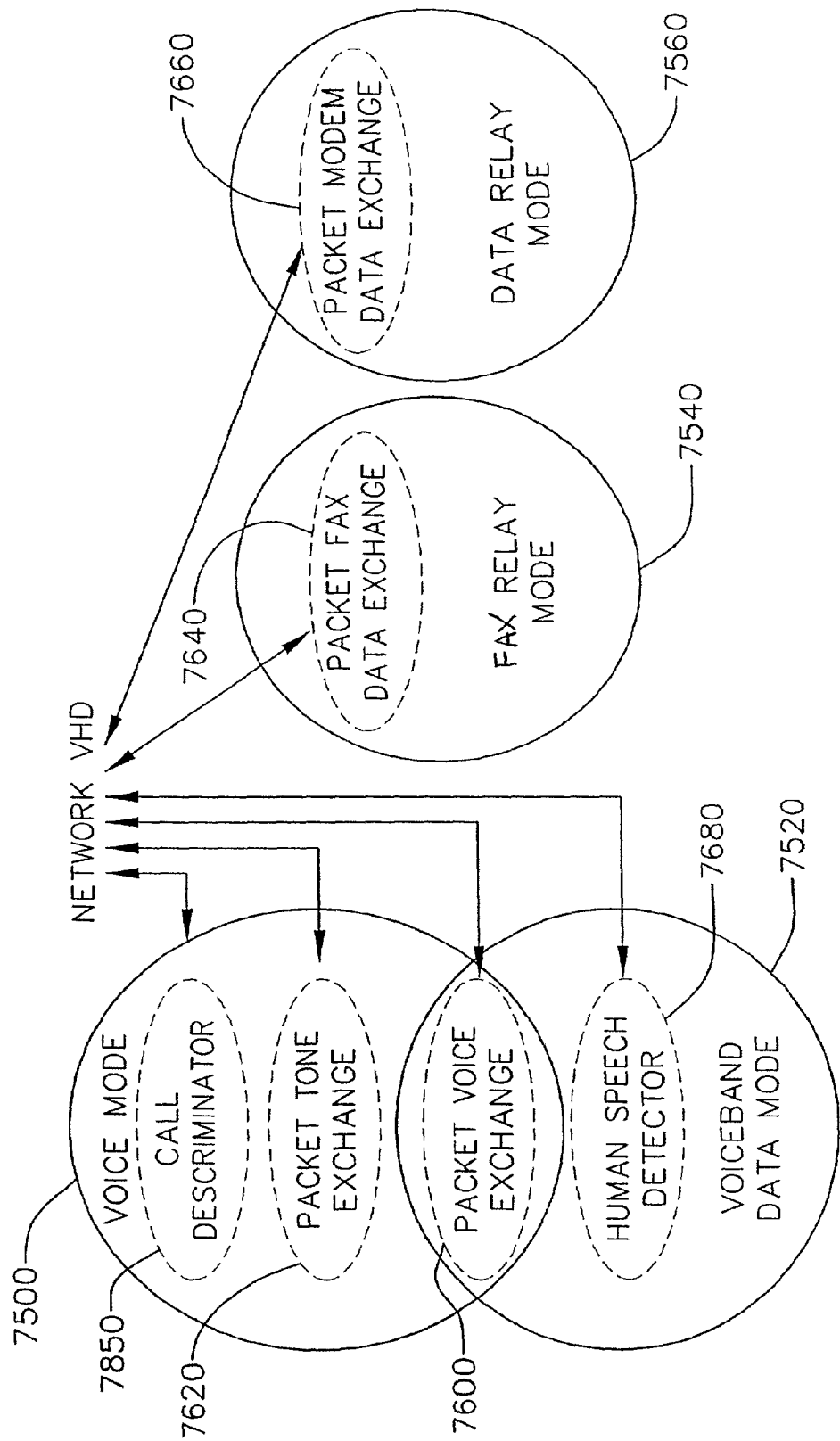
Figure 65:
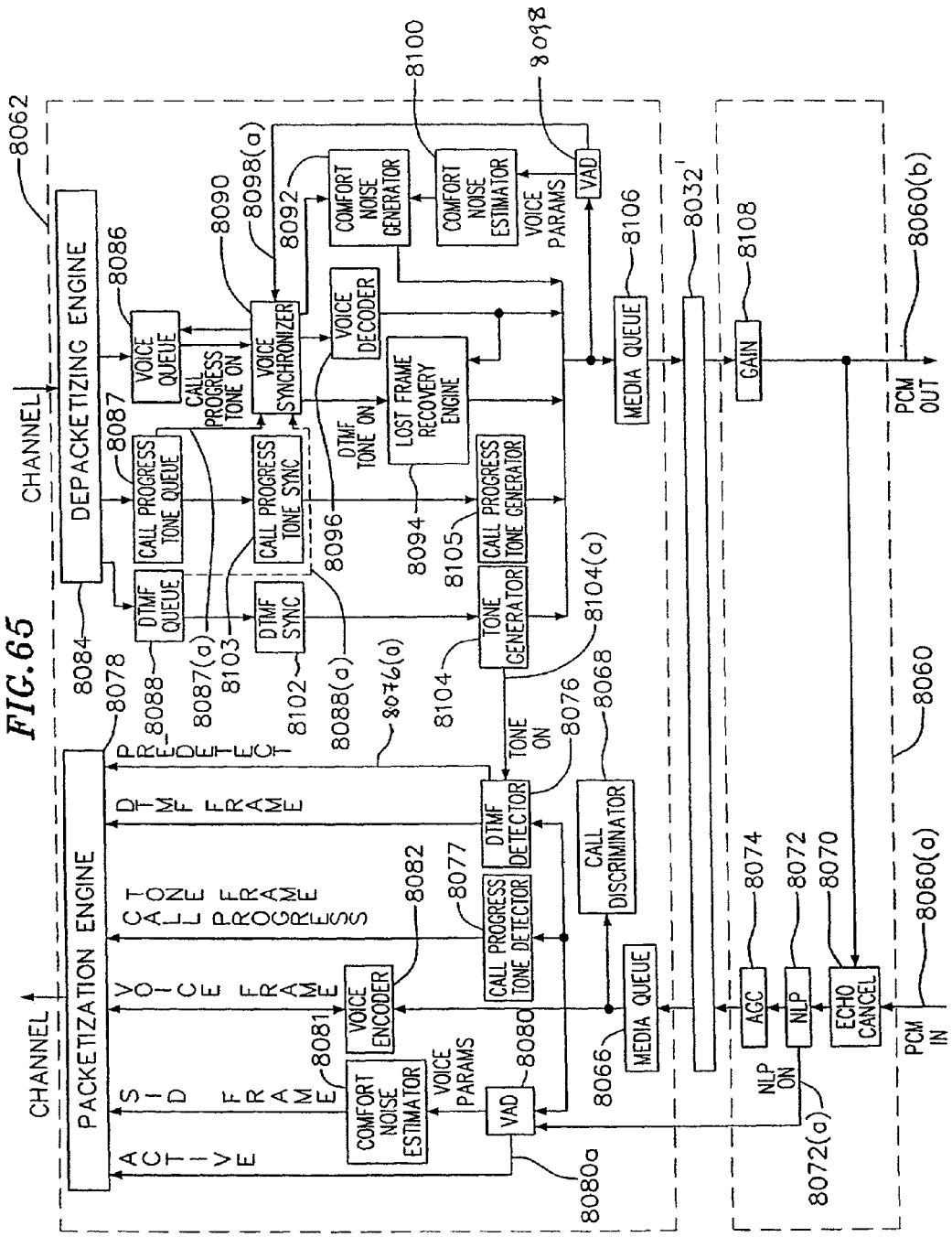
Figure 66:
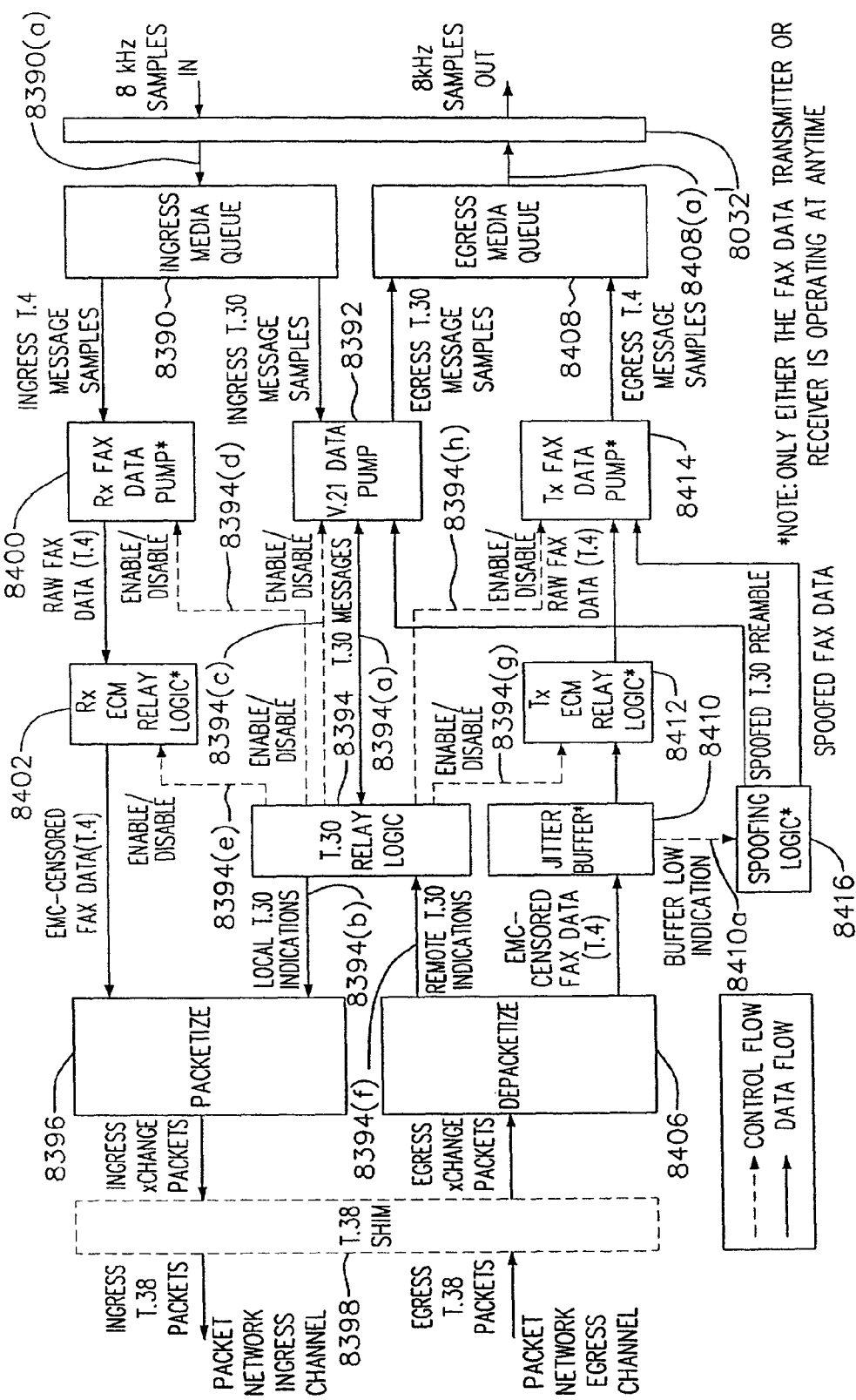
Figure 67:
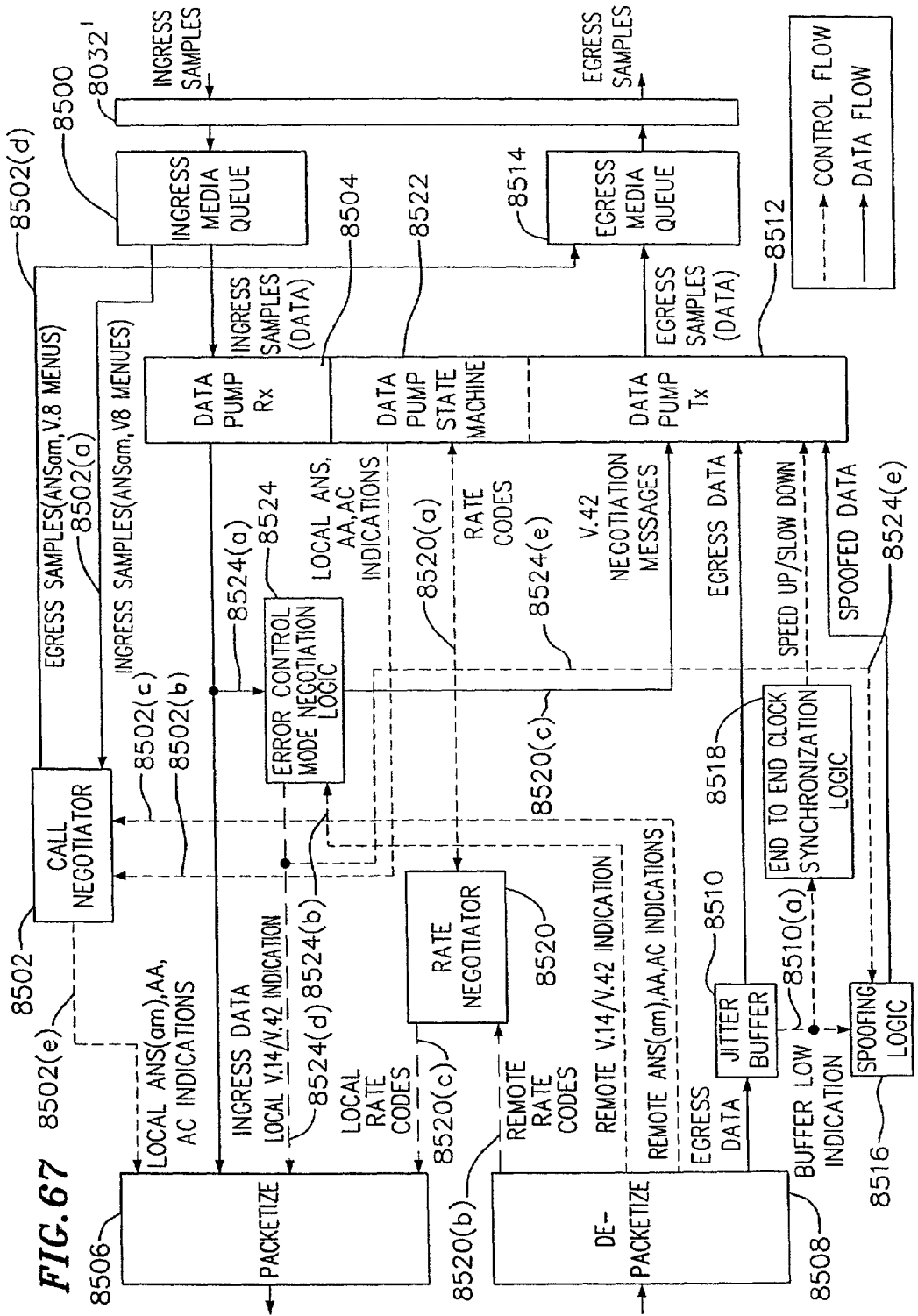
Figure 68:
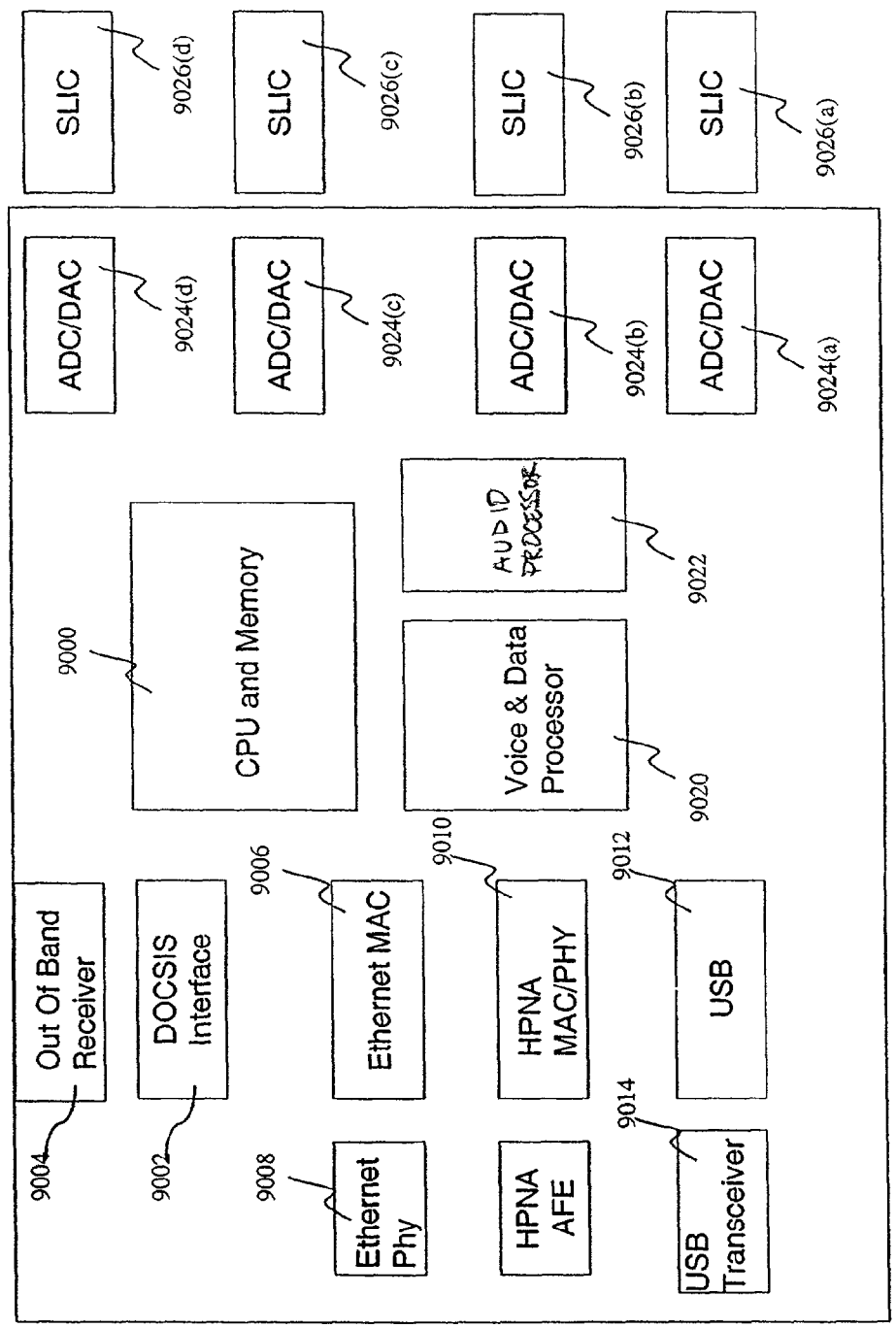

FIG. 43 graphically illustrates zero buffer padding required between data points in a data buffer and low pass filter coefficients which, when applied to the samples stored in the buffer, yield a resampled signal;

FIG. 44 graphically illustrates the regeneration of a desired resampled output with a reduced number of filter coefficients;

FIG. 45 is a voice synchronizer for the upstream direction wherein a TRC clock drives a counter which is clocked by a high frequency ADC clock and an incoming voice signal is re-sampled in accordance with the ratio of the counter output divided by the ratio of the high frequency ADC clock and the TRC clock in accordance with a preferred embodiment of the present invention;

FIG. 46 is a block diagram of a single pole low pass filter used to smooth or average the differences between sampling rates in accordance with a preferred embodiment of the present invention;

FIG. 47 is a voice synchronizer for the downstream direction wherein a frame arrival clock drives a counter that is clocked by a high frequency DAC clock so that an incoming voice signal is re-sampled in accordance with the ratio of the counter output divided by the ratio of the high frequency DAC clock and the frame arrival clock in accordance with a preferred embodiment of the present invention;

FIG. 48 is a flow diagram illustrating the operation of an alternate voice synchronizer in accordance with a preferred embodiment of the present invention;

FIG. 49 is a voice synchronizer for the downstream direction wherein a TRC clock drives two counters, one of which latched in accordance with a packet arrival flag, the other of which is latched in accordance with a packet complete control flag, and an incoming voice signal is re-sampled in accordance with the ratio of the packet arrival counter output divided by the packet complete counter output in accordance with a preferred embodiment of the present invention;

FIG. 50 is a block diagram of an echo canceller which utilizes energy estimates to detect near end speech in the presence of far end speech to control the adaptation of an adaptive filter in accordance with a preferred embodiment of the present invention;

FIG. 51 is a block diagram of an echo canceller which avoids delays in the detection of near end speech that are typically associated with conventional echo cancellers and utilizes the delay associated with a decimator and high pass filter to provide a look ahead capability so that filter adaptation may be disabled in advance of the arrival of near end speech in accordance with a preferred embodiment of the present invention;

FIG. 52 is a block diagram of an echo canceller that utilizes a delay buffer to provide a look ahead capability so that filter adaptation may be disabled in advance of the arrival of near end speech in accordance with a preferred embodiment of the present invention;

FIG. 53 is a block diagram of method for reducing the amplitude level of near end speech prior to double talk detection in accordance with a preferred embodiment of the present invention;

FIG. 54 is a block diagram of a signal processing system implemented with a programmable digital signal processor (DSP) software architecture for interfacing telephony devices with packet based networks in accordance with a preferred embodiment of the present invention;

FIG. 55 is a simplified block diagram of an HPNA network showing typical pathways for data transmission between a CMTS at a cable headend and a remote HPNA media adapter via a network gateway in accordance with an exemplary embodiment of the present invention;

FIG. 56 is a block diagram of an MTA architecture for interfacing a voice processor DSP with a MIPS core processor of a network gateway in accordance with a preferred embodiment of the present invention;

FIG. 57 is a block diagram of an architecture for gateway control protocol logic which interfaces with an external control element, called a call agent or call management server (CMS), to terminate and generate call signaling from and to a voice and data processor in compliance with the network-based call signaling (NCS) protocol specification, in accordance with a preferred embodiment of the present invention;

FIG. 58 is a block diagram of a method for converting between real time protocol packets required by the PacketCable exchange specification and the xChange packet format utilized by a voice and data processor and vice versa in accordance with a preferred embodiment of the present invention;

FIG. 59 is a block diagram of a software messaging interface between a host DSP and a remote media adapter in accordance with a preferred embodiment of the present invention;

FIG. 60 is a table illustrating call flow for an outgoing call origination in accordance with an exemplary embodiment of the present invention;

FIG. 61 is a block diagram of a software messaging interface between a host DSP and voice and data processing software in accordance with a preferred embodiment of the present invention;

FIG. 62 is a block diagram of channel associated signaling service logic for exchanging commands and events between a host MTA call client and standard commercial analog loop/ground start devices in accordance with a preferred embodiment of the present invention;

FIG. 63 is a block diagram of a software architecture operating on the DSP platform of FIG. 54 in accordance with a preferred embodiment of the present invention;

FIG. 64 is state machine diagram of the operational modes of a virtual device driver for packet based network applications in accordance with a preferred embodiment of the present invention;

FIG. 65 is a system block diagram of a signal processing system operating in a voice mode in accordance with a preferred embodiment of the present invention;

FIG. 66 is a system block diagram of a signal processing system operating in a real time fax relay mode in accordance with a preferred embodiment of the present invention;

FIG. 67 is a system block diagram of a signal processing system operating in a modem relay mode in accordance with a preferred embodiment of the present invention; and FIG. 68 is a system block diagram illustrating the component parts of an exemplary network gateway that may be controlled by a power management system in accordance with an exemplary embodiment of the present invention.

DETAILED DESCRIPTION OF THE INVENTION

Table of Contents

A. Overview
B. DOCSIS Cable Modem
   1. Downstream Demodulator
   2. Upstream Modulator
   3. DOCSIS MAC
   4. Integrated Ethernet MAC
   5. Universal Serial Bus Transceiver and MAC
   6. HPNA
      a. MAC/PHY
      b. Latency
      c. HPNA Timing Synchronization
      d. HPNA VoIP Timing Synch Circuit
   7. Audio Processor
      a. Voice Synchronization
      b. Echo Cancellation
   8. Voice Processing
      a. Packetized Voice and Signaling Services
      b. Voice and Data Processor i. The Voice Mode
   ii. The Fax Relay Mode
   iii. Data Relay Mode
  9. Power Management
   a. CPU and Memory
   b. DOCSIS Interface
   c. Ethernet MAC and PHY
   d. HPNA MAC/PHY
   e. USB MAC and Transceiver
   f. Voice and Data Processor
   g. Audio Processor
   h. Analog Front End ADC/DAC
C. Conclusion

A. OVERVIEW

In an exemplary embodiment of a cable modem system, a headend or cable modem termination system (CMTS) is located at a cable company facility and functions as a modem which services a large number of subscribers. Each subscriber has a cable modem (CM). Thus, the cable modem termination system must be capable of facilitating bidirectional communication with any desired one of the plurality of cable modems.

As used herein, the cable modem termination system (CMTS) is defined to include that portion of a headend which facilitates communication with a number of cable modems. A typical cable modem termination system includes a burst receiver, a continuous transmitter and a medium access control (MAC:).

The cable modem termination system communicates with the cable modems via a hybrid fiber coaxial (HFC) network, wherein optical fiber provides communication to a number of fiber nodes and each fiber node typically serves approximately 500 to 2,000 subscribers, which communicate with the node via coaxial cable. The subscribers communicate with the fiber node via a common or shared coaxial cable.

The HFC network of a cable modem system utilizes a point-to-multipoint topology to facilitate communication between the cable modem termination system and the cable modems. Frequency domain multiple access (FDMA)/time division multiplexing (TDM) is used to facilitate communication from the cable modem termination system to each of the cable modems, i.e., in the downstream direction. Frequency domain multiple access (FDMA)/time domain multiple access (TDMA) is used to facilitate communication from each cable modem to the cable modem termination system, i.e., in the upstream direction.

The cable modem termination system includes a downstream modulator for transmitting data communications to the cable modems and an upstream demodulator for receiving data communications from the cable modems.

The downstream modulator of the cable modem termination system generally utilizes either 64 QAM or 256 QAM in a frequency band of 54 MHz to 860 MHz to provide a data rate of up to 56 Mbps. Since the upstream channel has a much lower data rate requirement, the upstream demodulator may use either QPSK or 16 QAM in a frequency range of 5 MHz to 42 MHz to provide a data rate of up to 10 Mbps.

Similarly, each cable modem includes an upstream modulator for transmitting data to the cable modem termination system and a downstream demodulator for receiving data from the cable modem termination system. In the described exemplary embodiment, the upstream modulator of each cable modem typically uses either QPSK or 16 QAM within the 5 MHz to 42 MHz bandwidth of the upstream demodulator and the downstream demodulator of each cable modem may use either 64 QAM or 256 QAM in the 54 MHz to 860 MHz bandwidth of the downstream modulator (in North America). As those skilled in the art will appreciate, other modulation schemes may be used depending on the application.

In order to accomplish TDMA for upstream communication, time slots may be assigned to each cable modem within which cable modems may transmit communications to the cable modem termination system. The assignment of such time slots is accomplished by providing a request contention area in the upstream data path within which the cable modems are permitted to contend in order to place a message which requests additional time in the upstream data path for the transmission of their message. The cable modem termination system responds to these requests by assigning time slots to the cable modems making such a request, so that as many of the cable modems as possible may transmit their messages to the cable modem termination system utilizing TDMA and so that the transmissions are performed without undesirable collisions.

Because of the use of TDMA, the cable modem termination system uses a burst receiver, rather than a continuous receiver, to receive packets of information from the cable modems via upstream communications. As those skilled in the art will appreciate, a continuous receiver may be utilized where generally continuous communications (as opposed to burst communications as in the present invention) are performed, so as to substantially maintain timing synchronization between the cable modem transmitter and the CMTS receiver, for proper reception of the communicated information. During continuous communications, timing recovery is a more straightforward process since signal acquisition generally only occurs at the initiation of such communications. Thus, acquisition is generally only performed in continuous receivers once per continuous transmission and each continuous transmission may be very long.

However, the burst communications inherent to TDMA systems entail periodic and frequent reacquisition of the signal. That is, during TDMA communications, the signal is reacquired for each separate burst transmission being received.

Figure 1:
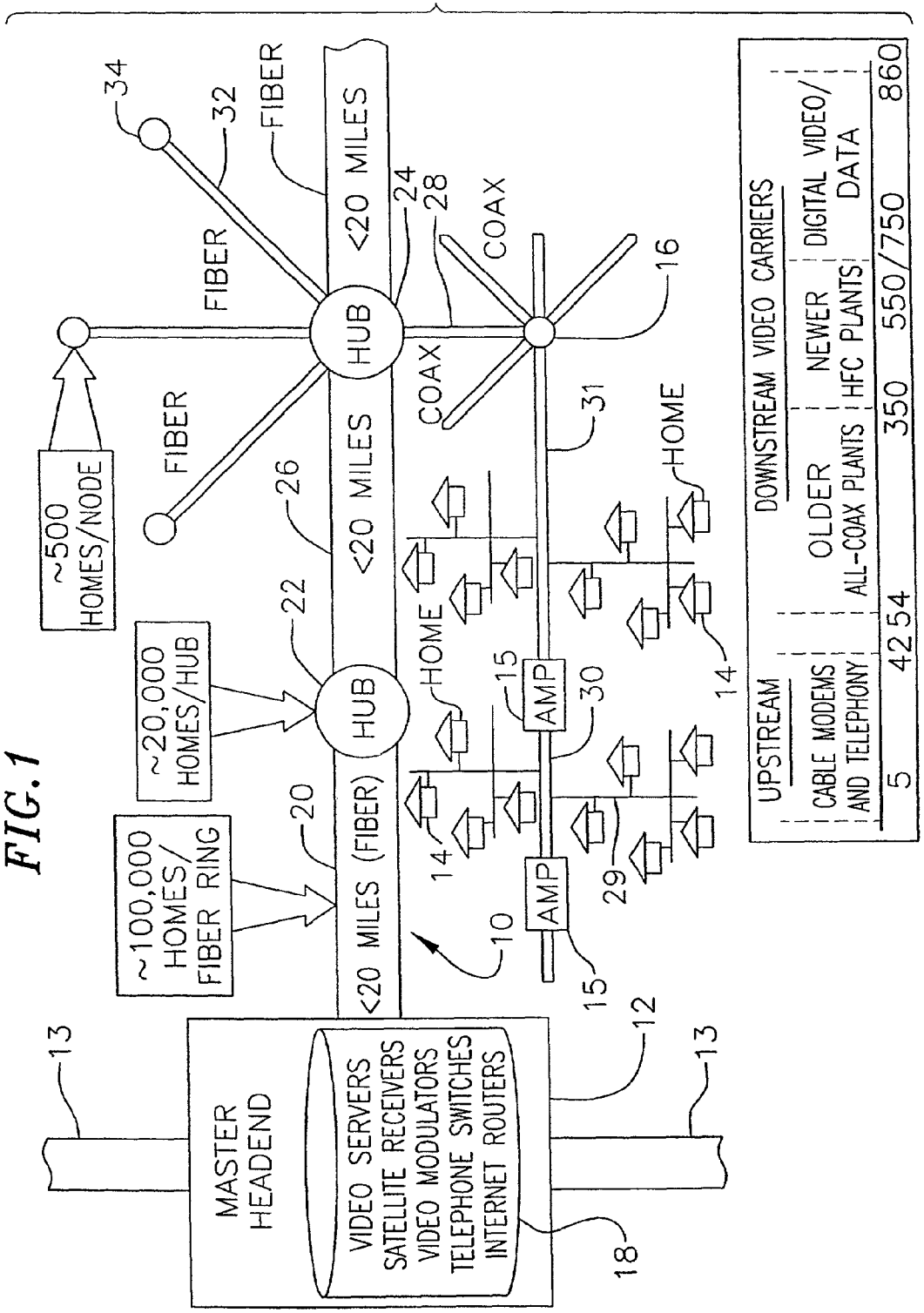
FIG. 1 is a schematic diagram of a hybrid fiber coaxial (HFC) network showing typical pathways for data transmission between the headend (which contains the cable modem termination system) and a plurality of homes (each of which contain a cable modem)

Referring now to FIG. 1, a hybrid fiber coaxial (HFC) network 10 facilitates the transmission of data between a headend 12, which includes at least one cable modem termination system, and a number of homes 14, each of which contains a cable modem. Such hybrid fiber coaxial networks are commonly utilized by cable providers to provide Internet access, cable television, pay-per-view and the like to subscribers. An exemplary CMTS for use with the present invention is disclosed in commonly owned U.S. patent application Ser. No. 09/574,558, entitled "CABLE MODEM APPARATUS AND METHOD", filed May 19, 2000 the content of which is incorporated fully herein by reference. In this and other embodiments, common reference numerals may be used to represent like components.

Approximately 500 homes 14 are in electrical communication with each node 16, 34 of the hybrid fiber coaxial network 10, typically via coaxial cables 29, 30, 31. Amplifiers 15 facilitate the electrical connection of the more distant homes 14 to the nodes 16, 34 by boosting the electrical signals so as to desirably enhance the signal-to-noise ratio of such communications and by then transmitting the electrical signals over coaxial cables 30, 31. Coaxial cable 29 electrically interconnects the homes 14 with the coaxial cables 30, 31, which extend between amplifiers 15 and nodes 16, 34. Each node 16, 34 is electrically connected to a hub 22, 24, typically via an optical fiber 28, 32. The hubs 22, 24 are in communication with the headend 12, via optical fibers 20, 26. Each hub is typically capable of facilitating communication with approximately 20,000 homes 14.

The optical fibers 20, 26 extending intermediate the headend 12 and each hub 22, 24 define a fiber ring which is typically capable of facilitating communication between approximately 100,000 homes 14 and the headend 12. The headend 12 may include video servers, satellite receivers, video modulators, telephone switches and/or Internet routers 18, as well as the cable modem termination system. The headend 12 communicates via transmission line 13, which may be a T1 or T2 line, with the Internet, other headends and/or any other desired device(s) or network.

Figure 2:
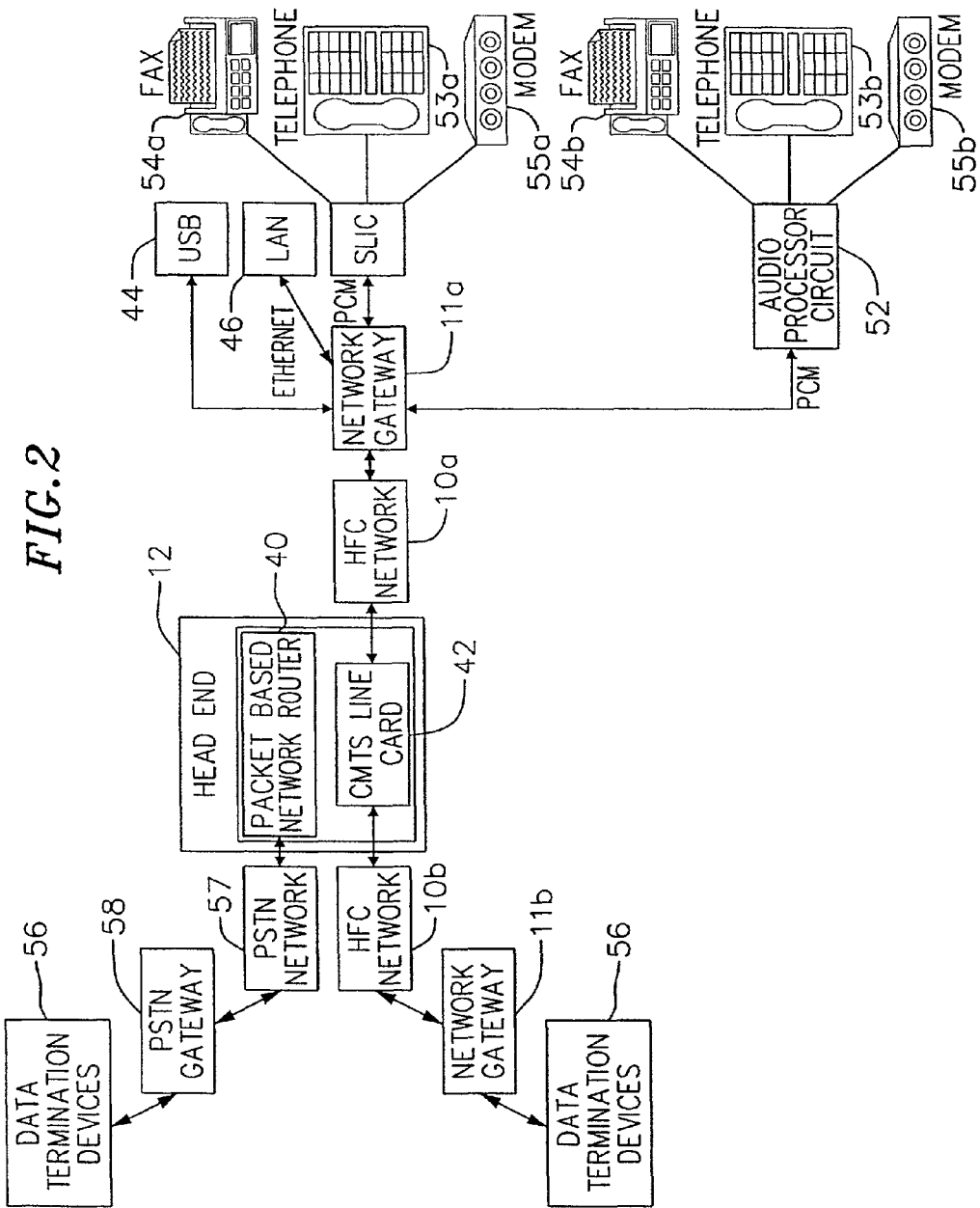
FIG. 2 is a block diagram of a network gateway integrated into a cable modem system wherein the network gateway interfaces a plurality of packet based and circuit switched systems with a cable modem termination system (CMTS) disposed at the headend.

In an exemplary embodiment of the present invention, a network gateway may facilitate on line and off line bi-directional communication between a number of near end data or telephony devices and far end data termination devices via a cable modem termination system. An exemplary topology is shown in FIG. 2 with a network gateway 11a providing an interface to HFC network 10a for a telephone 53a, fax machine 54a and modem 55a through a subscriber loop interface circuit (SLIC) 50. The network gateway 11a also provides an interface to the 10a HFC network for a telephone 53b, a fax machine 54b and a modem 55b through an audio processor circuit 52. The described exemplary network gateway 11a may also couple a local area network (LAN) 46 and a universal synchronous bus (USB) 44 access to the HFC network 10a. The HFC network is coupled to a CMTS line card 42 in the CMTS 12. The CMTS line card 12 is coupled to a packet based network router 40 to determine whether the communication will be transported via a far end HFC network 10b, a far end PSTN network 57 or the Internet. The packet based network router 40 facilitates communication between the near end data devices and off line far end data terminating devices 56 via a circuit switched networks such as the public switched telephone network (PSTN) 57 and a PSTN gateway 58.

In the case of a far end HFC network, a network gateway 11b provides an interface between the far end data termination devices 56B and the far end HFC network 10b connected to the CMTS 12. Data termination devices include by way of example, analog and digital phones, ethernet phones, Internet Protocol phones, fax machines, data modems, cable modems, interactive voice response systems, PBXs, key systems, and any other conventional telephony devices known in the art. One of skill in the art will appreciate that the described exemplary network gateway is not limited to a telephony interface to the HFC network, but rather may interface with a variety of communication media such as for example, asymmetric digital subscriber line (ADSL), DSL, T1 or other networks known in the art. Therefore, the described hybrid fiber coaxial network 10a is by way of example only and not by way of limitation.

Figure 3:
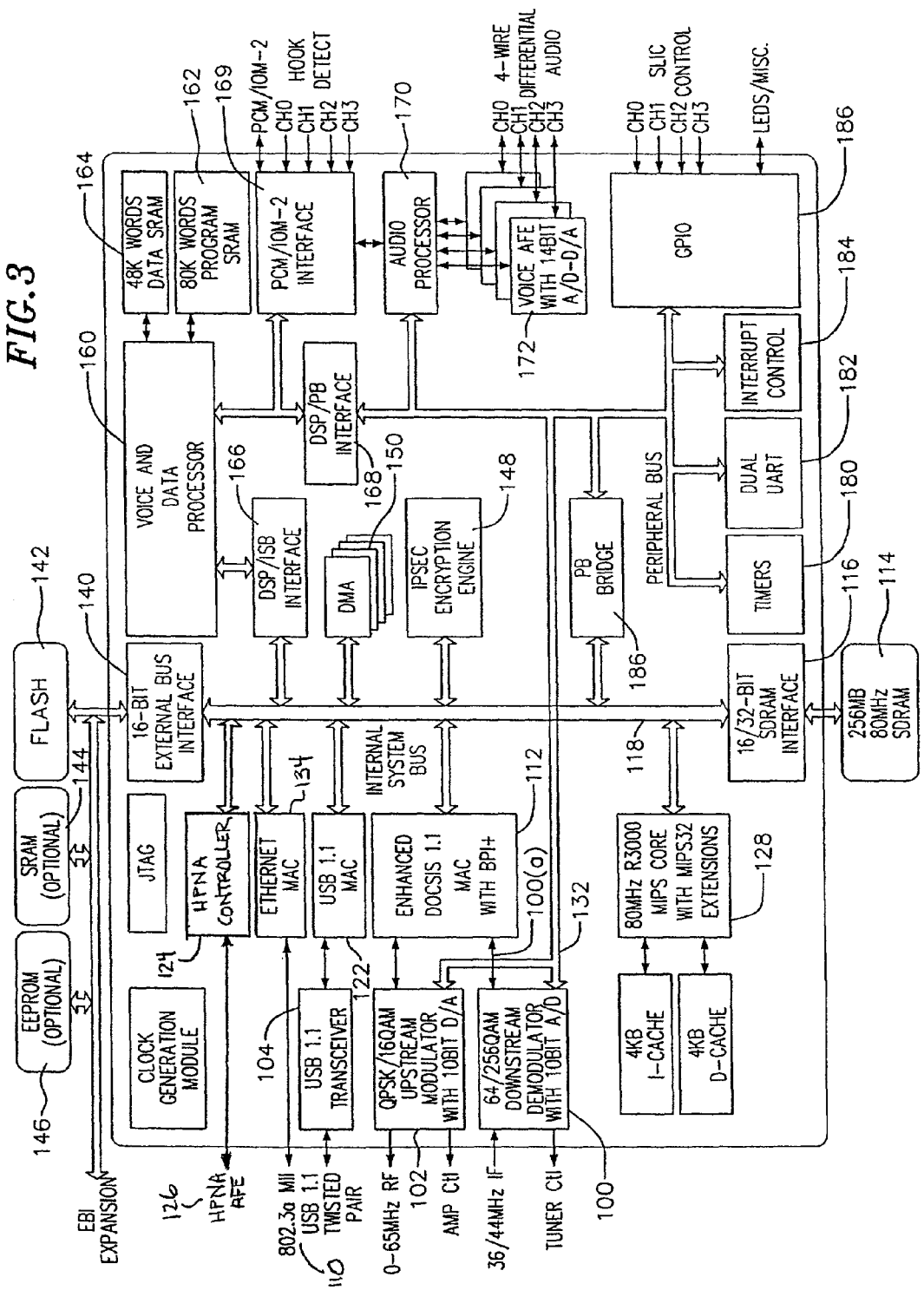
FIG. 3 is a system block diagram of an exemplary network gateway in accordance with a preferred embodiment of the present invention.

An exemplary embodiment of the network gateway is shown schematically in FIG. 3. The described exemplary embodiment is implemented by a highly integrated single chip solution that is compliant with the Data Over Cable Service Interface Specification (DOCSIS). DOCSIS was developed to ensure that cable modem equipment built by a variety of manufacturers is compatible, as is the case with traditional dial-up modems. The described exemplary embodiment can provide integrated functions for communicating with the CMTS. For example, a QPSK upstream modulator 102 transmits data to the far end data terminating device, and a QAM downstream demodulator 100 receives data from the far end data terminating device via a CMTS.

In an exemplary embodiment of the present invention, a power splitter (not shown) may divide the downstream signal into two, approximately half power signals. One of the signals may then be coupled to a subscriber's television via a shutoff relay (not shown) and the other is coupled to the downstream demodulator. In accordance with an exemplary embodiment, a remote cable operator may command the MIPS core to shut off a subscribers access to the cable television signal via the QAM downstream demodulator. In response the MIPS core may issue a command to the shut off relay (not shown) effectively blocking access to the television signal. In addition, the described exemplary embodiment can support multiple inputs in accordance with a variety of protocols. For example, a universal serial bus (USB) transceiver 104 and USB MAC 122 support transparent bi-directional IP traffic between devices operating on a USB, such as, for example a PC workstation, server printer or other similar devices and the far end data terminating device. Additionally, an I.E.E 802.3 compliant media independent interface (MII) 110 in conjunction with an Ethernet MAC 134 provide bi-directional data exchange between devices such as, for example, a number of PCs and or Ethernet phones operating on an Ethernet and the far end data terminating device. Further, a voice and data processor 160 processes and exchanges voice, as well as fax and modem data between packet based networks and telephony devices.

In an exemplary embodiment of the present invention, the QAM downstream demodulator 100 may utilize either 64 QAM or 256 QAM in the 54 to 860 MHz bandwidth to interface with the CMTS. The QAM downstream demodulator 100 accepts an analog signal centered at the standard television IF frequencies, amplifies and digitizes the signal with an integrated programable gain amplifier and A/D converter. The digitized signal is demodulated with recovered clock and carrier timing. Matched filters and then adaptive filters remove multi-path propagation effects and narrowband co-channel interference. Soft decisions are then passed off to an ITU-T J.83 Annex A/B/C compatible decoder. The integrated decoder performs error correction and forwards the processed received data, in either parallel or serial MPEG-2 format to a DOCSIS Media Access Controller (MAC) 112.

The DOCSIS MAC 112 may include baseline privacy encryption and decryption as well as robust frame acquisition and multiplexing with MPEG2-TS compliant video and audio streams. The DOCSIS MAC 112 implements the downstream portions of the DOCSIS protocol. The DOCSIS MAC 112 extracts DOCSIS MAC frames from MPEG-2 frames, processes MAC headers, and filters and processes messages and data.

Downstream data packets and message packets may then be placed in system memory 114 by a SDRAM interface 116 via an internal system bus 118. The SDRAM interface 116 preferably interfaces to a number of off the shelf SDRAMs which are provided to support the high bandwidth requirements of the Ethernet MAC 134 and other peripherals. In the described exemplary embodiment, the SDRAM interface 116 may support multiple combinations of 8, 16 or 32 bit wide SDRAMs, allowing for external data storage in the range of about 2 to 32 MBytes. The DOCSIS MAC 112 includes a number of direct memory access (DMA) channels for fast data access to and from the system memory 114 via the internal system bus 118.

The DOCSIS MAC 112 can also implement the upstream portions of the DOCSIS protocol before transmission by the upstream modulator 102. The DOCSIS MAC 112 receives data from system memory via a DMA channel, requests bandwidth and frames the data for TDMA with other modems on the same upstream frequency.

The upstream modulator 102 provides an interface with the CMTS. The upstream modulator 102 may be configured to operate with numerous modulation schemes including for example, QPSK and 16-QAM. In the described exemplary embodiment, the upstream modulator 102 supports bursts or continuous data, provides forward error correction (FEC) encoding and pre-equalization, filters and modulates the data stream and provides a direct 0-65 MHz analog output.

The DOCSIS MAC interfaces with MIPS core 128 via the ISB 118. An exemplary embodiment of the MIPS core 128 includes a high performance CPU operating at a speed of at least 80 MHz with 32-bit address and data paths. In an exemplary embodiment of the present invention, the MIPS core includes two way set associative instruction and data caches on the order of about 4 kbytes each. Further, the MIPS core 128 may provide standard EJTAG support with debug mode, run control, single step and software breakpoint instruction as well as additional optional EJTAG features.

In the described exemplary embodiment, the MIPS core 128 controls the upstream modulator 102 and the downstream demodulator 100 via a serial interface that is compatible with a subset of the Motorola M-Bus and the Philips I$^2$C bus. The interface consists of two signals, serial data (SDA) and serial clock (SCL), which may control a plurality of devices on a common bus. The addressing of the different devices may be accomplished in accordance with an established protocol on the two wire interface.

The described exemplary embodiment of the network gateway includes a full-speed universal serial bus (USB) transceiver 104 and USB MAC 122 that is compliant with the USB 1.1 specification. The USB MAC 122 and USB transceiver 104 provide two way communication of information to a device operating on a USB, such as for example a PC on a USB 1.1 compliant twisted pair. In an exemplary embodiment of the present invention, the USB MAC 122 provides concurrent operation of control, bulk, isochronous and interrupt endpoints. The USB MAC 122 may also support standard USB commands as well as class/vendor specific commands. The USB MAC 122 includes integrated RAM that allows flexible configuration of the device. The USB MAC 122 can be arranged for hardware fragmentation of higher layer packets from USB packets with automatic generation and detection of zero length USB packets.

The USB MAC 122 may include DMA channels which are used to communicate received data to the system memory 114 via the internal system bus 118. Data stored in system memory 114 may then be processed and communicated to the cable modem termination system (not shown) via the DOCSIS MAC 112 and the upstream modulator 102. Similarly data received from the cable modem termination system and processed by the downstream demodulator 100 and stored in system memory as higher layer packets can be retrieved by the USB MAC 122 via the ISB 118 and assembled into USB packets with automatic generation of zero length USB packets. USB packets may then be communicated to the external device operating on the USB via the USB transceiver 104.

In the described exemplary embodiment, the media independent interface (MII) 110 and the Ethernet MAC 134 provide bi-directional communication with devices, such as, for example a personal computer (PC) operating on an Ethernet. The media independent interface 110 forwards data to and receives information from the Ethernet MAC 134. The Ethernet MAC 134 can also perform all the physical layer interface (PHY) functions for 100BASE-TX full duplex or half-duplex Ethernet as well as 10BBASE-T full or half duplex. The Ethernet MAC 134 may also decode the received data in accordance with a variety of standards such as for example 4B5b, MLT3, and Manchester decoding. The Ethernet MAC can perform clock and data recovery, stream cipher de-scrambling, and digital adaptive equalization. The Ethernet MAC 134 may include DMA channels which are used for fast data communication of processed data to the system memory 114 via the internal system bus 118. Processed data stored in system memory 114 may then be communicated to the cable modem termination system (not shown) via the DOCSIS MAC 112 and the upstream modulator 102. Similarly, data received from the cable modem termination system is processed by the downstream demodulator 100 and stored in system memory as higher layer packets that are retrieved by the Ethernet MAC 134 via the ISB 118 and encoded into Ethernet packets for communication to the external device operating on the Ethernet via the MII 110. The Ethernet MAC 134 may also perform additional management functions such as link integrity monitoring, etc.

Home phone network alliance (HPNA) protocol allows for 4-32 Mbits/sec LAN using existing in-home telephone wiring. HPNA controller 124 is a fully integrated MAC/PHY device that provides bi-directional communication with devices such as for example a HPNA phone, computer etc., operating on a HPNA network. The HPNA controller 124 may include DMA channels which are used for fast data communication of processed data to the system memory 114 via the internal system bus 118. In the described exemplary embodiment, the HPNA controller 124 includes a digital PHY having a FDQAM/QAM transmitter and receiver coupled between an analog front end 126 and HPNA MAC:.

In an exemplary embodiment of the present invention, the HPNA PHY uses 4 MBaud QAM modulation and 2 MBaud Frequency Diverse QAM (FDQAM), with two to eight bits-per-Baud constellation encoding. The PHY-layer payload modulation rate therefore ranges from 4 Mb/s to 32 Mb/s. The modulation techniques are set forth in U.S. patent application Ser. No. 09/169,552 entitled "Frequency Diverse Single Carrier Modulation For Robust Communication Over In-Premises Wiring", which is incorporated herein by reference. Information is transmitted on the transmission medium/channel in bursts. Each burst or physical layer frame consists of PHY-layer payload information encapsulated with a PHY preamble, header and postamble. The PHY-layer payload in each physical frame is that part of the Ethernet link level frame that follows the Ethertype field through the frame check sequence (FCS), plus a CRC-16 and a pad field for the 4 Mbaud rate. Hereafter, "payload" refers to the PHY-layer payload unless otherwise specified.

In the described exemplary embodiment, the HPNA MAC is modeled after the carrier-sense multiple-access with collision detection (CSMA/CD) MAC function of Ethernet (IEEE Std 802.3, 1998 Edition), adapted to the V2 PHY and enhanced with quality-of-service (QoS) features. The Carrier Sense Multiple Access/Collision Detect (CSMA/CD) media access method is the means by which two or more stations share a common transmission channel. To transmit, a station waits (defers) for a quiet period on the channel (that is, no other station is transmitting) and then sends the intended message modulated as per the PHY characteristics. The transmission deferral is ordered by up to eight priority levels, implementing absolute priority among stations contending for access. If, after initiating a transmission, the message collides with that of another station, each transmitting station ceases transmission and resolves the collision by choosing a backoff level and defers to other stations that have chosen a lower backoff level. The distributed algorithm for choosing a backoff level tightly bounds the access latency.

An exemplary HPNA MAC therefore includes carrier sense logic, collision detection logic, and CSMA/CD collision resolution/rx frame synchronization logic. Carrier sense logic detects the starting and ending times of a valid frame transmission on the wire. This is used to determine when frames are present on the channel/transmission medium, as well to detect the presence of a backoff signal in a signal slot. Collision detection logic detects the presence of a valid frame transmission from some other station during an active transmission, and for all stations, including non-transmitting stations, detects the received fragment that represents a transmission truncated by a collision. Collision resolution logic implements the distributed algorithm that controls backoff.

In the downstream direction the HPNA controller 124 interfaces with the MIPS core 128 via a bus interface that is couple to the ISB 118. The HPNA MAC encapsulates messages with a data layer header and start of frame (SOF) indicator. The HPNA MAC may also add data trailer and end of frame indicators. The MAC header may include a source address (SA) to identify the node sending the message, and may also include a destination address (DA) to identify the intended recipient or group of recipients. The message with appended headers, trailers and indicators is passed to the Physical layer where it is passed on to network transmission medium. In the upstream direction the reverse process occurs wherein the HPNA MAC receives messages from the Physical layer and the HPNA MAC strips off the header and/or trailer information and places the message in system memory (SDRAM) via the ISB 118 for transmission upstream to the CMTS.

In addition to the SDRAM interface 116, the described exemplary embodiment of the network gateway includes an external bus interface (EBI) 140 that supports connection to flash memory 142, external SRAM 144 or EPROMS 146. Additionally, the EBI 140 may be used to interface the described exemplary network gateway with additional external peripherals. The EBI 140 can provide a 24 bit address bus and a 16-bit bi-directional data bus. Separate read and write strobes can be provided along with multiple firmware configurable chip select signals. Each chip select can be fully programmable, supporting block sizes between about 4 K-bytes and 8 M-bytes, extended clock cycle access control and 8 or 16-bit selection of peripheral data bus width. In the described embodiment, the EBI 140 can support both synchronous and asynchronous transfers. Pseudonymous transfers may be supported through the use of read/write strobes to indicate the start and duration of a transfer. The EBI 140 can include DMA access capability to or from the SDRAM interface 116. The DMA operation may take one or more forms. For example, in EBI mode, an EBI bridge can act as the DMA controller, and perform all pointer and buffer management tasks during DMA operations. In an external mode, an external device can act as the DMA controller and the EBI 140 can serve as a simple bridge. In DMA mode the MIPS core 128 can be responsible for DMA setup.

The network gateway may be vulnerable to network breaches due to peripheral devices such as PCs employing windows or network Macintosh computers. Therefore the exemplary embodiment of the gateway includes IP security module 148 that interfaces with the ISB 118. In the described exemplary embodiment, the MIPS core 128 can set-up and maintain all security associations. The MIPS core 128 can also filter all IP traffic and route any messages requiring security processing to the security module via the ISB 118. The IP security module 148 may support single DES (CBC and ECB modes) triple DES (CBC and ECB modes) MD-5 and SHA authentication in hardware to provide support for virtual private networks.

The IP security module 148 can implement the basic building blocks of the developing IP Security Standard (IPsec). The IP security module 148 may also implement other security schemes that use the same basic two protocol technique as IPsec to provide traffic security. A first protocol, IP encapsulating security payload (ESP), provides private data privacy with encryption and limited traffic flow confidentiality. ESP may also provide connectionless integrity, data source authentication and an anti-replay service. A second format, IP authentication header (AH), provides connectionless integrity, data source authentication and an optical anti-replay service. Both protocols may be used to provide access based on the distribution of cryptographic keys and the management of traffic flows. The protocols may be used alone or in combination to satisfy the security requirements of a particular system. In addition, the security module 148 can support multiple modes of operation depending on a security association to the traffic carried by a simplex connection. For example, transport mode security association between two hosts primarily protects protocols above the IP layer while tunnel mode security association provides security and control to a tunnel of IP packets.

An exemplary security module 148 addresses possible differences in packet format between IPsec and future security applications with a generalized scheme to determine where the authentication/encryption algorithms are applied within a data packet. The authentication/encryption algorithms consider each packet to consist of three parts, a header, body and trailer. The appropriate algorithm can be applied, using any specified parameters to the body section only.

In encryption mode, the security module 148 can add and initialize any necessary headers, determine necessary parameters, generate the associated control message and add the control and data message. In the authentication mode, the control fields of the received data packets are parsed, the parameters are determined via a security association lookup table, a control message is created and the control and data messages are enqueued.

An exemplary embodiment of the network gateway also includes a DMA controller 150 having a number of channels that enable direct access over the ISB 118 between peripherals and the system memory 114. With the exception of the security module 148, packets received by the network gateway cause DMA transfers from a peripheral to memory, which is referred to as a receive operation. A DMA transfer from memory to a peripheral is referred to as a transmit operation. Programmable features in each channel allow DMA controller 150 to manage maximum ISB burst lengths for each channel, enable interrupts, halt operation in each channel, and save power when certain modules are not operational. The maximum ISB burst length may be programmed independently for each channel preferably up to sixty four 32 bit words.

In the described exemplary embodiment, each channel may include maskable interrupts connected to the MIPS core 128 that indicate buffer complete, packet complete and or invalid descriptor detected. Busy DMA channels may be stalled or completely disabled by the MIPS core 128. Source clocks (not shown) for each channel can be connected to the channels based on the internal peripheral they service. For power reduction, these clocks may be turned off and on coincident with the respective peripheral's clock.

The DMA controller 150 can be operable in both non-chaining and chaining mode. In the non-chaining mode the DMA channel refers to its internal registers for the pertinent information related to a scheduled DMA burst transfer. The DMA controller can set-up the buffer start address, byte count, and status word registers before initiating the DMA channel for each allocated buffer. In the transmit direction, the DMA channels can send the specified number of bytes (preferably up to 4095) from the specified byte address. In the receive direction, the DMA channels can insert data into a specified memory location until a buffer has been completely filled or the end of a packet is detected.

Figure 4:
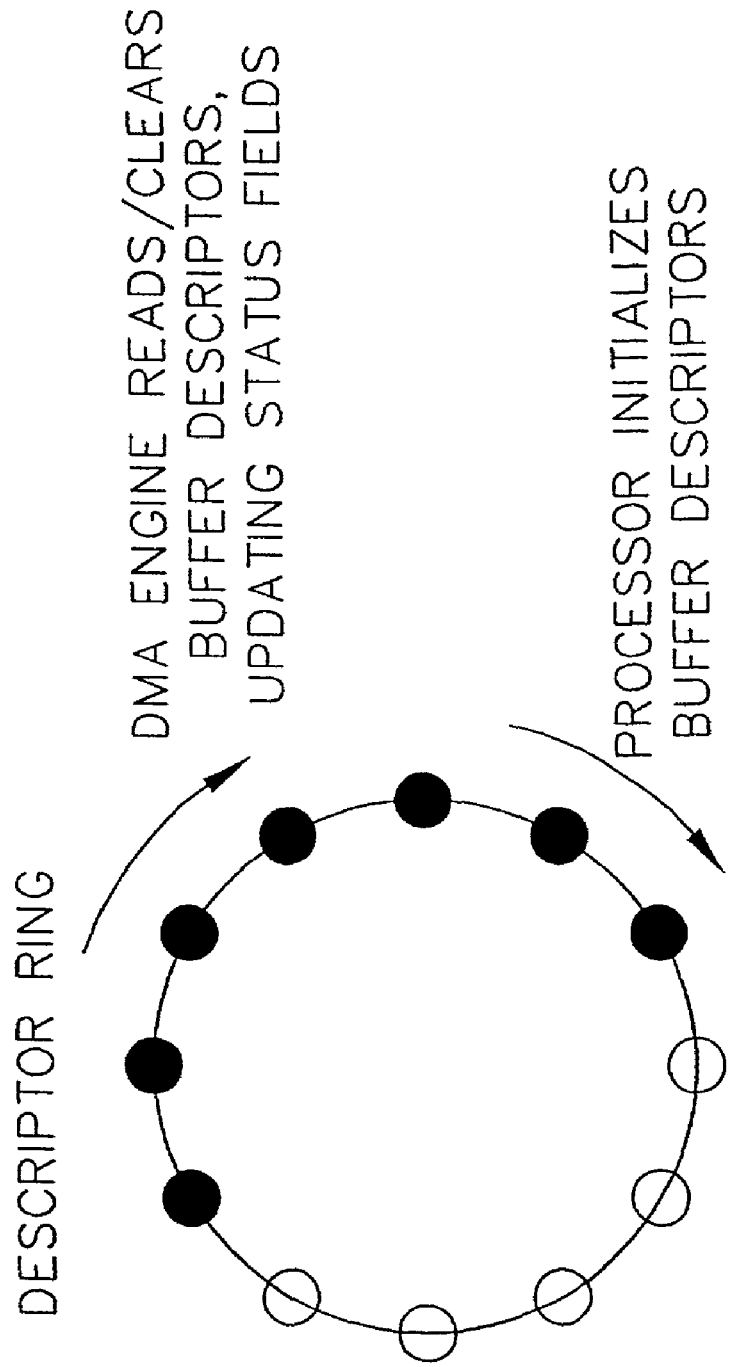
FIG. 4 is a graphical depiction of a chaining mode of operation of a system direct memory access controller in accordance with a preferred embodiment of the present invention.

In the chaining mode, the system memory can be partitioned as shown in FIG. 4 preferably using descriptor rings containing pointers to memory buffers as well as status information for each memory buffer. The MIPS core 128 can write the descriptor pointers while the DMA controller 150 follows by inserting/taking data into/from the location designated by the descriptor. Upon completion of the transfer of a buffer, the DMA controller 150 effectively clears the descriptor by updating the status to indicate that the data has been inserted/taken. Specific information may be added to the descriptor to indicate, for example, the length of data in the block, or to specify whether the data is the first or last block of a packet.

In the downstream direction, the MIPS core 128 can fill or recognize a data block for a particular DMA channel, then write the next unused descriptor in the ring indicating that the block is filled and where the downstream data exists in memory. The DMA controller 150 can follow the DSP write to the descriptor ring, sending out data and clearing the descriptor when the transfer is complete. When the DMA controller 150 reads a descriptor that does not contain valid data, it can go idle until initiated by the MIPS core.

In the upstream direction, the MIPS core 128 allocates memory space for incoming data, then writes the descriptor with the start address for that buffer. The DMA controller 150 reads the base address and inserts data until either the buffer is full or an end of packet has been detected. The DMA controller 150 can update the descriptor, communicating to the MIPS core 128 that the block is full, indicating the length of the data on the block, and/or asserted first and or last buffer flags.

Referring back to FIG. 3, the described exemplary network gateway includes the voice and data processor 160 for processing and transporting voice over packet based networks such as PCs running network on a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x) or GSM for terrestrial wireless applications, or any other packet based system. The described embodiment of the voice and data processor 160 also supports the exchange of voice, as well as fax and modem, between a traditional circuit switched network or any number of telephony devices and the CMTS (not shown). The voice and data processor may be implemented with a variety of technologies including, by way of example, embedded communications software that enables transmission of voice over packet based networks.

The embedded communications software is preferably run on a programmable digital signal processor (DSP). In an exemplary embodiment the voice and data processor 160 utilizes a ZSP core from LSI Logic Coreware library for mid to high end telecommunications applications. In the described exemplary embodiment, the DSP core includes internal instruction RAM 162 and internal data RAM 164. The voice and data processor 160 interfaces with the internal system bus 118 via a DSP/ISB interface 166 and the peripheral bus 132 via the DSP/PB interface 168.

The voice and data processor 160 may include a grant synchronizer that ensures timely delivery of voice signals to the MIPS core 128 for upstream transmission. In addition, a PCM interface 169 provides the voice and data processor 160 with an interface to an internal audio processor 170 as well as external audio processing circuits (not shown) to support constant bit rate (CBR) services such as telephony. The PCM interface 169 provides multiple PCM channel controllers to support multiple voice channels. In the described exemplary embodiment of the network gateway, there are four sets of transmit and receive FIFO registers, one for each of the four PCM controllers. However, the actual number of channels that may be processed may vary and is limited only by the performance of the DSP. The internal system bus 118 is used to transfer data, control and status messages between the voice and data processor 160 and the MIPS core 128. FIFO registers are preferably used in each direction to store data packets.

The described exemplary embodiment of the gateway includes the internal audio processor 170 with an analog front end 172 that interface the voice and data processor 160 with external subscriber line interface circuits (SLICs) for bi-directional exchange of voice signals. The audio processor 170 may include programmable elements that implement filters and other interface components for a plurality of voice channels.

In the transmit mode the analog front end 172 accepts an analog voice signal and digitizes the signal and forwards the digitized signal to the audio processor 170. The audio processor 170 decimates the digitized signal and conditions the decimated signal to remove far end echos. As the name implies, echo in telephone systems is the return of the talker's voice resulting from the operation of the hybrid with its two-four wire conversion. The audio processor can apply a fixed gain/attenuation to the conditioned signal and forwards a gain adjusted signal to the voice and data processor 160 via the PCM interface 169. In the receive mode the audio processor 170 accepts a voice signal from the PCM interface and preferably applies a fixed gain/attenuation to the received signal. The gain adjusted signal is then interpolated from 8 kHz to 96 kHz before being D/A converted for communication via a SLIC interface to a telephony device.

In the described exemplary embodiment, each audio channel can be routed to a PCM port to allow for system level PCM testing. The PCM system tests, by way of example, may require compliance with ITU G.711 for A-law and μ-law encoding/decoding.

The described exemplary embodiment of the network gateway further includes integrated peripherals including independent periodic interval timers 180, a dual universal asynchronous receiver-transmitter (UART) 182 that handles asynchronous serial communication, a number of internal interrupt sources 184, and a GPIO module 186 that provides multiple, individually configurable input/output ports. In addition, multiple GPIO ports can be provided to drive various light emitting diodes (LEDs) and to control a number of external SLICs. A peripheral bus bridge 186 can be used to interface the low speed peripheral to the internal system bus 118.

B. DOCSIS CABLE MODEM

1. Downstream Demodulator

Figure 5:
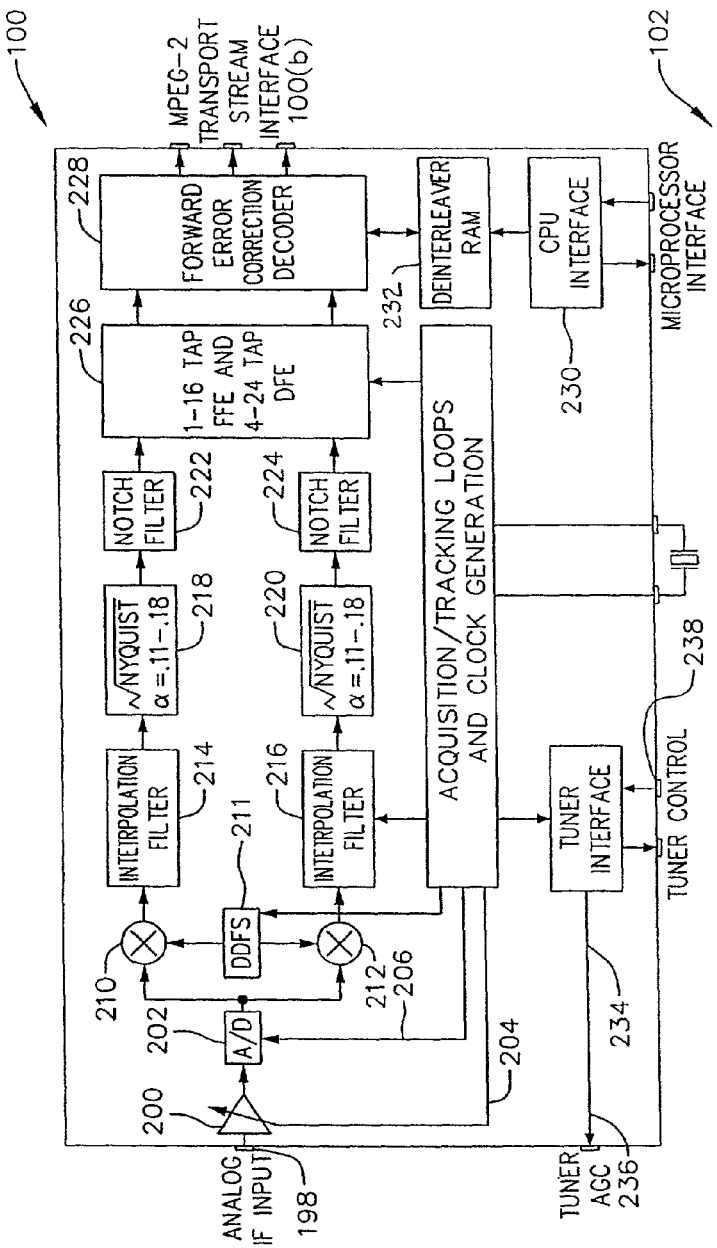
FIG. 5 is a system block diagram of a DOCSIS downstream demodulator in accordance with a preferred embodiment of the present invention.

The DOCSIS downstream demodulator 100 can support 64/256 QAM. Referring to FIG. 5 the downstream demodulator accepts an analog IF input signal 198, amplifies and digitizes the input signal with an integrated programable gain amplifier (PGA) 200, and an A/D converter 202. An on chip gain recovery loop 204 circuit controls the PGA 200 to provide an on chip automatic gain control (AGC) function. Timing recovery and clock generation includes an on chip voltage controlled oscillator (not shown) that can be locked to an off chip crystal, to control the sampling of the A/D converter 202. The stability of the crystal reference allows for accurate subsampling of the IF signal to produce a digital data stream centered on a lower IF center frequency.

A digital demodulator demodulates the digitized output 202($a$) of the A/D converter 202, with recovered clock and carrier timing. The digital demodulator includes digital mixers 210, 212 that mix a complex data stream generated by a direct digital frequency synthesizer (DDFS) 211 with the digitized signal 202($a$). The timing recovery loop controls the timing of the DDFS 211. Matched interpolation filters 214, 216 convert mixer outputs to in-phase (I) and quadrature-phase(Q) baseband signals correctly sampled in both frequency and phase. Dual square root Nyquist filters 218, 220 which may accommodate 11-18% roll-off factors, filter the I & Q baseband signals to reduce inter-symbol interference. In addition, notch filters 222, 224 may be used to substantially reduce narrowband, co-channel interference caused by intermodulation products from analog CATV channels. The notch filters 222, 224 preferably place notches in the frequency spectrum at the frequencies of these subcarrier.

The downstream demodulator preferably includes a configurable multi-tap decision directed equalizer 226. In the described exemplary embodiment, a 40 tap equalizer is used to remove intersymbol interference generated by worst case coaxial cable channels with multipath spreads of up to 4.5 μsec at 5.26 Mbaud. Blind convergence algorithms facilitate equalizer acquisition.

In addition to adaptive equalization, the configurable multi-tap decision directed equalizer 226 performs phase recovery on the equalized constellation points using a quadrature synthesizer and complex mixer under the control of the carrier recovery loop to track out residual carrier offsets and instantaneous phase offsets such as those caused by tuner microphonics. The output of the adaptive equalizer phase recovery block is coupled to a forward error correction (FEC) decoder 228. The FEC decoder 228 can support numerous decoders including ITU-T J.83 Annex A/B/C compatible decoders.

The Annex A/C decoder consists of four major functions, frame synchronization, convolution de-interleaving, Reed-Solomon error correction and de-randomization. Hard decisions are preferably input into the frame synchronization block which locks onto the inverted sync bit pattern. The MIPS core 128 sets the characteristics of the frame synchronization acquisition and retention via a CPU interface 230. Once synchronized, data interleaving is removed by the convolution de-interleaver. The de-interleaver can be based on the Ramsey III approach, and can be programmable to provide depths from I=1-204 with J=204/I. An on chip RAM 232 can provide for I=1-12. After de-interleaving the data symbols are processed by a Reed-Solomon decoder, which can correct up to eight symbol errors per RS block. The decoded symbols are then de-randomized, which substantially undoes the randomization inserted at the modulator. The de-randomized output consists of MPEG-2 serial or parallel data, packet sync and a data clock.

The Annex B decoder includes five layers, trellis decoding, de-randomization, convolution de-interleaving, Reed-Solomon decoding and checksum decoding. The Annex B concatenated coding scheme along with interleaving provides good coding gain to combat Gaston noise while still protecting against burst errors. Soft decisions from the adaptative equalizer 226 are input to the trellis decoder which estimates the maximum likelihood of a sequence. The output sequences are forwarded to a frame synchronization and de-randomization block similar to those described for the Annex A/C decoders. A Reed-Solomon decoder preferably corrects up to three symbol errors per RS block. The checksum decoder accurately identifies block containing uncorrectable errors. The downstream demodulator outputs MPEG-2 serial or parallel data, packet sync and a data clock to the DOCSIS MAC.

The downstream demodulator also includes two AGC loops which provide control for both RF and IF variable gain amplifiers (GAS). The gain control allocated to each loop may be established via a CPU interface 230. The RF gain control loop 234 may be closed at the tuner AGC 236 while the IF loop 204 may be completed with either an off chip VGA (not shown) or preferably with the internal PGA 200. The power of the internal IF signal is estimated and compared to a programmable threshold. If the estimated power exceeds the threshold, the appropriate AGC integrator is incremented by a programmable value. If the estimated power is less than the threshold, the appropriate AGC integrator is decremented by a comparable amount. The timing recovery loop 206 may include a timing error discriminant, a loop filter, and a digital timing recovery block which controls the digital re-sampler. The carrier frequency/phase recovery and tracking loops are all digital loops which simultaneously offer a wide acquisition range and a large phase noise tracking ability. The loops may use decision directed techniques to estimate the angle and direction for phase/frequency compensation. The loops can be filtered by integral-plus-proportional filters, in which the integrator and linear coefficients of the filter are programmable to provide the means for setting the loop bandwidths. The upper bits of the loop filter can control the direct frequency synthesizer 211, providing both accurate frequency generation and fine phase resolution.

In the described exemplary embodiment, the downstream demodulator uses an on chip VCO (not shown) referenced to a single off chip crystal which can provide all required chip clocks. In addition, a spare D/A demodulator provides a 1-bit pulse-width modulated signal which may be used with an off chip RC filter. In addition, the downstream demodulator may provide tuner control ports 238 that may be used to program two serially controlled tuner phase locked loop (PLL) frequency synthesizers.

2. Upstream Modulator

Figure 6:
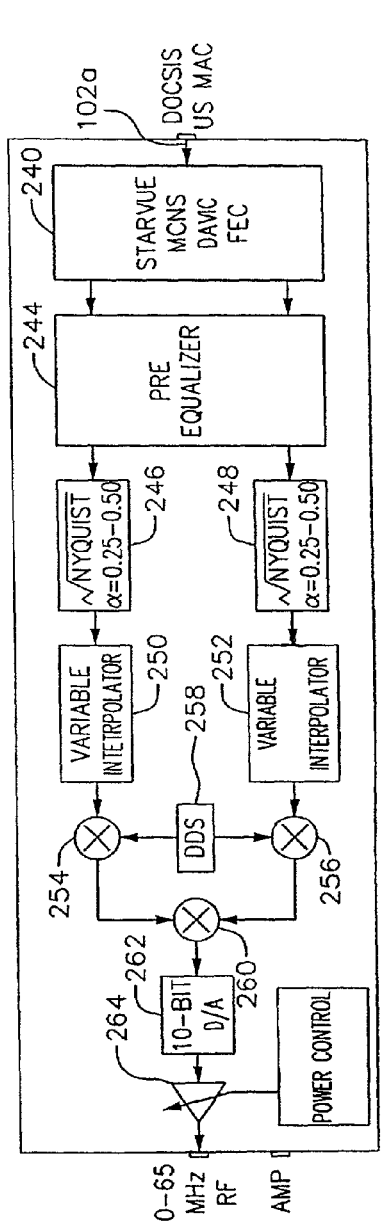
FIG. 6 is a system block diagram of a DOCSIS upstream modulator in accordance with a preferred embodiment of the present invention.

Referring to FIG. 6, the upstream modulator 102 can support QPSK and 16-QAM processing of burst or continuous data signals 102 ($a$) received from the DOCSIS MAC. Burst encoding logic 240 includes FIFO registers and a FEC encoder, preamble prepend and symbol mapper. The burst FIFO register decouples the input data rate from the transmission data rate and allows data to be input while a burst is being actively transmitted. The FEC encoder processes data stored in the FIFO. The FEC encoder may be a Reed-Solomon encoder with data randomization. In the described exemplary embodiment, the parallel to serial conversion of bytes entering the randomizer and serial to parallel conversion of bits leaving the randomize may be programmed to be most significant bit (MSB) or least significant bit (LSB) first. The encoder may be programmed to correct from zero to ten symbol errors per RS block. The FEC encoder may also be configured to integrate the randomize before or after the RS encoder. A programmable preamble of up to 1024 bits may then be added to the data burst and the completed data burst can then be mapped into 90 degree DQPSK, QPSK or 16-QAM.

The output of the burst encoding logic 240 is coupled to a pre-equalizer 244 that may be selectively enabled to pre-distort the transmitted waveform to offset the effects of inter-symbol interference (ISI). The data burst is then shaped by square root Nyquist filters 246, 248. In the described exemplary embodiment, the square root Nyquist filters 246, 248 may have a selectable excess bandwidth factor in the range of about 25% to 50%. The maximum passband ripple of these filters is preferably less than about 0.05 dB and the minimum stopband attenuation is preferably greater than about 60 dB. The shaped signals are forwarded to interpolation filter banks 250, 252 which interpolate the signal to the sample rate. The outputs of these filters are then mixed or modulated onto quadrature carriers generated by a digitally tunable frequency synthesizer 258 by mixers 254, 256. The I and Q components are then combined by summer 260. The summer 260 outputs a digital waveform carrying a data burst whose spectrum is preferably centered on the desired RF frequency to a D/A converter 262. The D/A converter converts the digital, shaped output burst to an analog waveform. In the described exemplary embodiment, a programmable gain attenuator 264 can be used to provide up to about 25 dB attenuation in incremental steps, on the order of about 0.4 dB.

3. DOCSIS MAC

In the described exemplary embodiment, the DOCSIS media access controller (MAC), includes baseline privacy encryption and decryption, transmission convergence support, a TDM/TDMA framer, and a scatter/gather DMA interface. The transmission convergence sub-layer supports robust frame acquisition and multiplexing with MPEG-TS compliant video and audio streams. The TDM/TDMA preferably handles time synchronization with the cable modem termination system, upstream MAP decoding, bandwidth request generation and contention resolution. The DOCSIS MAC may be divided into four major functions, downstream functions, upstream functions, DMA interface and miscellaneous control. The downstream functions of the DOCSIS MAC include receiving MPEG frames from the downstream demodulator, extracting the DOCSIS MAC frames from the MPEG frames, processing the MAC header, filtering messages and data, processing MAP and SYNC messages, decrypting data packets if necessary and providing cyclic redundancy checks (CRCs) on the MAC payloads.

Figure 7:
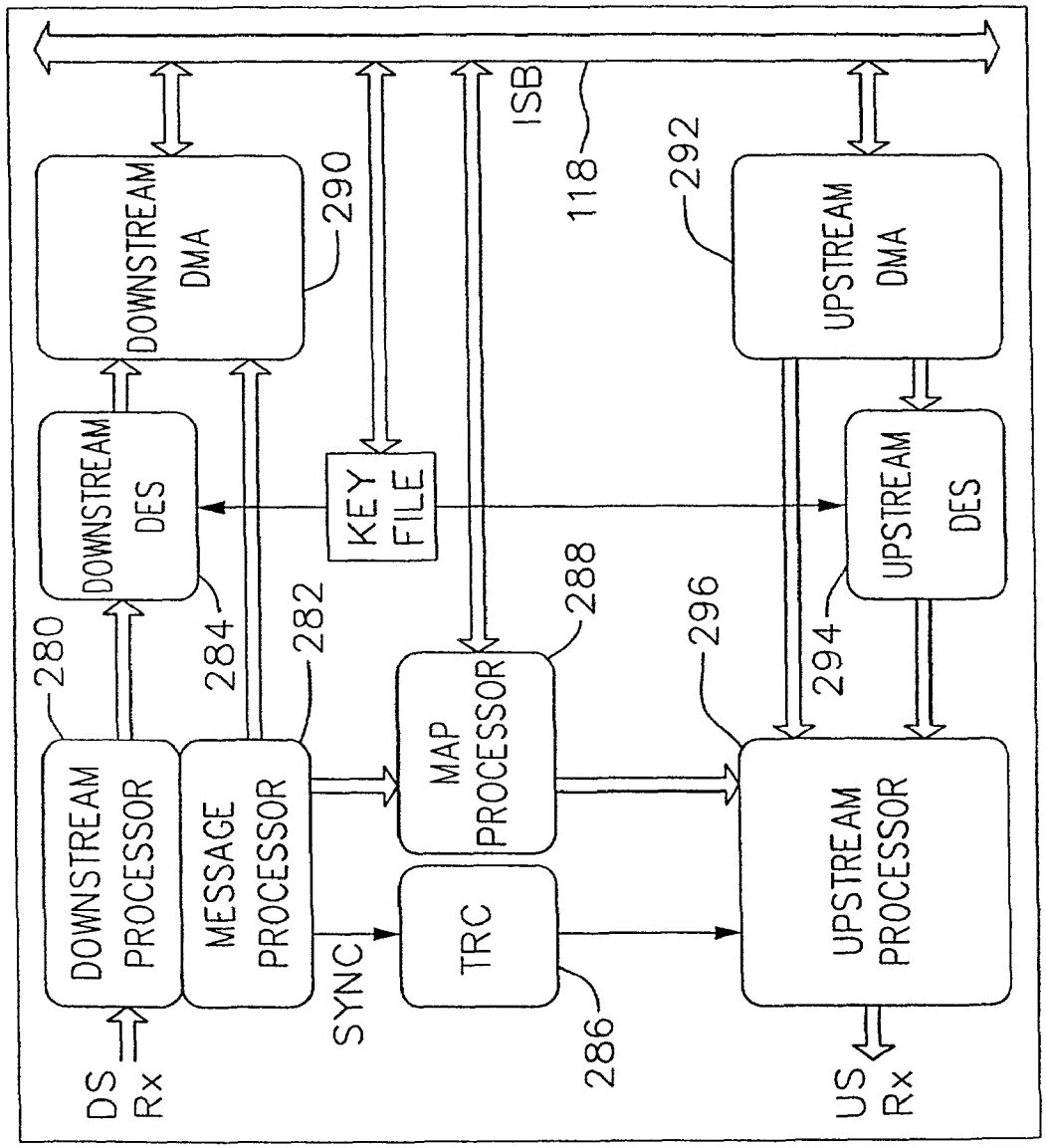
FIG. 7 is a system block diagram of a DOCSIS media access controller (MAC) in accordance with a preferred embodiment of the present invention.

Referring to FIG. 7, an exemplary DOCSIS MAC may include a downstream processor 280 having a physical layer (PHY) interface that provides the interface to the downstream demodulator (not shown). The downstream processor receives the incoming MPEG stream, filters on the predefined PID, and uses the offset value contained in the MPEG frame to locate and extract the MAC frames. The extracted MAC frames are passed to a MAC header processing block in a message processor 282 and through a rate conversion FIFO (not shown) to a MAC header processing block in a downstream data encryption security (DES) processor 284 that provides baseline security by decrypting QAM downstream traffic. The MAC header processing blocks (not shown) examine the MAC header for type, wherein the MAC header processor in the message processor 282 processes only MAC messages while the MAC header processor in the downstream DES 284 processes packets that are not MAC messages.

The incoming MAC header is parsed for the presence of an extended header field. If the extended header field is present, the MAC header processor block parses the extended header type-length-value (TLV) fields, and searches for a baseline privacy header. Once the baseline privacy header has been located, the MAC header processor forwards the associated value data to the downstream DES 284 for further parsing and interpretation. With the exception of the baseline privacy extended header, all other header types are preferably ignored by the MAC header processor. Both MAC header processing blocks determine the length of the extended header, calculate the header check sequence (HCS) over the MAC header and compare the calculated HCS with that contained in the MAC header. In the described exemplary embodiment, if the calculated HCS values do not match the HCS values contained in the MAC header, the MAC processor preferably discards the packets and signals the PHY interface requesting re-synchronization. Those packets where the calculated HCS values match the values contained in the MAC header, the MAC header processor preferably generates control signals to flag the type of packet, the beginning of the extended header, the beginning of the protocol data unit (PDU) and the length of the PDU. The MAC header processor routes all PDUs matching the network gateway extended header type to the downstream DES 284 for decryption. The message processor 282 calculates the CRC over the message payload in accordance with the control signals generated by the MAC header processor and supplies data to the downstream DMA controller 290. There are a number of fault conditions on the DMA interface that require specific action. If an HCS fail is generated by the MAC header processor the DMA is prematurely terminated. If the CRC is correct the message processor 282 preferably examines the type field of the message. The message processor 282 extracts the time stamp from SYNC messages and passes these to a timing regeneration circuit 286. The timing regeneration circuit 286 provides timing recovery using the time stamp values from the sync messages. In addition, the message processor 282 forwards messages that match the upstream channel ID and UCD change count to a MAP processor 288. The remaining messages with valid CRC are passed to a downstream message DMA 290 through a rate adjustment FIFO (not shown). If a FIFO full state is encountered, the DMA discards the current packet, flushes the FIFO and waits until the next packet arrives.

The downstream DES 284 receives data packets and control signals from the header processor in the downstream processor 280. The downstream DES 284 determines what type of filtering should be applied to the packet based on information contained in the MAC header. If a packet supports baseline privacy the downstream DES filters the packet based on the service flow identifier (SID). The DES 284 preferably decrypts packets using the key corresponding to the SID and even/odd key bit in the baseline privacy header. The DOCSIS MAC does not perform decryption on packets that do not contain a baseline privacy header. The DES 284 preferably filters packets based upon the destination address and forwards the filtered packets to a CRC processor (not shown) which calculates a CRC over the entire PDU payload. If the calculated CRC does not match the value stored in the packet, a CRC error flag is set and the packet is marked as erred in the downstream DMA buffer.

The downstream DMA 290 is used to transfer data to system memory (not shown). The downstream DMA 290 may have two channels, one of which is used to transfer data into system memory, the other is used to transfer message packets into memory. The two channels can be substantially identical in function. The downstream DMA can use structures in the memory to control transfer of information. The structures can be established and maintained by firmware. Data can be stored in regions of memory called particles. One structure contains a ring of buffer descriptors with each buffer descriptor describing particles in the shared memory. The DMA can store received downstream data in the particles and update the status and length in the buffer descriptor. The other structure is an additional ring of descriptors used to refer to single packets. Where a packet may be contained in any number of particles described by a like number of buffer descriptors, there is only one packet descriptor associated with the packet.

In the described exemplary embodiment, the upstream DMA 292 includes a plurality of upstream channels that read upstream packet headers and protocol data units (PDUs) from system memory. The upstream DMA 292 inserts the HCS, CRC and piggyback fields when transferring packets to an upstream DES 294. The upstream DES 294 examines the extended header to determine if encryption is enabled. If encryption is not enabled, the upstream DES 294 forwards the packet to the upstream processor 296, otherwise if encryption is enabled the upstream DES 294 preferably uses the SID and the even/odd key bit in the extended header to perform a key lookup. The upstream DES 294 then encrypts the packet and forwards the packet to the upstream processor 296.

The upstream processor 296 extracts MAP information elements (IEs) from the MAP FIFO and compares the elements to a next upstream minislot count. If the counts match, the upstream processor 296 evaluates the type of slot described by the MAP information element. If the network gateway needs to respond to the information element, the upstream processor 296 preferably loads the appropriate physical layer parameters to the upstream modulator 102 (see FIG. 3) and forwards the appropriate message or data packet. This operation depends on the slot type and status of the network gateway. The upstream processor 296 preferably responds to initial maintenance slots and will ignore all station maintenance slots and requests until the MIPS core 128 (see FIG. 3) signals that the network gateway has been initially ranged and assigned a SID (temporary or permanent). The upstream processor 296 responds to initial maintenance slots by extracting the ranging request message from internal memory that is programmed by the MIPS core. Once the network gateway has been initially ranged, the upstream processor 296 responds to station messages, requests, request/data regions, and grants and not to initial maintenance messages.

Once ranged, the upstream processor 296, monitors the upstream DMA queues. In the described exemplary embodiment there are sixteen independent upstream queues maintained by the upstream DMA 292. When a packet is ready for transmission, the upstream processor randomly selects one of the available requests slots. The upstream processor 296 then waits to receive a grant, an acknowledgment (grant with length zero) or an ACK time past the time it sent its request upstream. If the upstream processor 296 does not receive an acknowledgment or grant before the ACK time has past, the upstream processor 296 preferably uses truncated binary exponential back-off to select another request slot to resend its request. Once granted, the upstream processor 296 signals the upstream DMA 292 to begin extracting the packet from memory and forwarding the packet to the upstream DES for processing as described above. The upstream processor 296 then forwards the packet to the upstream modulator (not shown) at the appropriate transmission time.

4. Integrated Ethernet MAC

Referring to FIG. 3, the integrated Ethernet MAC performs all the physical layer interface functions for 100BASE-TX full duplex or half duplex Ethernet on CAT 5 twisted pair and 10BASE-T full or half duplex Ethernet on CAT 3, 4 or 5 twisted pair. The Ethernet MAC 134 may be coupled directly to the Ethernet network via the media independent interface 110. In 100BASE-TX mode, the Ethernet MAC 134 preferably monitors the twisted pair for transitions in the energy level of the received signal. Signals can be qualified using squelch detect circuits. The Ethernet MAC enters and remains in a "link fail" state when valid signals are not detected on the receive twisted pair. In the link fail state, the Ethernet MAC 134 preferably transmits only idle codes. When the Ethernet MAC 134 detects a valid signal for a predetermined period, the Ethernet MAC 134 enters a link pass state and the appropriate transmit and receive functions are enabled.

The Ethernet MAC 134 preferably provides the ability to negotiate its mode of operation over the twisted pair link using the auto negotiation mechanisms defined in the IEEE 802.3u specifications, the contents of which are incorporated herein by reference as if set forth in full. Auto-negotiation should be selectively enabled by the Ethernet MAC. When enabled, the Ethernet MAC 134 preferably chooses a mode of operation by advertising its abilities and comparing those abilities to those received from its link partner.

Figure 8:
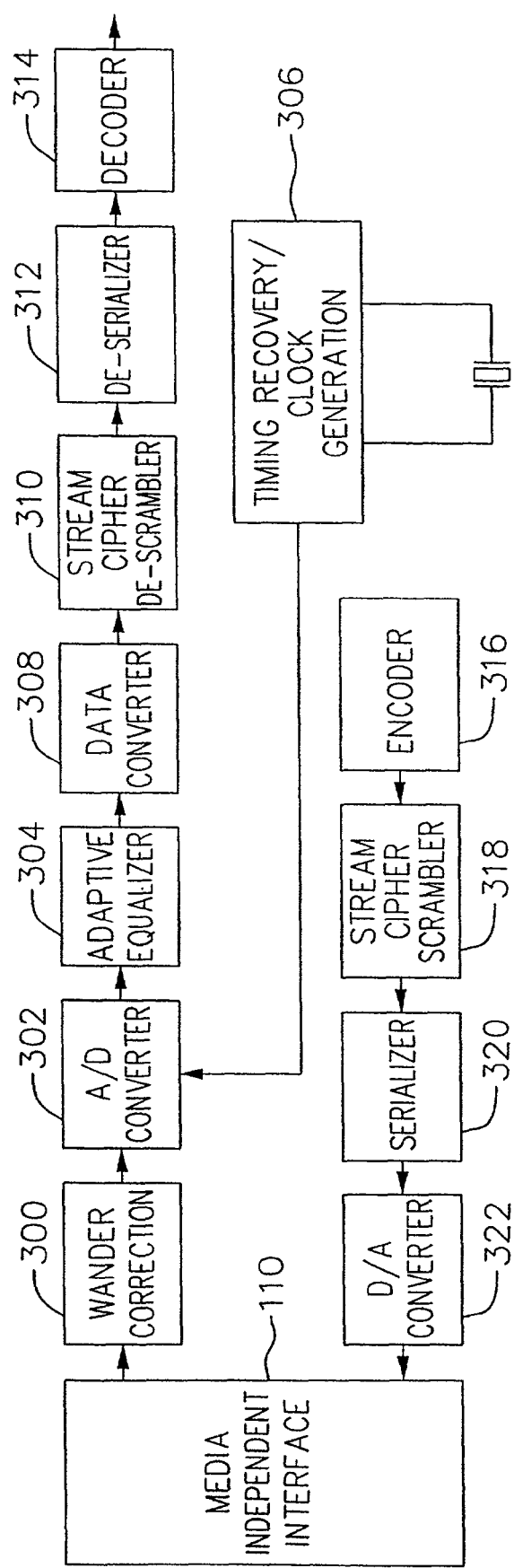
FIG. 8 is a system block diagram of an Ethernet transceiver for interfacing the network gateway with Ethernet devices in accordance with a preferred embodiment of the present invention.

FIG. 8 shows the physical interface portion of the Ethernet MAC 134. The Ethernet MAC 134 may perform 4B5B, MLT3, and Manchester encoding and decoding. For 100BASE-TX mode the Ethernet MAC enables a 4B5B encoder 316. The transmit packet is encapsulated by replacing the first two nibbles with a start of stream delimiter and appending an end of stream delimiter to the end of the packet. The transmitter will repeatedly send the idle code group between packets. When the MII transmit enable is asserted, data is inserted into the transmit data stream. The encoded data stream is scrambled by a stream cipher scrambler 318 to reduce radiated emissions on the twisted pair, serialized by serializer 320 and encoded into MLT3 signal levels. A multimode digital to analog converter (DAC) 322 drives the MLT3 data onto the twisted pair cable. The multi-mode DAC 322 can transmit MLT3-coded symbols in 100Base-TX mode and Manchester coded symbols in 10BASE-TX mode. Further, in the described exemplary embodiment, the DAC 322 can perform programmable edge rate control in transmit mode, which decreases unwanted high frequency signal components. High frequency pre-emphasis is preferably performed in 10BASE-TX mode.

In the described exemplary embodiment, the Ethernet MAC 134 can receive a continuous data stream on twisted pair. A 100BASE-TX data stream is not always DC balanced, because the receive signal must pass through a transformer, and therefore, the DC offset of the differential receive input may wander. Baseline wander may reduce the noise immunity of the receiver. Wander correction logic 300 can be used to compensate for baseline wander by removing the DC offset from the input signal, thereby reducing the receive symbol error rate. Each receive channel of the Ethernet MAC 134 can include an analog to digital converter (ADC) 302 coupled to the output of the wander correction logic. The ADC output is forwarded to a digital adaptive equalizer 304 that removes interzonal interference created by the transmission channel media. The described exemplary Ethernet MAC 134 combines feed forward equalization and decision feedback equalization to achieve an optimal signal to noise ratio. The digital design increases tolerances to on chip noise and the filter coefficients preferably self adapt to any quality of cable or cable length. The adaptive equalizer can be bypassed in 10BASE-TX mode which includes transmit pre-equalization capability.

The Ethernet MAC 134 may include a digital clock recovery/generator system 306 that creates all internal transmit and receive clocks. The transmit clocks can be synched to a 50 MHz clock input while the receive clocks are locked to the incoming data streams. Clock recovery circuits optimized to MLT3, and Manchester encoding schemes can be included for use with each of three different operating modes. The input data streams can be sampled by the recovered clock from each port and fed synchronously to the respective digital adaptive equalizer.

Following baseline wander correction, adaptive equalization, and clock recovery a data converter 308 converts the received data stream from MLT3 to NRZ data. The NRZ data is descrambled by a stream cipher de-scrambler 310. A de-serializer 312 is coupled to the output of the stream cipher descrambler and de-serializes and aligns the data into 5-bit code groups. The 5-bit code groups are decoded into 4-bit data nibbles by a decoder 314. The start of stream delimiter is replaced with preamble nibbles and the end of stream delimiter and idle codes are replaced with zeros. When an invalid code group is detected in the data stream, the Ethernet MAC 134 asserts the MII receive error RXER signal which asserts several error conditions which can be used to improperly terminate the data stream. While RXER is asserted, the receive data can be driven with "01" for an invalid data reception and "10" for a false carrier.

Figure 9:
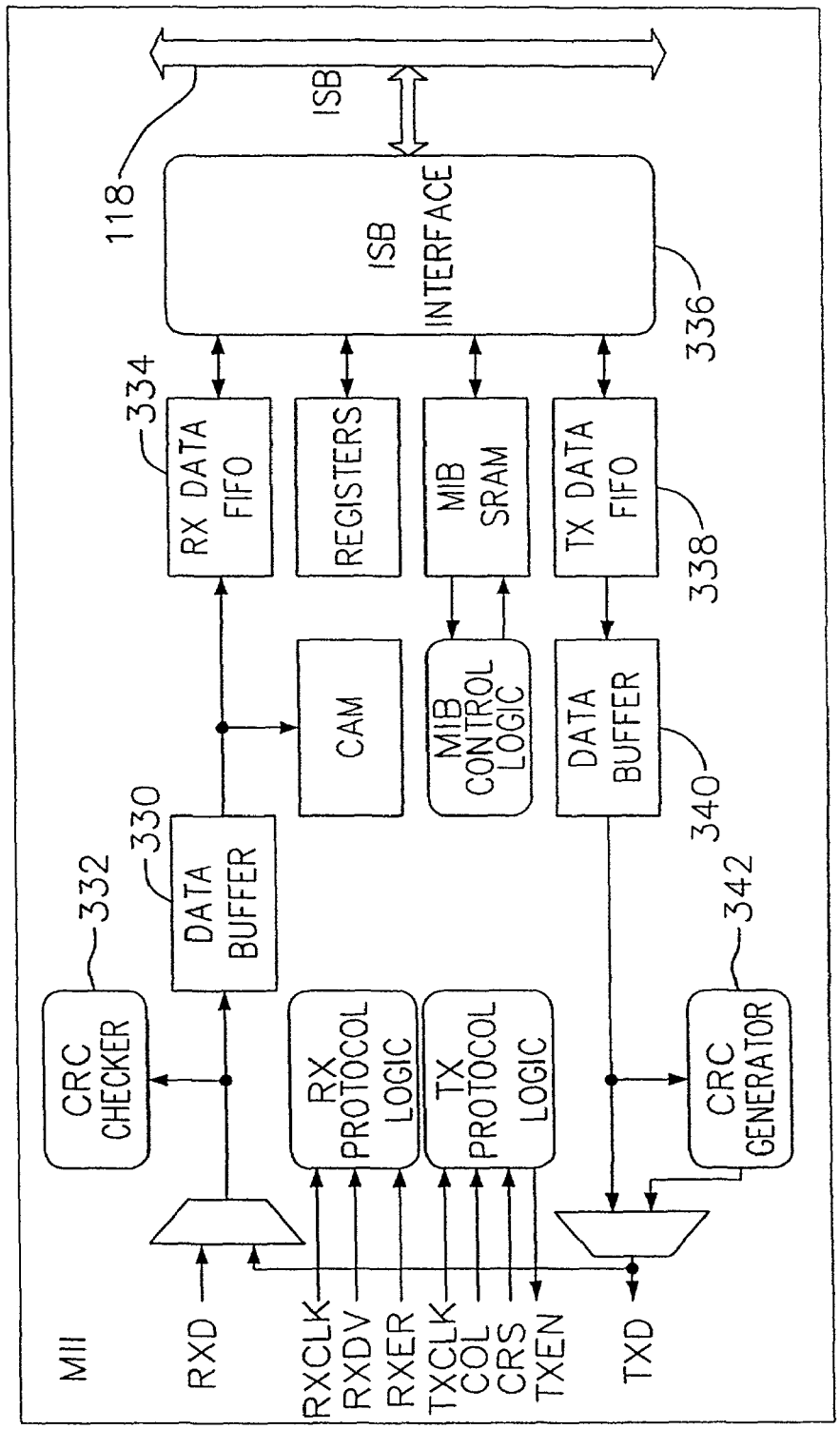
FIG. 9 is a system block diagram of an Ethernet media access controller (MAC) in accordance with a preferred embodiment of the present invention.

FIG. 9 shows the controller portion of the Ethernet MAC. The MAC receiver routes nibble wide MII data through cyclic redundancy checker 332 to a buffer 330 where it can be assembled into 32-bit long words. The data is forwarded to a FIFO register 334 that is coupled to the ISB 118 by ISB interface 336. Ethernet packet data is moved from the FIFO 334 to system memory by the system DMA controller (not shown). The MAC transmitter contains a FIFO register 338 that is coupled to the ISB 118 via the ISB interface 336. An Ethernet packet is moved from system memory (not shown) into the FIFO 338 by the system DMA controller (not shown). The data can be forwarded through data buffer 340 to the MI (not shown) by a transmit state machine (not shown). The transmit state machine initiates transmission of the packet to the MII when a FIFO watermark is reached or an end of packet is received. The transmit state machine also ensures that the correct inter-packet gap (IPG) duration has expired before initiating packet transmission to the MII (not shown) from the data buffer 340.

The preamble and start of frame delimiter (SFD) can be initially transmitted over the MII, followed by transmission of actual data. If the packet is less than 64 bytes long, all zero pad bytes can be appended to the frame. CRC generator 342 automatically generates CRC which is appended if the packet is less than 64 bytes long.

5. Universal Serial Bus Transceiver and MAC

An exemplary network gateway includes a USB 1.1 compliant, full speed (12 M b/sec) device interface. The USB 1.1 specification defines an industry-standard USB. The specification describes the bus attributes, the protocol definition, types of transactions, bus management, and the programming interface required to design and build systems and peripherals that are compliant with this standard. The USB 1.1 specification is incorporated herein by reference as if set forth in full. The (USB) can provide a ubiquitous link that can be used across a wide range of PC-to-telephone interconnects.

The USB interface, in the described embodiment, supports sixteen configurations, four concurrent interfaces per configuration, four alternative interfaces per interface and six concurrent endpoints. An endpoint is a uniquely identifiable portion of a USB device that is the termination of a data path between the host (e.g. MIPS core) and device. Each USB logical device is composed of a collection of independent endpoints. Each logical device has a unique address assigned by the system at device attachment time. Each endpoint on a device is assigned a unique device-determined identifier called the endpoint number. Each endpoint has a device-determined direction of data flow. The combination of the device address, endpoint number, and direction allows each endpoint to be uniquely referenced. Each endpoint is a simplex connection that supports data flow in one direction: either input (from device to host) or output (from host to device). An endpoint has characteristics that determine the type of transfer service required between the endpoint and the client software.

Figure 10:
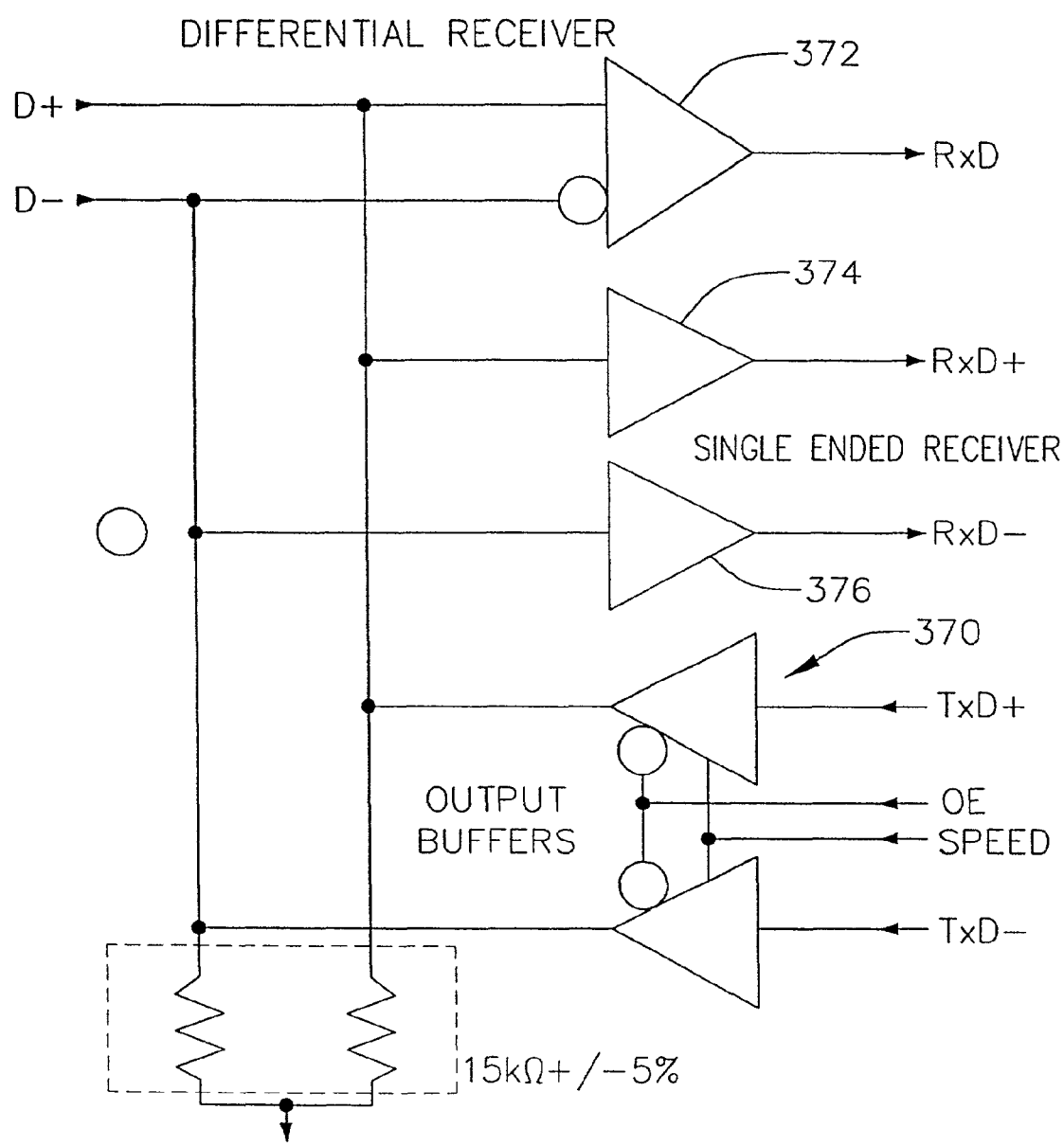
FIG. 10 is a system block a Universal Serial Bus (USB) controller in accordance with a preferred embodiment of the present invention.

FIG. 10 shows an exemplary USB transceiver. The USB transceiver uses a differential output driver 370 to drive the USB data signal onto the USB cable in accordance with the USB 1.1 specification. The driver can be a CMOS driver with an impedance that is less than the resistance specified in the USB 1.1 specification so that a discrete series resistor may be included to make up the balance as required. A differential input receiver 372 can accept the USB data signal. In the described exemplary embodiment, the receiver sensitivity complies with the USB 1.1 specification with an input sensitivity (VDI) of at least about 200 mV when both differential data inputs are in the differential common. In addition to the differential receiver, the described exemplary USB transceiver may include a single-ended receiver 374, 376 for each of the two data lines. The transceiver can support both full- and low-speed data rates such that any type of device may be coupled to these ports. When the transceiver is in full-speed mode it can use full-speed signaling conventions and edge rates. In low-speed it can use low-speed signaling conventions and edge rates. The described exemplary transceiver preferably utilizes two logical levels, J and K data states, to communicate differential data in the system. Differential signaling complies with the crossover voltage requirements of Section 7.1.2 of the USB 1.1 specification.

Figure 11:
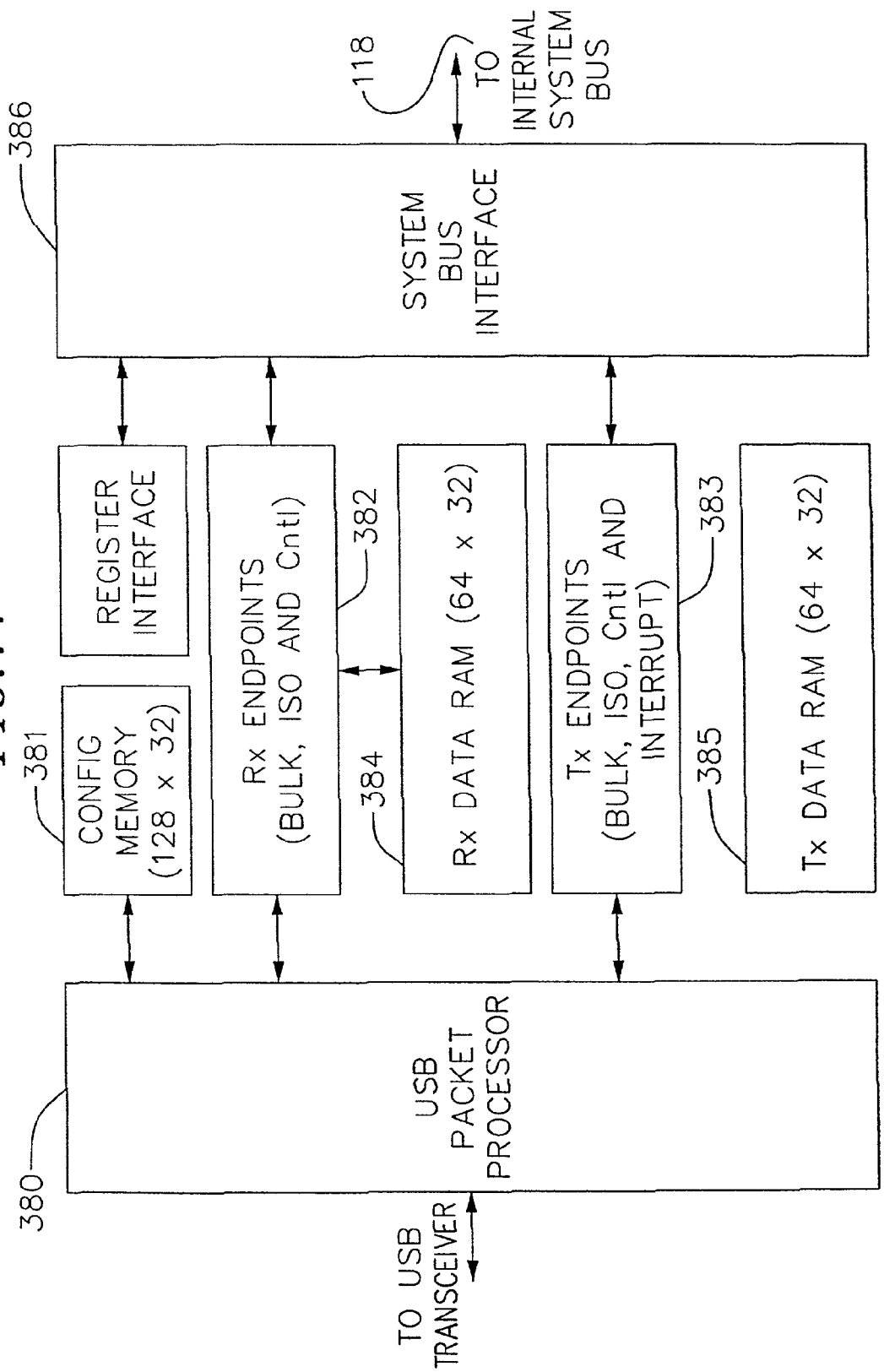
FIG. 11 is a system block diagram of a MAC for a USB controller.

FIG. 11 shows an exemplary USB MAC. The USB MAC includes a USB packet processor 380 that supports bulk in/out endpoints with packet sizes of eight, sixteen, thirty two or sixty four bytes. The USB packet processor 380 fragments USB packets and reassembles them into higher level packets with automatic detection of zero length USB packets. Internal USB configuration RAM 381 allows flexible configuration of the USB interface. The configuration RAM 381 can provide on the order of at least about 512 bytes of storage space for USB configuration descriptors. At power up of the network gateway, the MIPS core programs the configuration RAM 381 with a USB descriptor sequence. The MIPS core reads the values back from the configuration RAM and verifies the accuracy of the descriptors in RAM. The MIPS core enables USB operation.

The USB MAC can support multiple configurations, interfaces, alternative interfaces and endpoints. The size of the configuration RAM limits the total length of the descriptor sequence. Therefore, the size of the configuration RAM may be optimized for integration into various applications that may require more than the described 512 bytes of storage space. There are five descriptors, the device descriptor, configuration descriptor, string descriptor, as well as interface and endpoint descriptors. A descriptor sequence contains one device descriptor and one or more configurations, interface and endpoint descriptors. The length of a device/configuration interface descriptor is nine bytes and the length of an endpoint descriptor is seven bytes. In the described exemplary embodiment string descriptors are not stored in the configuration RAM.

The USB MAC processes all required USB standard device requests in hardware, including the clear_feature, get_configuration, get_descriptor, get_interface, get_status, set address, set_configuration, set_feature, and set_interface commands. The USB MAC extracts optional and class/vendor commands such as, for example, set_descriptor, synch_frame, and get_string_descriptor and forwards those commands to the MIPS core for processing. Upon receipt of such device requests the USB MAC preferably issues an interrupt to the MIPS core which then extracts the setup command and processes it.

In the described exemplary embodiment of the network gateway, there are preferably six physical USB endpoints: one bulk RX endpoint, one bulk TX endpoint, one isochronous RX endpoint, one isochronous TX endpoint, and one interrupt RX endpoints. An isochronous transfer can provide guaranteed access to USB bandwidth with bounded latency and guaranteed constant data rate through the pipe as long as data is provided to the pipe. The endpoint can be a given configuration and specifies the maximum size data payload that it can transmitted or received. The USB uses this information during configuration to ensure that there is sufficient bus time to accommodate the maximum data payload in each frame. If there is sufficient bus time for the maximum data payload, the configuration is established; if not, the configuration is not established.

The interrupt transfer type endpoint supports those devices that send or receive small amounts of data infrequently, but with bounded service periods. An interrupt transfer preferably provides a guaranteed maximum service period for the pipe as well as an attempt to re-transfer the data at the next period, in the case of occasional delivery failure due to error on the bus. The endpoint description identifies whether a given interrupt pipe's communication flow is into or out of the host.

Bulk transfers can support the exchange of relatively large amounts of data at highly variable times where the transfer can use any available bandwidth. Bulk transfers preferably provide access to the USB on a bandwidth-available basis, with guaranteed delivery of data, but no guarantee of bandwidth or latency. In addition, bulk transfers preferably attempt to re-transmit in the case of delivery failure. The bulk endpoint specifies the maximum data payload size that the endpoint can accept from or transmit to the bus. This maximum applies to the data payloads of the data packets; i.e., the size specified is for the data field of the packet not including other protocol-required information. The bulk endpoint is designed to support a maximum data payload size. The bulk endpoint preferably reports in its configuration information the value for its maximum data payload size.

In the described exemplary embodiment, the USB does not require that the size of transmitted data payloads be exactly the maximum size i.e., if a data payload is less than the maximum, it does not need to be padded to the maximum size. In the described exemplary embodiment of the USB, both RX/TX bulk endpoints can support a maximum USB packet size of eight, sixteen, thirty two, or sixty four bytes. Both RX/TX isochronous endpoints 382, 383 can support a maximum USB packet size of eight, sixteen, thirty two, sixty four, one hundred and twenty eight, two hundred and fifty six or five hundred and twelve bytes. The control endpoints can support a maximum packet size of thirty two bytes and the interrupt RX endpoint can support a maximum USB packet size of eight bytes.

Both the bulk and isochronous endpoints 382, 383 can support hardware fragmentation of higher layer packets (such as Ethernet packets) into USB packets in the transmit direction and the reassembly of higher layer packets from USB packets in the receive direction. An end of packet flag can be used to signal when a USB packet is shorter than the maximum packet size defined by the endpoint. In the described exemplary embodiment, the USB MAC inserts a zero length packet as an end of packet signal when the length of the higher layer packet is exactly an integer multiple of the maximum USB packet size. The USB MAC supports the generation of zero length packets in the transmit direction and the detection of zero length packets in the receive direction.

The USB MAC may include internal RX and TX RAM 384, 385 for temporary data buffering among the bulk, isochronous and control endpoints. The endpoints are then forwarded to system memory. The USB preferably includes four direct memory access (DMA) channels for fast access to and from system memory through a system bus interface 386 coupled to the ISB. Preferably, two DMA channels are used for bulk RX/TX endpoints and two are used for isochronous RX/TX endpoints.

6. HPNA a. MAC/PHY

Figure 12A:
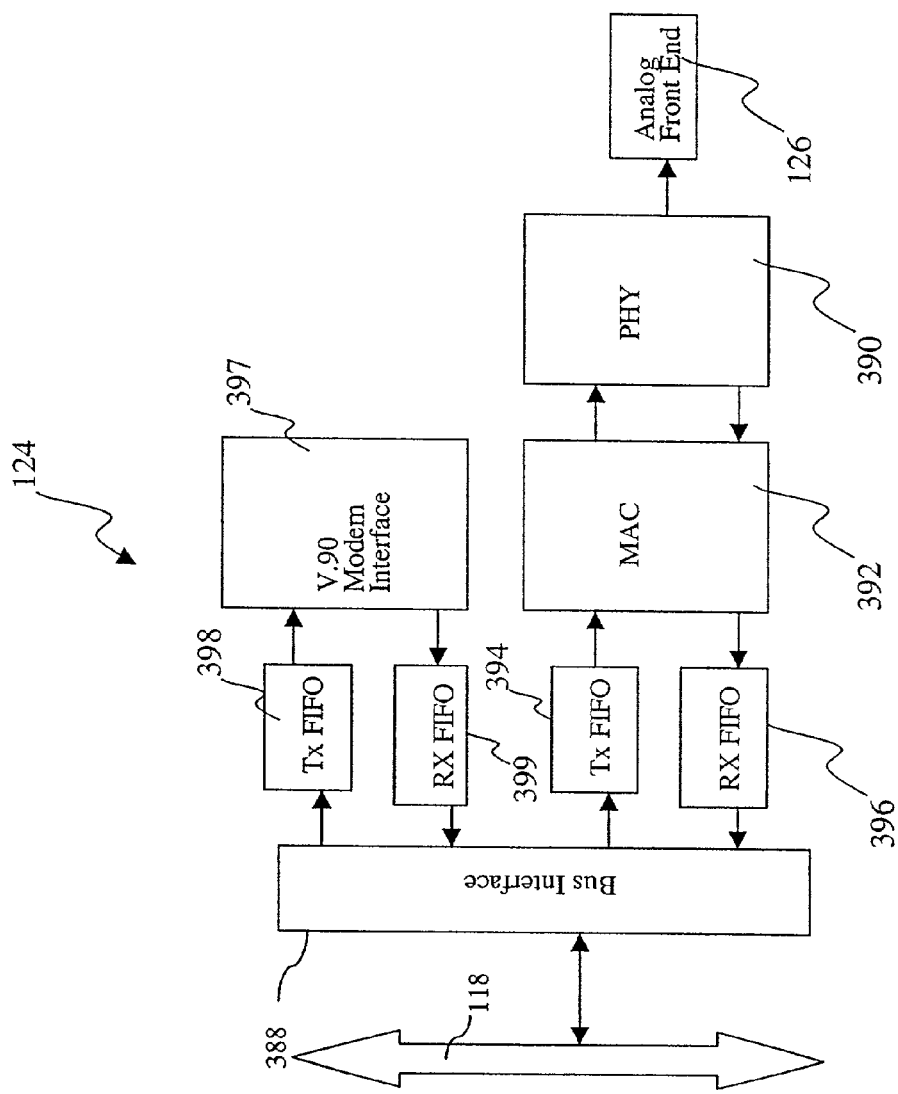
FIG. 12a is a system block diagram of an integrated HPNA MAC/PHY controller in accordance with an exemplary embodiment of the present invention.

The Physical layer of the HPNA controller is concerned with transmission and reception of bit stream traffic to and from the transmission medium. An exemplary HPNA PHY includes a FDQAM/QAM transmitter and receiver coupled to an analog front. FIG. 12*a* shows in block diagram form the controller aspects of the embodiment, while FIG. 12*b* shows the analog front end aspects of the embodiment.

Referring to FIG. 12*a*, HPNA controller 124 is a fully integrated MAC/PHY that transmits and receives data over an HPNA network. In the described exemplary embodiment, HPNA controller 124 includes a bus interface 388, such as a PCI or MSI bus interface for communication in accordance with well-known PC-based and/or peripheral/internet appliance architectures. HPNA controller 124 also includes digital PHY 390 having a FDQAM/QAM transmitter and receiver interfacing with the HPNA analog front end 126 and MAC 392. In the described exemplary embodiment HPNA MAC 392 is coupled to bus interface 388 through transmit (TX) FIFO 394 and receive (RX) FIFO 396. HPNA packet data is moved from the (RX) FIFO 396 to system memory by the ISB 118 via the bus interface 388. Similarly, HPNA data packets are moved from system memory (not shown) via the ISB and bus interface into the (TX) FIFO 394. A transmit state machine initiates transmission of the packet to the MAC/PHY when a FIFO watermark is reached or an end of packet is received. Bus interface 388 also has the capability of similarly communicating with other devices, such as a v.90 modem through v.90 modem interface 397 and its respective transmit (TX) FIFO 398 and receive (RX) FIFO 399.

Figure 12B:
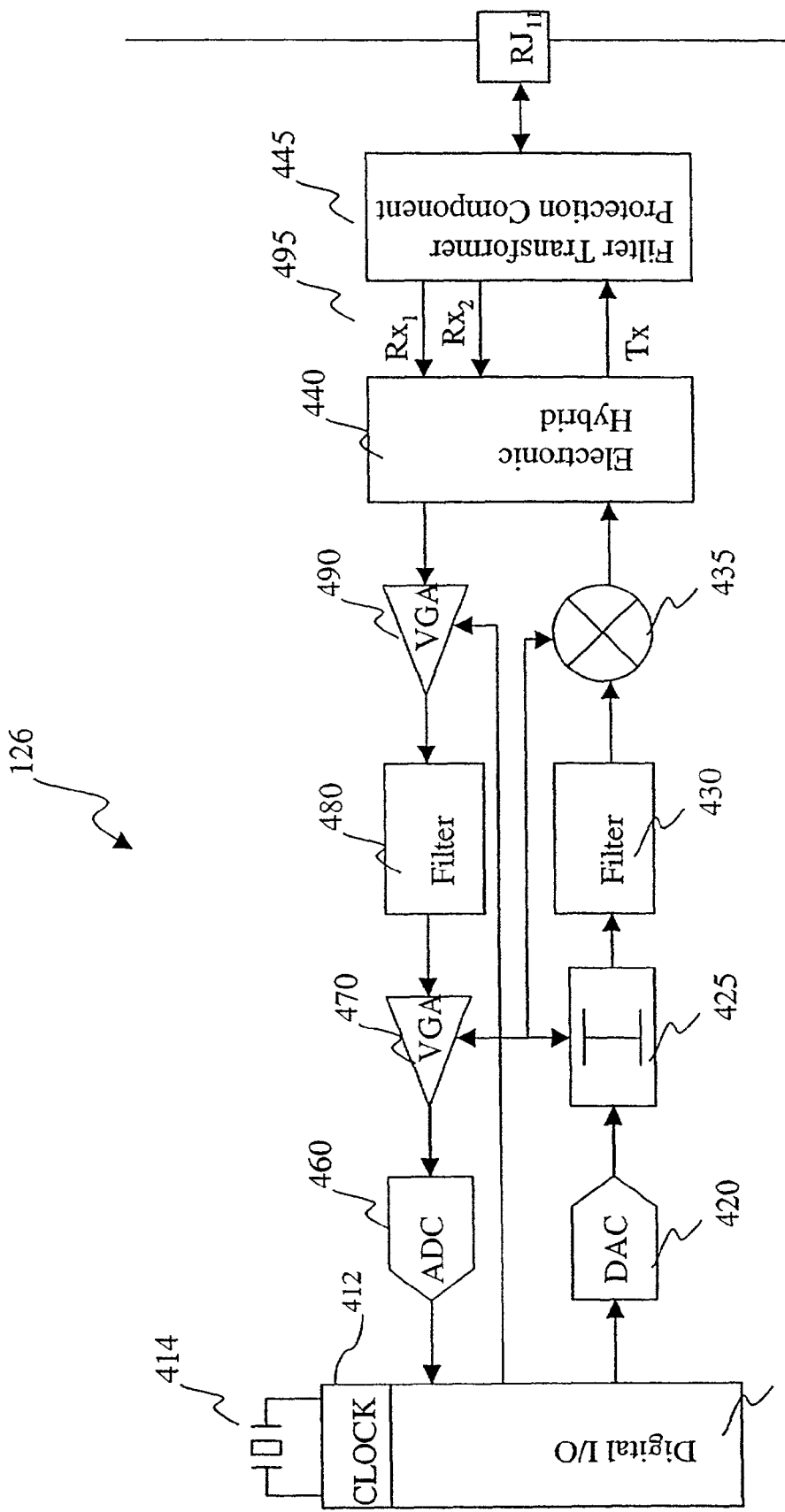
FIG. 12b shows an analog front end interfacing the HPNA controller of FIG. 12a to premises wiring in accordance with an exemplary embodiment of the present invention.

Referring to FIG. 12*b*, analog front end 126 couples HPNA controller to a transmission medium such as a premises UTP wiring. Analog front end 126 includes digital input/output (I/O) circuit 410 for transferring samples to and receiving samples from the HPNA controller. Digital I/0 410 includes clock 412 for driving HPNA controller 124 with a 64 MHz +/−100 ppm clock generated by 64 Mhz crystal 414.

A transmit path of the analog front end includes digital-to-analog converter 420 for converting digitally sampled data to an analog signal. The transmit path may further include an automatic gain controller 425 that adjust the gain of the analog signal in accordance with an input received by digital I/O 410. Filter 430 and transmit-off switch 435 are coupled to phone line connector 450, such as a UTP wiring RJ11 connector, through electronic hybrid 440 for buffering signals and filter/transformer/electronic protection circuit 445. The receive path includes analog-to-digital converter 460 for sending valid sample data, variable gain amplifier (VGA) 470, filter 480 for low-pass anti-aliasing, VGA 490, and is similarly coupled to phone line connector 450 through electronic hybrid 440 and filter/transformer/electronic protection circuit 445. Electronic hybrid 440 and filter/transformer/electronic protection circuit 445 are connected there between by a plurality of transmit and receive lines (e.g., TX, RX1, RX2) 495. The operations of the analog front end are well known in the art.

Figure 13:
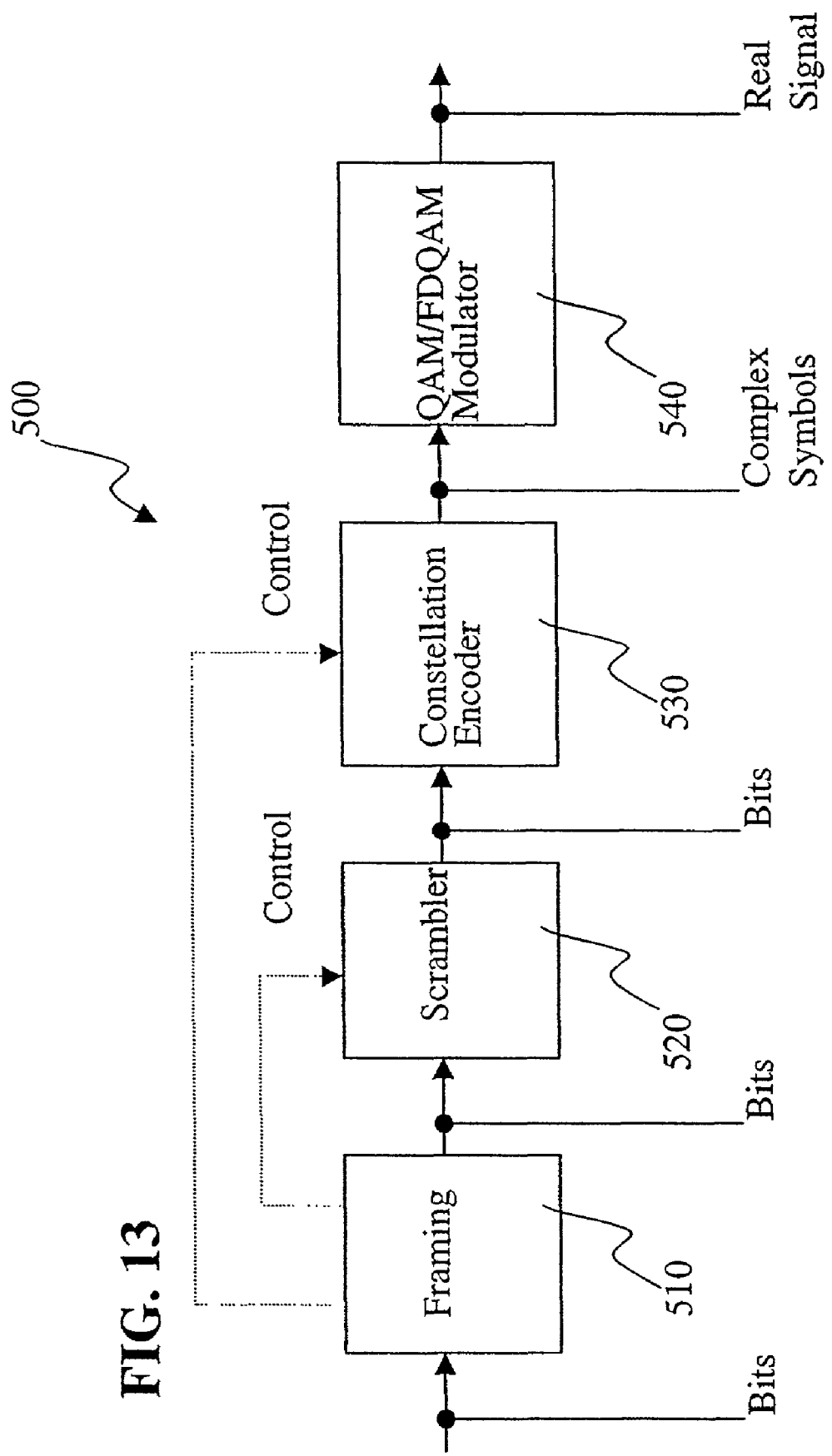
FIG. 13 depicts in block diagram form a transmitter aspect of an embodiment of a PHY in accordance with an exemplary embodiment of the present invention.
Figure 14:
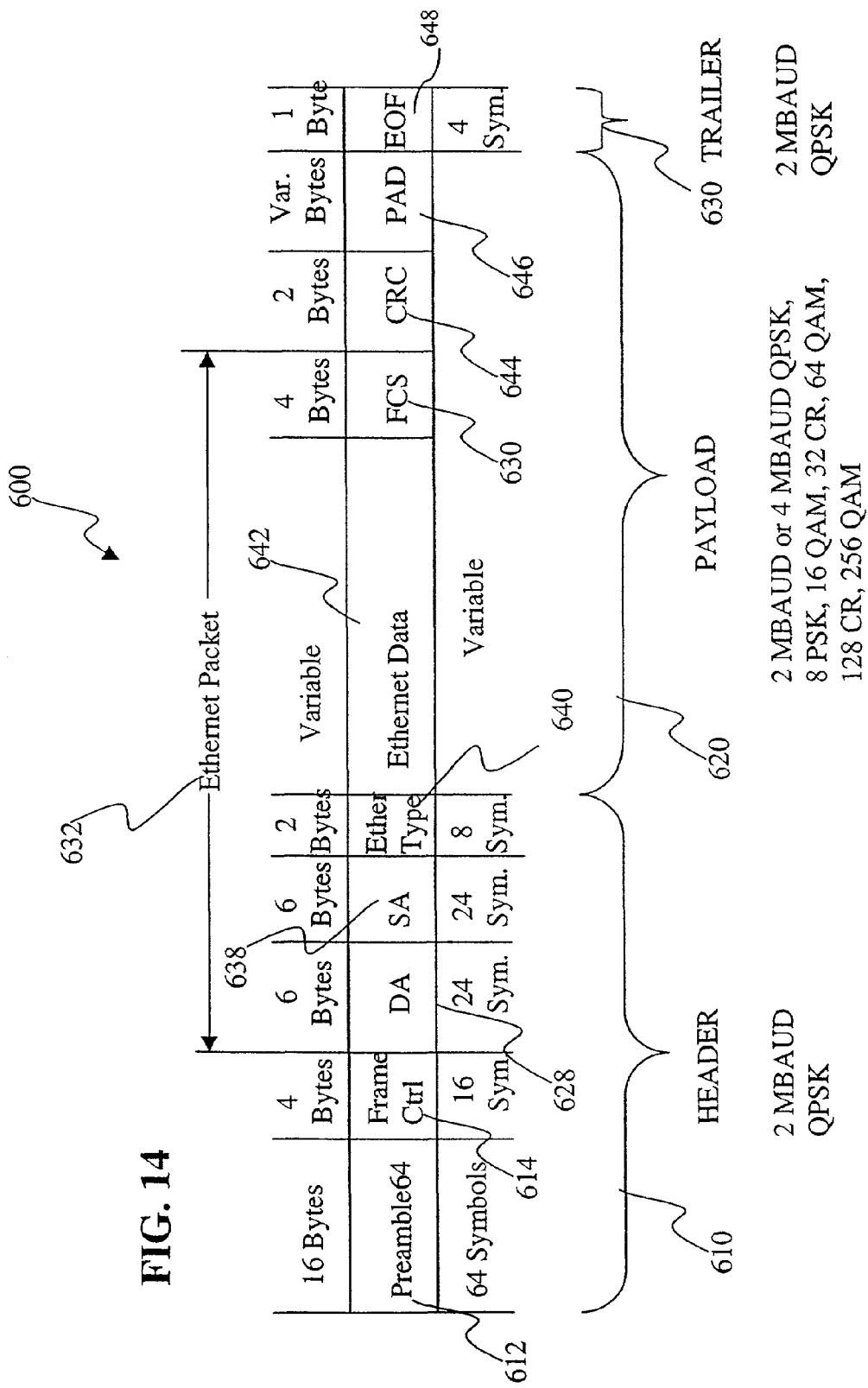
FIG. 14 shows an HPNA frame format in accordance with an exemplary embodiment of the present invention.

Referring to FIG. 13, a transmitter aspect of HPNA PHY is shown in functional block diagram form. Transmitter 500 includes frame processor 510, data scrambler 520, bit-to-symbol mapper (constellation encoder) 530, and QAM/FDQAM modulator 540. An exemplary frame format is illustrated in FIG. 14. Frame format 600 consists of low-rate header section 610, a variable-rate payload section 620, and a low-rate trailer 630. Some parts of the frame are not scrambled, as described below. Header 610 includes a preamble (PREAMBLE64) 612 that facilitates power estimation and gain control, baud frequency offset estimation, equalizer training, carrier sense, and collision detection as is described in more detail below.

Header 610 also includes frame control field 614. In the described exemplary embodiment, frame control field 614 is a 32-bit field defined in the table set forth in FIG. 15. Frame Type (FT) 616 is an eight bit field that is intended to provide flexibility for defining other frame formats in future versions of the embodiment. Present devices transmit zero in this field, and discard any frames with FT other than zero. The FT field is intended to provide a mechanism for forward compatibility, allowing extensions to use frame formats differing from the present embodiment. Scrambler initialization (SI) field 622 is set to the value used to initialize scrambler 520.

Priority (PRI) field 620 refers to a media access priority mechanism as described below. The three bit PHY priority value (PRI) refers to the absolute priority that a particular frame will be assigned when determining media access, and is the value used in the MAC embodiment described below. In the described exemplary embodiment, the priority value 620 is a field carried in the PHY-level frame transmission and is intended to indicate a three-bit PHY-level priority or class-of-service indication to the receiver link level processor for managing priority and class of service of the received frame. The priority value is not used by the receiver PHY processor. For stations that do not implement class-of-service the PRI field is ignored on receive, and is set to one for transmission. The described exemplary embodiment may also include a field that is reserved (RSVD) 618 for future use. In the described exemplary embodiment the RSVD field 618 is ignored by the receiver.

Payload encoding (PE) field 624 determines the constellation encoding of the payload bits. Header check sequence (HCS) 626 field is a cyclic redundancy check (CRC) computed as a function of the 128-bit sequence in transmission order starting with the FT bits and ending with the Ethernet source address (SA) bits, with zeros substituted for the as-of-yet uncomputed HCS field. The encoding may be defined by the following generating polynomial.

$$G(x)=x^8+x^7+x^6+x^4+x^2+1$$

In the described exemplary embodiment, the fields covered by the HCS are transmitted at two MBaud and two bits per Baud. Therefore, these fields may be received correctly in many cases where the payload is received in error. The HCS may be used in conjunction with soft-decision error statistics to determine with high probability whether the header was received correctly. This knowledge may be useful for optimizing the performance of ARQ and/or rate negotiation algorithms described below.

Returning to FIG. 14, it can be seen that the bit fields starting with the destination address (DA) field 628 and ending with the FCS field 630 substantially correspond with the fields described in IEEE Std 802.3 and are referred to as a link-level Ethernet frame (packet) 632. However, the bits of a PHY-level Ethernet frame have an Ethernet preamble and start-frame-delimiter (SFD) bits prepended to the link-level frame, that are not included in the frames of the present embodiment. It is intended that IEEE assigned Ethernet MAC addresses are used for destination address (DA) 628 and source address (SA) 638.

The Ethernet frame consists of an integer number of octets. Following Ether-type field 640 is Ethernet data field 642, FCS field 630 and cyclic redundancy check (CRC) field 644. CRC field 644 is a 16-bit cyclic redundancy check computed as a function of the contents of the (unscrambled) Ethernet frame in transmission order, starting with the first bit of the DA field and ending with the last bit of the FCS field. The encoding is defined by the following generating polynomial.

$$G(x)=x^{16}+x^{12}+x^5+1$$

For four MBaud payloads, a variable-length PAD field 646 follows CRC field 644 and consists of an integer number of octets. The last octet of the pad field (PAD_LENGTH) specifies the number of zero octets (0x00) preceding PAD_LENGTH. In the described exemplary embodiment the value of PAD_LENGTH is equal to or greater than the number of zero octets required to ensure that the minimum length of the transmission, from the first symbol of the PREAMBLE64 through the last symbol of the end of frame delimiter, is 92.5 microseconds. For 2 MBaud payloads, there is no PAD field. The PAD field is not present in a compatibility mode frame, as described below.

Figure 16:
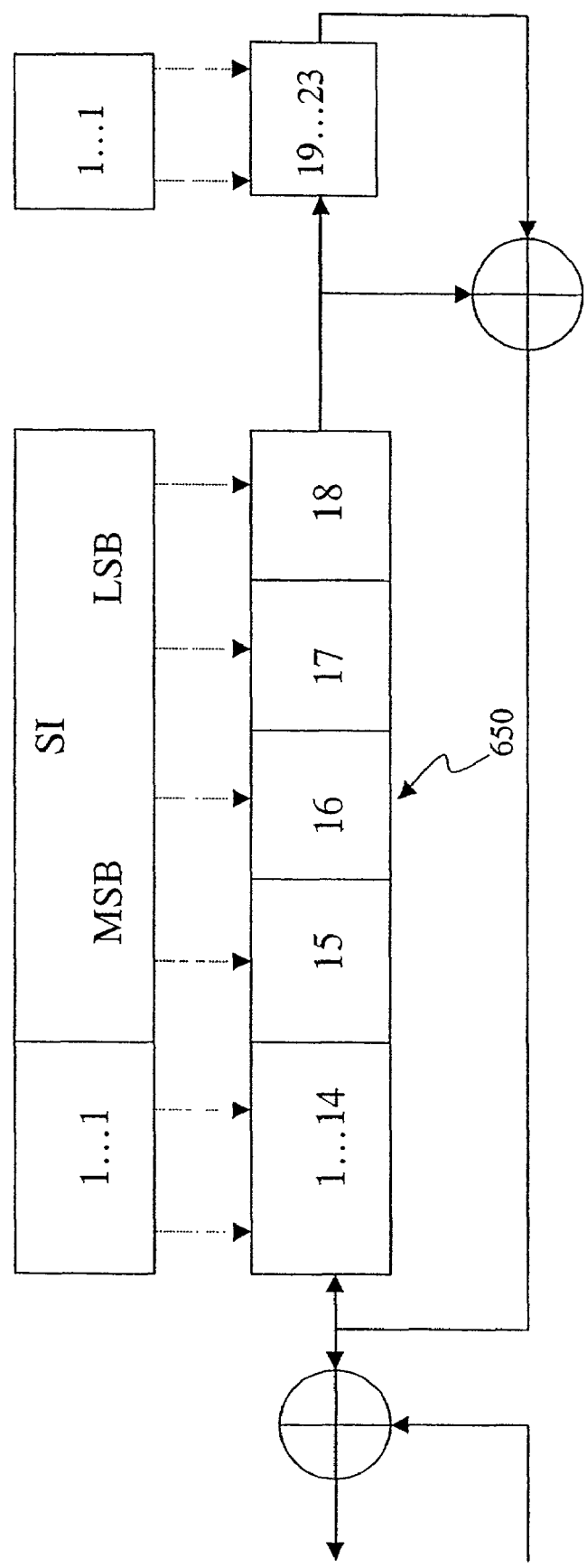
FIG. 16 depicts the frame-synchronized scrambler of FIG. 13 in accordance with an exemplary embodiment of the present invention.

Turning back to FIG. 13, scrambler 520 is described in more detail. Scrambler 520 is the frame-synchronized scrambler shown in FIG. 16, which uses the following generating polynomial.

$$G(x)=x^{23}+x^{18}+1$$

In the described exemplary embodiment, scrambler 520 is bypassed during the preamble bit field and the first 16 bits of Frame Control. Scrambler 520 is initialized and enabled starting with the 17$^{th}$ bit of Frame Control field 614. Scrambler 520 is bypassed after the last bit of the CRC-16 644, or the last bit of the PAD field 646, if present. The EOF sequence is not scrambled. The use of a pseudo-random initial scrambler state results in a more uniform power-spectral density (PSD) measured over multiple similar frames. This eliminates the problem of tones in the PSD from highly correlated successive packets.

Figure 17:
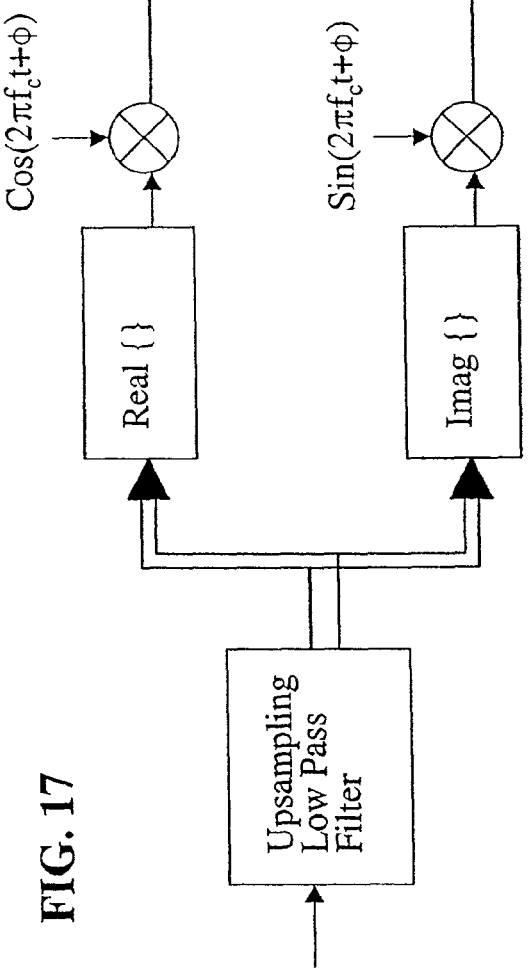
FIG. 17 shows in simplified block diagram form an example QAM implementation in accordance with an exemplary embodiment of the present invention.

Turning again to FIG. 13, following scrambler 520 is constellation encoder 530. Constellation encoder 530 performs bit to symbol mapping. The incoming bits are grouped into N-bit symbols, where N is the number of bits per baud specified in PE field 624. Complex symbols from constellation encoder 540 are input to QAM/FDQAM Modulator 540. QAM/FDQAM modulator implements Quadrature Amplitude Modulation (QAM). FIG. 17 shows an example QAM implementation. The carrier frequency and transmit filters are the same for Baud rates of 2 MHz and 4 MHz. Thus, a 2 MBaud signal is equivalent to an appropriately scaled 4 MBaud signal in which every other symbol is zero. The QAM/FDQAM Modulator used in conjunction with the present invention is described in more detail in the pending application referenced above.

Figure 18:
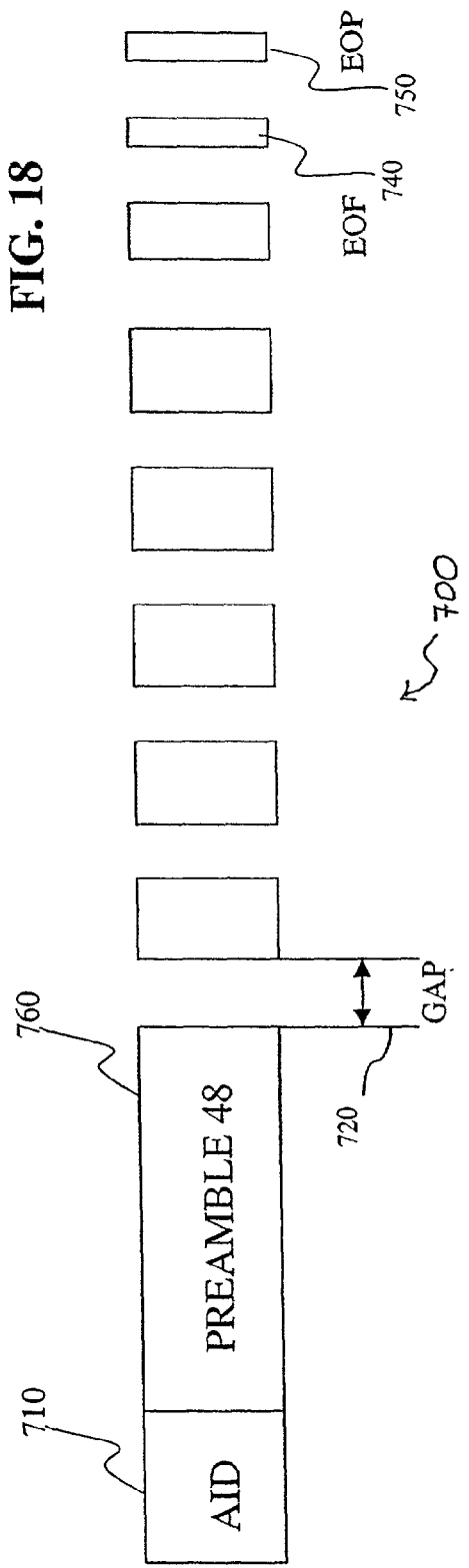
FIG. 18 depicts compatibility mode frame formatting in accordance with an exemplary embodiment of the present invention.

In addition to the frame formatting described above, the present invention may provide for a compatibility frame format that is defined for use by HPNA V2 nodes when they are sharing the phone line with HPNA V1 nodes. In this case, the V2 transmissions masquerade as valid V1 frames to provide correct carrier sense and collision detection behavior, even though V1 nodes are not able to recover the data from the frame. In this format, referring to FIG. 18, frame 700 starts with a modified V1 AID field 710, followed by a V2 symbol sequence modified to have periodic gaps 720 so that a V1 receiver will detect this signal as a series of pulses. The frame ends with a trailer that includes 4-symbol V2 EOF 740 and a single pulse, EOP 750, generated by passing a QPSK symbol through the transmit path.

Figure 19:
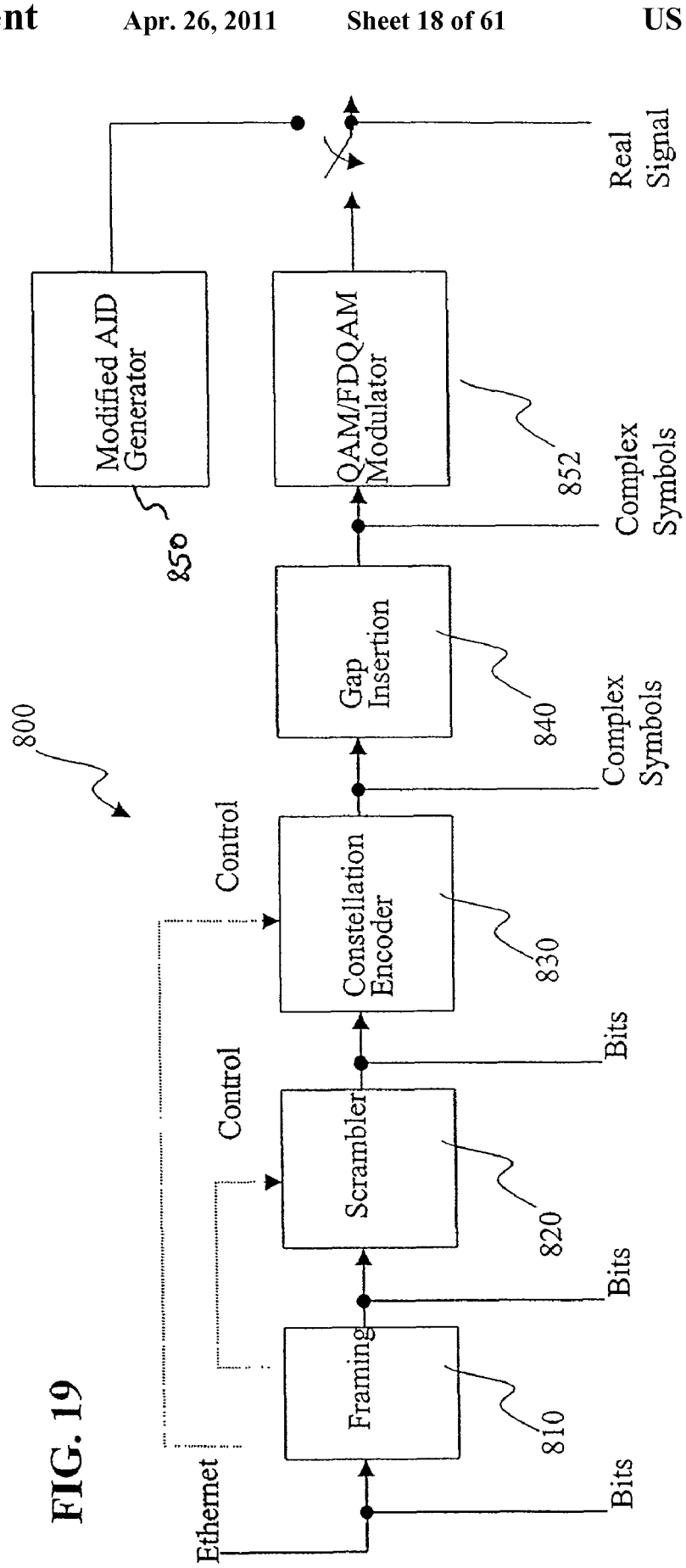
FIG. 19 shows the transmitter aspect of the PHY embodiment operating in compatibility mode in accordance with an exemplary embodiment of the present invention.

Referring to FIG. 19, transmitter aspect of PHY 320 operating in compatibility mode is shown in functional block diagram form. Transmitter 800 includes framing logic 810 implementing the compatibility mode framing described above. Scrambler 820 is responsive to framing 810 and is identical to scrambler 520 described above in conjunction with FIG. 13. Scrambler 820 is initialized at the same point in the frame control field. Constellation Encoder 830 is coupled to scrambler 820 and is substantially the same as the constellation encoder 530 described above in conjunction with FIG. 13.

In the described exemplary embodiment, a modified AID Generator 850 prepends a modified V1 AID to every frame. The modified AID is defined as a V1 AID in which each pulse in the AID is replaced by a pulse defined below. The AID number is one chosen by the sending station and conflicts are resolved by selecting a new AID number. The control word indicates high-speed and low-power transmission. The use of the AID mechanism for collision detection implies that V2 has the same limitation on the maximum number of nodes as V1 when in compatibility mode. In the described exemplary embodiment, the modified AID pulse is generated by passing the first symbol of the PREAMBLE48 through the QAM/FDQAM modulator with the same initial modulator phase as the first symbol of the PREAMBLE48. The modified AID pulse may also be used for the JAM sequence.

Figure 20:
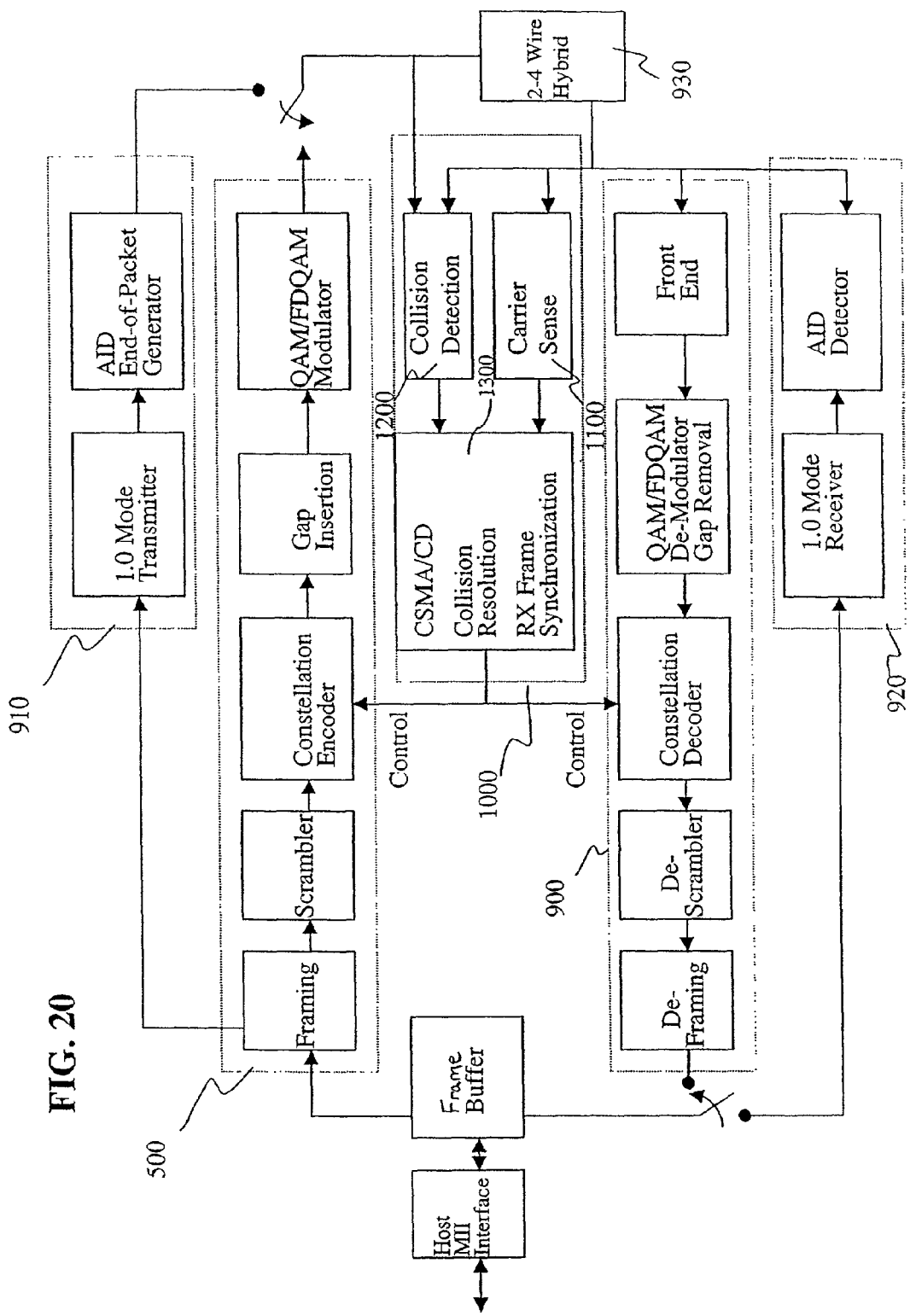
FIG. 20 shows in functional block diagram form an embodiment of a transceiver in accordance with an exemplary embodiment of the present invention.

With regard to the receiver aspects in accordance with the PHY layer protocol, reference is made to FIG. 20, wherein receiver functionality 900 is shown in block diagram form.

Receiver functionality 900 performs the reverse of that described above for transmitter 500, namely, upon receiving a signal from 2-4 wire hybrid and performing front end processing, the following occurs: QAM/FDQAM Demodulator Gap Removal, Constellation Decoding, De-scrambling and De-framing, as is well-known in the art given the above-defined transmitter functionality.

Now turning to the MAC Layer, the station media access control (MAC) function, as seen at the wire interface is described in more detail. The HPNA V2 MAC is modeled after the carrier-sense multiple-access with collision detection (CSMA/CD) MAC function of Ethernet (IEEE Std 802.3, 1998 Edition). In the described exemplary embodiment, the HPNA MAC is adapted to the V2 PHY and enhanced with quality-of-service (QoS) features.

FIG. 21 depicts the MAC logical layers and functions. Although the MAC function is an essential part of the wire interface characteristics, the system partitioning of PHY and MAC functions is implementation dependent. In particular, it is intended that the present embodiment can be implemented in an integrated PHY+MAC chip. Alternatively, a PHY-only chip may be interfaced with a standard "MAC chip" using the Media Independent Interface (MII) described in IEEE Std 802.3-1998, clause 22.

When in compatibility mode V2 devices transmit either V1 format frames or V2 compatibility format frames depending on the destination station type. The MAC operation in this mode is as specified in IEEE Std 802.3-1998 CSMA/CD MAC with BEB collision resolution and no access priority. When in compatibility mode the MAC operation is as specified in IEEE Std. 802.3-1998, clause 4, for a MAC sublayer operating in half duplex mode at speeds of 100 Mb/s and below. The timing parameters to be used in Compatibility Mode are in accordance with the V1 PHY Specification, Version 1.1. In compatibility mode the MAC times the interframe gap from the de-assertion of the carrier sense signal, CAR_SENS. The timing of CAR_SENS relative to the wire interface adheres to the timing specified in HPNA V1 PHY Specification rev 1.1, clause 3.3.

An implementation may have different individual CAR_SENS/MAC timing parameters provided the overall timing at the wire interface is the same as CAR_SENS/MAC with the parameters specified. Further, in compatibility mode the detection of collisions is as specified in HPNA V1 PHY Specification rev 1.1, clause 2.5.3, with a JAM signal emitted as specified in clause 2.5.4. ACCESS ID values are maintained as specified in clause 2.5.5.

The Carrier Sense Multiple Access/Collision Detect (CSMA/CD) media access method is the means by which two or more stations share a common transmission channel. To transmit, a station waits (defers) for a quiet period on the channel (that is, no other station is transmitting) and then sends the intended message modulated as per the PHY characteristics. The transmission deferral is ordered by up to eight priority levels, implementing absolute priority among stations contending for access. If, after initiating a transmission, the message collides with that of another station, then each transmitting station ceases transmission and resolves the collision by choosing a backoff level and defers to other stations that have chosen a lower backoff level. The distributed algorithm for choosing a backoff level bounds the access latency.

Referring again to FIG. 20, a transceiver functional block diagram of an embodiment of the present invention is shown that includes transmit functionality portion 500, counterpart receive functionality portion 900, V1 compatibility transmit and receive functionality portions 910, 920, MAC functionality portion 1000 for both V1 and V2 modes, and 2-4 wire hybrid portion 930. Included in MAC 1000 is carrier sense functionality portion 1100, collision detection functionality portion 1200, and CSMA/CD collision resolution/rx frame synchronization functionality portion 1300. Carrier Sense 1100 detects the starting and ending times of a valid frame transmission on the wire. This is used to determine when frames are present on the channel/transmission medium, as well as to determine the presence of a backoff signal in a signal slot.

Collision detection 1200 detects the presence of a valid frame transmission from some other station during an active transmission, and for all stations, including non-transmitting stations, detects the received fragment that represents a transmission truncated by a collision. Collision Resolution 1300 implements the distributed algorithm that controls backoff. Although the performance of the blocks in the MAC function are implementation dependent, certain minimum performance requirements are needed to ensure interoperability and compatible sharing of the channel and are now described in more detail.

Figure 22:
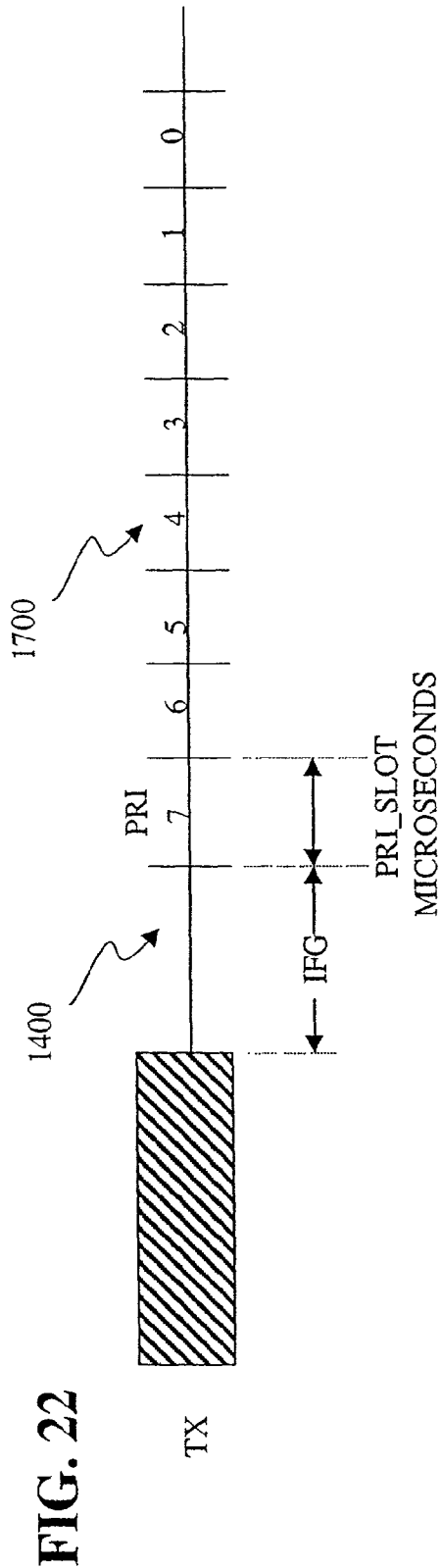
FIGS. 22 and 23 depict signal and priority slots involved with transmission and collision aspects in accordance with an exemplary embodiment of the present invention.
Figure 23:
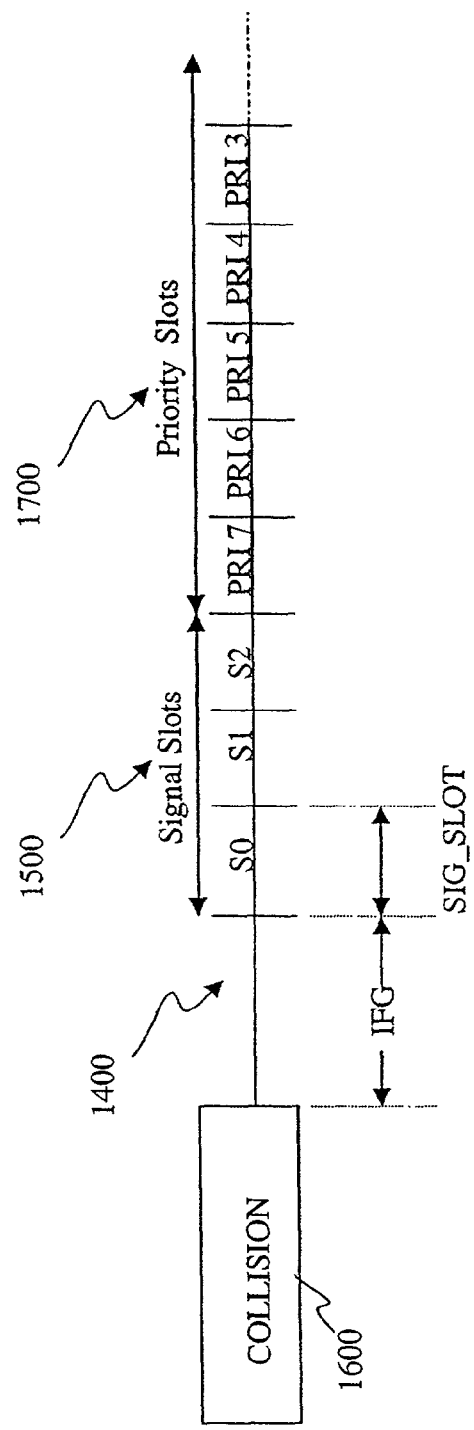

Referring to FIGS. 22 and 23, the time following a transmission TX is divided into a plurality of slots: (1) an Interframe Gap (IFG) 1400; (2) three backoff signal slots 1500 (following collisions 1600); and (3) eight priority slots 1700. During these time periods the MAC is synchronized and the slot timing is defined by the rules for valid transmissions as set forth above. After priority slot zero there may be an arbitrarily long period with no transmissions followed by one or more stations attempting transmission. In this latter case the MAC is unsynchronized. In the described exemplary embodiment, when MAC timing is synchronized stations commence any transmission no earlier than zero and no later than four microseconds (TX_ON) after a slot origin, measured at the transmitter wire interface.

The V2 embodiment can be used for carrying media streams, such as video and audio (as described in more detail below). To reduce the latency variation in these streams, a priority mechanism is implemented to allow higher layers to label outgoing frames with priority to ensure that those frames have preferential access to the channel over lower priority frames. In the described exemplary embodiment, transmissions may be delayed to a slot beyond the minimum inter-frame gap, based on the priority level of the frame waiting to be transmitted.

Referring back to FIG. 22, in the described exemplary embodiment slots are numbered in decreasing priority, starting at priority seven. Higher priority transmissions commence transmission in earlier slots and acquire the channel without contending with the lower priority traffic. A station's Priority Slot may be based on the PHY priority number associated with the frame ready for transmission (TX_PRI), as determined by the network stack and communicated to the MAC.

FIG. 22 shows the relative timing of priority slots. After priority slot zero there are no more priority slots, and stations with traffic at any priority level can contend on a first-come, first-served basis. All collisions after priority slot zero are considered to happen at PRI=0. In the described exemplary embodiment no station transmits in a Priority Slot numbered higher than the TX_PRI assigned to the frame being transmitted. Further, in the described exemplary embodiment, stations that do not have priority implemented may automatically default to a TX_PRI value of one.

Stations waiting for transmission monitor Carrier Sense, and defer if CS was true prior to the start of the station's Priority Slot, or if beyond Priority Slot zero the station defers if CS was true prior to the start of transmission. Any station ready to transmit at the start of its Priority Slot transmits if CS was false prior to the start of it's Priority Slot, without deferring if CS was asserted prior to the start of transmission. See FIGS. 24 and 25, depicting transmission aspects, without and with priority access, respectively. With priority access video traffic at priority level seven gains access ahead of best effort traffic scheduled at level one. In the described exemplary embodiment, the slot timer is restarted if there is some other transmission that acquires the channel while a station is waiting at a lower priority.

The TX_PRI value is the priority the MAC uses to schedule transmission and is the value present in the PRI field of the frame header. This value is determined by a higher layer in the network stack. The PRI field is used to transport the priority label from source to destination, to assist the destination in managing the receive queue. The 3 bit priority values referred to are "PHY priorities". In the described exemplary embodiment, PRI=7 has the highest priority, PRI=0 has the lowest. There may be a mapping between PHY priorities and the Link Layer (LL) priority values as delivered to the Link Layer by the Network Layer. This mapping is described herein below with regard to the Link Layer Protocols for V2.

In general, the Network layer or Application layer will determine what policy is used to map traffic onto Link Layer priorities. For instance, IETF Integrated Services currently defines priority 0 as the default "best effort" priority, and priority 1 as the penalty "worse than best effort" priority—and most implementations will map best effort to PHY PRI=1 and worse-than-best-effort to PHY PRI=0. The PHY priority mechanism is strict priority (as opposed to schemes which allocate lower priorities some minimum percentage of network capacity)—higher priority traffic never defers to lower priority traffic. However, in the described exemplary embodiment, higher priority traffic will be limited by admission control or other Link Layer policy mechanism to prevent over-subscription.

Two or more stations may begin transmitting in the same Priority Slot following the IFG period. All stations monitor the channel to detect the colliding transmissions of other stations. Colliding frame(s) will be received over a channel with impairments. Passive stations can detect collisions by observing the length of transmission fragment and the validity of the received PREAMBLE64. A Valid CS Frame is guaranteed to have a unique symbol sequence within the first 128 symbols (which are transmitted at Base Rate). The Ethernet MAC Source Address (SA) is used to guarantee uniqueness. That field is scrambled, but the scrambled SA, SI tuple will be unique. SI is the 4-bit scrambler initialization field, as described above. After detecting a collision a station continues to transmit through the Ethertype field followed by an EOF sequence (symbol 139) and then ceases transmission.

A collision occurs when two or more stations are active with ready frames and are contending for access to the channel at approximately the same time. Generally, collisions are between frames at the same priority level. A distributed collision resolution (CR) algorithm is run which results in stations becoming ordered into backoff Levels where only one station is at backoff Level zero and can therefore acquire the channel. After the winning station completes its transmission, all stations reduce their backoff Level by one if it is greater than zero, and the new station(s) at backoff Level zero attempt transmission. All stations, even those with no frame to transmit, monitor the activity on the medium.

Also, the collision resolution cycle is closed, so that stations that did not collide are not allowed to contend for access to the medium until all stations that collided have transmitted one frame successfully or have forgone the right to transmit their waiting frame. Ultimately all stations that were contending for access in the initial collision gain access to the wire and the collision resolution cycle is ended. This results in access latency being tightly bounded. This mechanism differs from binary exponential backoff (BEB) used in other versions of Ethernet in that the backoff level does not determine the contention slot chosen by a station—all stations at a given priority always contend in the slot corresponding to the access priority. Instead stations at non-zero Backoff Levels defer contending until stations that are at zero Backoff Level transmit.

The method used is called Distributed Fair Priority Queuing (DFPQ) as described in U.S. Pat. No. 6,256,317, entitled "PACKET-SWITCHED MULTIPLE-ACCESS NETWORK SYSTEM WITH DISTRIBUTED FAIR PRIORITY QUEUING," issued on Jul. 3, 2001, the contents of which are expressly incorporated by reference herein. Each station maintains eight backoff level (BL) counters, one for each priority. The backoff level counters are initialized to zero. The priority level of a collision can be inferred from the priority slot where the collision occurs. Consider the case where stations are only contending on one priority. After a collision and an IFG, three special backoff signal slots (S0 ... S2) are present before the normal sequence of priority contention slots occurs. Signal slots only occur after collisions, they do not follow successful transmissions.

Each active station pseudo-randomly chooses one of the slots, and transmits a backoff signal. More than one station can transmit a backoff signal in the same slot. The active stations transmit backoff signals to indicate ordering information that determines the new backoff levels to be used. All stations (even those without a frame ready to transmit) monitor collision events and the backoff signal slots to compute the backoff level. If an active station sees a backoff signal in a slot prior to the one it chose, it increases its backoff level.

Those stations at backoff level zero (ones that are actively contending) that saw no backoff signals prior to the one they chose, remain at backoff level zero and contend for transmission in the priority slot equal to TX_PRI that immediately follows the backoff signal sequence. Eventually, only one station remains at backoff level zero and successfully gains access to the channel. Stations waiting to transmit higher priority frames may pre-empt the collision resolution by transmitting in a higher-priority slot. All stations, even those not contending for access to the wire, also maintain a maximum backoff level (MBL) counter per priority, which is incremented for each backoff signal seen and decremented when a successful transmission occurs. The MBL is non-zero whenever a collision resolution cycle is in progress. When a station first becomes active, if MBL is non-zero, BL is initialized to contents [MBL], otherwise BL is initialized to zero. This ensures that all currently active stations gain access to the channel before stations can re-enter the waiting queue. The BACKOFF20 signal is a symbol sequence consisting of 16 symbols of the preamble sequence (TRN16) transmitted, followed by the 4 symbol EOF sequence. Detection of the BACKOFF20 signal(s) in a backoff signal slot must be possible even if more than one station selects the same slot. Stations implement saturating 4-bit BL and MBL counters. The width of the Signal Slot is 32 microseconds (SIG_SLOT). Stations implement the MAC function with collision resolution whose behavior matches the procedural model described below.

The procedural model uses a pseudo-code modeled after concurrent Pascal. IEEE Std 802.3 1998 Clause 4.2.2 provides an overview of this pseudo-code. The code set forth below models three independent concurrent processes (Deference, Transmitter, Receiver), which interact through shared variables. The Deference process is driven by the detection of transmissions on the channel, and times the boundaries for Signal Slots and Priority Slots. The shared variable current Priority signals the Transmitter process when a transmission slot exists.

HPNA V2 includes a standardized mechanism for Link Layer network control and encapsulation. The link layer, provides for the reliable transfer of information across the physical link. It is concerned with sending frames, or blocks of data, with the necessary synchronization, error control, and flow control. In the described exemplary embodiment, control frames are data link layer frames that are identified by IEEE assigned Ethertype value (0x886c designated for the Assignee of the present application) in the Type/Length field of the frame, and further distinguished by individual subtypes. The link control entities may be implemented in hardware or driver software. Link Control frames are not seen by layer three (IP) of the network stack, and are not bridged between network segments. An exemplary method for implementing Link Control frames is further disclosed in U.S. patent application Ser. No. 09/825,851, entitled "METHOD FOR PROVIDING SYNCHRONOUS TRANSFER OF PACKETS BETWEEN ASYNCHRONOUS NETWORK NODES IN A FRAME BASED COMMUNICATION NETWORK", filed Apr. 4, 2001, the content of which is incorporated herein by reference.

Given the home networking implementation aspects of the present invention described above, we now turn to voice implementation aspects associated therewith. The desire to create quality voice over home networking service springs from an initiative with several goals, including the reduction of the cost of maintaining carrier networks by switching from a circuit-switched to a packet-switched model and by allowing voice and data to share a common infrastructure. However, to be competitive, the quality of voice over home networking calls should at least equal that delivered by today's circuit-switched networks. The quality of a voice call is affected by at least two metrics namely audio fidelity and audio delay. Audio fidelity of packetized voice is affected by several parameters such as, for example, the choice of codec. In general, the lower the compression rate in the codec, the higher the mean opinion score (MOS) of the resulting playback, and the better the perceived speech quality. Similarly, audio quality may be affected by lost samples due to congestion and transmission errors and excessive path latency.

Further, the audio quality may also be degraded by frame slips that may occur if the receiving system's clock is not correlated with the transmitter's clock. In this context, frame slip means that, if samples are taken at slightly higher than at 8 kHz rate and played out at the 8 kHz rate, eventually there will be more samples than time to play them out, necessitating a drop in samples in order to catch up, such droppage being termed frame slip, a frame being one sample at 8 kHz.

Audio delay in a VoIP system is determined by the summation of the individual delays that occur within the total communication path for the call. The path includes codec delay, packetization delay, LAN queuing and transmission delay, IP network queuing delay, processing and transmission delays, far-end LAN delay and finally, de-packetization delay. When this total delay exceeds about 150 msec one-way, the perceived response time of the party at the other end tends to exceed the normally expected human response time. As a result, speakers tend to become impatient and repeat themselves and inadvertently interrupt the other speaker.

b. Latency

With regard to path latency and the jitter in that latency, it is not desirable to have packets assembled on one end of the network and leisurely delivered at the other end. Components to latency may include the possibility that someone else is using the network when the network is desired to be used. In addition, a collision may also occur on the network. The collision resolution in the worst case may take several msec with a specific probability of resolution. If the probability of resolution is increased the time to complete the collision resolution also increases.

Standard Ethernet protocol might be one choice for a home LAN, if it were to be adapted to a home-friendly medium, such as a phone line or a wireless carrier. The HPNA V1 protocol was built injust this fashion. HPNA V1 protocol is the IEEE 802.3 MAC protocol operating on home phone lines with a novel PHY implementation. However, the IEEE 802.3 protocol's collision resolution algorithm delivers very unsatisfactory latency performance when the aggregate network load is moderate to high. One of the most often-cited problems arising from high offered load on the IEEE 802.3 protocol is the network capture effect, where competing stations take turns at virtual dominance over the network for relatively long periods of time. Overall, the network behavior is fair, but for short periods of time, the network is very unfair.

The HPNA V2 protocol solves the problem of network capture by employing a simple, yet tightly-bounded collision resolution mechanism which does not rely on a central arbiter to resolve network sharing issues, known as DFPQ, as described above. The key to the protocol is the employment of a RX based collision detection scheme that allows all network nodes to maintain consistent knowledge of the network condition. Based on the network condition, each node can determine whether it may take its turn to transmit a packet. Once a node has transmitted, it must wait until all other nodes wishing to transmit have also taken a turn before it can get a new turn.

In accordance with HPNA V2 protocol, as multiple nodes contend for the same opportunity to transmit, they perform a randomization step which serves to define a transmission ordering among the competing nodes. Because the ordering decision is random and decentralized, there is some non-zero tail to the time it takes to resolve a non-colliding order, but the tail is very small in comparison to the behavior of more traditional collision resolution protocols. Thus the DFPQ collision resolution avoids the network capture effect.

However, removing the network capture effect is not enough to completely solve the problem of delivering guarantees of limited latency. Because some competing nodes may have relatively time-insensitive packets in their queues (such as file transfer data or web-page data), the latency of delivery for the time-sensitive VoIP packets could be greatly altered by the varying load of time-insensitive packets. Worse yet, if there were a large number of non-VoIP nodes in the network, and each was given a turn over the VoIP nodes, then the aggregate of non-VoIP traffic could be sufficient to degrade audio quality.

However, DFPQ again provides a solution. This time, the solution is to allow for multiple instances of the MAC protocol to operate in parallel, with one instance for each of 8 different priority levels. Each MAC instance (priority level) operates with a successively longer inter-frame space (IFS). Packets from lower levels of priority are only allowed access to the network when no packets exist at higher levels. This mechanism prevents time-insensitive traffic from affecting the delivery latency of packets from higher levels of priority. VoIP traffic is assigned to the highest level of priority because it has the tightest performance targets of all network traffic. Therefore, VoIP traffic always gets to "cut in line" ahead of lower priority traffic.

In order to take full advantage of the multiple priority levels of the HPNA V2 protocol, a MAC controller includes multiple transmission queues. If only one transmission queue exists, then it is possible for the device driver to load a low-priority frame into the queue, not knowing that a short time later, a high priority frame may need to be queued. When the high priority frame does arrive at the device driver, this frame must wait until the low-priority frame is transmitted by the MAC. The described exemplary embodiment therefore includes a single physical queue under queue management control that allows re-ordering of previously queued frames to permit the highest priority frame to appear at the head of the queue.

In qualitative terms, the latency of delivery of frames using DFPQ is greatly improved over previous methods. However, an additional system latency component exists. This component is due to the lack of coordination of the framing of voice samples at the handset such that a VoIP packet will be sent on the LAN and arrive just in time to utilize the next available upstream transmission slot on the WAN. If such coordination is not performed, as much as an additional 10 msec of latency can be added to the upstream path. As an example, the DOCSIS network for cable modems allocates a fixed amount of bandwidth to the upstream portion of each voice call. The bandwidth is allocated in periodic intervals that match the framing rate of the VoIP frames.

For example, a call utilizing a 10 msec VoIP packet rate will receive a DOCSIS upstream bandwidth allocation allowing it to transmit one frame every 10 msec. The initial timing of the upstream transmission opportunities is random, relative to the potential framing of a set of samples at the handset. If the handset creates a VoIP frame and sends it to the cable modem, with the arrival just missing an upstream transmission slot, then the VoIP frame will have to wait 10 msec to be forwarded to the headend. Previous to arriving at the cable modem, the VoIP frame may have already experienced the 5 msec allotted LAN latency.

Figure 26:
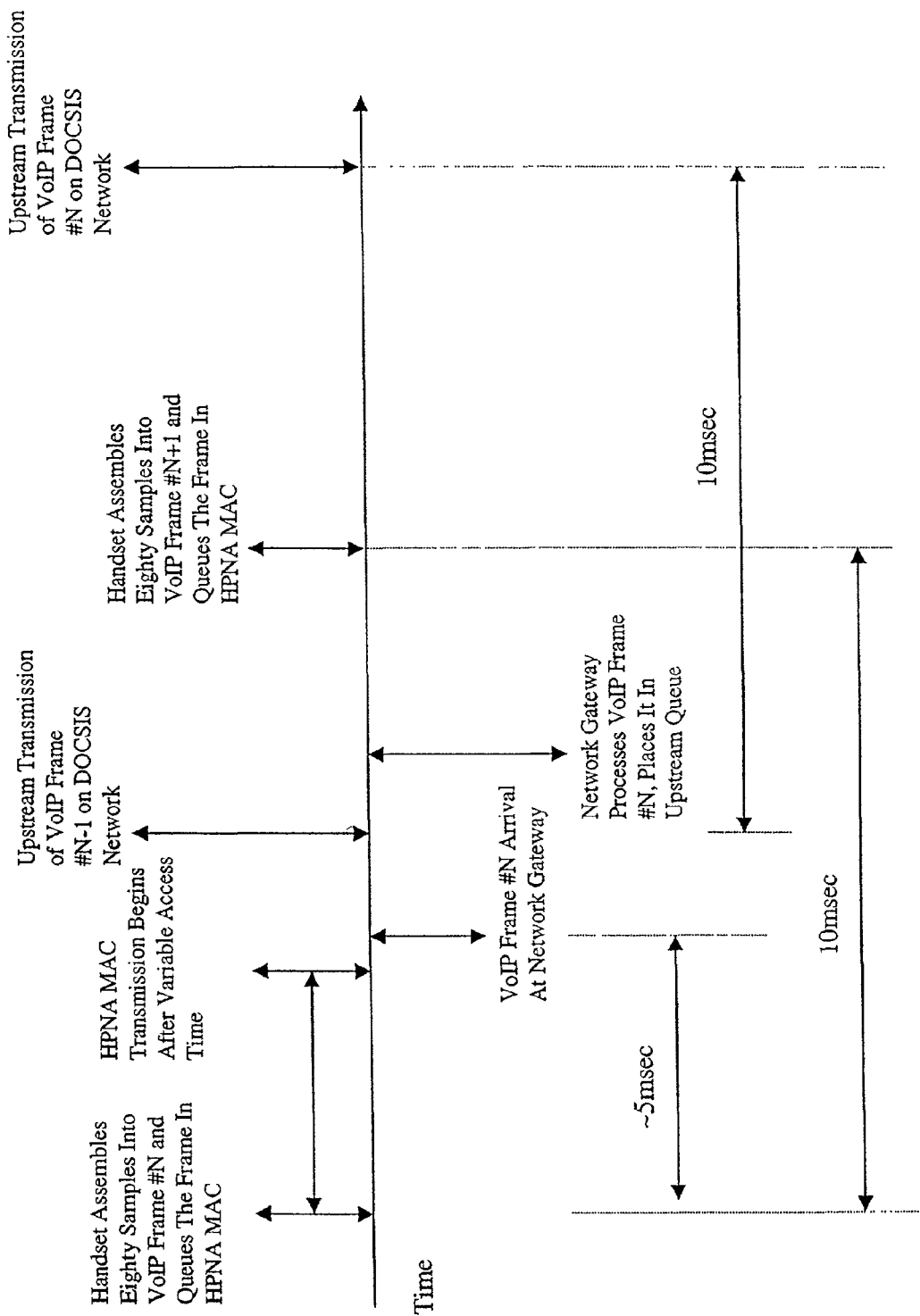
FIG. 26 is a timing diagram of upstream transmission over an HPNA network in accordance with an exemplary embodiment of the present invention.

Referring back to FIG. 26, this timing relationship is illustrated, where the packet arrival at the cable modem is too late for the current upstream transmission slot, resulting in an additional 10 msec of latency for delivery of all VoIP frames in this stream. As can be seen in the illustration, the total latency from packetization at the handset to delivery on the DOCSIS network for this example is about 15 msec. However, if the packetization at the handset can be synchronized to accommodate the HPNA LAN delivery latency and the cable modem processing delay such that the VoIP frame is ready for transmission on the next upstream slot, then the additional 10 msec latency penalty can be avoided. The mechanism for coordinating the handset framing is accomplished through a protocol to communicate the upstream slot timing from the network gateway to the handset. Such coordination is provided via a clock synchronization mechanism between the network gateway and the handset. The clock synchronization mechanism includes a timing circuit within the HPNA MAC controller and an HPNA LAN protocol for the exchange of timing information. Through the exchange of timing information, the handset discovers when the next upstream transmission opportunity will occur. It assembles the initial VoIP packet at such a time that, accounting for HPNA LAN delivery latency and cable modem processing latency, the packet will arrive in time for the next available upstream transmission slot.

c. HPNA Timing Synchronization

Figure 27:
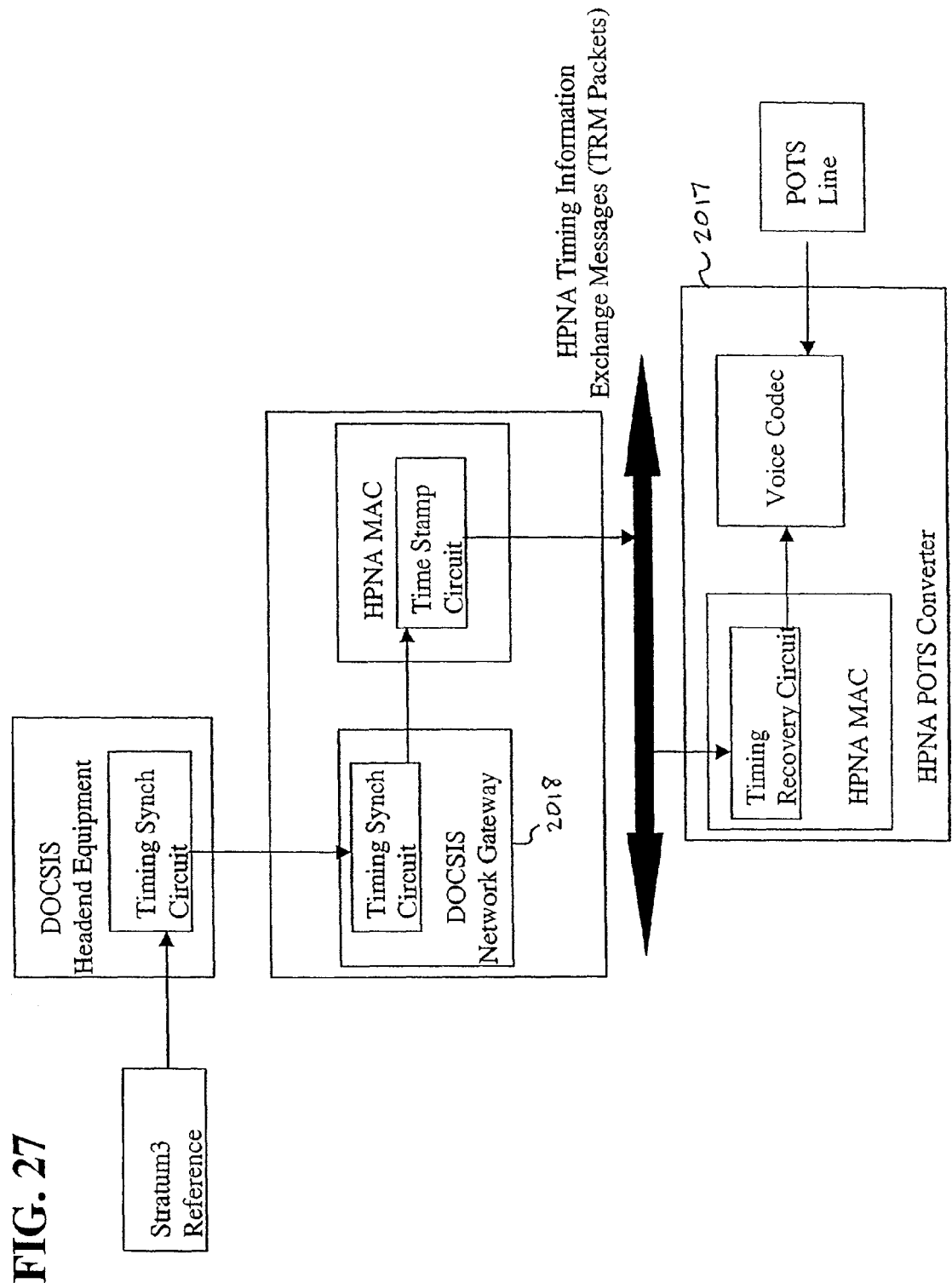
FIG. 27 show latency components in accordance with an exemplary embodiment of the present invention.

In the described exemplary embodiment, signaling frames and procedures are defined to permit time synchronization between network gateway 2018 and representative HPNA-POTS converter 2017 as depicted in FIG. 27. In an exemplary embodiment of the present invention the time synchronization procedures enable two types of time synchronization. First, an exemplary embodiment of the present invention provides a method for synchronizing the 8 kHz sample rate of the analog voice codec at the handset to a reference clock at the Home gateway. In addition, in accordance with an exemplary embodiment the generation of encoded voice packets at the HPNA-POTS converter is synchronized to the arrival of the assigned upstream time slot at the Home gateway from the digital carrier network, accounting for any processing delays or jitter introduced by HPNA network access. In the DOCSIS/PacketCable system, this is the arrival of an upstream grant sync for the service flow allocated for the specific voice stream.

Figure 28:
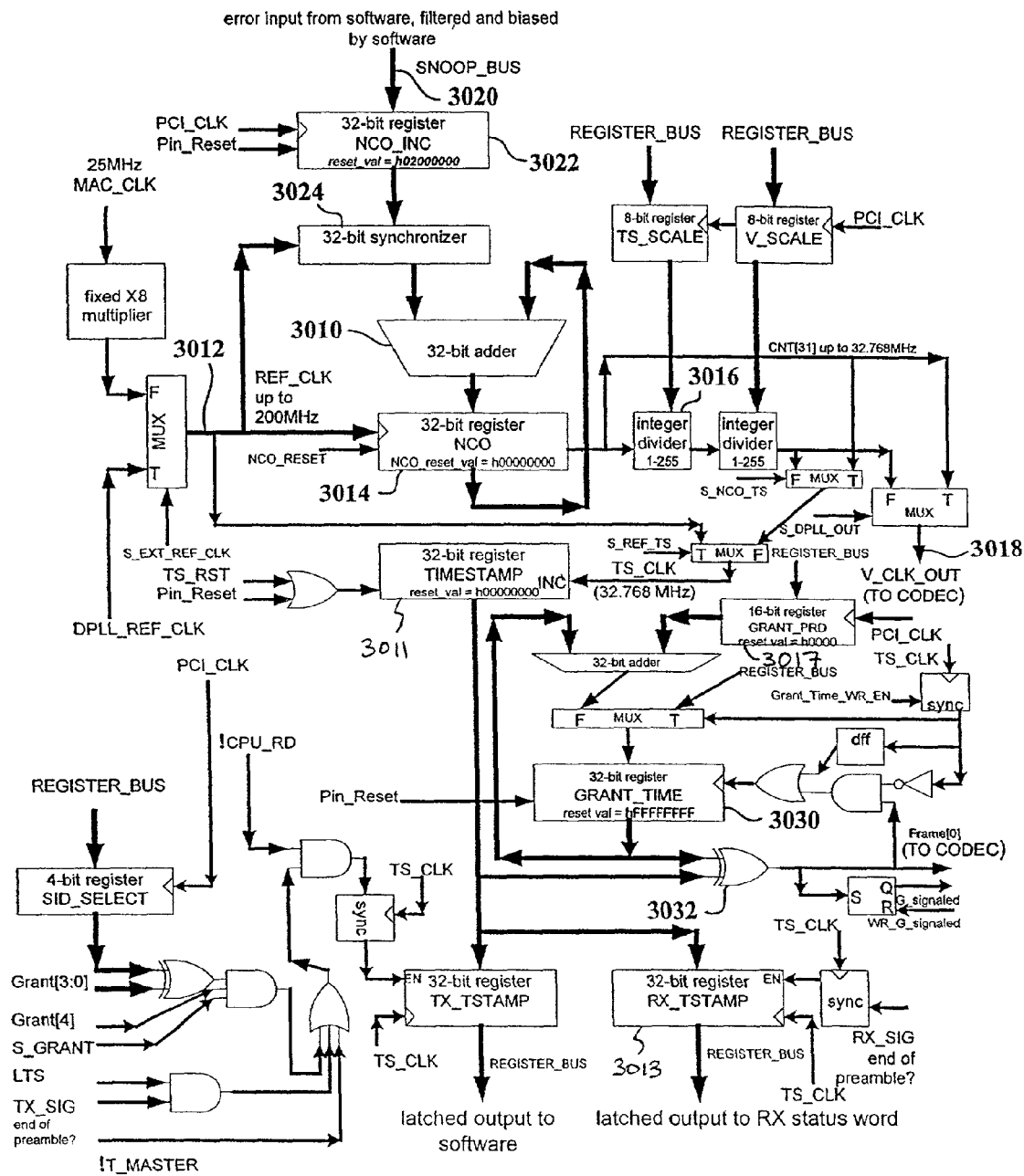
FIG. 28 shows a timing recovery circuit in accordance with an exemplary embodiment of the present invention.

Referring to FIG. 27 in conjunction with FIG. 28, an exemplary network gateway 2018 in accordance with the present invention implements a counter/timer that is sync-locked to the network stratum reference source. The HPNA MAC transmitter in the network gateway implements a function to read and latch the value of the counter/timer into Master Timestamp Register 3011 at the exact time of transmission of a frame marked with the "Latch Timestamp" (LTS) descriptor bit. The HPNA-POTS converter implements a counter/timer which is subdivided to derive the Codec clock. The HPNA MAC receiver in the HPNA-POTS converter implements a function to read and latch the value of the counter/timer into Receive Timestamp Register 3013 upon the receipt of a frame. Receive Timestamp Register 3013 is logically part of the receive status word of each received frame. The timing information is conveyed to the HPNA-POTS converter via a pair of messages. The Home gateway periodically transmits a Timestamp Sync (TSM) frame with the LTS descriptor set, then reads and transmits the latched Master Timestamp register value in a subsequent Timestamp Report (TRM) frame. The HPNA-POTS converter reads and saves the Receive Timestamp register values of Timestamp Sync frames, and builds a database of corresponding Receive and Master timestamp pairs from the received TSM and TRM frames. The HPNA-POTS converter periodically calculates a frequency error=[(R2−R1)/(M2−M1)]−1, where Rx equals the receive timestamp value of frame received at time x and Mx equals the master timestamp value in frame received at time x. The frequency error adjustment is then applied to the HPNA-POTS converter local codec clock.

An exemplary network gateway implements a function to read and latch the value of the reference counter/timer into Grant Timestamp register 3030 upon the occurrence of a selected time slot grant sync signal from the upstream network (i.e. SID match and Grant sync). The described exemplary network gateway is aware of the mapping of upstream time slot grant to specific HPNA-POTS converter and line ID. The HPNA-POTS converter implements a timer that generates a local frame sync signal at the expected voice frame rate. This timer is derived from the local codec clock. The relative timing of the upstream grant sync signal is conveyed to the HPNA-POTS converter prior to enabling the voice encoder, but after the establishment of the upstream service flow. The timing offset is adjusted to account for internal processing cycles needed each by the network gateway and the HPNA-POTS converter, and allowing for worst case voice frame latency on the HPNA media.

When the network gateway needs to send the time slot grant sync timing information, it will latch the grant timestamp value and adjust the value to account for internal processing time to receive and forward voice frames to the upstream network interface. The adjusted grant timestamp is transmitted to the HPNA-POTS converter in a Timestamp Report (TRM) frame. The HPNA-POTS converter calculates an absolute time offset from the difference in the Receive and Master timestamp, and calculates a future local frame sync time as: Frame Sync=Grant timestamp+offset+voice frame period−latency; where latency=HPNA-POTS converter internal processing time+worst case HPNA media transmit latency. The method by which the Frame Sync adjustment is then applied to the HPNA-POTS converter voice encoder is implementation-dependent. The network gateway transmits time synchronization frames (Timestamp Sync Message and Timestamp Report Message) on a periodic rate continuously. Time sync messages are always transmitted in pairs, according to the following procedure.

In the described exemplary embodiment, the network gateway maintains a Time Sync timer and a sequence number counter, SeqNum. Upon expiry of the time sync timer, the Home gateway:(1)restarts the Time Sync timer with for example a one second period; (2) increments SeqNum=SeqNum+1; (3)formats a Timestamp Sync Message frame with the current value of SeqNum; (4)marks the frame with the LTS=1 descriptor and (5)transmits the TSM frame. The Home gateway then: (1)reads the value of the Master Timestamp register; (2)formats a Timestamp Report Message frame with the current values of SeqNum and Master Timestamp, and (3)transmits the TRM frame. Upon the establishment or re-establishment of an upstream service flow for a media stream, the Home gateway: (1)obtains the grant timestamp for the service flow from the Grant Timestamp register; (2) adjusts the grant timestamp by a known constant equal to the internal processing time to receive and forward an upstream voice packet; (3) formats a Timestamp Report Message frame as above, including the additional Grant Timestamp and associated Line ID and Call ID fields; and (4) transmits three copies of the TRM frame. TRM frames containing a Grant Timestamp are transmitted immediately (without waiting for the Time Sync timer to expire). An HPNA-POTS converter derives clock and grant timing information from received Timestamp Sync and Timestamp Report message frames. Frames which are received with a MAC source address (SA field) that do not match the expected Home gateway are discarded.

In the described exemplary embodiment the HPNA-POTS converter maintains an information base of {SeqNum, Receive timestamp, Master timestamp} tuples. The most recent two tuples are retained; older tuples are discarded. Upon receipt of a Timestamp Sync Message frame, the HPNA-POTS converter reads the Receive Timestamp receive status word, and enters the {SeqNum, Receive Timestamp} tuple into its information base. Upon receipt of a Timestamp Report Message frame, the HPNA-POTS converter: (1)locates the tuple associated with the received sequence number, SeqNum, from its information base; (2)enters the Master timestamp value in the corresponding tuple in the information base; (3)calculates a codec clock frequency error: where frequency error=[Rseqnum−R(seqnum−1))/(Mseqnum−M(seqnum−1))]−1; and (4) adjusts the local clock frequency as necessary. When the HPNA-POTS converter receives a Timestamp Report Message frame containing a Grant Timestamp, the HPNA-POTS converter: (1)examines the SeqNum field and discards the message if a duplicate received frame and takes no further action; (2) examines the Line ID and Call ID field and discards the message if no match to an existing voice call; (3) calculates the time delta to the next local frame sync signal as follows: Frame sync time−Grant Timestamp+Toffset+VF−KCPU−KHPNA; where Toffset=Receive Timestamp−Master Timestamp (absolute time offset); KCPU=a known constant equal to the HPNA-POTS converter internal processing time to prepare an upstream voice packet; KHPNA=a known constant equal to the worst case HPNA media transmission delay; and VF=voice frame period; and (4) adjusts the local frame sync timing as necessary.

d. HPNA VoIP Timing Synch Circuit

In accordance with the present invention a solution to the problem of synchronization of clocks between the Network gateway and the handset in a VoIP network that includes an HPNA LAN as the link between the handset and the Network gateway is provided. The clock in the network gateway is used to synchronize transmissions of upstream packets to the DOCSIS MAC. Upstream transmission times are generally dictated by the DOCSIS head end equipment. In addition, for synchronous traffic flows, such as VoIP, the periodicity of the transmission of packets is directly related to the upstream clock. Furthermore, the data samples in the packets are acquired at a rate which is a derivative of the system master clock. Therefore in the described exemplary embodiment the network gateway clock is synchronized to the clock in the cable modem head end. At the VoIP handset, a local clock that is related to the head end clock is used to sample the analog voice channel.

As has been described briefly above, synchronization between clocks in VoIP handsets and network gateways is necessary for two reasons. First, the sample rate of the analog voice signal at the handset should match the transmission rate (e.g. 8 kHz) that is established for the entire voice transmission path in order to avoid frame slips (lost samples or sample gaps) which compromise the quality of voice traffic and significantly reduce the throughput of voice-band data flows. Second, the framing of samples into an RTP voice packet preferably occurs synchronously with the arrival of an upstream grant at the DOCSIS MAC in order to minimize the latency of the upstream path.

Variation in the A/D sample clock from a nominal 8 kHz frequency can be modeled as noise in the coded signal. Therefore, a poorly tracking sample clock in the handset can cause the handset to fall out of compliance with signal to noise ration (SNR) of ITU-T G.712 that typically govern communication across a PSTN line. The performance limits of G.712 translate directly into a jitter performance objective for the timing synchronization circuit of the HPNA VoIP system. A voice sample loss rate of 0.25 samples lost per minute must be maintained to support a toll-quality VoIP call. This requirement translates into a long-term average tracking error of 0.52 ppm between the handset and the network gateway. The overall latency that can be experienced by a real-time interactive voice call before user-reported degradation of call quality occurs has been determined, through experimentation, to be no more than 150 msec according to ITU-T recommendation G.114. Therefore, the one-way latency limit of 150 msec from ITU-T G.114 sets the performance goal for the latency requirement to be met by the HPNA VoIP system. The largest potential customer of the systems to be built using the HPNA LAN for VoIP traffic has stated their desire for the final system to be capable of meeting the G.114 goal.

The network gateways employ a digital phase lock loop (DPLL) to track the reference clock which is located in the cable modem head end equipment. In the described exemplary embodiment the performance of the DPLL is sufficient to comply with the requirements for digitized voice transmission set forth in ITU-T recommendation G.712. ITU-T recommendation G.712 gives an SNR of 35 dB to be maintained for PCM signals. This value cannot be met with PCM μ-law encoding (beginning with 12-bit linear samples) in the presence of more than about −70 dB noise. The analysis done for the voice over DOCSIS case, accounting for the A/D and D/A performance, suggests that the output clock used for generating the 8 kHz A/D voice sampling clock should have a jitter of 5 ns or less in order to meet these requirements. Any DPLL employed for clock tracking must be able to perform to this level if G.712 criteria are to be met.

As described above, the Network gateway DOCSIS clock maintains synchronization with the headend DOCSIS clock through the exchange of ranging messages and SYNC messages with the DOCSIS head end equipment. The timestamp in these messages are inserted and extracted as the messages leave or enter the DOCSIS MAC devices. The synchronization of the Network gateway clock is maintained by a circuit within the DOCSIS MAC called the Timing Regeneration Circuit (TRC). The network gateway extracts the timestamp from the SYNC message as the bits are arriving off of the wire. This timestamp is passed to the TRC, where a comparison to the local timestamp is made. Any difference is used to adjust a DPLL which controls the local clock frequency of the network gateway. A ranging message is used to determine the time-distance between the network gateway and the head end. The local clock is adjusted for this offset. The local clock in the network gateway is used to time network gateway DOCSIS operations, such as upstream transmissions.

However, network gateway VoIP operations also run synchronously to the DOCSIS head end clock, so a product implementation includes two functions which allow for POTS/VoIP conversion devices (i.e. A/D and codec functions) to operate in synchronization with the DOCSIS clock. The first VoIP support function of a product implementation is the export of a clock (TIC_CLK_OUT), which is a derivative of the local DOCSIS clock. TIC_CLK_OUT is used to drive the A/D sampling of the voice channel. This clock is used in order to insure that the sample rate of the A/D is locked in frequency to the DOCSIS clock. By doing this, the A/D sampling does not get ahead of or behind the DOCSIS grants—a situation which would result in lost samples or gaps in the stream of samples. The second VoIP support function of a product implementation is the export of a set of grant signals which indicate the arrival time of an upstream grant which corresponds to the desired framing interval of the collected voice samples. This grant signal indicates the framing boundary for a Voice over IP RTP data packet, which is a collection of A/D compressed and coded samples. In the described exemplary embodiment, the network gateway exports an equivalent of these two functions to an HPNA LAN-attached handsets, in order to allow the analog portion of the handset to maintain a proper sample rate and to allow a remote DSP to packetize a set of samples in a timely manner, to avoid additional path latency.

The HPNA device does not need to duplicate the exact mechanism of the DOCSIS MAC device because the HPNA MAC at the network gateway has direct access to the TICK-CLK-OUT clock. Therefore, a subset of the DOCSIS synchronization mechanism is implemented for the HPNA LAN MAC device. In addition, the HPNA LAN MAC mimics both the DOCSIS head end behavior and the DOCSIS CPE behavior. The HPNA LAN MAC device located at the network gateway will provide a timing reference to the HPNA LAN MAC devices located in handsets. The Network gateway's HPNA MAC will mimic the functionality of the head end equipment with respect to clock sourcing. That is, there will be a master/slave relationship between HPNA MAC's in network gateways and HPNA MACs in handsets—the master dictates the current time to the slaves. This relationship only slightly complicates the HPNA MAC time synchronization solution, as the same circuit can easily be made to operate in either capacity. The basic solution is similar to the DOCSIS MAC solution. A DPLL is incorporated within the HPNA MAC device. The DPLL is easily provided as a complete circuit (Timing Regeneration Circuit). In addition, the Smoothed TICK Clock Generator circuit is needed to produce the A/D sample clock at the handset side. In addition to the DPLL, the HPNA MAC includes a grant timing indication circuit. This circuit is basically a timestamp function that operates whenever a grant is signaled by the network gateway. In practice, it is simply a modification to the existing network gateway DPLL circuit. A few registers are added to the HPNA MAC to support the TRC operation, and a few more for supporting the Grant Timing Indication circuit.

The transfer of the network gateway HPNA MAC timestamp to the handset HPNA MAC timers is effected as follows. Instead of transferring DOCSIS SYNC-like messages with timestamp inserted/extracted on the fly, the HPNA synchronization mechanism relies on an internal MAC indication of frame movement to latch the current time into a timestamp register. The value in the register is read and then delivered in a subsequent frame to the handset which uses it to adjust its clock.

In the described exemplary embodiment, the network gateway HPNA MAC device is set up (through a register bit) to be a timing master, such that only transmit activity is timestamped. In addition, only frames marked with the timestamp transmit descriptor bit cause the HPNA MAC timestamp to be latched. Software in the network gateway reads the timestamp following the sending of a frame that had the Timestamp descriptor bit set to TRUE. Software then constructs a TIMESTAMP REPORT message containing the latched timestamp value and queues this frame for HPNA LAN delivery to the broadcast address. The queue latency is unknown and doesn't matter. The strict identity of the frame which generated the timestamping event is unknown and doesn't matter, although it is preferable to limit the frames which are timestamped. The mechanism chosen is to timestamp only TX frames that have the LTS descriptor bit set. To limit processing requirements at the receive end, the special Timestamp Report Message (TRM) is defined. Only TRM will need to have timestamp information recorded and delivered from the timing master. Timing slaves will then be able to ignore receive timestamp information from all but TRM packets.

Referring back to FIG. 28, the receiver at the handset is configured to act as a timing slave, such that only receive activity is timestamped. Each received frame triggers a timestamp to occur at the same relative position within a frame. There is a tradeoff wherein positioning the timestamp sample at an earlier location in the frame (up to and including the Type/Length field) yields a fixed offset from the beginning of the frame and results in the elimination of an offset correction. But the earlier timestamp allows less time for the handset's logic to read the latched timestamp before a new frame possibly overwrites the latched value. A preferred method causes the latched timestamp to be incorporated within the RX status word of each received frame, thereby eliminating any race condition. In any case, the timestamp for each received frame is stored in memory. Associated with each timestamp is a TRM sequence number. The receiver may eliminate all RX status word timestamp that do not correspond to TRM packets. What remains is a database of TRM sequence numbers and their corresponding RX timestamp. When a TIMESTAMP REPORT message arrives, the handset searches its local database for the referenced sequence number and compares the received timestamp with the stored timestamp. The difference between the two values is used to determine the DPLL error.

The handset performs a filtering function on the error, adds the DPLL bias value and then writes the resulting value into NCO_INC register 3014. In order to maximize the performance of the DPLL, it is recommended that TRM packets be sent in pairs. The rate of transmission is suggested at about 1 pair per second. From the DPLL, an output can be fed to the pin output that will drive the codec of the handset and ultimately, the A/D sampling circuit. Initialization of the handset timer is achieved by accepting two TIMESTAMP REPORT messages, the second one of which refers to the first. The receiver adopts the error indicated as an OFFSET value. This value is always added to received timestamp in order to calculate DPLL error. The DPLL counter is never modified. Since part of the DPLL loop is performed in software, the offset correction can easily be performed there. The network gateway HPNA clock is sampled as DOCSIS upstream grants arrive. The grant arrival time is then communicated to individual handsets through HPNA packets, in order to allow the assembly and queuing of RTP voice packets to be scheduled to insure that the packets will arrive at the network gateway just in time for the next upstream grant. Packet assembly overhead, queuing latency, transmission time, and network gateway packet processing time is subtracted from the grant time in order to generate a packet assembly start time that insures that the packet meets the next upstream grant at the network gateway The mechanics of this operation are as follows. DOCSIS upstream grants are signaled by the network gateway through the GrantRcv[4:0] interface. GrantRcv[4] is used to indicate the arrival of a grant from the head end. GrantRcv[3:0] are used to signal the SID which corresponds to the current grant. Each SID corresponds to a particular connection flow, such as an individual call flow. The timing of the arrival of each grant needs to be communicated to the appropriate handset. In order to accomplish this, the 5 GrantRcv signals are fed to the network gateway HPNA MAC, and the HPNA MAC's internal timestamp value is latched whenever the GrantRcv[4] signal becomes active, provided that the GrantRcv[3:0] signals match the value set up in the tscSID register of the HPNA MAC. The MIPS core of the network gateway programs the tscSID register to match the SID corresponding to the call in progress for a given handset. Once the GrantRcv[4] timing is latched in the HPNA MAC, the MIPS core reads the latched timestamp and subtracts worst case queuing latency, transmission time, and network gateway packet processing time. It then sends a GRANT_TIMESTAMP message to the appropriate handset. A SID to MAC address mapping exists at the network gateway in order to allow for proper grant timing signaling. This map is constructed and maintained by the MIPS core.

The handset receives the GRANT_TIMESTAMP message (an extended version of the TIMESTAMP REPORT message). The handset adds N*T time units (N=integer, T=RTP packet period) minus packet assembly processing latency to the timestamp from the message in order to calculate a time that is in the future. It then loads this time into the GRANT_TIME register so that the HPNA MAC can produce a grant-sync output to the codec at the appropriate time. When the TRC reaches GRANT_TIME, the GrantRcv[4] signal is asserted for one clock pulse duration and GRANT_TIME register 3030 is automatically incremented by the value in GRANT_PERIOD register 3017. A register bit exists to disable the generation of grant pulses on GrantRcv[4]. A safety bit is used to indicate that the grant time has been indicated, in order to prevent the case of a grant time having been passed before it was programmed, and hence, no grant signals ever being generated. The safety bit would be a register bit that changes from a zero to a one when the grant time is signaled on the output pin, and which can only be reset to zero by software. Note that the timing master must switch between transmit and grant-arrival timestamp latching operations. The implementation may include either one latch that is switchable between the two functions, or two latches to satisfy both requirements. The receive frame timestamp latching operation may share one of the latches mentioned, or it may be separate.

FIG. 28, which, depicts components of an exemplary embodiment of an HPNA TRC circuit in accordance with the present invention, is now described in more detail. Adder 3010, reference clock signal 3012 and NCO 3014 are provided. An output from the NCO 3014 is fed into integer divider 3016. This clock in the slave device gets divided down to 8 kHz (V_CLK_OUT) 3018 since it is running at much higher speed to maintain an accuracy. The V_CLK_OUT feeds the sampling circuitry of the CODEC. In the described exemplary embodiment, the software determines whether the clock is running fast or slow via SNOOP_BUS 3020 which is located inside the transceiver which allows the software to communicate with the hardware. The PCI bus writes a value to register 3022. Synchronizer 3024 is provided to make sure that the change in register 3022 is synchronous to the NCO 3014. The output clock gets speeded up or slowed down depending on the value loaded into register 3022. The software looks at the timestamp that are received at the slave and determines if the slave clock is running slow or fast. It makes an adjustment to the register 3022 value which adjusts the speed of the NCO 3014. It does this typically every one second, or whatever time is necessary for a defined accuracy.

There are two other aspects on the receive side for the slave. When the packet comes in, every packet creates a signal which samples the current value of the timestamp clock which is running based upon the DPLL. The sampled clock is put into a structure that is associated with the receive packets. Every received packet has clock timestamp associated with it. The software that has the responsibility of identifying the special packets that contain timing information from the master and from those it can look to see what the time it received those packets was and it can see what time the master sent them. The master will have sent a packet that will, when it gets sent, get a timestamp associated with it. The software goes and reads the timestamp and puts it into a follow-up packet. The protocol involves the sending of two packets. The first packet from the master gets a timestamp stored locally and the packet goes out without having a timestamp included in it. It makes it across to the converter. The converter takes a timestamp on the same packet. Both the master and slave have taken a timestamp. However, neither knows what the other's timestamp is. The master then reads the timestamp out of the register and puts it into a follow-up packet and sends it along. The follow-up packet doesn't get timestamped by anybody. The follow-up packet arrives at the slave device. The slave device now has the time that the first packet was sent out and the time that the first packet was received. Once that information the slave can then see the difference between them.

The grant timing that is determined from the DOCSIS network is delivered directly to the transceiver for the HPNA. That information is gathered by the timestamp circuit on the master and input to the circuit via Grant(4)timing signal, with S_GRANT enabling the path. Grant [3:0] allows multiple different grant identifiers (one of sixteen) to be selected. When the interested in grant identifier sees it's grant, that latches the timestamp. Therefore, when a grant occurs there is a timestamp associated with the grant at the master. The master then reads that timestamp information, puts it into a packet and delivers that packet with the grant timestamp identifiers associated with it to all the nodes. The node associated with that particular grant identifier picks up the information and now it knows when its grant occurred. It will have been able to relate its time to the master's time by looking at the offset between the time it received according to its clock and the master's time.

For example, using human time differentials, if the master indicates that it sent a packet at 12:00 o'clock, and the slave indicates that it received the packet at 3:30 am, the network gateway knows that the two clocks differ by 3½ hours. Therefore, when the described exemplary network gateway delivers a grant time to the slave the network gateway adjusts the time by 3½ hours to correlate the grant to the local time of the slave. Once it knows the local time of the grant, then it adjusts that backwards by the time it needs to assemble the packet and deliver it on the HPNA network. It works backwards to figure out what the latest time is that it should send that packet out of the network.

In the described exemplary embodiment, the HPNA slave device puts that time into a GRANT_TIME register 3030. In operation when the local time in the slave matches at an exclusive-OR comparator 3032 an output signal Frame[0] is created that is forwarded to the voice CODEC instructing the voice CODEC to deliver eighty samples. In fact, the signal Frame [0] can be sent to any portion of the circuit which is making the actual decision as to when to call a set of 80 samples a frame. In the described exemplary embodiment, the circuit also automatically updates the grant time period rate, e.g., 10 msec, such that when the grant time matches the current local time, 10 msec is automatically added to the grant time and 10 msec later another match of the grant time with the current local time and the framing signal will be created again.

7. Audio Processor

The audio processor module provides an interface between the voice and data processor and external subscriber line circuits (SLICs). Referring back to FIG. 3, the audio processor includes an analog front end 172 that provides bi-directional exchange of signals over the voice bandwidth, including voice or fax/modem data signals modulated with a voice band carrier. In the described exemplary embodiment, the analog front end 172 can support four separate voice channels with an analog front end 172 having four pairs of analog to digital converters (ADCs) and digital to analog converters (DACs).

Figure 29:
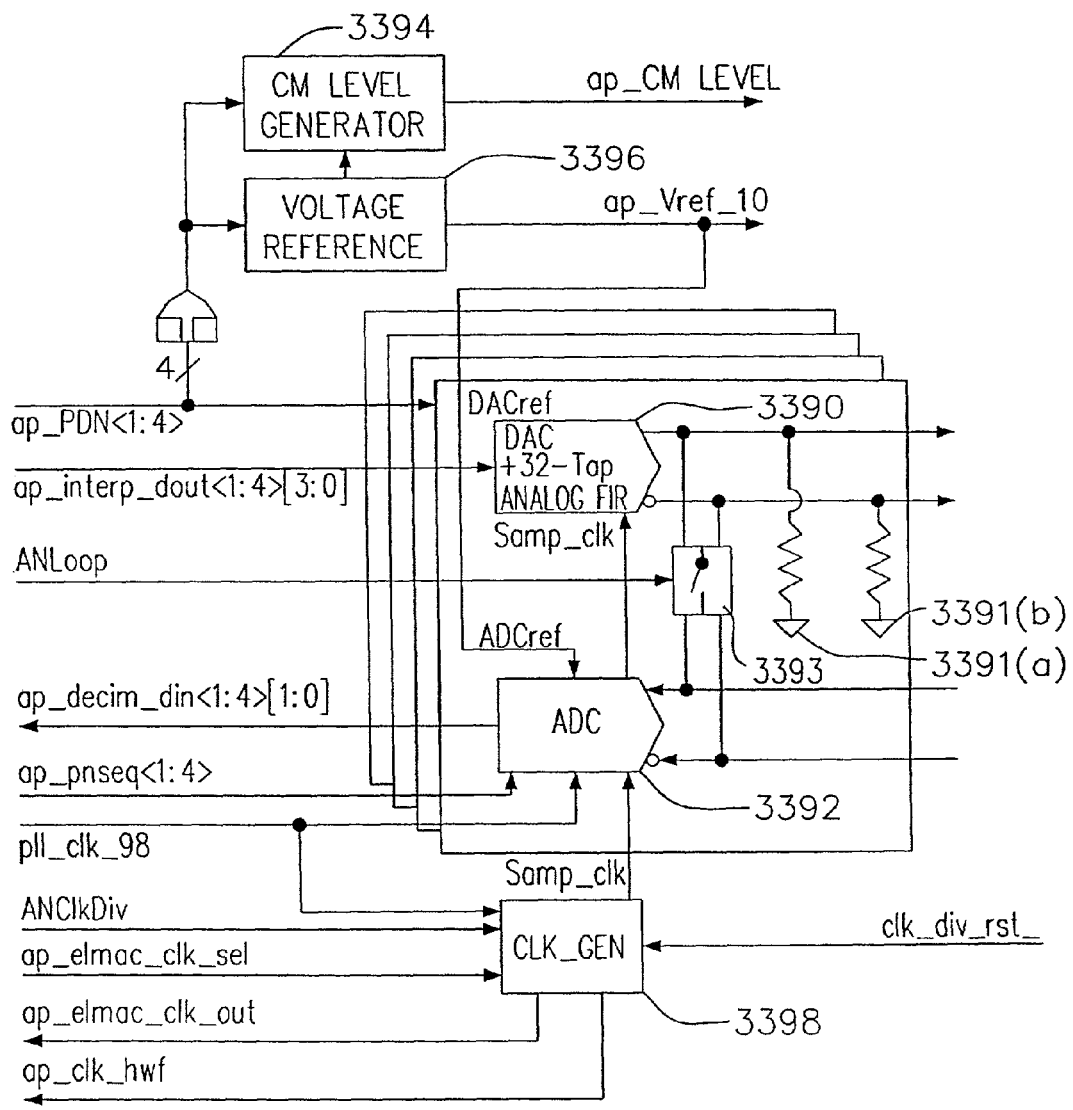
FIG. 29 is a block diagram of the analog front end for interfacing the analog processor with an external subscriber line interface circuit (SLIC) in accordance with a preferred embodiment of the present invention.

FIG. 29 shows a block diagram of the analog front end of the audio processor. The digital input/output data of the DAC/ADC can be interpolated/decimated to provide 8 kHz input/output data for the audio processor 170. A pair of resistors 3391*a*, 3391*b* at the output of each DAC 3390 convert the current output signal to a voltage. A switch 3393 can be provided between the output of the DAC and the input of the ADC to provide analog loopback test capability.

The analog front end may include a common mode voltage level generator 3394 that provides an external common mode voltage level. Passive external circuitry coupled with the common mode voltage level generator 3394 may be used to establish the DC level of the AC coupled input signals for the ADCs 3392. A voltage reference 3396 can be used to provide signals and bias currents for each of the ADC/DAC pairs and provide a bias current for the common mode voltage level generator 3394. The reference may be overdriven with an external reference or may be left disconnected externally, allowing the internal bandgap to set the reference voltage. A clock generator 3398 can be used to divide the 98.304 MHz PLL clock down to 49.152 MHz, 24.576 MHz and 12.288 MHz. The clock generator 3398 provides a sample clock for the ADC 3392 and DAC 3390.

Figure 30:
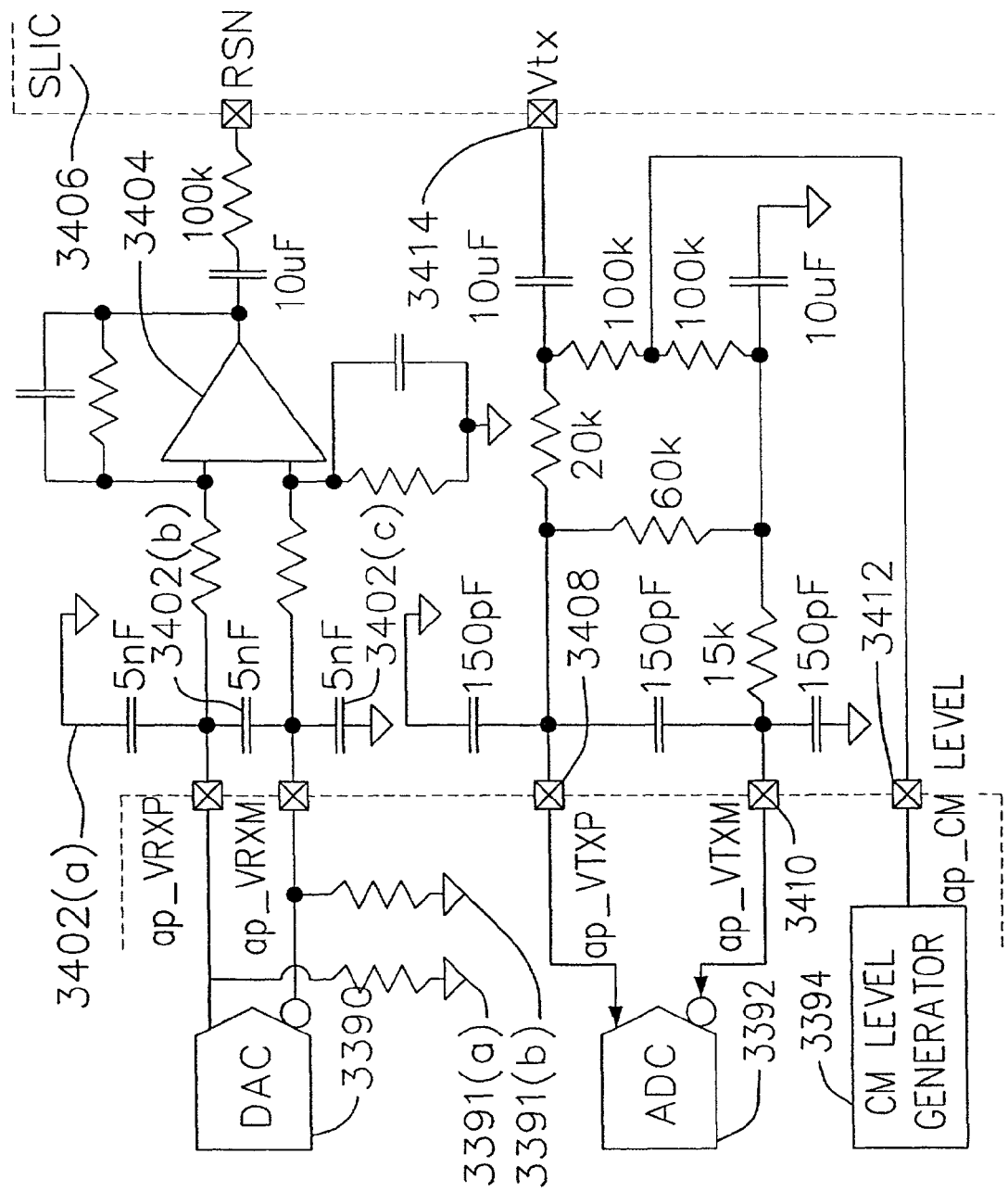
FIG. 30 is a block diagram of an external interface between the analog front end and the subscriber line interface circuit (SLIC) in accordance with a preferred embodiment of the present invention.

The external analog interface between each channel of the audio analog front end and an external SLIC is shown in FIG. 30. In the described exemplary embodiment, of the analog front end resistors 3391*a* and 3391*b* convert the current output signal of DAC 3390 to avoltage signal. Capacitors 3402*a*, 3402*b* and 3402*c* provide low pass filtering to smooth the output signal from DAC 3390. Op-amp 3404 provides single ended differential conversion and amplification of the DAC output which can then be forwarded to the SLIC 3406. In the transmit direction, an RC network at the input of the ADC 3392 provides balanced impedances at both ADC input pins and provides attenuation of the transmit signal at the positive input. The balanced impedance interface ensures that power supply and digital substrate noise affect both ADC inputs equally. The ADC 3392 samples the difference between the voltages at the inputs 3408, 3410 so that common noise can be rejected. The passive components fix the ADC input 3410 at a constant DC level equal to the common mode level 3412 output by the common mode voltage generator 3394. The ADC input 3408 varies in direct proportion to the transmit signal 3414 from the SLIC 3406.

Figure 31:
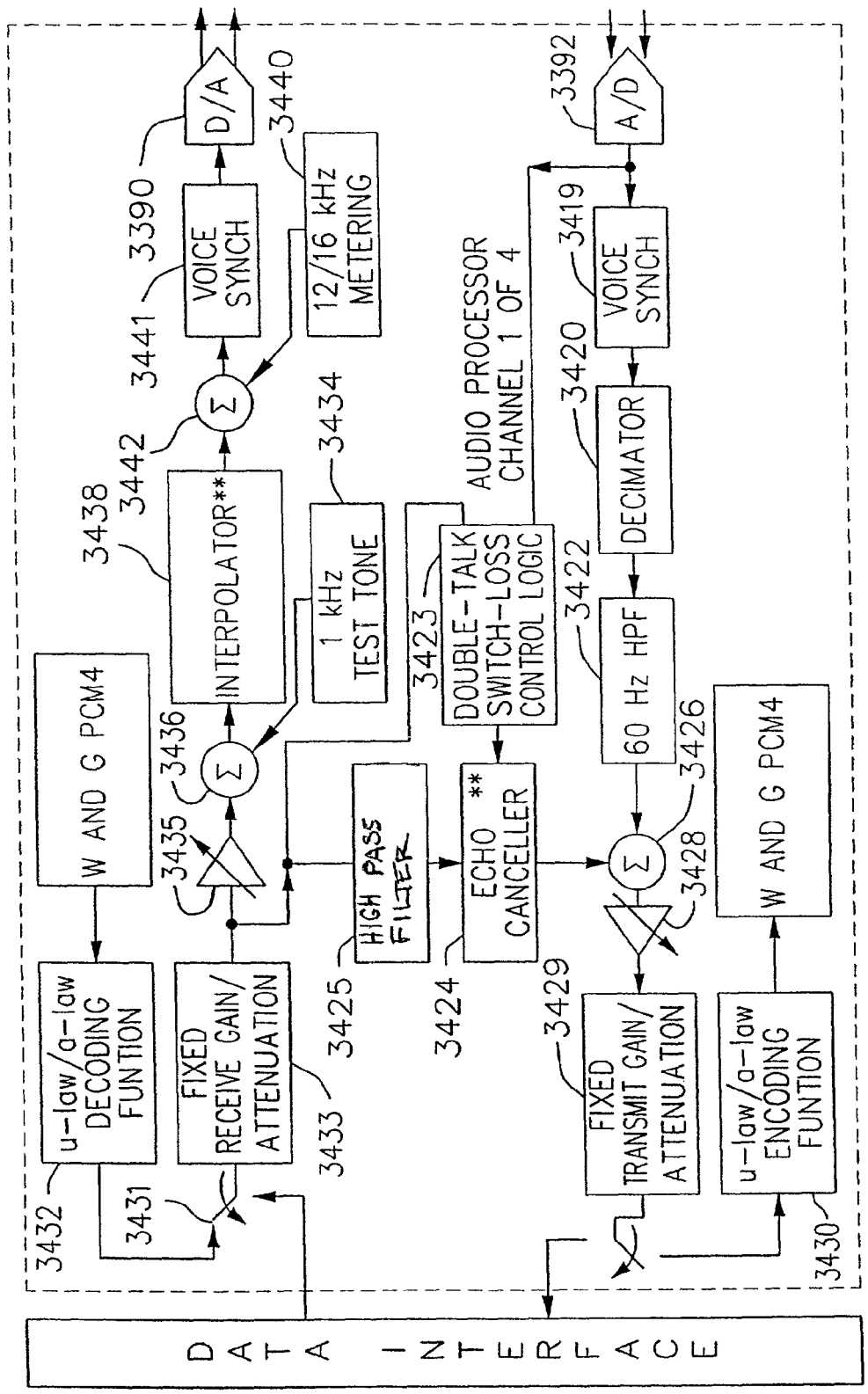
FIG. 31 is a block diagram of an audio processor that interfaces a voice and data processor with external subscriber line circuits (SLICs) via an analog front end in accordance with a preferred embodiment of the present invention.

Referring to FIG. 31, in the described exemplary audio processor, a voice synchronizer 3419 synchronizes the digitizing of the near end voice signal by the ADC 3392 to the average timing regeneration circuit clock to ensure voice exchange between the network gateway and CMTS does not introduce jitter due to data underflow or overflow. A decimator 3420 downsamples the synchronized output of the voice synchronizer 3419 from 96 kHz to a 8 kHz rate.

The decimated signal can be filtered by a 60 Hz high pass filter 3422. The filter 3422 reduces the 60 Hz interference induced on the transmit line due to proximity to power lines. The filter provides on the order of about 20 dB attenuation at 60 Hz relative to the transmission path loss at 1004 Hz. The filtered signal can be conditioned by a network echo canceller 3424. The network echo canceller may interface with ITU-T G711, G726, G728 and G729 encoders. Double talk logic 3423 can provide control functions including voice detection, automatic signal level control, transmit/receive gain switching balance, noise level estimation and double talk detection. The adaptive cancellation processes the receive side signal samples through an adaptive model of the hybrid coupling and subtracts the result from the transmit side in difference operator 3426. A high pass filter 3425 is coupled to the echo canceller input to match the echo path impulse response.

Programmable gain adjuster 3428 applies a fixed gain or attenuation to an output of the difference operator 3426. Gain adjuster 3428 can provide programmable gain/attenuation adjustments of +/−20 dB with step size of 1 dB. In addition, in the described exemplary embodiment, a fixed gain or attenuation adjuster 3429 is applied to the gain adjusted signal. A multiplexer 3427 coupled to the output of the fixed gain adjuster 3429 allows the signal to be routed to a A-law/μ-law (G.711 compatible) encoder 3430 which is coupled to an external PCM port that allows for external testing of the audio processor module. Multiplexer 3429 also forwards the gain adjusted output signal to the voice processor 160 via the DSP interface 168 (see FIG. 3).

The described exemplary embodiment of the audio processor includes multiplexer 3431 coupled to the data interface in the receive mode. Multiplexer 3431 may couple decoded samples to a A-law/μ-law decoder 3432 that is also coupled to an external PCM port to allow for external testing of the audio processor module. The multiplexer 3431 may also forward decoded samples from the data interface to a gain adjuster 3433 which applies a fixed gain or attenuation to the decoded signal. Programmable gain adjuster 3435 compensates for system level gain adjustments and may provide programmable gain/attenuation adjustments on the order of about +/−20 dB with a step size of 0.0006 dB.

The described exemplary audio processor may include a 1 kHz test tone generator 3434 that provides a digital representation of a 1004 Hz test tone at a level of 0 dBm. The test tone may be optionally injected into the data stream by summer 3436 to debug and verify the audio processor. The test tone may be configurable in both frequency and amplitude, although it is preferably limited by the 8 kHz sample rate such that only 0-4 kHz may be allowed.

An interpolator 3438 modifies the sample rate from 8 to 96 kHz. The interpolator 3438 can be implemented with a FIR filter which may be either minimum phase or linear phase. A minimum phase filter is preferred for voice applications which require low group delay but may tolerate group delay distortion which may be introduced by the minimum phase filter. A linear phase filter is preferred for fax and or modem applications. In addition, a metering pulse generator 3440 can be used to generate $^{12}/_{16}$ kHz metering pulses that are summed with the interpolated signal by summer 3442. The metering pulses allow a user to monitor the cost of the call as it progresses. The rate at which the metering pulse generator 3440 transmits the metering pulses varies depending on the rate per minute of the call. The minimum gap between pulses is, by way of example, on the order of about 100 msec but may be much greater for inexpensive local calls. The amplitude of the metered pulses can be adjustable to accommodate impedance changes during the on hook, off hook and ringing states. The interpolated signals are forwarded to a voice synchronizer 3441 that synchronizes the far end voice signal to the average timing regeneration circuit clock to ensure voice exchange between the network gateway and CMTS does not introduce jitter due to data underflow or overflow. The synchronized signal is forwarded to DAC 3390 for communication to a telephony device via the SLIC (not shown).

In embodiments, a two-stage filtering process may be used to implement both the interpolator 3438 and the decimator 3420, thereby reducing the required processing power and permitting the same size filter to be utilized for both audio and modem applications.

Furthermore, an impedance matching algorithm (not shown) may be performed (for example, at 96 kHz) to reduce the reflection on the 2-wire interface for different countries that have different load impedance characteristics. In essence, the algorithm acts as a Y filter that is used to control the reflection coming off the 2 wire interface.

Power efficiency is often important for telephony applications. Therefore, the described exemplary embodiment of the audio processor includes the capability to enter a power saving/sleep mode wherein only those functions that are required for wake up are active. All circuits should be capable of reaching active steady state within about a 10 msec activation period.

The described exemplary embodiment of the preferred audio processor 170 further includes a ring generator which synthesizes reference waveforms which are forwarded to the SLIC to ring telephony devices. The ring generator can be used to support sinusoidal, trapezoidal and square waves. In addition the ring generator frequency, amplitude and DC offset can be configurable.

Figure 32:
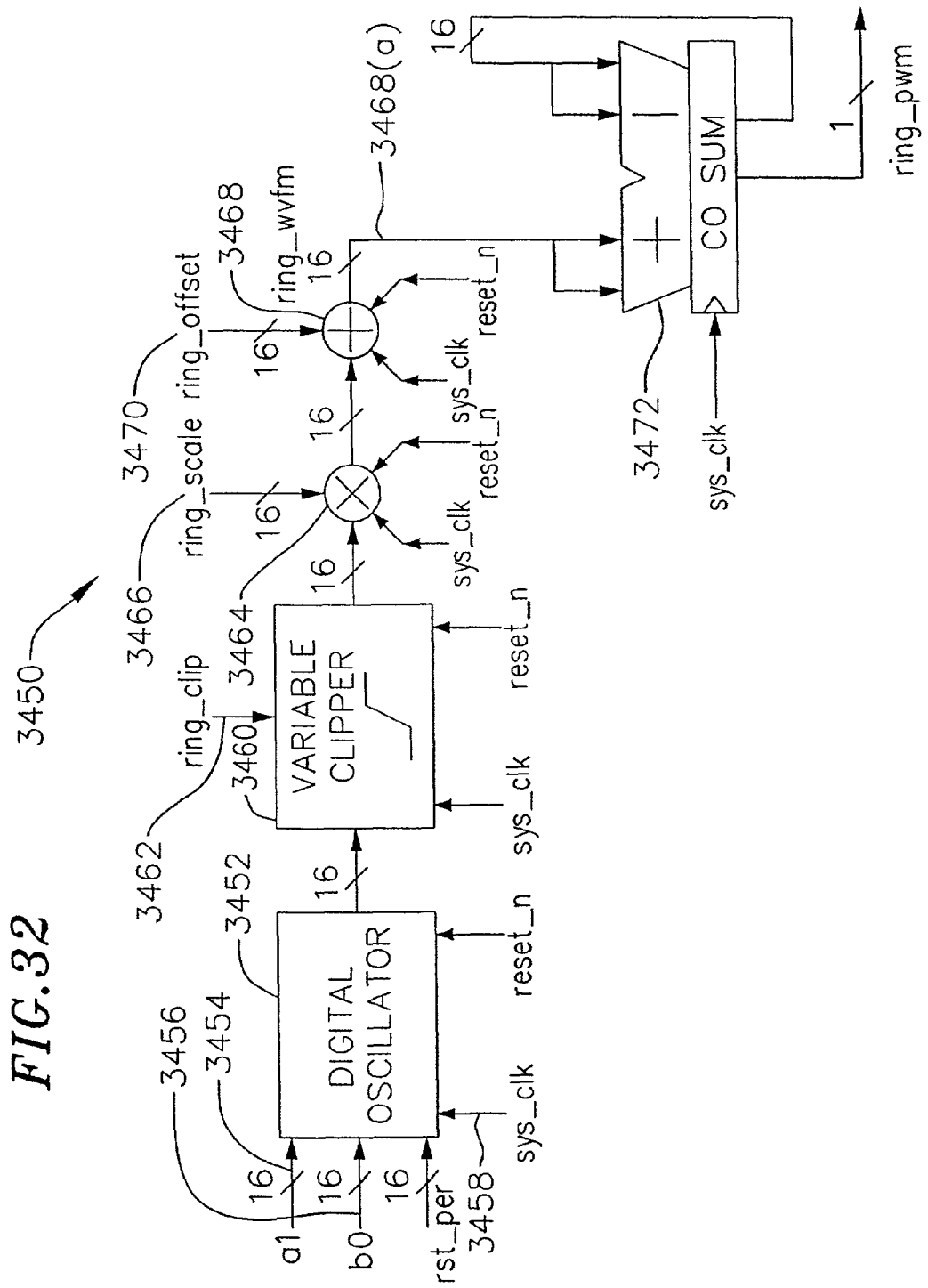
FIG. 32 is a block diagram of a ring generator that synthesizes a reference waveform utilized by external SLICs to ring telephony devices in accordance with a preferred embodiment of the present invention.

A block diagram of a preferred ring generator 3450 is shown in FIG. 32. The ring generator 3450 includes a digital oscillator 3452 which generates a sinusoid at a given frequency and amplitude determined by instructions 3454, 3456 from the MIPS core 128 via the DSP/PB interface 168 (see FIG. 3). The sample rate of the sinusoid can be, by way of example, on the order of about 1000 Hz, divided down from the 24.576 MHz system clock input 3458. A variable clipper 3460 symmetrically clips the sinusoid about zero such that the sinusoid may be converted into either a trapezoid or into a square wave. The MIPS core 128 (see FIG. 3) can be used to define the thresholds 3462 with which the sinusoidal waveform is clipped.

In the described exemplary embodiment, a multiplier 3464 scales the clipped waveform by applying a signal attenuation 3466 defined by the voice processor 160. Summer 3468 provides a configurable DC offset by adding a DC bias 3470 as established by the voice processor. The offset may vary from negative full scale to positive full scale. A converter 3472 can be used to convert the ring waveform 3468(a) into a single bit representation. A single pole analog filter may be included on the output of the converter to reduce the quantization noise generated by the converter 3472. The filtered signal is then forwarded to the analog front end for communication to a telephony device via the SLIC.

Referring back to FIG. 3, in one embodiment the described exemplary audio processor 170 may include an audio co-processor. The audio co-processor comprises a programmable engine that augments the processing capability of the voice and data processor 160 by performing various low level or front-end signal processing tasks such as for example, sample rate conversion or echo cancellation. The described exemplary audio co-processor is a highly configurable multiply and accumulate engine controlled by a central processing unit (CPU). The CPU preferably includes a restricted set of instructions in program memory. Access to audio co-processor memory is preferably optimized for burst access by the multiply and accumulate engine. The audio co-processor instruction set preferably incorporates simple load and ALU-based instructions to augment the multiply, multiply and accumulate and divide macro-instructions.

Figure 33:
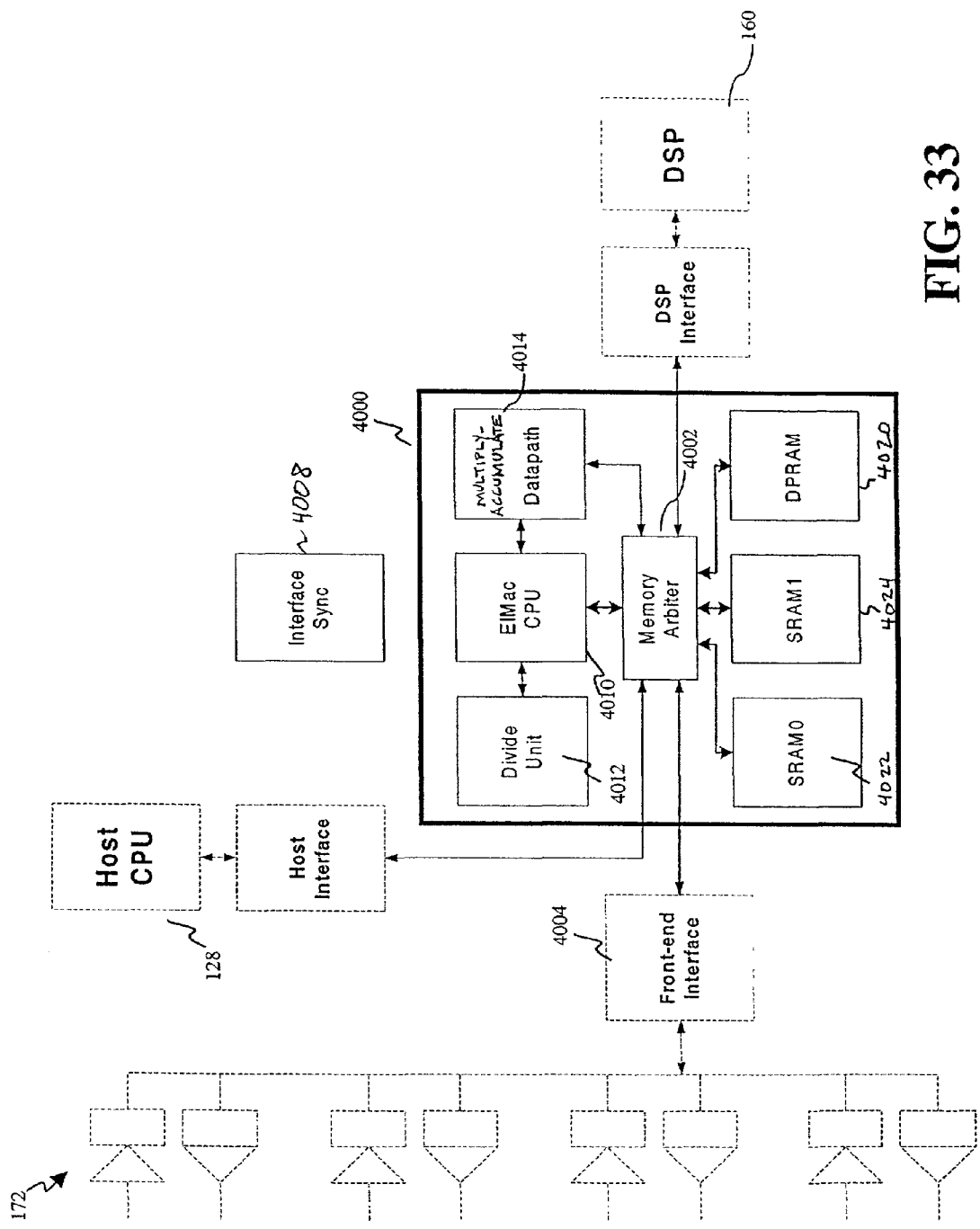
FIG. 33 is a block diagram of an audio processor integrated into a representative cable modem architecture in accordance with an exemplary embodiment of the present invention.

Referring to FIG. 33, in an exemplary embodiment of the present invention, audio co-processor 4000 is substantially self contained, having a basic asynchronous memory interface 4004 for each peripheral coupled to the audio co-processor. In the described exemplary embodiment, the audio co-processor preferably interfaces with four audio channels on the analog front end. However, one of skill in the art will appreciate that the total number of memory interfaces may be scaled by duplicating the memory access ports and scaling the memory arbitrator 4002.

In the described exemplary embodiment, the host MIPS core 128 (see FIG. 3) may have access to a limited set of registers to control the enabling and disabling of the audio co-processor and clock control. The host may download filter coefficients, the audio co-processor program, etc., to this set of registers. In addition, power efficiency is often important for telephony applications. Therefore, in the described exemplary embodiment, the MIPS core may instruct the audio co-processor to activate a power saving/sleep mode wherein only those functions that are required to initiate a return to full power operation are active. In the described exemplary embodiment all circuits are capable of reaching active steady state within about a 10 msec activation period.

In addition, the audio co-processor may also transmit interrupts to the MIPS core 128 and the voice and data processor 160 (see FIG. 3). In an exemplary embodiment, interfaces for all peripherals other than the host only have access to SRAM0 4022. An interface sync 4008 may provide pulses that mark important events, such as 8 kHz, 48 kHz, and 96 kHz clock pulses in a voice processing application, or enable/disable signals for the audio co-processor.

Audio co-processor CPU 4010 operates with a reduced set of instructions. The audio co-processor CPU 4010 is designed to maximize the number of multiplies that may be performed in real time applications. The audio co-processor CPU 4010 has minimal exception handling capability with high visibility access to the MIPS core 128 via interrupts, shared memory and mailbox registers. The audio co-processor CPU 4010 preferably includes complex NOOPS for synchronizing with the surrounding system, as well as advanced macro-instructions, such as, for example, multiply and accumulate, DIV, ABS and TWOS.

The audio co-processor CPU 4010 interfaces with a divide unit 4012 that provides fixed point divide capability. The divide unit 4012 preferably provides auto saturation wherein if the absolute value of divisor/dividend is greater than one, the divide unit preferably forces the result to either one or negative one. The divide unit preferably provides signed or unsigned 16 bit results with a 16 bit remainder.

Figure 34:
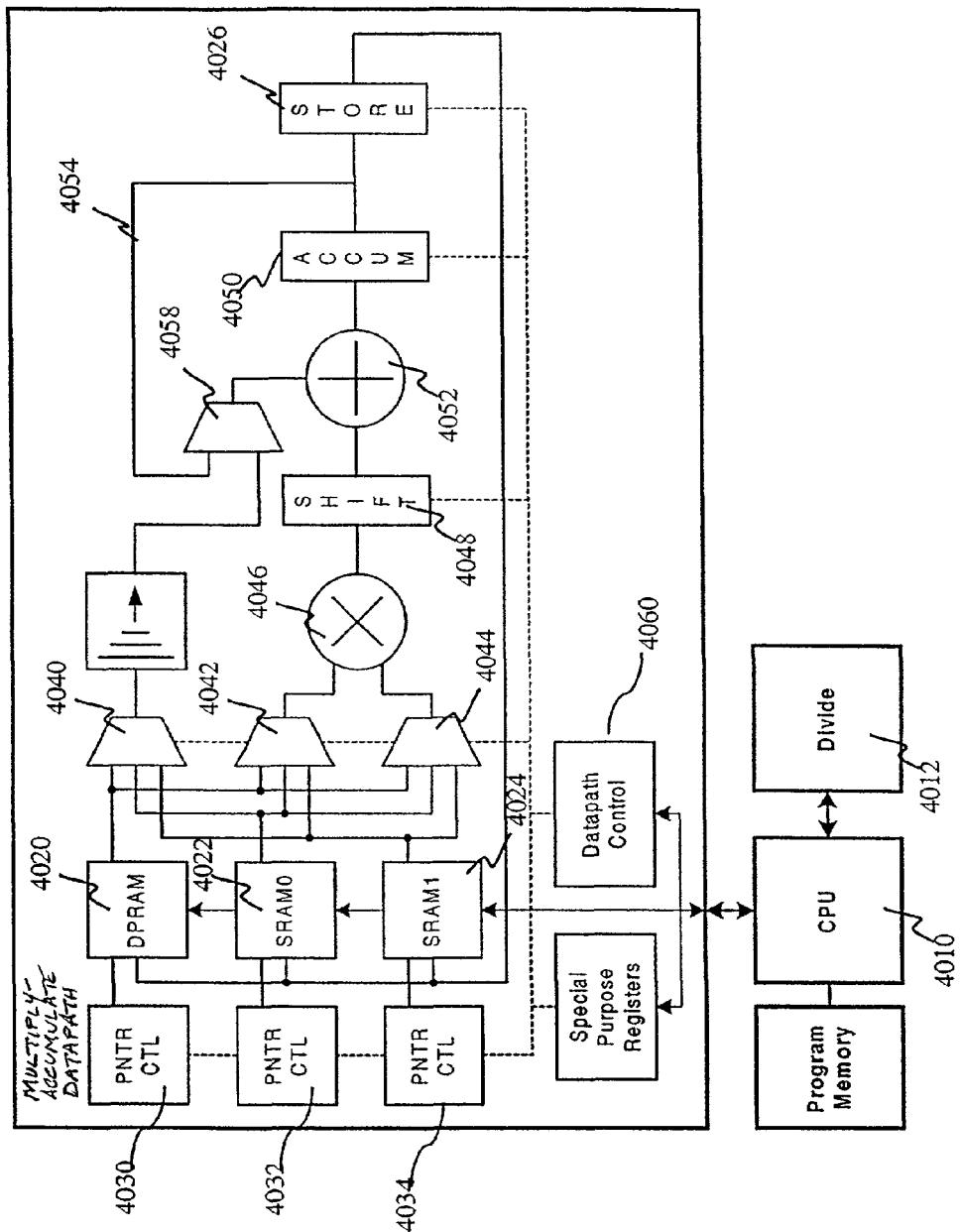
FIG. 34 is a block diagram of a multiply-accumulate datapath of an audio co-processor in accordance with an exemplary embodiment of the present invention.

The described exemplary audio co-processor also includes a highly programmable multiply-accumulate datapath 4014. Referring to FIG. 34, the multiply and accumulate engine within the multiply-accumulate datapath is part of a pipeline that incorporates memory structures controlled by configurable pointer logic. The datapath preferably includes a dual port RAM (DPRAM) structure 4020 and two SRAM structures 4022 and 4024. Data exiting the memory structures 4020, 4022 and 4024 streams through the data path to a store block 4026, with the end result being fed back into the in-line memory structures 4020, 4022 and 4024. The store block 4026 performs 16 bit or 32 bit stores, adjusts for 16 bit×16 bit, or 32 bit×16 bit multiply and accumulate operations. The store block 4026 may also provide rounding and saturation results when needed.

The described exemplary embodiment allows data to flow through the multiply and accumulate engine to produce one multiply result per clock cycle. Pointer controllers 4030, 4032, and 4034 may be programmed to use variable-sized ring buffers for functions that require FIFO like data storage. In addition, the pointer controllers may also be independently configured for many permutations of increment/decrement modes and are preferably capable of zero-overhead looping for matrix operations.

The described exemplary embodiment provides configurable connections between the memory structures 4020, 4022 and 4024 and the datapath. In operation the memory structures 4020, 4022 and 4024 may output to any one of the three datapaths via multiplexers 4040, 4042 and 4044. A signed/unsigned multiplier 4046 preferably includes shift and add logic to provide real number 16×16, 32×32 or 16×32 multiplies of the outputs of multiplexers 4042 and 4044. A FIFO may also be installed to carry data for optionally adding an offset to the multiply result.

An exemplary multiply-accumulate datapath preferably includes a programmable shifter 4048 that provides semi or block floating point capability. The programmable shifter 4048 may apply prescaled coefficients to the output of the multiplier 4046 or translate the decimal point of the multiplier output to generate multiplies by values greater than one, thereby providing the ability to selectively amplify the multiplier output. The datapath preferably includes an accumulator loop having an adder 4052 that adds the shifted multiply result to either the current value 4054 accumulated in accumulator block 4050 or data pipelined 4056 from DPRAM 4020 through multiplexer 4058. The accumulator preferably includes saturation so that if the accumulator 4050 overflows the accumulator 4050 defaults to the largest positive or negative number.

Thus, the described multiply-accumulate datapath may perform a plurality of operations including for example (A×B)+C where A and B are the outputs of memory structures 4022 and 4024 respectively and C is the output of memory structure 4020. Alternatively, the described exemplary multiply-accumulate datapath may also support the processing of a plurality of inputs to provide a plurality of accumulated results. For example, an exemplary multiply-accumulate datapath may perform the following operation:

$$R = \sum_{i=1}^{n} A_i x B_i + C_0$$

where A and B are again the outputs of memory structures 4022 and 4024 respectively and C is the output of memory structure 4020 and i=1 . . . n. One of skill in the art will appreciate that the inputs to the described operations can be output by any one of the three described memory structures 4020, 4022, 4024.

The audio co-processor CPU 4010 performs basic processing and memory management tasks, programs datapath registers and initiates multiply and accumulate and divide operations. In addition, a datapath control pipeline 4060 operates independently from the CPU once a command is executed.

In the described exemplary embodiment, the audio co-processor instruction set incorporates a number of simple load and ALU-based instructions to augment the multiply, multiply-accumulate, and divide macro-instructions. The audio co-processor preferably contains 16 general-purpose registers (GPRs) connected to the ALU, with desired modifications to the special-purpose registers (SPRs) being performed either by performing a load immediate instruction or by first modifying a GPR, then moving that value into the SPR. In alternate embodiments, the GPRs and SPRs may be merged into one register file so that SPRs may share the same load, store, and ALU instructions with the GPRs.

Table 1 illustrates a set of audio-coprocessor Assembly Instructions in accordance with the described exemplary embodiment.

TABLE 1

| IN-STRUCTION | DESCRIPTION | EXECUTION TIME | LATENCY |
|---|---|---|---|
| NOOP | Noop instruction designed especially to synchronize very closely with a real-time system | a minimum of 2 cycles, depending on options set in the instruction | 0 instructions |
| JUMP | Jump to specified instruction address | 1 cycle | 1 instruction |
| BNEZ | Branch not equal to zero. Branch to label if given register not equal to zero | 2 cycles | 1 instruction |
| BEQZ | Branch equal to zero. Branch to label if given register equal to zero | 2 cycles | 1 instruction |
| ADD | Add, signed | 2 cycles | 0 instructions |
| ADDU | Add, unsigned | 2 cycles | 0 instructions |
| ADDI | Add immediate, signed | 2 cycles | 0 instructions |
| ADDIU | Add immediate, unsigned | 2 cycles | 0 instructions |
| SLT | Set-less-than, signed | 2 cycles | 0 instructions |
| SLTU | Set-less-than, unsigned | 2 cycles | 0 instructions |
| TWOS | Twos complement | 2 cycles | 0 instructions |
| ABS | Absolute value | 2 cycles | 0 instructions |
| NOR | Nor | 1 cycle | 0 instructions |
| AND | And | 1 cycle | 0 instructions |
| OR | Or | 1 cycle | 0 instructions |
| XOR | Xor | 1 cycle | 0 instructions |
| LI | Load immediate | 1 cycle | 0 instructions |
| LW | Load word | 4 cycles + memory arbitration time | 0 instructions |
| SW | Store word | 3 cycles + memory arbitration time | 0 instructions |
| LIS | Load Immediate, SPR | 1 cycle | 0 instructions |
| MV | Move. Move data from a GPR to a SPR | 1 cycle | 0 instructions |
| MAC | Multiply-accumulate. Multiply-accumulate | 2 cycles + time for last multiply-accumulate to finish | 0 instructions |
| | command with many options and SPR configurations | | |
| DIV | Divide, signed | 10 cycles | 0 instructions |

With regard to Table 1, the latency of an instruction is defined as the number of instructions that will execute immediately after a jump or branch command, regardless of the jump or branch address location. For instance, if a branch instruction is immediately followed in instruction memory by an add instructions, the add will execute even if the branch is taken. As further illustrated in Table 1, the execution time for load and store instructions is affected by the fact that, in the described exemplary embodiment, other interfaces have higher priority for memory accesses than the audio co-processor CPU. As a result, load and store instructions must wait if memory requests are coincident. As further shown in Table 1, the execution time of a multiply-accumulate instruction is affected by the fact that, in the described exemplary embodiment, where a multiply-accumulate instruction has been initiated and then another is ready to execute, the CPU will stall until the first multiply-accumulate instruction has read its last data value from memory.

Figure 35:
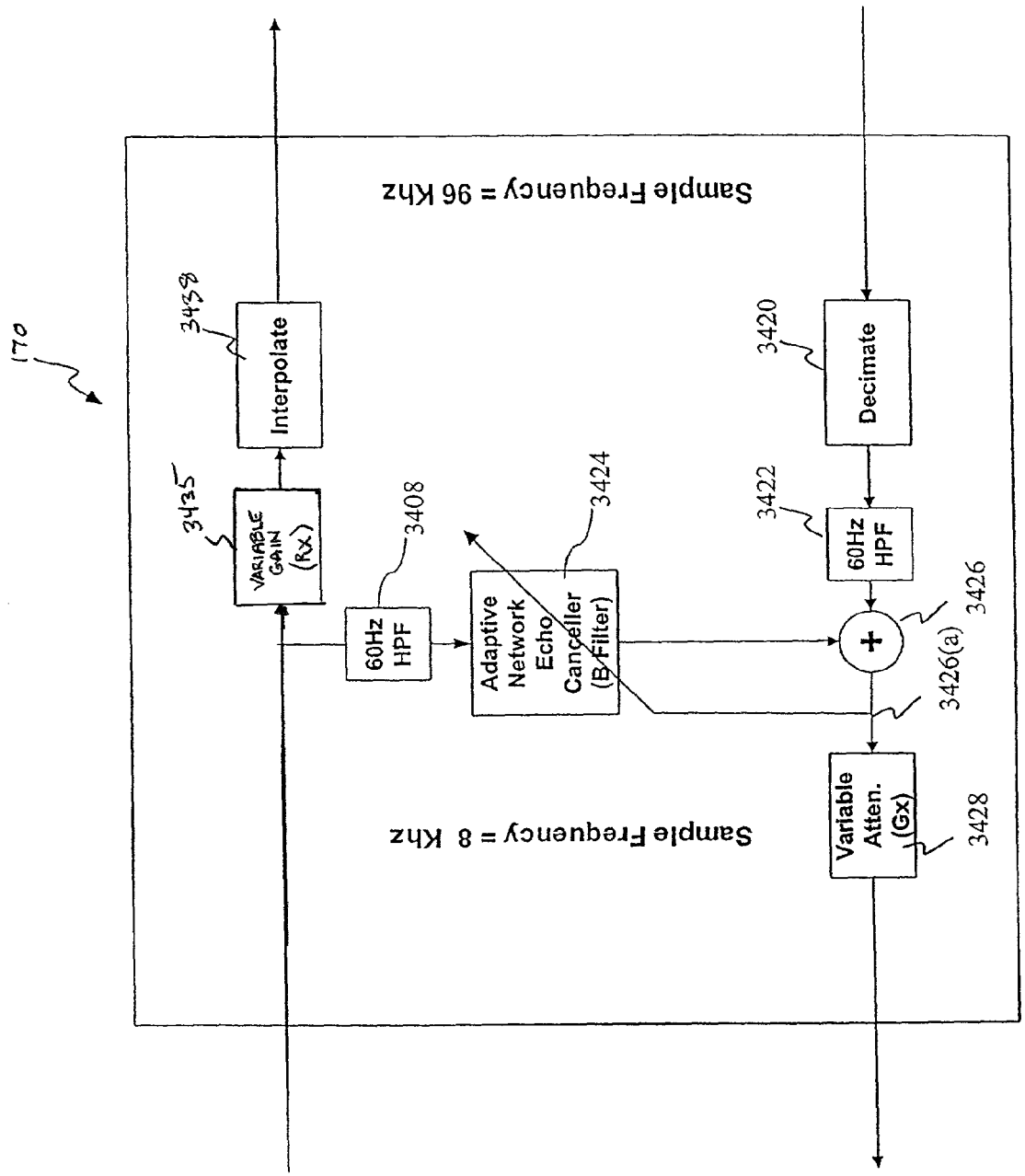
FIG. 35 is a block diagram of operations performed by an exemplary audio processor in accordance with an exemplary embodiment of the present invention.

Referring to FIG. 35, in the described exemplary embodiment the audio processor 170 may perform signal processing functions with the aid of the described audio co-processor, such as, for example, sample rate conversion on a plurality of audio channels. An exemplary audio processor 170 may include a decimator 3420 that downsamples the digitized output of the analog to digital converter in the analog front end from 96 kHz to a 8 kHz rate. The decimator 3420 may be implemented with a FIR filter that may be either minimum phase or linear phase. A minimum phase filter is preferred for application such as voice which need low group delay but may tolerate group delay distortion introduced by the minimum phase filter. The linear phase filter is preferred for fax and data modem applications. The decimator may be used to attenuate signals which can not be represented by the lower sampling rate, and then drop eleven out of every twelve samples. If a sample is not used at the output, there is no need to calculate its value. Therefore the FIR realization of the decimator may be set up so that only the one sample out of twelve that is needed is calculated, and then the data set is advanced by twelve samples and the next output is calculated, thereby forgoing the intervening eleven samples.

Further, in an exemplary embodiment of the present invention the decimator 3420 may be dynamically switched between a minimum phase or linear phase implementation in accordance with the information be communicated. In the described exemplary embodiment the voice and data processor 160 (see FIG. 3) discriminates between voice and data packets. The voice and data processor may then alert the MIPS core when the type of information being received changes from voice to data or vice versa. The MIPS core may then dynamically adjust decimator implementation in accordance with the information being transmitted.

In the described exemplary embodiment, the audio processor 170 may perform the previously described processing functions of the 60 Hz high pass filter 3422 as well as the network echo canceller 3424. Further, the audio processor 170 may also provide double talk (not shown) control functions such as, for example, voice detection, automatic signal level control, transmit/receive gain switching balance, noise level estimation and double talk detection. The audio processor 170 may further include high pass filter 3408 coupled to the echo canceller input to match the echo path impulse response. The audio processor 170 may also perform the functions of the programmable gain adjuster 3428 and 3435 as well as interpolater 3438 that modifies the sample rate from 8 to 96 kHz.

Although a preferred exemplary implementation of an audio processor has been described, persons skilled in the art will appreciate that a variety of hardware and/or software configurations may be utilized to implement the audio processing algorithms described above. For example, the signal processing functions described above in reference to FIG. 35 may be performed using a hardware and/or software configuration that differs from the embodiments described herein. This invention is not to be limited to the specific arrangements and constructions shown and described. Those skilled in the art will understand that various modifications may be made to the described embodiment.

a. Voice Synchronization

Digitizing and transmitting voice data via packets in a network system is a common telephony problem. Customarily, Pulse Code Modulation (PCM) techniques digitize a voice signal by sampling an analog voice signal and converting each sample into a digital code which is communicated between compatible receiving and transmitting systems on the near and far ends of the network. In addition, in a voice band data mode, the exemplary network gateway may transparently exchange data without modification (other than packetization) between a near end telephony device (or circuit switched network) and the packet based network. This is typically used for the exchange of fax and modem data when bandwidth concerns are minimal. The problem that arises is that the receiving system's clock may not be correlated with the transmitter's clock. This difference, even if minute, may cause the sample buffer in the receiving unit to underflow or overflow. In the case of data underflow, samples are extracted from a sample buffer faster than samples are written to the buffer so that the system may collapse from data starvation. During data overflow, voice signals transmitted from one communication port enter the sample buffer in the receiving unit faster than they are extracted. The resulting overflow of data signals may result in artifacts in a voice call or data in voiceband data mode.

To prevent data signal overflow and underflow, it is, therefore, desirable to synchronize the receiving clock to the incoming data rate. A voice synchronizer may be used for this purpose. Although the voice synchronizer is described in the context of an audio processor system within a network gateway, those skilled in the art will appreciate that the voice synchronizer is likewise suitable for various other telephony and telecommunications application.

Referring to FIG. 36, network gateway 4480 supports the exchange of voice between a hybrid fiber coaxial (HFC) network 4482 and a traditional circuit switched 4484 or a packet based network 4486. In an exemplary embodiment, telephony device 4490 is connected to the PSTN over PSTN telephone gateway 4492. The PSTN telephone gateway 4492 may be clocked by a telephony network clock signal 4494(*a*) from network clock reference 4494 which is also coupled to CMTS 4496 such that the PSTN telephone gateway 4492 may be synchronized with the CMTS clock for the transfer of PCM voice packets between the CMTS 4496 and the PSTN telephone gateway 4492. The telephony network clock reference is preferably a conventional Building Integrated Timing Supply (BITS) clock. The equipment requirements for interfacing to this clock are known to those skilled in the art and are described in Bellcore document TR-NWT-001244 the content of which is incorporated herein by reference as if set forth in full. The CMTS clock is synchronized with the telephony network clock signal 4494(*b*) via CMTS clock synchronizer 4498 which utilizes headend reference tick clock 4500, as described in U.S. patent application Ser. No. 09/501, 850, the contents of which is incorporated herein by reference as if set forth in full.

A timebase message generator 4502 generates time messages or stamps which provide the network gateway 4480 an absolute time reference which is representative of the frequency of the crystal oscillator timing reference (not shown) of the CMTS 4496, which is in turn synchronized to the telephone network clock 4494.

Referring to FIG. 37, the network gateway 4480 preferably includes a digital tracking loop 4504 that provides a substantially stable clock output 4510(*a*). A difference between the time stamps forwarded by the CMTS and the output of a local time reference, that is derived from a numerically controlled oscillator 4508, is formed by differencing circuit 4510. This difference defines a frequency error value. This frequency error value is filtered by loop averaging filter 4511 which prevents undesirable deviations in the frequency error value from affecting the numerically controlled oscillator 4508 in a manner which would decrease the stability thereof or cause the numerically controlled oscillator 4508 to operate at other than the desired frequency. The loop filter 4511 can be configured so as to facilitate the rapid acquisition of the frequency error value, despite the frequency error value being large, and then to reject comparatively large frequency error values as the digital tracking loop 4504 converges, i.e., as the output of the local timing reference becomes nearly equal to the absolute time reference, thereby causing the frequency error value to approach zero.

Figure 38:
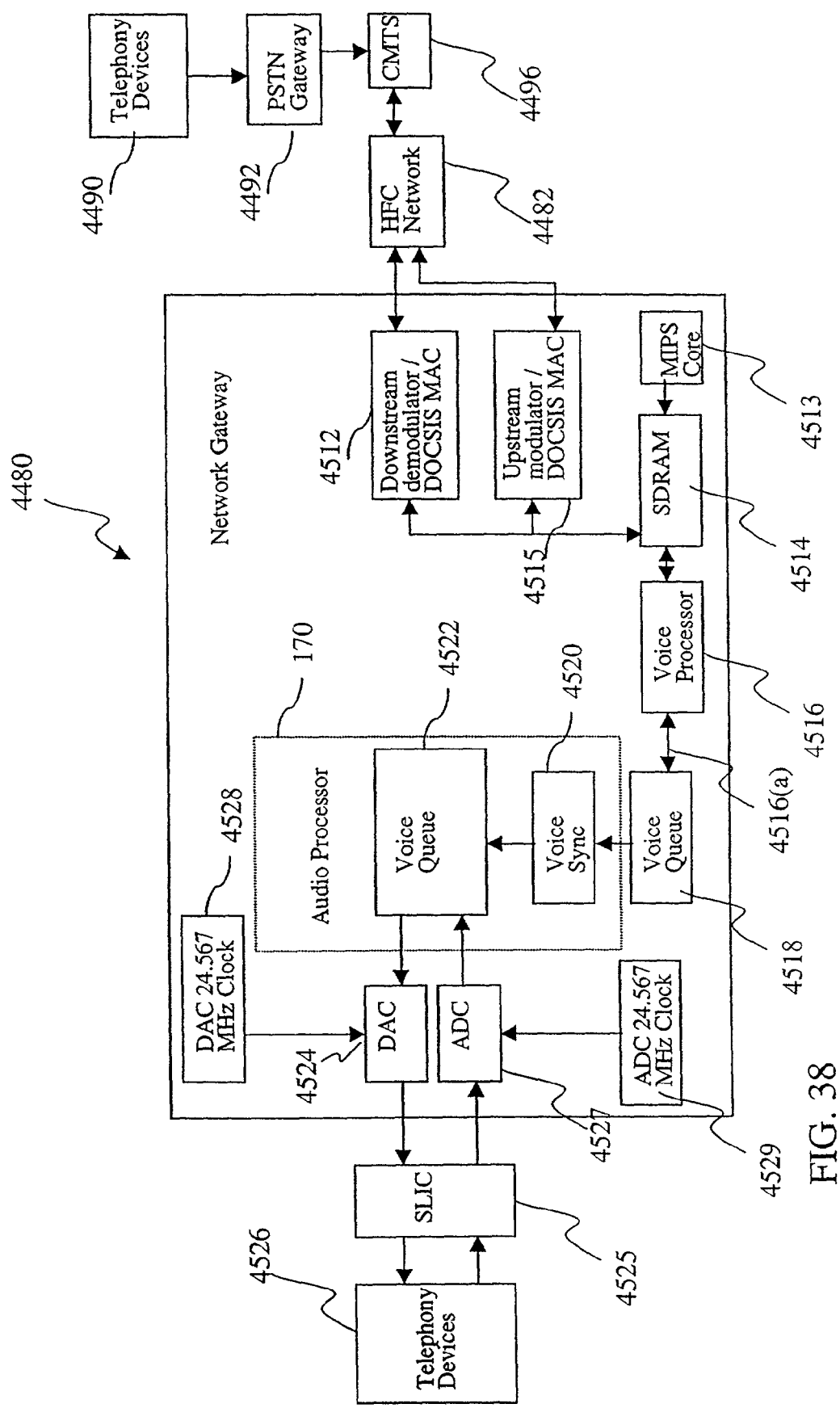
FIG. 38 is a block diagram of a network gateway including a voice synchronizer for synchronizing voice data signals between telephony devices on the near and far ends of a HFC network in accordance with a preferred embodiment of the present invention.

Referring to FIG. 38, in the downstream direction, voice or voiceband data packets are received by the network gateway 4480, demodulated and re-formatted by the downstream demodulator/DOCSIS MAC 4512 and forwarded to system memory 4514. The voice data is forwarded to a decoder system (not shown) within the voice processor 4516. The decoder system preferably provides delay compensation, voice decoding, DTMF generation, call progress tone generation, comfort noise generation and lost frame recovery. Processed voice sample are then forwarded to a first voice queue 4518. A voice synchronizer 4520 is coupled to the output of the first voice queue 4518. The voice synchronizer 4520 re-samples the voice frames stored in the first voice queue 4518 in accordance with an error signal and forwards re-sampled voice signals to a second voice queue 4522 so that the rate at which samples are removed from the second voice queue 4522 by a DAC 4524 matches the rate at which they are inserted into the second voice queue 4522 by the voice synchronizer 4520.

In operation, each time the clock of the DAC 4524 decrements to zero, a sample can be removed from the second voice queue 4522 and transmitted to the near end telephony device 4526 via a subscriber line interface circuit 4525. In the described exemplary embodiment, the DAC 4524 is preferably driven by sampled DAC clock 4528. In a jitter-free system, the DAC 4524 removes frames from the second voice queue 4522 at the exact same rate at which frames are inserted into the first voice queue 4518 by the voice processor 4516. However, when jitter or other impairments are present voice synchronization is needed because the DAC clock of the receive unit within the network gateway may not be correlated to the far end sample clock that generated the received data. In a data underflow condition in the downstream direction, the DAC clock 4528 in the network gateway 4480 leads the far end sample clock so that if left uncorrected samples would be removed from the second voice queue 4522 faster than they are being inserted in the first voice queue 4518, so that the system may collapse from data starvation. During a data overflow condition in the downstream direction, the DAC clock 4528 in the network gateway lags the far end sample clock so that samples are inserted into the voice queue faster than they are removed. The resulting overflow may result in artifacts in a voice call or data in voiceband data mode.

In the described exemplary network gateway, in the downstream direction a lost frame recovery engine in the voice and data processor is implemented whereby missing voice is filled with synthesized voice during data underflow conditions using the linear predictive coding model of speech. The voice is modelled using the pitch and spectral information from digital voice samples received prior to the lost packets. Similarly, during data overflow the voice and data processor preferably performs frame deletions to substantially eliminate the overflow condition. However, in voiceband data mode lost data may not be readily tolerated or recreated. Therefore, in voiceband data mode, the described exemplary voice synchronizer fractionally decimates the received voice signal 4516(a) stored in the first voice queue 4518 during data overflow and fractionally interpolates the voice samples during data underflow. Although voice synchronization is described in the context of an audio processor for voice and voice band data exchange over network gateway, those skilled in the art will appreciate that the techniques described for signal synchronization are likewise suitable for various applications requiring the synchronization of a signal in a system having two uncorrelated clocks. Accordingly, the described exemplary embodiment for voice and voiceband data synchronization in a signal processing system is by way of example only and not by way of limitation.

Figure 39:
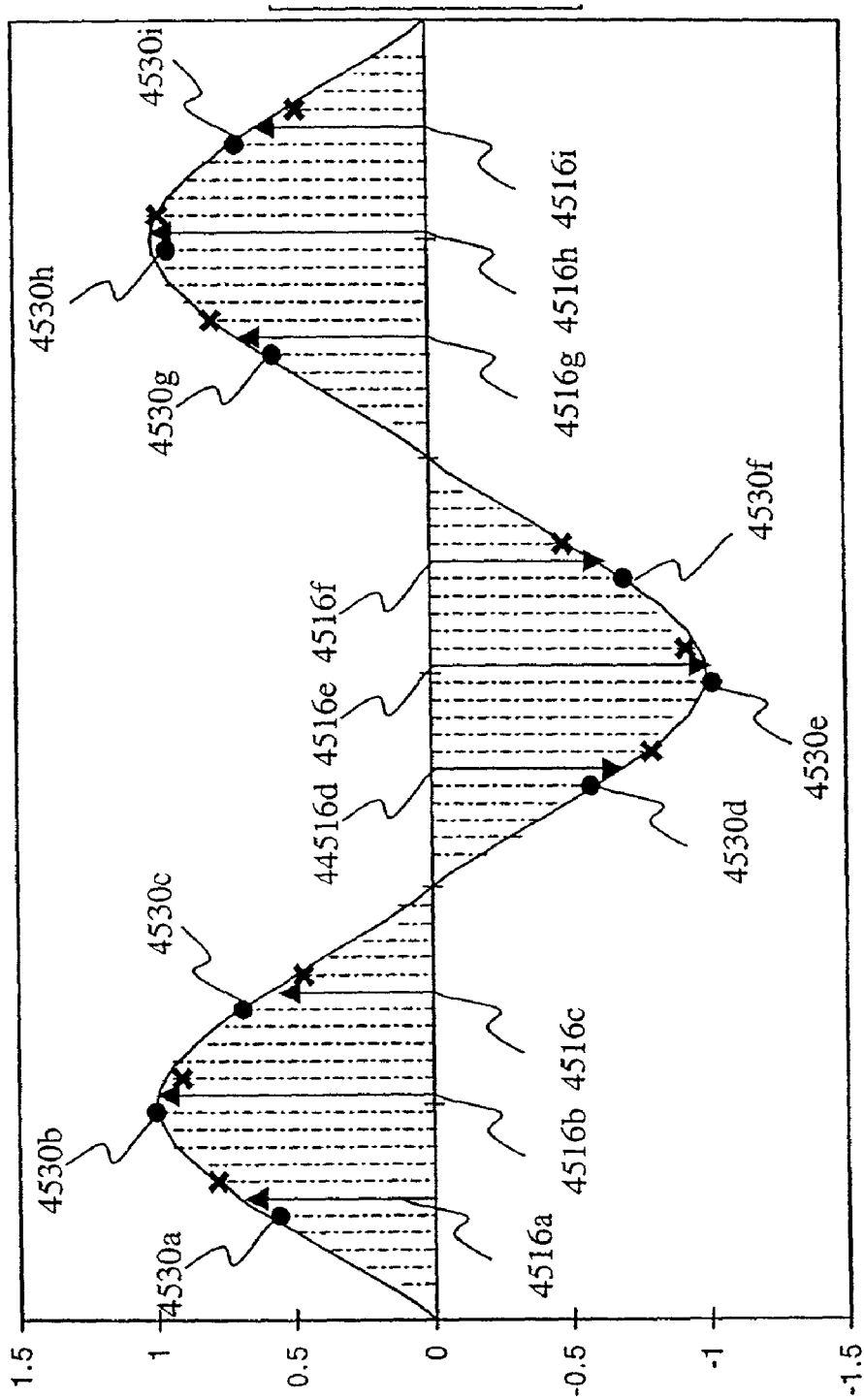
FIG. 39 is a graphical depiction of fractional interpolation and decimation of a digitized analog voice signal in accordance with a preferred embodiment of the present invention.

For example, referring to FIG. 39 a given input voice signal may be represented by a series of samples 4516(a-i) shown with arrow terminations. In the described exemplary embodiment, samples 4516(a-i) satisfy Nyquist sampling criteria so that input voice signal 4516 may be completely reconstructed from the series of samples 4516(a-i). Therefore, the input voice signal may be over sampled as represented by the dashed lines. For the data underflow case where the receive clock leads the transmit clock the input voice signal 4516(a-i) may be sampled at a slightly higher frequency 4530(a-i) shown with circles, so as to substantially eliminate the data underflow condition, by generating additional samples as a function of time.

Similarly, for the data overflow condition, the input voice signal may be downsampled with a slightly lower frequency, shown with "x" terminations, so as to substantially eliminate the data overflow condition by generating fewer samples as a function of time. For example if the DAC clock 4528 were 96.0000152587890625 kHz, and the far end transmit clock as represented by the rate at which samples are written into the first voice queue 4518 is 96.0 kHz, then the voice synchronizer 4520 would preferably generate an additional data sample every 1/(0.0000152587890625)=65536 samples. Therefore, the incoming signal would have to be resampled at the rate of (65536)(96 kHz) or 6.291456 GHz. Advantageously, the described exemplary embodiment generates an error signal as a function of the ratio between the rate at which frames arrive or are placed into the first voice queue 4518 and the rate at which frames are removed from the second voice queue 4522 so that only those samples that are required to fractionally decimate or interpolate the input voice signal need be computed.

Referring back to FIG. 38, in the upstream direction, the near end telephony device 4526 transmits an analog voice signal to the network gateway 4480 via the SLIC 4525. An analog to digital converter 4527 converts the incoming analog signal to digital samples with an ADC sample clock 4529. If the TRC clock and the ADC clock are correlated, the ADC output is forwarded to the audio processor 170 for decimation, echo cancellation and other processing as previously described, prior to being forwarded to the encoder system of the voice processor 4516. The voice processor encoder system can provide, among other things, DTMF and call progress tone detection, voice activity detection, voice compression, and comfort noise estimation. Encoded voice sample are then forwarded to system memory 4514 for transmission to the far end telephony device 4490 by the upstream modulator and MAC 4515. However, if the ADC clock 4529 and the TRC clock are uncorrelated, voice synchronizer 4520 should synchronize the digital voice samples to the TRC clock.

Figure 40:
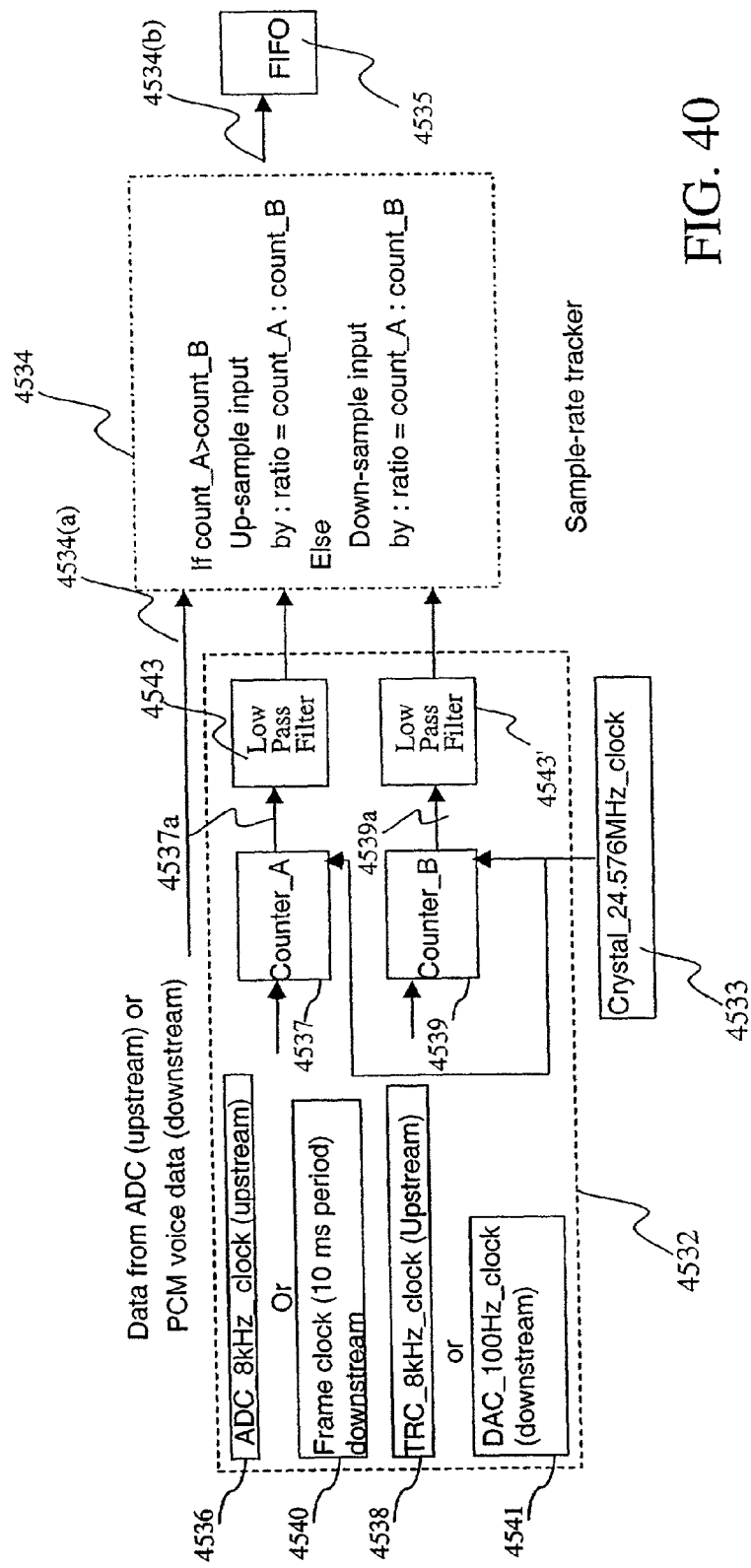
FIG. 40 is a general block diagram of a voice synchronizer that generates an error signal which is used to polyphase re-sample an input voice signal so as to synchronize a near end signal with a far end signal in accordance with a preferred embodiment of the present invention.

A general block diagram of an exemplary voice synchronizer is shown in FIG. 40. The voice synchronizer preferably includes an error generation unit 4532, a sampling rate tracker 4534 and a voice queue or FIFO 4535. The error generation unit 4532 includes two counters each of which may be clocked by a locally generated reference clock at 24.576 MHz 4533. In the upstream direction the ADC forwards digital samples to the sample rate tracker 4534. With the assumption that the ADC clock and the TRC clock are uncorrelated, an ADC 8 kHz clock 4536 drives a first counter 4537 and a TRC 8 kHz clock 4538 drives a second counter 4539. Counter outputs 4537(a) and 4539(a) are forwarded to low pass filters 4543, 4543' that average the output count (see FIG. 46). In the described exemplary embodiment, the sample rate tracker 4534 fractionally decimates or interpolates the incoming signal 4534(a) in accordance with the ratio of count A to count B. Thus if count A is larger than count B the sample rate tracker up-samples the incoming signal 4534(a) by the ratio count A to count B. Otherwise the sample rate tracker 4534 down-samples the incoming signal 4534(a) by the ratio count A to count B. The sample rate tracker 4534 forwards the resampled signal 4534(b) to the FIFO 4535 wherein the samples are assembled into a frame. The assembled frame is then forwarded to an encoder system of the voice and data processor (not shown) for voice compression, such as for example G.729.

Referring to FIG. 42, the operation of an exemplary sample rate tracker may be best demonstrated by an example. In FIG. 42 it is assumed that the input sample count, shown as samples 1, 2, 3, and 4, is 65537 and the output sample count, shown as samples A, B, C and D, is 65536 thereby creating a slight overflow condition. The distance between for example, sample 2 and B is equal to 1/65536 of one input sample period. Therefore, an incoming 8 kHz signal would have to be resampled at the rate of (65536)(8 kHz) or 524.288 MHz to generate the additional samples required to eliminate the overflow condition. Referring to FIG. 43, in the extreme 65535 zeros would be placed between each individual data sample of the input signal stored in a data buffer. In a typical application eighteen data points would be used to compute the resampling. The number of data points represents a trade between the quality of the conversion and computational complexity. Low pass filter coefficients (Coef-1 through Coef-1179648) would be computed which, when applied to the samples stored in the buffer yield the resampled signal.

Advantageously, the generation of the error signal, defined as the output count divided by the input count, facilitates the regeneration of the desired resampled output with a reduced number of filter coefficients. For example, referring to FIG. 44, to compute output B we shift 655357 inputs with 65535 zeros, so that sample 65536 is not equal to zero and sample number 65537 is equal to zero. Therefore, only eighteen filter coefficients multiply non zero data and only those eighteen coefficients need be calculated for each sample. They are 2, 2+65536, 2+(2*65536), . . . 2+(17*65536). The process is then repeated to compute output sample C. The first 65534 samples are zeros, sample number 65536 is non zero and sample 65537 is equal to zero.

Figure 41:
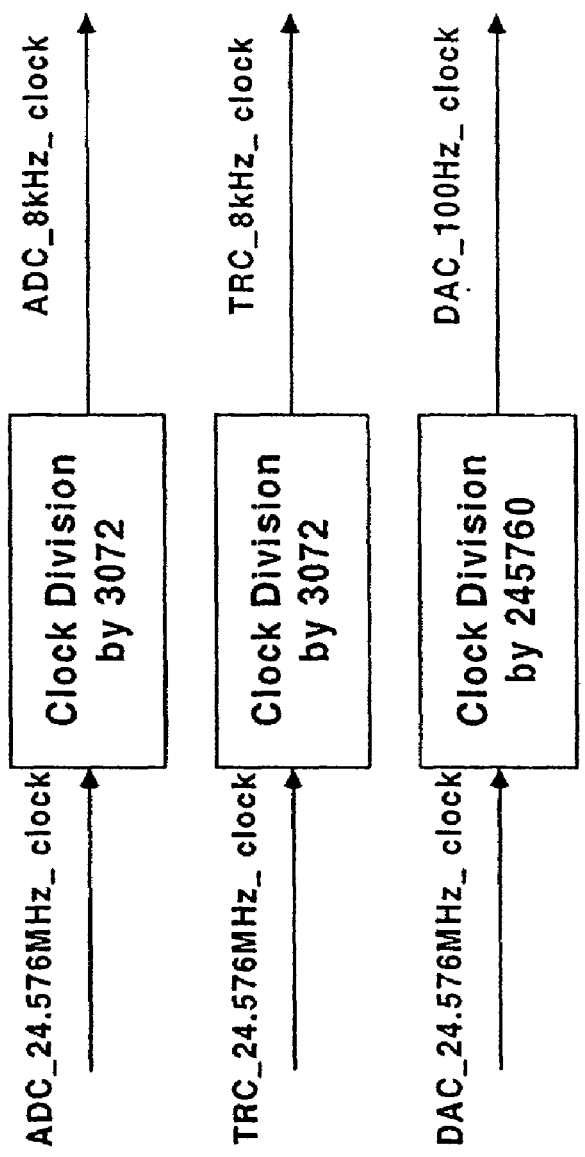
FIG. 41 is a block diagram of clock divider circuits for generating various clocks for use within a network gateway in accordance with a preferred embodiment of the present invention.

Returning to FIG. 40, in the downstream direction, incoming PCM voice data is forwarded to the sample rate tracker 4534. The voice data may not be synchronized to the local DAC sample clock that converts the received voice samples to an analog format prior to transmission to the near end telephony device. In the downstream direction the first counter 4537 is driven by an adjustable frame clock 4540. The speed of the frame clock is negotiated between the network gateway and the CMTS and is assumed to be 10 msec. The frame clock 4540 may be generated by the MIPS core, or the DSP of the voice processor as a function of frame arrival time. The second counter 4539 is preferably driven by a 100 Hz DAC clock 4541 that is generated by a clock division counter as shown in FIG. 41. The sample rate tracker 4534 preferably fractionally decimates or interpolates the incoming signal 4534(a) in accordance with the ratio of count A to count B. Thus if count A is larger than count B the sample rate tracker up-samples the incoming signal 4534(a) by the ratio count A to count B. Otherwise the sample rate tracker 4534 downsamples the incoming signal 4534(a) by the ratio count A to count B. The sample rate tracker 4534 forwards the resampled signal 4534(b) to the FIFO 4535 (second voice queue 4522 of FIG. 38). The resampled signal is then converted to an analog signal via a DAC that may use 24.576 MHz DAC clock.

FIG. 45 shows an alternative approach to voice synchronization. In the upstream direction the ADC 4527 again digitizes analog voice data received from the near end telephony device 4526 via the SLIC 4525. The ADC 4527 then forwards the digital samples to a sample rate tracker 4548. In this instance the error generation unit utilizes a single counter to derive the offset between the ADC and TRC clocks. With this approach, the TRC 8 kHz clock 4544 drives a counter 4546 that utilizes an ADC 24.576 MHz clock 4547 as a reference to count the number of periods within one 8 kHz TRC cycle. The counter forwards this count 4546(a) to the low pass filter 4543. The low pass filter as shown in FIG. 46 is preferably a single pole 4550 filter that smooths the transitions between different sampling rates. The described exemplary single pole filter includes a first gain adjuster 4551 that applies a fixed gain (b) to the count out signal and a second gain adjuster 4552 applies a fixed (a) that is the time constant of the filter. Preferably the scale factors are interrelated according to the following: b=1−a. The duration of the time constant represents a tradeoff between tracking accuracy and jitter and is preferably in the range of about 1-20 msec.

In this embodiment, the sample rate tracker 4548 fractionally decimates or interpolates the incoming signal 4548(a) in accordance with the filtered counter output 4543(a) as compared to 3072. In the case where the TRC clock and the ADC clock are perfectly correlated the counter would output 3072 and the incoming signal 4548(a) would not be resampled. However, for the case where the filtered counter output 4543 (a) is greater than 3072, the incoming signal is upsampled by the filtered counter output 4543(a) divided by 3072 (A/3072). Similarly, when filtered counter output 4543(a) is less than 3072, the incoming signal is down-sampled by the filtered counter output 4543(a) divided by 3072 (A/3072).

Referring to FIG. 47, in an alternate voice synchronizer in the downstream direction, the MIPS core 4513 increments a counter 4553 when the network gateway 4480 receives a new voice frame from the CMTS (not shown). The counter 4553 preferably utilizes the DAC 24.576 MHz clock 4528 as a reference. The counter output 4553(a) provides the difference between the frame clock and the DAC clock. A low pass filter 4543' again smooths or averages the difference in various frame arrival rates as previously described. The sample rate tracker 4548 fractionally decimates or interpolates the incoming signal 4548(a) in accordance with the output of filtered counter count 4543(a) as compared to 24576. In the case where the frame arrival clock and the DAC clock are perfectly correlated the counter 4553 would output 24576 and the incoming signal would not be resampled. However, for the case where the filtered counter output 4543(a) is greater than 24576 the sample tracker 4548 upsamples the incoming signal by the output 4543(a) of the low pass filter divided by 24576 (i.e. A/24576). Similarly, when the filtered counter output 4543(a) is less than 24576, the sample rate tracker 4548 down-samples the incoming signal by the output 4543 (a) of the low pass filter divided by 24576 (A/24576).

Referring to FIG. 48, an alternate error generation unit utilizes packet control information 4554 to generate a far end clock error signal 4555 representing the difference between the far end sampling rate and the near end voice playout sampling rate. The clock error signal may then be used to fractionally resample the received data packets 4556. In operation the DSP of the voice processor module may read from and write to data packet control registers within local memory of the DSP to monitor and control the flow of downstream data. For example, the DSP may write a packet arrival indication to the packet control register when a downstream packet has arrived and been placed in a jitter buffer. The jitter buffer may be part of the voice processor's local memory or may be external memory accessed via the internal system bus and DSP/ISB interface. The voice processor then processes voice samples and forwards the processed samples to the first voice queue 4518. In operation the voice queue 4518 writes a packet buffer ready indication to the packet control registers, that produces a maskable interrupt that is transmitted to the DSP of the voice processor module. In addition, the DSP may write a packet complete indication to the packet control registers indicating that the next packet has been delivered and clearing the packet buffer ready status. The period of the packet complete indication is negotiated between the network gateway and the CMTS and may be for example 10 msec. The packet complete indication is generated by the DSP of the voice processor in accordance with the reference clock locally generated at the network gateway.

In this embodiment the average far end sampling rate may be obtained from the packet arrival control signal and the near end voice playout sampling rate may be obtained from the packet complete control signal. One of skill in the art will appreciate that the present invention may utilize other control signals to obtain the average far end sampling rate and the near end playout rate. In addition, the control signals may be generated by, for example, the MIPS core of the network gateway.

A general block diagram of the alternate downstream voice synchronizer is shown in FIG. 49. In this and other embodiments, common reference numerals may be used to represent like components. The voice synchronizer preferably includes an error generation unit 4557, the sampling rate tracker 4534 and the voice queue or FIFO 4535. The error generation unit 4557 includes two counters 4558, 4559 each of which may be driven by the locally generated TRC clock 4536. The TRC clock may range in frequency from about 8 kHz to 24.576 MHz. However, one of skill in the art will appreciate that increasing the frequency of the TRC clock 4536 will provide increasingly accurate error estimates. The first and second latches 4560, 4561 coupled to counters 4558, 4559 respectively are responsive to packet arrival control signals 4562 and packet complete control signals 4563 respectively. Latch 4560 therefore outputs the count value between successive packet arrival control signals, i.e. last count 4560(a) and current count 4560(b) and latch 4561 outputs the count value between successive packet complete control signals, i.e. last count 4561(a) and current count 4561(b). Difference operator 4564 is coupled to latch 4560 and outputs the difference between the current and the last packet arrival counts, i.e. the count between successive packet arrival control signals output by latch 4560. Similarly, difference operator 4564a is coupled to latch 4561 and outputs the difference between the current and the last packet complete counts, i.e. the count between successive packet complete control signals output by latch 4561. Low pass filters 4543 and 4543' are coupled to difference operators 4564, 4564 a respectively. The low pass filters 4543 and 4543' as previously described may be single pole filters that smooth the transitions between different sampling rates.

A difference operator 4565 is coupled to the output of low pass filters 4543 and 4543' and forwards an estimate of the difference between the packet arrival period and packet complete period to the sample rate tracker 4534. The sample rate tracker also receives the incoming PCM voice data. The sample rate tracker 4534 fractionally decimates or interpolates the incoming signal 4534(a) in accordance with the ratio of the packet arrival count and the packet complete count. Thus if in operation the packet arrival count is larger than the packet complete count, the sample rate tracker up-samples the incoming signal 4534 (a) by the ratio of the packet arrival count to the packet complete count. Otherwise the sample rate tracker 4534 downsamples the incoming signal 4534(a) by the ratio of the packet arrival count to the packet complete count. The sampling rate tracker 4534 forwards the resampled signal 4534(b) to the FIFO 4535. The resampled signal is then converted to an analog signal via a DAC that may use the 24.576 MHz DAC clock.

One of skill in the art will appreciate that the voice synchronizer is not limited to DOCSIS compatible VOIP systems. Rather the present invention may be utilized to synchronize VOIP data in for example digital subscriber line (DSL) or other packet based networks. Therefore, the disclosed network gateway embodiment is by way of example only and not by way of limitation.

b. Echo Cancellation

Referring to FIG. 50, in the analog front end of the audio processor, a DAC 5570 forwards decoded voice signals to a local telephony device 5571 and a ADC 5572 receives signals from a local telephony device via a SLIC 5573. The SLIC 5573 contains a hybrid 5574 that converts from two-four wires. Ideally the hybrid gain would be zero to eliminate coupling between the far end and near end transmission paths. However, the operation of the hybrid 5574 typically results in a frequency dependent gain of less than about one-half. Hybrid gain commonly results in a telephony problem known as line echos, such as the reflection of the talker's voice at the mismatch created by the two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user. Therefore echo cancellers are typically used to remove far end echo.

Conventionally, a reference signal 5575(a) is input into an adaptive filter 5575 that models the transfer characteristics of the dialed telephone line (i.e. the hybrid plus the tail circuit which is the telephone line from DAC to ADC) so that the unwanted echo may preferably be canceled by subtracting filtered reference signal 5575(b) from the near end digital input signal 5572(a) in a difference operator 5576. Typically, the adaptive filter 5575 converges or adapts only in the absence of near end speech. Therefore, near end speech and/or noise present on the near end digital input signal 5572(a), typically referred to as the double talk condition, may cause the adaptive filter 5575 to diverge. Traditionally, echo cancellers utilize energy estimators 5577a, 5577b to estimate the energy ($E_{near}$) of the near end signal 5572(a) and the energy ($E_{far}$) of the far end 5575(a) signal. A typical double talk algorithm 5568 then declares near end speech active, disabling adaptation of the adaptive filter 5575, when the energy of the near end signal is greater than the energy of the far end signal times the hybrid gain(H), ($E_{near}$>H*$E_{far}$).

A primary disadvantage of conventional approaches which utilize energy estimates is the delay introduced into the detection of near end speech by the energy estimators (typically low pass filters) that may significantly corrupt the output of difference operator 5576, which is typically used as a the feedback error for filter adaptation. The described exemplary echo canceller includes a double talk algorithm that provides rapid detection of near end speech in the presence of far end speech along with a look ahead capability so that the adaptive filter may halt adaptation (i.e. freeze the filter taps or coefficients) before the near end speech reaches the difference operator.

Although echo cancellation is described in the context of an audio processor for voice exchange via a network gateway, those skilled in the art will appreciate that the techniques described for echo cancellation are likewise suitable for various applications requiring the cancellation of reflections, or other undesirable signals, from a transmission line. Accordingly, the described exemplary embodiment for echo cancellation in a signal processing system is by way of example only and not by way of limitation.

Referring to FIG. 51, a high pass filter 5587 receives a reference signal. The high pass filter 5587 matches the echo path impulse response of the Rx data line. The output of the high pass filter 5587 is input into the adaptive filter 5575 that models the transfer characteristics of the dialed telephone line circuit. The adaptive filter 5575 may be a linear transversal filter or other suitable finite impulse response filter. In addition, Rx data from the far end 5581(a) is coupled to double talk logic 5580 before the interpolator 5581 of the audio processor (not shown) and the DAC 5588 of the analog front end (not shown). The double talk logic 5580 therefore receives a far end reference signal F(n) 5581(a) with an 8 kHz sampling rate. In addition, the double talk logic 5580 is preferably coupled between the ADC 5589 of the analog front end and the decimator 5582 of the audio processor (not shown). A downsampler 5583 performs 12:1 sample decimation of the 96 kHz near end Tx data 5589(a) and forwards the decimated near end data samples 5583(a) to the double talk logic at an 8 kHz sample rate.

To minimize delay, the downsampler does not low pass filter the near end samples 5589(a) prior to decimation. Aliasing components which may be created are insignificant in that the output of the downsampler 5583(*a*) simply drives the double talk detection logic 5580 and is not transmitted to the far end. An energy estimator 5584 estimates the background noise level of the decimated near end signal 5583(*a*) and forwards the estimated level to the double talk logic 5580. The energy estimator 5584 is preferably a low pass filter with a long time constant, on the order of about 10 seconds. With a long time constant the energy estimator tends to track the minimum energy level of the decimated near end signal 5583 (*a*). Energy estimator 5585 estimates the short term energy of the far end TX data F(n).

The adaptive filter 5575 can be based upon a normalized least mean square algorithm (NLMS) as described in S. Haykin, Adaptive Filter Theory, and T. Parsons, Voice and Speech Processing, the contents of which are incorporated herein by reference as if set forth in full. An error signal 5576(*a*) at the output of the difference operator 5576 for the filter adaptation may be characterized as follows:

$$e(n) = Tx(n) - \sum_{j=0}^{L-1} w(j)F(n-j)$$

where e(n) is the error signal at time n, F(n) is the reference signal 5587(*a*) at time n, Tx(n) is the Tx data signal 5586(*a*) input into the difference operator 5576 at time n, and w(j) are the coefficients of the transversal filter where the dimension of the transversal filter is the worst case echo path length (i.e. the length of the tail circuit L) and W(j), for j=0 to L−1, is given by:

$$w(j)=w(j)+\mu^*e(n)^*F(n-j)$$

wherein w(j) is preferably initialized to a reasonable value such as for example zero.

Assuming a block size of four msec (or 32 samples at a sampling rate of 8 kHz), the short term average energy of the reference signal $E_{ref}$ is the sum of the last 32 reference samples so that the convergence gain may be given by:

$$\mu = \frac{\alpha}{E_{ref(n)}}$$

where α is the adaptation step size and $E_{ref}$ is the energy estimate of the far end data sample F(n). In the described exemplary embodiment α, is set to zero when near end voice is detected so that the convergence gain μ is equal to zero and the filter coefficients are not updated. Otherwise α is set to a constant of less than one and preferably in the range of 0.8-0.95. One of skill in the art will appreciate that the adaptive filter may be implemented in a variety of ways, including fixed point rather than the described floating point realization. Accordingly, the described exemplary adaptation logic is by way of example only and not by way of limitation.

The 96 kHz near end Tx data samples 5589(*a*) are also decimated by a second 12:1 decimator 5582. However, decimator 5582 does include a low pass filter capability to prevent aliasing of the decimated signal. The decimated output is forwarded to a 60 Hz high pass filter 5586 which reduces the 60 Hz interference induced on the transmit line due to proximity to power lines. Filtered output 5586(*a*) is input to the difference operator 5576 that preferably cancels unwanted echo by subtracting filtered reference signal 5575(*b*) from the filter output signal 5586(*a*).

In the described exemplary embodiment, the adaptive filter 5575 models the transfer characteristics of the hybrid and the tail circuit of the telephone circuit. The tail length supported should preferably be at least 8 msec. The adaptive filter 5575 may be a linear transversal filter or other suitable finite impulse response filter. The echo canceller preferably converges or adapts only in the absence of near end speech. Therefore, near end speech and/or noise present on the input signal 5589(*a*) may cause the adaptive filter 5575 to diverge. To avoid divergence, the adaptive filter 5575 can be selectively enabled by the double talk logic 5580. The double talk logic 5580 utilizes a sample based algorithm to detect the presence of near end speech without incurring the delays associated with conventional systems in accordance with the following equation:

|Near|>H*Peak{|F(n)|}+Background_Noise(n)

The double talk logic 5580 is used to declare near end speech active when the absolute value of the decimated near end signal 5589(*a*) is greater than the product of the hybrid gain (H) and a peak statistic of the far end data samples 5581(*a*) summed with the estimated background noise of the transmit data samples. The hybrid gain is generally a constant preferably less than about one-half. The background noise for a typical voice channel is on the order of about −70 dBm which is far less than average active speech levels, which are typically in the order of about −25 dBm. The background noise estimate is therefore initialized to a value of about −70 dBm and thereafter periodically updated 5584(*a*) by the energy estimator 5584. The peak statistic of the far end data samples is defined by the following logic:

If max{A*[|F(n)|, . . . , |F(n−L−1)|]}>Peak(n−1) then
  Peak(n)=max{A[|F(n)|, . . . , *|F(n−L−1)|]}
else
  Peak(n)=d*Peak(n−1);

where A is a weighting function that is greater than zero and less than or equal to one. The parameter L is the number samples over which the maximum is determined, typically in the range of zero to one hundred and twenty eight samples and preferably on the order of about 64 samples. The parameter d is preferably a constant that is also greater than zero and less than or equal to one and preferably on the order of about 0.99. Therefore, to determined the peak statistic of the far end, the double talk logic applies a weighting factor A to the absolute value of the current sample (F(n)) and previous L samples (F(n−L)). If the maximum product is greater than the previous peak statistic Peak(n−1) then the current peak statistic Peak (n) is set at the maximum of the product of the weighting factor and far end samples. Otherwise the current peak statistic Peak(n) is set equal to d times the value of the previous peak statistic Peak(n−1).

In the described exemplary embodiment, A, L and d are empirically determined to optimize performance and computational load for a given application. For example, double logic 5580 can more accurately detect near end speech if the maximum is determined over a larger number of samples L. However, computational intensity also increases with increasing number of samples L. A and d can be inversely related to the number of sample L, so that A and d are smaller for larger number of samples and vice versa.

In the described exemplary embodiment, there is a delay associated with the high-pass filter 5586 and the decimator 5582. The double talk logic 5580, which has negligible delays, can receive and process near end data samples prior to their arrival at the difference operator 5576. Thus, the delay associated with the high-pass filter 5586 and the second decimator 5582 provide a look-ahead of M samples allowing the double talk logic 5580 to preferably disable adaptation of the adaptive filter 5575 M samples before the near-end signal reaches the difference operator 5576. The look ahead capability M is the sum of the equivalent delays associated with the high pass filter 5586 and the second decimator 5582 and is typically two-three 8 kHz samples for a ITU-T G712 compliant system.

FIG. 52 shows another approach for echo cancellation where a decimated near end digital signal after decimation to an 8 kHz signal 5582(*a*) is input to the double talk logic 5580. This approach can be utilized in systems where the echo canceller and codec are not integrated so that the near end data samples have previously been decimated. In this instance, a look ahead buffer 5588 receives, buffers, and forwards decimated near end signals 5582(*a*) to the difference operator 5576, providing a look ahead capability of M samples where M may be optimized for a given application to balance performance, computational intensity and delay.

The approach shown in FIG. 52 also utilizes a digital hybrid balancer 5592 coupled between the interpolator 5581 and the decimator 5582. The digital hybrid balancer 5592 takes the output of the interpolator 5581 and uses it to generate a signal which is summed with the output of the ADC 5589 before presentation to the decimator 5582. The digital hybrid balancer 5592 operates to reduce echo in the digital domain as opposed to in the analog domain for improved operation of the adaptive echo cancelled.

The approach shown in FIG. 52 also utilizes a Y filter 5593 coupled between the ADC 5589 and the DAC 5588. The Y filter 5593 takes the output of the ADC 5589 and uses it to generate a signal which is summed with the output of the interpolator 5581 before presentation to the DAC 5588. The function of the Y filter is to reduce reflections on the two wire interface.

The relative strength of the near end signal compared to the echo coupled through the hybrid increases with decreasing hybrid gain (H) so that in the described exemplary embodiment, the accuracy of near end voice detection increases with decreasing hybrid gain(H). Referring to FIG. 53, in another aspect of the present invention, a short adaptive filter 5590 is integrated into the preferred double talk detection algorithm. The adaptive filter 5590 models the transfer characteristics of the dialed telephone line circuit. The adaptive filter 5590 may be a linear transversal filter or other suitable finite impulse response filter. An error signal 5591(*a*) at the output of difference operator 5591 for filter adaptation may be characterized as follows:

$$e_0(n) = Tx_0(n) - \sum_{j=0}^{K-1} w_0(j) F(n-j)$$

where $e_0(n)$ is the error signal at time n 5591(*a*), F(n) is the reference signal 5580(*a*) at time n and $T_{x0}(n)$ is the Tx data signal 5591(*b*) input into difference operator 5591 at time n, and $w_0(j)$ are the coefficients of the transversal filter where the dimension of the transversal filter is preferably the worst case echo path length (i.e. the length of the tail circuit K) and $W_0(j)$, for j=0 to K−1, is given by:

$$w0=(j)w0(j)+\mu^* e0(n)^* F(n-j)$$

wherein $w_0(j)$ is preferably initialized to a reasonable value such as for example zero.

Assuming a block size of one msec (or 8 samples at a sampling rate of 8 kHz), the short term average energy of the reference signal $E_{ref}$ is the sum of the last eight samples so that the convergence gain may be given by:

$$\mu = \frac{\alpha}{E_{ref(n)}}$$

where α is the adaptation step size and $E_{ref}$ is the energy estimate of the far end data sample F(n). In the described exemplary embodiment, the double talk logic 5580 does not selectively enable/disable adaptation of the filter 5590 in accordance with the detection of near end speech so that filter 5590 continuously adapts. Therefore, to reduce the computational burden placed upon the system and to prevent the filter from diverging the adaptive filter 5590 can be figured to adapt very slowly so that α is preferably in the range of about 0.01-0.0001.

The adaptive filter 5590 again filters the far end reference signal 5581(*a*) so that the echo level is can be reduced by subtracting filtered reference signal 5590(*b*) from the Tx data samples 5591(*b*) in a difference operator 5591. The adaptive filter 5590 can be reduce line echos about 6-12 dB so as to improve the performance of the double talk logic. In the described exemplary embodiment, the output 5591(*a*) of the difference operator 5591, (i.e. Tx data samples with reduced echo) is then forwarded to double talk logic 5580 which then detects near end speech and selectively enables/disables adaptation of the adaptive filter 5575 (see FIG. 51).

8. Voice Processing

The Internet is a loose association of thousands of networks and millions of computers across the world that are interconnected through communication links. The emergence of Internet Protocol (IP) as the standard transport protocol for packet based networks has enabled an on-line revolution in communications service and applications. Traditional dial-up modems provide online access through the public telephone network at up to 56 Kbps (equal to 56,000 bits per second). A cable modem, on the other hand, provides users with high-speed Internet access through a cable television network at data rates as high as 56 Mbps. However, traditional cable modem service has been limited to data applications so that the realization of diverse communications services at increased data rates requires the development of a common broadband cable access network with integrated voice and data services. Cable Television Laboratories, Inc. (CableLabs®), a membership organization consisting of cable television system operators, developed PacketCable 1.0 which defines interface specifications for interoperable equipment capable of providing packet-based voice, video and other high-speed multimedia services over hybrid fiber coax (HFC) cable systems utilizing the DOCSIS protocol.

a. Packetized Voice and Signaling Services

The described exemplary network gateway includes a voice and data processor that supports the exchange of voice and data between a traditional circuit switched and a packet based network via a DOCSIS HFC network. The exemplary voice and data processor may be implemented with a programmable DSP software architecture as shown in FIG. 54. This architecture includes a high speed DSP 6000 with program memory 6002, and data memory 6004. A PCM highway 6006 provides the voice and data processor 160 access to the audio processor and optional external audio processing circuits. A grant synchronizer 6008 ensures delivery of samples to the network gateway for upstream transmission. The grant synchronizer signals the DSP 6000 that a pending grant is about to arrive at the network gateway so as to allow the DSP 6000 to synchronize itself to scheduled grants at the network gateway. A host interface 6100 transfers data, control and status messages between the DSP 6000 and the MIPS core 128.

Notwithstanding, many voice applications often require simultaneous support of multiple telephony devices. Conventionally, multiple devices could only be supported with additional telephone wires. Recently however, multiple POTS service terminations may be multiplexed over a HPNA network utilizing existing in home telephone wiring and communicated to an upstream telephony service. Voice over home networks (VOHN) may therefore be utilized to reduce the installation costs normally associated with providing simultaneous support of multiple telephony or other network devices. The described exemplary network gateway supports the bidirectional exchange of packetized voice and call signaling between a HPNA local area network and a wide area network such as the Internet. Referring to FIG. 55, a network gateway 6104 translates between the upstream telephony service and a local HPNA network segment 6110. A remote HPNA media adapter 6120 provides a subscriber side interface equivalent to the standard analog phone interface and a network side interface defined by HPNA 2.0. One of skill in the art will appreciate that the partition of functionality between the remote HPNA media adapter and the network gateway may vary. However, in the described exemplary embodiment, voice compression and decompression algorithms, such as, for example, G.729 are implemented in the media terminal adapter to minimize end-end delay and jitter in accordance with packetized voice QOS requirements.

An exemplary network gateway includes an embedded media terminal adapter (MTA) in compliance with PacketCable 1.0 to support bidirectional exchange of packetized voice or voice band data. An exemplary embedded MTA may be implemented with programmable DSP software architecture to provide a subscriber side interface to a subscriber's telephony device via the voice and data processor or the HPNA MAC/PHY and remote HPNA media adapter. The embedded MTA further provides a network side interface to the DOCSIS cable modem. Referring to FIG. 56 the preferred embedded MTA 6200 includes a host application programming interface (HAPI) 6210 that provides a software messaging interface between the MIPS host and the voice and data processor DSP. The HAPI 6210 facilitates the issuing of commands from the MIPS host to the voice and data processor DSP as well the sending of events from the DSP to the MIPS core host. Similarly, the MTA further includes a VOHN interface 6150 that provides a software messaging interface between the MIPS core host and the remote HPNA media adapter via the HPNA MAC/PHY. The VOHN interface also facilitates the issuing of commands from the MIPS host to the remote media adapter as well the sending of events from the remote media adapter to the MIPS core host.

In addition, the MTA 6200 may provide all signaling and encapsulation elements required to support telephony service over a DOCSIS HFC network 6220 including media transport and call signaling via quality service logic 6230. For example, gateway control protocol (GCP) logic 6240 receives and mediates call-signaling information between the PacketCable network and the PSTN. The GCP logic 6240 maintains and controls the overall call state for calls requiring PSTN interconnection. The GCP logic 6240 controls the voice and data processor, via the MTA 6200 and HAPI interface 6210, as well as the remote HPNA media adapter via the MTA and VOHN interface by instructing it to create, modify, and delete connections that support the media stream over the IP network. The GCP logic 6240 also instructs the voice and data processor and the remote HPNA mediate adapter to detect and generate events and signals. The GCP logic 6240 also exercises attribute control over the voice and data processor and the remote HPNA media adapter, providing instructions as to which attributes to apply to a connection, such as, for example, encoding method, use of echo cancellation, security parameters, etc.

The GCP logic 6240 also interfaces with an external control element, such as, for example, a call agent or call management server (CMS) 6280 to terminate and generate the call signaling from and to the PacketCable side of the network in accordance with the network-based call signaling (NCS) protocol specification. The PacketCable 1.0 NCS architecture places call state and feature implementation in the centralized CMS 6280, and places telephony device controls in the MTA 6200. The MTA 6200 passes device events to the CMS 6280, and responds to commands issued from the CMS. The CMS is responsible for setting up and tearing down calls, providing advanced services such as custom calling features, performing call authorization, and generating billing event records, etc.

For example, the CMS 6280 instructs the MTA 6200 to inform the CMS 6280 when a phone goes off hook, and seven dual tone multi frequency (DTMF) digits have been entered. The CMS 6280 instructs the MTA 6200 to create a connection, reserve quality of service (QoS) resources through the access network for the pending voice connection, and to play a locally generated ringback tone. The CMS in turn communicates with a remote CMS (or MGC) to setup the call. When the CMS detects answer from the far end, it instructs the MTA to stop the ringback tone, activate the media connection between the MTA and the far-end MTA, and begin sending and receiving media stream packets.

When a voice channel is successfully established, real time transport protocol (RTP) is used to transport all media streams in a PacketCable compliant network to guarantee interoperability. Real time transport protocol (RTP) provides end-to-end delivery services for data with real time characteristics, such as interactive audio and video. Those services include payload type identification, sequence numbering, timestamping and delivery monitoring of the quality of service (QoS) and conveys to participants statistics such as for example packet and byte counts for the session. RTP resides right above the transport layer. The described exemplary embedded MTA 6200 preferably includes RTP logic 6300 that converts RTP packets (headers) to a protocol independent format utilized by the HAPI and VOHN interfaces and vice versa.

The described exemplary embedded MTA preferably includes channel associated signaling (CAS) logic 6320 resident on the MIPS core that interfaces with the subscriber line interface circuits 6340 via the GPIO interface 184 (see FIG. 3) to provide ring generation, hookswitch detection, and battery voltage control. The CAS logic 6320 preferably supports custom calling features such as for example distinctive ringing.

The described exemplary embedded MTA 6200 preferably includes MTA device provisioning logic 6360 that enables the embedded MTA 6200 to register and provide subscriber services over the HFC network 6220. Provisioning logic 6360 provides initialization, authentication, and registration functions. The Provisioning logic 6360 also provides attribute definitions required in the MTA configuration file. The provisioning logic 6360 includes SNMP logic 6380 that exchanges device information and endpoint information between the MTA 6200 and an external control element called a provisioning server (not shown). The MTA also sends notification to the provisioning server that provisioning has been completed along with a pass/fail status using the SNMP protocol.

The Provisioning logic 6360 also includes DHCP logic 6400 that interfaces with an external dynamic host configuration protocol (DHCP) server to assign an IP address to the MTA. The DHCP server (not shown) is a back office network element used during the MTA device provisioning process to dynamically allocate IP addresses and other client configuration information. Further provisioning logic preferably includes domain name server (DNS) logic 6420 which interfaces with an external DNS server (not shown) to obtain the IP address of a PacketCable server given its fully qualified domain name.

The MTA configuration file is downloaded to the MTA from an external trivial file transfer protocol (TFTP) server (not shown) through TFTP logic 6440. The TFTP server is a back office network element used during the MTA device provisioning process to download configuration files to the MTA. An HTTP Server may be used instead of a TFTP server to download configuration files to the MTA.

Each of PacketCable's protocol interfaces is subject to threats that could pose security risks to both the subscriber and service provider. The PacketCable architecture addresses these threats by specifying, for each defined protocol interface, the underlying security mechanisms (such as IPSec) that provide the protocol interface with the security services it requires, e.g., authentication, integrity, confidentiality. Security logic 6460 is PacketCable compliant and provides end-to-end encryption of RTP media streams and signaling messages, to reduce the threat of unauthorized interception of communications. The security logic 6460 preferably provides additional security services such as, for example, authentication, access control, integrity, confidentiality and non-repudiation.

DOCSIS service logic 6230 preferably provides the primary interface between the MTA 6200 and the DOCSIS cable modem (i.e. DOCSIS MAC and modulator/demodulator) of the network gateway. The DOCIS service logic 6230 provides multiple sub-interfaces such as, for example, a control sub-interface that manages DOCSIS service-flows and associated QoS traffic parameters and classification rules. The DOCIS service logic 6230 also provides a synchronization interface that is used to synchronize packet and scheduling prioritization for minimization of latency and jitter with guaranteed minimum constant bit rate scheduling. In addition, the DOCSIS service logic is used to request bandwidth and QoS resources related to the bandwidth. The DOCIS cable modem features of the network gateway then negotiate reserve bandwidth, guaranteed minimum bit rate etc, utilizing DOCSIS 1.1 quality of service feature. Similarly, DOCSIS service logic 6230 preferably includes a transport interface that is used to process packets in the media stream and perform appropriate per-packet QoS processing.

Referring to FIG. 57, the GCP logic implements the NCS features of the PacketCable 1.0 specification including protocol transaction management, parsing, verification and formatting of protocol data units (PDUs) and other utility functions. The PacketCable protocol typically requires an acknowledgment that a request has been received. Therefore, the GCP logic includes transmitter queue 6700 that registers all requests sent from the GCP logic to the call management server via a transmitter scheduler 6720 and the MTA. A receive router 6740 analyzes packets received from the call management server via the MTA call client to determine if the received message is an acknowledgment or a new request. The receiver router 6740 forwards new requests to a transaction queue 6760. If the received packet is an acknowledgment of a request previously sent from the GCP logic to the call management server, the receive router 6740 clears that request by forwarding the acknowledgment 6740(*a*) to the transmitter queue 6700. The transmitter queue 6700 periodically retransmits buffered requests until an acknowledgment from the call management server is received.

The transaction queue 6760 registers the receipt of a given request from the call management server as well as the transmission of an acknowledgment of that request from the GCP logic to the call management server. Further, in the described exemplary embodiment the transaction queue 6760 detects re-transmitted requests from the call management server for which an acknowledgment has already been sent. In addition, the transaction queue 6760 parses the incoming requests according to the type of requests. The transaction queue 6760 routes connection messages to a connection message parser 6780. Connections messages are used to create or terminate a connection. The connection message parser generates and forwards connection controls (including connection attributes) 6780(*a*) to the MTA which are then communicated to the voice and data processor via the HAPI interface or the remote HPNA media adapter via the VOHN interface. The transaction queue 6760 routes request/notify messages to a request/notify message parser 6800. Request/notify messages may be signal requests such as play dial tone, busy tone etc. or requests to detect events such as for example, detect DTMF digits, fax tone, modem tone etc. The request/notify message parser 6800 preferably generates and forwards signal requests 6800(*a*) to the voice and data processor via the MTA and HAPI interface or the remote HPNA media adapter via the MTA and VOHN interface. The request/notify message parser 6800 flags event detection requests 6800(*b*) to an event filter 6820.

Actual events detected by the voice and data processor and the remote HPNA media adapter (such as, for example, fax tone) or channel associated signaling (such as, for example, off hook detected) are forwarded to the event filter via the MTA call client. The event filter 6820 filters the events and only transmits those detected events that the call management server requested, as indicted by flags 6800(*b*) communicated to the event filter by the request/notify message parser 6800. The event filter 6820 preferably forwards detected events of interest to the call management server to a message formatter 6840. The message formatter 6840 formats the detected event into the appropriate protocol and forwards the detected event message to transmitter queue 6700, which registers the message and will retransmit the message if an acknowledgment is not received in a timely manner via the receive router 6740(*a*). The transmitter queue 6700 forwards the message to the transmitter scheduler 6720 which bundles outgoing messages and forwards them to the MTA call client (not shown) for communication to the call management server.

The PacketCable 1.0 specification provides for the use of a digit map which is designed to reduce the number of messages communicated between the call management server and the MTA call agent when a user is dialing a number. For example, the dialing of long distance number involves the use often digits (i.e. the area code and number) which would require ten requests and acknowledgments, i.e., one per digit. In the alternative, the call management server may provide a digit map to the MTA call client which instruct digit map logic 6860 to collect detected digits from the voice and data processor according to a specified format, for example ten digits for long distance call. The digit map logic 6860 then forwards for example all ten digits to the event filter which filters the digit detection, and forwards events of interest to the message parser 6840 for communication to the call management server as previously described through transmitter queue 6700 and transmitter scheduler 6720.

Event quarantine logic 6880 buffers detected events received from the CAS, or the remote HPNA media adapter or voice and data processor via the MTA call client for which the event filter has not received a detect event request from the call server manager via the request notify message parser flag 6800(*b*). Responses or the result 6900(*a*) of a connection or signal request are forwarded from the MTA call client to a response formatter 6900 within the GCP logic that formats the result into the proper protocol. The response formatter then forwards that result to the transmitter scheduler 6720 for communication to the call management server via the MTA call client. In addition, the response formatter 6900 notifies the transaction queue 6760 that an acknowledgment has been sent in response to a given request. The transaction queue 6760 may then detect the re-transmission of a request from the call management server should that acknowledgment be lost or otherwise not received by the call management server. The transaction queue 6760 preferably instructs the response formatter 6900 to retransmit an acknowledgment when the transaction queue 6760 detects the re-transmission of a request for which an acknowledgment had been previously sent.

Referring to FIG. 58, RTP logic 6300 preferably converts RTP packets to the protocol independent packet format utilized by the VOHN interface 6150 and the HAPI interface 6210 and vice versa. In the described exemplary embodiment, the protocol independent packet payload is preferably identical to the RTP packet payload so that the RTP logic 6300 need only convert between the RTP headers and the headers used in the independent protocol. In the described exemplary embodiment a RTP shim 7000 provides two way exchange of protocol independent packets with the MTA call client 6200. The RTP shim 7000 accepts these packets from the MTA call client 6200, converts the packet header to a RTP header and forwards the RTP packet to a RTP stack 7020. The RTP stack 7020 provides the statistical monitoring function required by the RTP protocol such as, for example, collecting statistics on the number of bytes sent and received, the number of packets lost as well as how much jitter was present. The RTP stack 7020 provides two way exchange of RTP packet between the MTA call client and the RTP logic 6300, receiving RTP packets from the RTP shim 7000 and forwarding them to the MTA call client 6200 and vice versa.

Referring to FIG. 59 the described exemplary VOHN interface provides a software messaging interface between the MTA call client 6200 and the remote HPNA media adapter 6120. The VOHN interface 6150 facilitates the issuing of commands from the MIPS core via the MTA call client 6200 to the remote HPNA media adapter 6120 as well the sending of events from the remote HPNA media adapter to the MTA call client 6200. The VOHN interface 6150 may be scalable to support multiple channels as well as multiple media adapters. In addition the VOHN interface is a thread safe environment, providing multi-threading capability to support multiple channels. Multi-threading provides multiple, simultaneously executing "threads" within a single application. The benefit of a multi-threaded application is similar to that of a multi-tasked operating system, the application may perform multiple tasks by using separate threads.

The described exemplary VOHN interface 6150 receives commands from and issues responses to the MTA call client 6200. The VOHN interface 6150 processes incoming packets to identify the channel that should process the packet as well as other processing parameters such as for example, packet type (i.e. voice or fax), packet length, etc. For example, VOHN signaling messages are data link layer frames that are identified by a unique IEEE assigned Ethertype value in the frame header. Further, in the described exemplary embodiment, the frame header may also include one or more payload element fields. Each payload element may be variable length and multiple payload types such as for example voice, channel associated signaling, etc., may be concatenated in a single frame in any order.

For example, in the described exemplary embodiment, voice payload fields transfer packetized voice encoded to ITU standards such as, for example, G.711 a-law, G.711 u-law, G.728 or G.729A/B/E. The size of the frame depends on the vocoder frame rate selected for the media stream, normally a multiple of 10 ms. Voice payload fields are transmitted at the selected frame rate while a voice path is established to the line termination. Some vocoder algorithms incorporate voice activity detection (VAD) and reduce packet rate significantly during periods of silence.

In the described exemplary embodiment, voice-band data traffic (such as, for example, G.711 u/a-law data) may be treated as a special case. Voice-band data is less sensitive to delay, but more sensitive to frame loss than voice traffic. Therefore, in operation, frames containing voice-band data contain two payload fields to increase delivery reliability over the HPNA segment. In the described exemplary embodiment, the first payload field contains voice samples from the current frame period, and a second payload field contains a repeat of the voice samples from the most recent previous frame period.

In the described exemplary embodiment, signaling and voice payloads are encoded in frames that are transported as a Link Layer Protocol according to the formats and procedures for HPNA 2.0 Link Layer Framing. The VOHN interface 6150 forwards processed messages 6150(*a*) to the HPNA MAC layer 6160 to provide access to the physical media and transparent transfer of link layer frames between the network gateway and remote HPNA media adapters 6120. In the described exemplary embodiment, individual line terminations are identified by single pre-defined/well-known MAC station addresses. Frames destined for a specific line termination are transmitted to the destination MAC address assigned for that line, rather than using the unique unicast MAC address of the network gateway or remote media adapter. The line termination or "station" addresses are actually multicast MAC addresses allowing multiple HPNA media adapters to share the same line termination and thus transmit/receive using the same station address. This addressing model permits implementation of distributed conferencing. Further, the sender of a communication may be identified from its unique unicast MAC station source address. The MAC layer may also perform error detection on received frames and silently discard frames with errors.

In the described exemplary embodiment, frames may be transmitted at one of two rates. For example, during static or quiescent periods when no state transitions are occurring, frames may be transmitted at a background rate on the order of about one frame every five seconds. However, when state information changes, frames may be transmitted at a foreground rate of one every 10 msec. In the described exemplary embodiment, frames are transmitted at the foreground rate until a quiescent period of at least about 50 msec has elapsed.

The remote HPNA media adapter forwards processed packets, such as, for example, encoded voice packets, to the HPNA PHY/MAC of the network gateway. The HPNA MAC 6160 preferably reformats the response into a VOHN message and forwards the VOHN message to system memory. In addition, when a processed packet is written into system memory the MIPS core interrupts a VOHN Task Thread 7050 that retrieves the processed VOHN message from the memory. The VOHN Task Thread 7050 determines whether the message is an event such as, for example, a voice or fax packet or a DTMF detection which are forwarded directly to the MTA call client 6200, or a response to a command/request from the MTA call client. For example, the MTA call client 6200 may command the remote HPNA media adapter 6120 to turn off echo cancellation. Such a command is preferably processed by the VOHN interface 6150 into the appropriate link layer format and forwarded to the HPNA MAC/PHY 6160. The MAC formats the message in accordance with HPNA V.2 protocol and forwards the command over the HPNA network to the remote HPNA media adapter.

When the command has been complied with, the remote HPNA media adapter 6120 returns an acknowledgment to the HPNA PHY/MAC 6160 of the network gateway via the HPNA network. The HPNA MAC formats the response into a VOHN message and forwards it to the VOHN Task thread 7050 which then forwards it as a VOHN response to the VOHN interface 6150. The VOHN interface 6150 correlates the VOHN responses received from the VOHN Task thread 7050 to the corresponding command/request that prompted the response and forwards a VOHN response to the MTA call client 6200.

The interaction of an exemplary embedded MTA and remote HPNA media adapter may best be illustrated in the context of a typical voice communication across the DOCSIS HFC network. The table set forth in FIG. 60 illustrates the call flow for an outgoing call origination. In this example, the network is initially in an idle state. The MTA and CAS of the network gateway transmit a loop current feed (LCF) state indication to the remote media adapter that returns a loop open or on hook indication. The user initiates a communication by going off hook. The remote HPNA media adapter performs hook-switch monitoring on the local subscriber line interface (SLIC) and relays a loop closed, offhook state indication to the network gateway. The CAS logic detects an offhook state and forwards a detection event to the MTA. The MTA call client then instructs the GCP logic to generate an off hook signal. The GCP logic generates an off hook signal which is forwarded to the MTA call client and transmitted out the QoS service logic to the call management server via the DOCSIS MAC and upstream modulator of the network gateway and the CMTS. The call management server typically would transmit a return signal via the CMTS, DOCSIS MAC and downstream demodulator of the network gateway to the MTA call client via the QoS service logic. The MTA call client preferably forwards that signal to the GCP logic that decodes the signal, typically play dial tone. The GCP logic would then signal the MTA call client to play dial tone. The MTA call client then sends a command to the remote media adapter via the VOHN interface and HPNA MAC/PHY to play dial tone. The user then hears a dial tone.

Upon hearing a dial tone a user will then typically dial a number. The remote HPNA media adapter includes a DTMF detector that detects the dialed digits and generates DTMF tone on and tone off events that are forwarded to the MTA call client as events via the HPNA PHY/MAC and the VOHN interface. The MTA call client forwards the event to the GCP logic that encodes the dialed digits into a signaling message which is returned to the MTA call client. The MTA call client transmits the signaling message out the QoS service logic to the call management server via the DOCSIS MAC and upstream modulator of the network gateway and the CMTS. The call management server would then instruct a called party MTA to generate a ring to the called number. If the call is answered by going offhook, the CAS of the called MTA would detect an offhook condition and signal the call management server. The call management server then instructs the MTA call client via the CMTS, and downstream demodulator, DOCSIS MAC and QoS service logic of the network gateway to establish a voice connection with a given set of features, i.e. use echo cancellation, and silence suppression, use given coder etc. In addition, the MTA call client is given the IP address of the called party, to which the RTP voice packets should be sent. The MTA call client forwards the received message to the GCP logic that decodes the received message. The GCP logic generates attribute instructions for the remote HPNA media adapter such as, for example, encoding method, use of echo cancellation, security parameters, etc. which are communicated to the remote media adapter via the MTA call client, the VOHN interface and the HPNA MAC/PHY.

Voice packets are then exchanged. For example, if the calling party speaks, the remote HPNA media adapter would process the voice and forward voice packets to the MTA call client via HPNA PHY/MAC and the VOHN interface. The MTA call client forwards those voice packets to the RTP logic that converts the packet from a protocol independent packet format to the RTP format. The RTP voice packets are then returned to the MTA which transmits the RTP voice packet to the CMTS via the QoS service logic and the DOCSIS MAC and upstream demodulator of the network gateway. The voice packets are then routed to the called party. Similarly, voice packets from the called party are communicated to the MTA of the call client via the QoS service logic. The MTA call client forwards the RTP voice packets to the RTP logic that converts the packet from the RTP format to the protocol independent packet format. The protocol independent voice packets are returned to the MTA call client that forwards them to the VOHN interface. The remote HPNA media adapter decodes the packets and communicates a digital stream to the called party. Voice exchange would continue in a similar manner until an on hook condition is detected by either the calling or called party. The CAS would then forward an on hook detection event to its respective MTA. The MTA instructs the GCP logic to generate a hook detection signaling message that is returned to the MTA and forwarded to the call management server. The call management server generates a request to each MTA to terminate the voice connection. Each MTA would forward the request to their respective GCP logic that instructs the remote HPNA media adapters to disable their respective voice encoders via the MTA, VOHN interface and HPNA MAC/PHY.

Telephony calls in the other direction are similarly processed. For example, the call management server instructs the MTA called client to ring a dialed number. The MTA called client instructs the GCP logic to generate a command to ring the dialed number. The command is then forwarded to the CAS via the MTA called client. The CAS generates a ring signal and forwards that signal to the VOHN interface for communication across the network to the remote HPNA media adapter. The MTA called client may also instruct the GCP logic to present call ID that preferably generates a command for the remote HPNA media adapter to present caller ID. If the user picks up the phone the CAS would detect an off hook condition and signal an off hook event back to the MTA. The MTA called client then instructs the GCP logic to create an offhook detection signaling message, which when created is returned to the MTA and forwarded to the external call management server via the QoS service logic, DOCSIS MAC and upstream modulator of the network gateway and the CMTS. A communication channel would again be established with a given set of attributes as previously described.

In the described exemplary embodiment, the network gateway transmits CAS and CLASS payload frames to a multicast MAC destination address that is associated with the line termination. In this way, ringing and caller ID messages are distributed to each remote HPNA media adapter bound to the line. In the described exemplary embodiment, the network gateway is responsible for timing of state transitions on the remote HPNA media adapter loop interface. The network gateway generates ring signal cadence and by timing ringer on and ringer off events and manages ring-trip removal. It is responsible for managing the timing between CAS state events and CLASS messages for on-hook and off-hook CLASS services, according to Bellcore GR-30. It is responsible for meeting for the ring-trip removal delay requirement. The Proxy Gateway performs hook-switch event detection based on the timing of hook-switch events reported from the Media Adapter according to Bellcore GR-506. The Proxy Gateway is able to determine off-hook, on-hook and hook-flash events and report those events to the upstream telephony service.

In the described exemplary embodiment, the network gateway may also transmit test payloads to remote HPNA media adapters to perform loop test and diagnostic functions on the line termination handled by the remote media adapter. For example, a ping request payload requests that the receiving media adapter respond with a ping response payload containing the same payload data field as the request. An analog loopback payload requests that the receiving remote media adapter perform an analog loopback (i.e. as close to the SLIC interface as possible). In the analog loopback test, subsequent voice payloads received should be played out (D/A conversion) and re-encoded (A/D conversion) for transmission upstream. A digital loopback payload requests that the receiving remote media adapter perform a digital loopback. Subsequent voice payloads received should be echoed back unchanged for transmission upstream.

Referring to FIG. 61 the described exemplary host application programming interface (HAPI) provides a software messaging interface between the MTA call client 6200 and the voice and data processor DSP. The HAPI 6210 facilitates the issuing of commands from the MIPS core via the MTA call client to the voice and data processor DSP as well the sending of events from the DSP to the MTA call client 6200. The HAPI interface 6210 can be scalable to support multiple channels as well as multiple DSPs. In addition the HAPI interface 6210 is a thread safe environment, providing multi-threading capability to support multiple channels. Multi-threading provides multiple, simultaneously executing "threads" within a single application. The benefit of a multi-threaded application is similar to that of a multi-tasked operating system, the application may perform multiple tasks by using separate threads.

In the described exemplary HAPI, an application programming interface (API) 7060 receives commands from and issues responses to the MTA call client 6200. The API 7060 processes incoming packets adding an additional header word to identify the channel that should process the packet as well as other processing parameters such as for example, packet type (i.e. voice or fax), packet length, etc. The API forwards processed API messages 7060(a) to a physical interface (firmware layer) 7080 that interfaces with the host port of the DSP underlying the voice and data processor so as to isolate the MTA call client software and the signal processing software from the underlying hardware. This methodology allows the software to be ported to various hardware platforms by porting only the hardware interface portions of the HAPI interface to the target hardware. The physical interface 7080 formats the message in accordance with the underlying DSP and forwards or transmits the message to the telephony algorithms executing on the DSP.

Similarly, the underlying DSP forwards processed packets, such as, for example, encoded voice packets, to the physical interface 7080. The physical interface 7080 preferably reformats the response into an API message. When a processed packet is forwarded to the physical interface 7080 the underlying DSP also interrupts an APITask Thread 7100 that retrieves the processed API messages from the physical interface 7080. The APITask Thread 7100 determines whether the API message is an event such as, for example, a voice or fax packet or a DTMF detection which are forwarded directly to the MTA call client 7100(a), or a response to a command/request from the MTA call client. For example, the MTA call client may command the voice and data processor to turn off the echo canceller. Such a command is preferably processed by the API interface 7060 to add the appropriate header word and forwarded to the physical interface 7080. The physical interface 7080 formats the message in accordance with the underlying DSP and issues the command to the underlying voice channel to turn off the echo canceller.

When the command has been complied with, a response is returned from the underlying DSP to the physical interface 7080. The physical interface 7080 formats the response into an API message and forwards it to the APITask thread 7100 which then forwards it as an API response to the API interface 7060. The API interface 7060 correlates the API responses received from the APITask thread 7100 to the corresponding command/request that prompted the response and forwards a HAPI response to the MTA call client 6200.

The operation of an exemplary embedded MTA and the voice and data processor may best be illustrated in the context of a typical voice communication across the DOCSIS HFC network. The user initiates a communication by going off hook. The CAS detects the off hook condition from the SLIC and sends an off hook event to the MTA call client. The MTA call client then instructs the GCP logic to generate a off hook signal. The GCP logic generates an off hook signal which is forwarded to the MTA call client and transmitted out the QoS service logic to the call management server via the DOCSIS MAC and upstream modulator of the network gateway and the CMTS. The call management server typically would transmit a return signal via the CMTS, DOCSIS MAC and downstream demodulator of the network gateway to the MTA call client via the QoS service logic. The MTA call client preferably forwards that signal to the GCP logic that decodes the signal, typically play dial tone. The GCP logic would then signal the MTA call client to play dial tone. The MTA call client then sends a command to the voice and data processor via the HAPI interface to play dial tone. The user then hears a dial tone.

Upon hearing a dial tone a user will typically dial a number. The voice and data processor includes a DTMF detector which detects the dialed digits and forwards the detected digits to the MTA call client as events via the HAPI interface. The MTA call client forwards the event to the GCP logic that encodes the dialed digits into a signaling message that is returned to the MTA call client. The MTA call client transmits the signaling message out the QoS service logic to the call management server via the DOCSIS MAC and upstream modulator of the network gateway and the CMTS. The call management server would then instruct a called party MTA to generate a ring to the called number. If the called number answers by going off hook, the CAS of the called MTA would detect an off hook condition and signal the call management server. The call management server then instructs the MTA call client via the CMTS, and downstream demodulator, DOCSIS MAC and QoS service logic of the network gateway, to establish a voice connection with a given set of features, i.e. use echo cancellation, and silence suppression, use given coder etc. In addition, the MTA call client is given the IP address of the called party to which the RTP voice packets should be sent. The MTA call client forwards the received message to the GCP logic that decodes the received message. The GCP logic generates attribute instructions for the voice and data processor such as, for example, encoding method, use of echo cancellation, security parameters, etc. that are communicated to the voice and data processor via the MTA call client and the HAPI interface.

Voice packets are then exchanged. For example, if the calling party speaks, the voice and data processor would process the voice and forward voice packets to the MTA call client via the HAPI interface. The MTA call client forwards the voice packet to the RTP logic that converts the packet from a protocol independent packet format to the RTP format. The RTP voice packets are then returned to the MTA which transmits the RTP voice packet to the CMTS via the QoS service logic and the DOCSIS MAC and upstream demodulator of the network gateway. The voice packets are then routed to the called party. Similarly, voice packets from the called party are communicated to the MTA of the call client via the QoS service logic. The MTA call client forwards the RTP voice packets to the RTP logic that converts the packet from the RTP format to the protocol independent packet format. The protocol independent voice packets are returned to the MTA call client that forwards them to the voice and data processor via the HAPI interface. The voice and data processor decodes the packets and communicates a digital stream to the called party. Voice exchange would continue in a similar manner until an on hook condition is detected by either the calling or called party. The CAS would then forward an on hook detection event to its respective MTA. The MTA instructs the GCP logic to generate a hook detection signaling message which is returned to the MTA and forwarded to the call management server. The call management server generates a request to play (dial tone, silence or receiver off hook) which is forwarded to the opposite MTA. The MTA would forward the request to the GCP logic which would then instruct the voice and data processor to play dial tone via the MTA and HAPI interface.

Telephony calls in the other direction are similarly processed. For example, the call management server instructs the MTA called client to ring a dialed number. The MTA called client instructs the GCP logic to generate a command to ring the dialed number. The command is then forwarded to the CAS via the MTA called client. The CAS generates a ring signal and forwards that signal to the SLIC that then rings the called telephony device. The MTA called client may also instruct the GCP logic to present call ID that preferably generates a command for the voice and data processor to present caller ID. If the user picks up the phone, the CAS would detect an off hook condition and signal an off hook event back to the MTA. The MTA called client instructs the GCP logic to create an off hook detection signaling message, which when created is returned to the MTA and forwarded to the external call management server via the QoS service logic, DOCSIS MAC and upstream modulator of the network gateway and the CMTS. A communication channel would again be established with a given set of attributes as previously described.

Referring to FIG. 62, the described exemplary channel associated signaling (CAS) logic 6320 utilizes a foreign exchange office (FXO) interface to provide exchange of commands and detection of events between the MTA call client 6200 and standard commercial analog loop/ground start devices such as, for example, plain old telephone sets (POTS), group three facsimiles, modems, answering machine or other similar devices. The CAS logic 6320 can operate in switch mode, such that ABCD bits 7120 are terminated within the CAS logic. The MTA call client interfaces with the CAS logic through high level commands 7140 and events 7160. For example, if the CAS logic detects a phone going off the hook, a detection event is forwarded to the MTA call client 6200 which may then notify the call management server as previously described. The MTA call client is also able to issue high level commands to the CAS logic.

For example, to ring a phone coupled to the network gateway via the voice and data processor, the MTA call client 6200 sends a ring generation profile to the CAS logic. The CAS logic reformats the command into raw CAS bits by FXO termination logic 7200 to control the external interface via a hardware abstraction layer (HAL) 7220. The HAL 7220 provides a physical interface to the connected SLIC. The HAL 7220 formats message signals in accordance with the underlying SLIC and forwards or transmits the message signal to the connected telephony device via the SLIC 7240.

Ringing a telephony device via the HPNA network proceeds similarly, wherein raw CAS bits generated by the FXO termination logic are forwarded to the remote HPNA media adapter 6120 via the HPNA MAC/PHY 6160. Further, detected events, signaled from the hardware SLIC 7240 or the remote HPNA media adapter 6120, including on/off hook, flash hook and potentially pulse dial, are returned to the FXO termination logic 7200 from the hardware abstraction layer or HPNA MAC/PHY 6160 respectively as raw CAS bits.

The FXO termination logic 7200 preferably verifies the integrity of the detected event and forwards a detected event message to the MTA call client. The FXO termination logic 7200 includes a state machine that monitors detected events signaled from the SLIC 7240 via the hardware abstraction layer 7220 or the HPNA remote media adapter 6120 via the HPNA MAC/PHY 6160. The FXO termination logic 7200 qualifies detected events to determine if a valid on/off hook, flash hook or pulse dial has been detected. The FXO termination logic analyzes the period of the received signal to determine valid flash hook or pulse dial conditions. Similarly, the FXO termination logic 7200 includes a state machine that is associated with the ringing of connected phones. When the MTA call client issues a command to ring a connected phone with a pre-defined cadence, the associated FXO termination state machine will ring the connected phone in accordance with the MTA command.

b. Voice and Data Processor

The described exemplary voice and data processor is preferably implemented with a programmable DSP software architecture (see FIG. 54). The programmable DSP 6000 is effectively hidden within the embedded communications software layer. The software layer binds all core DSP algorithms together, interfaces the DSP hardware to the host, and provides low level services such as the allocation of resources to allow higher level software programs to run. An exemplary multi-layer software architecture loaded into the program memory 6002 for execution on the DSP platform is shown in FIG. 63. The MTA call client 6200 provides overall executive control and system management, and directly interfaces a DSP server 7300 to the host MIPS core (see to FIG. 3). The DSP server 7300 provides DSP resource management and telecommunications signal processing. Operating below the DSP server layer are a number of physical devices (PXD)

7320*a*, 7320*b*, 7320*c*. Each PXD provides an interface between the DSP server 7300 and an external telephony device (not shown) via a hardware abstraction layer (HAL) 7340.

The DSP server 7300 includes a resource manager 7360 which receives commands from, forwards events to, and exchanges data with the MTA call client 6200. An application programming interface 7380 (API) provides a software interface between the user MTA call client 6200 and the resource manager 7360. The resource manager 7360 manages the internal/external program and data memory of the DSP 6000. In addition the resource manager dynamically allocates DSP resources, performs command routing as well as other general purpose functions.

The DSP server 7300 also includes virtual device drivers (VHDs) 7400*a*, 7400*b*, 7400*c*. The VHDs are a collection of software objects that control the operation of and provide the facility for real time signal processing. Each VHD 7400*a*, 7400*b*, 7400*c* includes an inbound and outbound media queue (not shown) and a library of signal processing services specific to that VHD 7400*a*, 7400*b*, 7400*c*. In the described exemplary embodiment, each VHD 7400*a*, 7400*b*, 7400*c* is a complete self-contained software module for processing a single channel with a number of different telephony devices. Multiple channel capability can be achieved by adding VHDs to the DSP server 7300. The resource manager 7360 dynamically controls the creation and deletion of VHDs and services.

A switchboard 7420 in the DSP server 7300 dynamically inter-connects the PXDs 7320*a*, 7320*b*, 7320*c* with the VHDs 7400*a*, 7400*b*, 7400*c*. Each PXD 7320*a*, 7320*b*, 7320*c* is a collection of software objects which provide signal conditioning for one external telephony device. For example, a PXD may provide volume and gain control for signals from a telephony device prior to communication with the switchboard 7420. Multiple telephony functionalities can be supported on a single channel by connecting multiple PXDs, one for each telephony device, to a single VHD via the switchboard 7420. Connections within the switchboard 7420 are managed by the user application layer 7380 via a set of API commands to the resource manager 7360. The number of PXDs and VHDs is expandable, and limited only by the memory size and the MIPS (millions instructions per second) of the underlying hardware.

A hardware abstraction layer (HAL) 7340 interfaces directly with the underlying DSP 6000 hardware (see FIG. 55) and exchanges telephony signals between the external telephony devices and the PXDs. The HAL 7340 includes basic hardware interface routines, including DSP initialization, target hardware control, codec sampling, and hardware control interface routines. The DSP initialization routine is invoked by the user application layer 7380 to initiate the initialization of the signal processing system. The DSP initialization sets up the internal registers of the signal processing system for memory organization, interrupt handling, timer initialization, and DSP configuration. Target hardware initialization involves the initialization of all hardware devices and circuits external to the signal processing system. The HAL 7340 is a physical firmware layer that isolates the communications software from the underlying hardware. This methodology allows the communications software to be ported to various hardware platforms by porting only the affected portions of the HAL 7340 to the target hardware.

The exemplary software architecture described above can be integrated into numerous telecommunications products. In an exemplary embodiment, the software architecture is designed to support telephony signals between telephony devices (and/or circuit switched networks) and packet based networks. A network VHD (NetVHD) is used to provide a single channel of operation and provide the signal processing services for transparently managing voice, fax, and modem data across a variety of packet based networks. More particularly, the NetVHD encodes and packetizes DTMF, voice, fax, and modem data received from various telephony devices and/or circuit switched networks and transmits the packets to the user application layer. In addition, the Net VHD disassembles DTMF, voice, fax, and modem data from the user application layer, decodes the packets into signals, and transmits the signals to the circuit switched network or device.

An exemplary embodiment of the NetVHD operating in the described software architecture is shown in FIG. 64. The NetVHD includes four operational modes, namely voice mode 7500, voiceband data mode 7520, fax relay mode 7540, and data relay mode 7560. In each operational mode, the resource manager invokes various services. For example, in the voice mode 7500, the resource manager invokes call discrimination 7580, packet voice exchange 7600, and packet tone exchange 7620. The packet voice exchange 7600 may employ numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (12/90)—40, 32, 24, 16 kbit/s Adaptive Differential Pulse Code Modulation (ADPCM)), G.729A 8 kbps (Annex A (11/96) to ITU Recommendation G.729—Coding of speech at 8 kbit/s using conjugate structure algebraic-code-excited linear-prediction (CS-ACELP)—Annex A: Reduced complexity 8 kbit/s CS-ACELP speech codec), and G.723 5.3/6.3 kbps (ITU Recommendation G.723.1 (03/96)—Dual rate coder for multimedia communications transmitting at 5.3 and 6.3 kbit/s). The contents of each of the foregoing ITU Recommendations are incorporated herein by reference as if set forth in full.

The packet voice exchange 7600 is common to both the voice mode 7500 and the voiceband data mode 7520. In the voiceband data mode 7520, the resource manager invokes the packet voice exchange 7600 for transparently exchanging data without modification (other than packetization) between the telephony device (or circuit switched network) and the packet based network. This is typically used for the exchange of fax and modem data when bandwidth concerns are minimal as an alternative to demodulation and remodulation. During the voiceband data mode 7520, the human speech detector service 7680 is also invoked by the resource manager. The human speech detector 7680 monitors the signal from the near end telephony device for speech. In the event that speech is detected by the human speech detector 7680, an event is forwarded to the resource manager which, in turn, causes the resource manager to terminate the human speech detector service 7680 and invoke the appropriate services for the voice mode 7500 (i.e., the call discriminator, the packet tone exchange, and the packet voice exchange).

In the fax relay mode 7540, the resource manager invokes a packet fax data exchange 7640 service. The packet fax exchange 7640 may employ various data pumps including, among others, V.17 which can operate up to 14,400 bits per second, V.29 which uses a 1700-Hz carrier that is varied in both phase and amplitude, resulting in 16 combinations of 8 phases and 4 amplitudes which can operate up to 9600 bits per second, and V.27ter which can operate up to 4800 bits per second. Likewise, the resource manager invokes a packet modem data exchange 7660 service in the data relay mode 7560. The packet modem data exchange 7660 may employ various data pumps including, among others, V.22bis/V.22 with data rates up to 2400 bits per second, V.32bis/V.32 which enables full-duplex transmission at 14,400 bits per second, and V.34 which operates up to 33,600 bits per second. The ITU Recommendations setting forth the standards for the foregoing data pumps are incorporated herein by reference as if set forth in full.

In the described exemplary embodiment, the user application layer does not need to manage any service directly. The user application layer manages the session using high-level commands directed to the NetVHD, which in turn directly runs the services. However, the user application layer can access more detailed parameters of any service if necessary to change, by way of example, default functions for any particular application.

In operation, the user application layer opens the NetVHD and connects it to the appropriate PXD. The user application then may configure various operational parameters of the NetVHD, including, among others, default voice compression (Linear, G.711, G.726, G.723.1, G.723.1A, G.729A, G.729B), fax data pump (Binary, V.17, V.29, V.27ter), and modem data pump (Binary, V.22bis, V.32bis, V.34). The user application layer then loads an appropriate signaling service (not shown) into the NetVHD, configures it and sets the NetVHD to the On-hook state.

In response to events from the signaling service (not shown) via a near end telephony device (hookswitch), or signal packets from the far end, the user application will set the NetVHD to the appropriate off-hook state, typically voice mode. In an exemplary embodiment, if the signaling service event is triggered by the near end telephony device, the packet tone exchange will generate dial tone. Once a DTMF tone is detected, the dial tone is terminated. The DTMF tones are packetized and forwarded to the user application layer for transmission on the packet based network. The packet tone exchange could also play ringing tone back to the near end telephony device (when a far end telephony device is being rung), and a busy tone if the far end telephony device is unavailable. Other tones may also be supported to indicate all circuits are busy, or an invalid sequence of DTMF digits were entered on the near end telephony device.

Once a connection is made between the near end and far end telephony devices, the call discriminator is responsible for differentiating between a voice and machine call by detecting the presence of a 2100 Hz. tone (as in the case when the telephony device is a fax or a modem), a 1100 Hz. tone or V.21 modulated high level data link control (HDLC) flags (as in the case when the telephony device is a fax). If a 1100 Hz. tone, or V.21 modulated HDLC flags are detected, a calling fax machine is recognized. The NetVHD then terminates the voice mode and invokes the packet fax exchange to process the call. If however, 2100 Hz tone is detected, the NetVHD terminates voice mode and invokes the packet data exchange.

The packet data exchange service further differentiates between a fax and modem by continuing to monitor the incoming signal for V.21 modulated HDLC flags, which if present, indicate that a fax connection is in progress. If HDLC flags are detected, the NetVHD terminates packet data exchange service and initiates packet fax exchange service. Otherwise, the packet data exchange service remains operative. In the absence of an 1100 or 2100 Hz. tone, or V.21 modulated HDLC flags the voice mode remains operative.

i. Voice Mode

Voice mode provides signal processing of voice signals. Voice mode enables the transmission of voice over a packet based system such as Voice over IP (VoIP, H.323), Voice over Frame Relay (VOFR, FRF-11), Voice Telephony over ATM (VTOA), or any other proprietary network. The voice mode should also permit voice to be carried over traditional media such as time division multiplex (TDM) networks and voice storage and playback systems.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery.

The services invoked by the network VHD in the voice mode and the associated PXD are shown schematically in FIG. 65. In the described exemplary embodiment, the PXD 8060 provides two way communication with a telephone or a circuit switched network, such as a PSTN line (e.g. DS0) carrying a 64 kb/s pulse code modulated (PCM) signal, i.e., digital voice samples.

The incoming PCM signal 8060a is initially processed by the PXD 8060 to remove far end echos. As the name implies, echo in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

An echo canceller 8070 is used to remove echos from far end speech present on the incoming PCM signal 8060a before routing the incoming PCM signal 8060a back to the far end user. The echo canceller 8070 samples an outgoing PCM signal 8060b from the far end user, filters it, and combines it with the incoming PCM signal 8060a. Preferably, the echo canceller 8070 is followed by a non-linear processor (NLP) 8072 which may mute the digital voice samples when far end speech is detected in the absence of near end speech. The echo canceller 8070 may also inject comfort noise which in the absence of near end speech may be roughly at the same level as the true background noise or at a fixed level.

After echo cancellation, the power level of the digital voice samples is normalized by an automatic gain control (AGC) 8074 to ensure that the conversation is of an acceptable loudness. Alternatively, the AGC can be performed before the echo canceller 8070, however, this approach would entail a more complex design because the gain would also have to be applied to the sampled outgoing PCM signal 8060b. In the described exemplary embodiment, the AGC 8074 is designed to adapt slowly, although it should adapt fairly quickly if overflow or clipping is detected. The AGC adaptation should be held fixed if the NLP 8072 is activated.

After AGC, the digital voice samples are placed in the media queue 8066 in the network VHD 8062 via the switchboard 8032'. In the voice mode, the network VHD 8062 invokes three services, namely call discrimination, packet voice exchange, and packet tone exchange. The call discriminator 8068 analyzes the digital voice samples from the media queue to determine whether a 2100 Hz, a 1100 Hz. tone or V.21 modulated HDLC flags are present. As described above with reference to FIG. 64, if either tone or HDLC flags are detected, the voice mode services are terminated and the appropriate service for fax or modem operation is initiated. In the absence of a 2100 Hz, a 1100 Hz. tone, or HDLC flags, the digital voice samples are coupled to the encoder system which includes a voice encoder 8082, a voice activity detector (VAD) 8080, a comfort noise estimator 8081, a DTMF detector 8076, a call progress tone detector 8077 and a packetization engine 8078.

Typical telephone conversations have as much as sixty percent silence or inactive content. Therefore, high bandwidth savings can be realized if digital voice samples are suppressed during these periods. The VAD 8080, operating under the packet voice exchange, is used to accomplish this function. The VAD 8080 attempts to detect digital voice samples that do not contain active speech. During periods of inactive speech, the comfort noise estimator 8081 couples silence identifier (SID) packets to the packetization engine 8078. The SID packets contain voice parameters that allow the reconstruction of the background noise at the far end.

From a system point of view, the VAD 8080 may be sensitive to the change in the NLP 8072. For example, when the NLP 8072 is activated, the VAD 8080 may immediately declare that voice is inactive. In that instance, the VAD 8080 may have problems tracking the true background noise level. If the echo canceller 8070 generates comfort noise during periods of inactive speech, it may have a different spectral characteristic from the true background noise. The VAD 8080 may detect a change in noise character when the NLP 8072 is activated (or deactivated) and declare the comfort noise as active speech. For these reasons, the VAD 8080 should be disabled when the NLP 8072 is activated. This is accomplished by a "NLP on" message 8072a passed from the NLP 8072 to the VAD 8080.

The voice encoder 8082, operating under the packet voice exchange, can be a straight 16 bit PCM encoder or any voice encoder which supports one or more of the standards promulgated by ITU. The encoded digital voice samples are formatted into a voice packet (or packets) by the packetization engine 8078. These voice packets are formatted according to an applications protocol and output to the host (not shown). In the described exemplary packet voice exchange, the voice encoder 8082 is invoked when digital voice samples with speech are detected by the VAD 8080. Since the packetization interval may be a multiple of an encoding interval, both the VAD 8080 and the packetization engine 8078 preferably cooperate to decide whether or not the voice encoder 8082 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 8080 passing an "active" flag 8080a to the packetization engine 8078, and the packetization engine 8078 controlling whether or not the voice encoder 8082 is invoked.

In the described exemplary embodiment, the VAD 8080 is applied after the AGC 8074. This approach provides optimal flexibility because both the VAD 8080 and the voice encoder 8082 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange, a DTMF detector 8076 determines whether or not there is a DTMF signal present at the near end. The DTMF detector 8076 also provides a pre-detection flag 8076a which indicates whether or not it is likely that the digital voice sample might be a portion of a DTMF signal. If so, the pre-detection flag 8076a is relayed to the packetization engine 8078 instructing it to begin holding voice packets. If the DTMF detector 8076 ultimately detects a DTMF signal, the voice packets are discarded, and the DTMF signal is coupled to the packetization engine 8078. Otherwise the voice packets are ultimately released from the packetization engine 8078 to the host (not shown). The benefit of this method is that there is only a temporary impact on voice packet delay when a DTMF signal is pre-detected in error, and not a constant buffering delay. In the described exemplary embodiment, the user application layer can adaptively control whether voice packets are held while the pre-detection flag 8076a is active.

Similarly, a call progress tone detector 8077 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 8077 monitors the call progress state, and forwards a call progress tone signal to the packetization engine to be packetized and transmitted across the packet based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 8062 essentially performs the inverse operation of the encoding system. The decoding system of the network VHD 8062 comprises a depacketizing engine 8084, a voice queue 8086, a DTMF queue 8088, a call progress tone queue 8087, a voice synchronizer 8090, a DTMF synchronizer 8102, a precision tone synchronizer 8103, a voice decoder 8096, a VAD 8098, a comfort noise estimator 8100, a comfort noise generator 8092, a lost packet recovery engine 8094, a tone generator 8104, and a call progress tone generator 8105.

The depacketizing engine 8084 identifies the type of packets received from the host (i.e., voice packet, DTMF packet, call progress tone packet, SID packet), transforms them into frames which are protocol independent. The depacketizing engine 8084 then transfers the voice frames (or voice parameters in the case of SID packets) into the voice queue 8086, transfers the DTMF frames into the DTMF queue 8088 and transfers the call progress tones into the call progress tone queue 8087. In this manner, the remaining tasks are, by and large, protocol independent.

A jitter buffer is utilized to compensate for network impairments such as delay jitter caused by packets not arriving at the same time or in the same order in which they were transmitted. In addition, the jitter buffer compensates for lost packets that occur on occasion when the network is heavily congested. In the described exemplary embodiment, the jitter buffer for voice includes a voice synchronizer 8090 that operates in conjunction with a voice queue 8086 to provide an isochronous stream of voice frames to the voice decoder 8096.

Sequence numbers embedded into the voice packets at the far end can be used to detect lost packets, packets arriving out of order, and short silence periods. The voice synchronizer 8090 can analyze the sequence numbers, enabling the comfort noise generator 8092 during short silence periods and performing voice frame repeats via the lost packet recovery engine 8094 when voice packets are lost. SID packets can also be used as an indicator of silent periods causing the voice synchronizer 8090 to enable the comfort noise generator 8092. Otherwise, during far end active speech, the voice synchronizer 8090 couples voice frames from the voice queue 8086 in an isochronous stream to the voice decoder 8096. The voice decoder 8096 decodes the voice frames into digital voice samples suitable for transmission on a circuit switched network, such as a 64 kb/s PCM signal for a PSTN line. The output of the voice decoder 8096 (or the comfort noise generator 8092 or lost packet recovery engine 8094 if enabled) is written into a media queue 8106 for transmission to the PXD 8060.

The comfort noise generator 8092 provides background noise to the near end user during silent periods. If the protocol supports SID packets, (and these are supported for example by VTOA, and VoIP), the comfort noise estimator at the far end encoding system should transmit SID packets. Then, the background noise can be reconstructed by the near end comfort noise generator 8092 from the voice parameters in the SID packets buffered in the voice queue 8086. However, for some protocols, namely, FRF-11, the SID packets are optional, and other far end users may not support SID packets at all. In these systems, the voice synchronizer 8090 must continue to operate properly. In the absence of SID packets, the voice parameters of the background noise at the far end can be determined by running the VAD 8098 at the voice decoder 8096 in series with a comfort noise estimator 8100.

Preferably, the voice synchronizer 8090 is not dependent upon sequence numbers embedded in the voice packet. The voice synchronizer 8090 can invoke a number of mechanisms to compensate for delay jitter in these systems. For example, the voice synchronizer 8090 can assume that the voice queue 8086 is in an underflow condition due to excess jitter and perform packet repeats by enabling the lost frame recovery engine 8094. Alternatively, the VAD 8098 at the voice decoder 8096 can be used to estimate whether or not the underflow of the voice queue 8086 was due to the onset of a silence period or due to packet loss. In this instance, the spectrum and/or the energy of the digital voice samples can be estimated and the result 8098a fed back to the voice synchronizer 8090. The voice synchronizer 8090 can then invoke the lost packet recovery engine 8094 during voice packet losses and the comfort noise generator 8092 during silent periods.

When DTMF packets arrive, they are depacketized by the depacketizing engine 8084. DTMF frames at the output of the depacketizing engine 8084 are written into the DTMF queue 8088. The DTMF synchronizer 8102 couples the DTMF frames from the DTMF queue 8088 to the tone generator 8104. Much like the voice synchronizer, the DTMF synchronizer 8102 is employed to provide an isochronous stream of DTMF frames to the tone generator 8104. Generally speaking, when DTMF packets are being transferred, voice frames should be suppressed. To some extent, this is protocol dependent. However, the capability to flush the voice queue 8086 to ensure that the voice frames do not interfere with DTMF generation is desirable. Essentially, old voice frames that may be queued are discarded when DTMF packets arrive. This ensures that there is a significant inter-digit gap before DTMF tones are generated. This is achieved by a "tone present" message 8088a passed between the DTMF queue and the voice synchronizer 8090.

The tone generator 8104 converts the DTMF signals into a DTMF tone suitable for a standard digital or analog telephone. The tone generator 8104 overwrites the media queue 8106 to prevent leakage through the voice path and to ensure that the DTMF tones are not too noisy.

There is also a possibility that DTMF tone may be fed back as an echo into the DTMF detector 8076. To prevent false detection, the DTMF detector 8076 can be disabled entirely (or disabled only for the digit being generated) during DTMF tone generation. This is achieved by a "tone on" message 8104a passed between the tone generator 8104 and the DTMF detector 8076. Alternatively, the NLP 8072 can be activated while generating DTMF tones.

When call progress tone packets arrive, they are depacketized by the depacketizing engine 8084. Call progress tone frames at the output of the depacketizing engine 8084 are written into the call progress tone queue 8087. The call progress tone synchronizer 8103 couples the call progress tone frames from the call progress tone queue 8087 to a call progress tone generator 8105. Much like the DTMF synchronizer, the call progress tone synchronizer 8103 is employed to provide an isochronous stream of call progress tone frames to the call progress tone generator 8105. And much like the DTMF tone generator, when call progress tone packets are being transferred, voice frames should be suppressed. To some extent, this is protocol dependent. However, the capability to flush the voice queue 8086 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 8087a passed between the call progress tone queue 8087 and the voice synchronizer 8090.

The call progress tone generator 8105 converts the call progress tone signals into a call progress tone suitable for a standard digital or analog telephone. The call progress tone generator 8105 overwrites the media queue 8106 to prevent leakage through the voice path and to ensure that the call progress tones are not too noisy.

The outgoing PCM signal in the media queue 8106 is coupled to the PXD 8060 via the switchboard 8032'. The outgoing PCM signal is coupled to an amplifier 8108 before being outputted on the PCM output line 8060b.

An exemplary voice signal processor is disclosed U.S. patent application Ser. No. 09/522,185, entitled "Voice and Data Exchange Over a Packet Based Network," the contents of which is hereby incorporated by reference as though fully set forth herein.

ii. Fax Relay Mode

Fax relay mode provides signal processing of fax signals. Fax relay mode enables the transmission of fax signals over a packet based system such as VoIP, VoFR, FRF-11, VTOA, or any other proprietary network. For the purposes of explanation, a first fax machine is called a sending fax that is connected to the sending network gateway through a PSTN. The sending network gateway is connected to a CMTS via a HFC network. Additional fax machines may be on line connections coupled to the other end of the CMTS via a network gateway and a HFC network, or off line connections, coupled to the CMTS for example by a telephone network gateway and a PSTN.

The transfer of fax signals over packet based networks may be accomplished by at least three alternative methods. In the first method, fax data signals are exchanged in real time. Typically, the sending and receiving fax machines are spoofed to allow transmission delays plus jitter of up to about 1.2 seconds. The second, store and forward mode, is a non real time method of transferring fax data signals. Typically, the fax communication is transacted locally, stored into memory and transmitted to the destination fax machine at a subsequent time. The third mode is a combination of store and forward mode with minimal spoofing to provide an approximate emulation of a typical fax connection.

In the fax relay mode, the network VHD invokes the packet fax data exchange. The packet fax data exchange provides demodulation and re-modulation of fax data signals. This approach results in considerable bandwidth savings since only the underlying unmodulated data signals are transmitted across the packet based network. The packet fax data exchange also provides compensation for network jitter with a jitter buffer similar to that invoked in the packet voice exchange. Additionally, the packet fax data exchange compensates for lost data packets with error correction processing. Spoofing may also be provided during various stages of the procedure between the fax machines to keep the connection alive.

The packet fax data exchange is divided into two basic functional units, a demodulation system and a re-modulation system. In the demodulation system, the network VHD couples fax data signals from a circuit switched network, or a fax machine, to the packet based network. In the re-modulation system, the network VHD couples fax data signals from the packet network to the switched circuit network, or a fax machine directly.

During real time relay of fax data signals over a packet based network, the sending and receiving fax machines are spoofed to accommodate network delays plus jitter. Typically, the packet fax data exchange can accommodate a total delay of up to about 1.2 seconds. Preferably, the packet fax data exchange supports error correction mode (ECM) relay functionality, although a full ECM implementation is typically not required. In addition, the packet fax data exchange should preferably preserve the typical call duration required for a fax session over a PSTN/ISDN when exchanging fax data signals between two terminals.

The packet fax data exchange for the real time exchange of fax data signals between a circuit switched network and a packet based network is shown schematically in FIG. 66. In this exemplary embodiment, a connecting PXD (not shown) connecting the fax machine to the switch board 8032' is transparent, although those skilled in the art will appreciate that various signal conditioning algorithms could be programmed into PXD such as echo cancellation and gain.

After the PXD (not shown), the incoming fax data signal 8390a is coupled to the demodulation system of the packet fax data exchange operating in the network VHD via the switchboard 8032'. The incoming fax data signal 8390a is received and buffered in an ingress media queue 8390. A V.21 data pump 8392 demodulates incoming T.30 message so that T.30 relay logic 8394 can decode the received T.30 messages 8394a. Local T.30 indications 8394b are packetized by a packetization engine 8396 and if required, translated into T.38 packets via a T.38 shim 8398 for transmission to a T.38 compliant remote network gateway (not shown) across the packet based network. The V.21 data pump 8392 is selectively enabled/disabled 8394c by the T.30 relay logic 8394 in accordance with the reception/transmission of the T.30 messages or fax data signals. The V.21 data pump 8392 is common to the demodulation and re-modulation system. The V.21 data pump 8392 communicates T.30 messages such as for example called station tone (CED) and calling station tone (CNG) to support fax setup between a local fax device (not shown) and a remote fax device (not shown) via the remote network gateway.

The demodulation system further includes a receive fax data pump 8400 which demodulates the fax data signals during the data transfer phase. In the described exemplary embodiment, the receive fax data pump 8400 supports the V.27ter standard for fax data signal transfer at 2400/4800 bps, the V.29 standard for fax data signal transfer at 7200/9600 bps, as well as the V.17 standard for fax data signal transfer at 7200/9600/12000/14400 bps. The V.34 fax standard, once approved, may also be supported. The T.30 relay logic 8394 enables/disables 8394d the receive fax data pump 8400 in accordance with the reception of fax data signals or T.30 messages.

If error correction mode (ECM) is required, receive ECM relay logic 8402 performs high level data link control (HDLC) de-framing, including bit de-stuffing and preamble removal on ECM frames contained in the data packets. The resulting fax data signals are then packetized by the packetization engine 8396 and communicated across the packet based network. The T.30 relay logic 8394 selectively enables/disables 8394e the receive ECM relay logic 8402 in accordance with the error correction mode of operation.

In the re-modulation system, if required, incoming data packets are first translated from a T.38 packet format to a protocol independent format by the T.38 packet shim 8398. The data packets are then de-packetized by a depacketizing engine 8406. The data packets may contain T.30 messages or fax data signals. The T.30 relay logic 8394 reformats the remote T.30 indications 8394f and forwards the resulting T.30 indications to the V.21 data pump 8392. The modulated output of the V.21 data pump 8392 is forwarded to an egress media queue 8408 for transmission in either analog format or after suitable conversion, as 64 kbps PCM samples to the local fax device over a circuit switched network, such as for example a PSTN line.

De-packetized fax data signals are transferred from the depacketizing engine 8406 to a jitter buffer 8410. If error correction mode (ECM) is required, transmitting ECM relay logic 8412 performs HDLC de-framing, including bit stuffing and preamble addition on ECM frames. The transmitting ECM relay logic 8412 forwards the fax data signals, (in the appropriate format) to a transmit fax data pump 8414 which modulates the fax data signals and outputs 8 KHz digital samples to the egress media queue 8408. The T.30 relay logic 8394 selectively enables/disables (8394g) the transmit ECM relay logic 8412 in accordance with the error correction mode of operation.

In the described exemplary embodiment, the transmit fax data pump 8414 supports the V.27ter standard for fax data signal transfer at 2400/4800 bps, the V.29 standard for fax data signal transfer at 7200/9600 bps, as well as the V.17 standard for fax data signal transfer at 7200/9600/12000/14400 bps. The T.30 relay logic selectively enables/disables (8394h) the transmit fax data pump 8414 in accordance with the transmission of the fax data signals or the T.30 message samples.

If the jitter buffer 8410 underflows, a buffer low indication 8410a is coupled to spoofing logic 8416. Upon receipt of a buffer low indication during the transmission of a fax data signal, the spoofing logic 8416 inserts "spoofed data" at the appropriate place in the fax data signals via the transmit fax data pump 8414 until the jitter buffer 8410 is filled to a pre-determined level, at which time the fax data signals are transferred out of the jitter buffer 8410. Similarly, during the transmission of T.30 message indications, the spoofing logic 8416 can insert "spoofed data" at the appropriate place in the T.30 message samples via the V.21 data pump 8392.

An exemplary fax relay is disclosed U.S. patent application Ser. No. 09/522,185, entitled "Voice and Data Exchange Over a Packet Based Network," the contents of which has been previously incorporated herein by reference.

iii. Data Relay Mode

Data relay mode provides full duplex signal processing of data signals. Data relay mode enables the transmission of data signals over a packet based system such as VoIP, VoFR, FRF-11, VTOA, or any other proprietary network. The data relay mode should also permit data signals to be carried over traditional media such as TDM. Network gateways, support the exchange of data signals other network gateways via a HFC network and CMTS or off line devices via for example a circuit switched network such as the PSTN. For the purposes of explanation, the first modem is referred to as a call modem. Far end modems are typically called answer modems.

In data relay mode, a local modem connection is established on each end of the packet based network. That is, the call modem and the call network gateway establish a local modem connection, as does the destination answer modem and its respective answer network gateway. Next, data signals are relayed across the packet based network. The call network gateway demodulates the data signal and formats the demodulated data signal for the particular packet based network. The answer network gateway compensates for network impairments and remodulates the encoded data in a format suitable for the destination answer modem. This approach results in considerable bandwidth savings since only the underlying demodulated data signals are transmitted across the packet based network.

In the data relay mode, the packet data modem exchange provides demodulation and modulation of data signals. With full duplex capability, both modulation and demodulation of data signals can be performed simultaneously. The packet data modem exchange also provides compensation for network jitter with a jitter buffer similar to that invoked in the packet voice exchange. Additionally, the packet data modem exchange compensates for system clock jitter between modems with a dynamic phase adjustment and resampling mechanism. Spoofing may also be provided during various stages of the call negotiation procedure between the modems to keep the connection alive.

The packet data modem exchange invoked by the network VHD in the data relay mode is shown schematically in FIG. 67. In the described exemplary embodiment, a connecting PXD (not shown) connecting a modem to the switch board 8032' is transparent, although those skilled in the art will appreciate that various signal conditioning algorithms could be programmed into the PXD such as filtering, echo cancellation and gain.

After the PXD, the data signals are coupled to the network VHD via the switchboard 8032'. The packet data modem exchange provides two way communication between a circuit switched network and packet based network with two basic functional units, a demodulation system and a remodulation system. In the demodulation system, the network VHD exchanges data signals from a circuit switched network, or a telephony device directly, to a packet based network. In the remodulation system, the network VHD exchanges data signals from the packet based network to the PSTN line, or the telephony device.

In the demodulation system, the data signals are received and buffered in an ingress media queue 8500. A data pump receiver 8504 demodulates the data signals from the ingress media queue 8500. In the described exemplary embodiment, the data pump receiver 8504 supports the V.22bis standard for the demodulation of data signals at 1200/2400 bps; the V.32bis standard for the demodulation of data signals at 4800/7200/9600/12000/14400 bps, as well as the V.34 standard for the demodulation of data signals up to 33600 bps. Moreover, the V.90 standard may also be supported. The demodulated data signals are then packetized by a packetization engine 8506 and transmitted across the packet based network.

In the remodulation system, packets of data signals from the packet based network are first depacketized by a depacketizing engine 8508 and stored in a jitter buffer 8510. A data pump transmitter 8512 modulates the buffered data signals with a voiceband carrier. The modulated data signals are in turn stored in an egress media queue 8514 before being output to the PXD (not shown) via the switchboard 8032'. In the described exemplary embodiment, the data pump transmitter 8512 supports the V.22bis standard for the transfer of data signals at 1200/2400 bps; the V.32bis standard for the transfer of data signals at 4800/7200/9600/12000/14400 bps, as well as the V.34 standard for the transfer of data signal up to 33600 bps. Moreover, the V.90 standard may also be supported.

During jitter buffer underflow, the jitter buffer 8510 sends a buffer low indication 8510*a* to spoofing logic 8516. When the spoofing logic 8516 receives the buffer low signal indicating that the jitter buffer 8510 is operating below a predetermined threshold level, it inserts spoofed data at the appropriate place in the data signal via the data pump transmitter 8512. Spoofing continues until the jitter buffer 8510 is filled to the predetermined threshold level, at which time data signals are again transferred from the jitter buffer 8510 to the data pump transmitter 8512.

End to end clock synchronization logic 8518 also monitors the state of the jitter buffer 8510. The clock synchronization logic 8518 controls the data transmission rate of the data pump transmitter 8512 in correspondence with the state of the jitter buffer 8510. When the jitter buffer 8510 is below a predetermined threshold level, the clock synchronization logic 8518 reduces the transmission rate of the data pump transmitter 8512. Likewise, when the jitter buffer 8510 is above a predetermined threshold level, the clock synchronization logic 8518 increases the transmission rate of the data pump transmitter 8512.

Before the transmission of data signals across the packet based network, the connection between the two modems must first be negotiated through a handshaking sequence. This entails a two-step process. First, a call negotiator 8502 determines the type of modem (i.e., V.22, V.32bis, V.34, V.90, etc.) connected to each end of the packet based network. Second, a rate negotiator 8520 negotiates the data signal transmission rate between the two modems.

The call negotiator 8502 determines the type of modem connected locally, as well as the type of modem connected remotely via the packet based network. In the described exemplary embodiment the call negotiator 8502 utilizes V.25 automatic answering procedures and V.8 auto-baud software to automatically detect modem capability. The call negotiator 8502 receives protocol indication signals 8502*a* (ANSam and V.8 menus) from the ingress media queue 8500, as well as AA, AC and other message indications 8502*b* from the local modem via a data pump state machine 8522, to determine the type of modem in use locally. The call negotiator 8502 relays the ANSam answer tones and other indications 8502*e* from the data pump state machine 8522 to the remote modem via a packetization engine 8506. The call negotiator also receives ANSam, AA, AC and other indications 8502*c* from a remote modem (not shown) located on the opposite end of the packet based network via a depacketizing engine 8508. The call negotiator 8502 relays ANSam answer tones and other indications 8502*d* to a local modem (not shown) via an egress media queue 8514 of the modulation system. With the ANSam, AA, AC and other indications from the local and remote modems, the call negotiator 8502 can then negotiate a common standard (i.e., V.22, V.32bis, V.34, V.90, etc.) in which the data pumps must communicate with the local modem and the remote modems.

The packet data modem exchange preferably utilizes indication packets as a means for communicating answer tones, AA, AC and other indication signals across the packet based network. However, the packet data modem exchange supports data pumps such as V.22bis and V.32bis which do not include a well defined error recovery mechanism, so that the modem connection may be terminated whenever indication packets are lost. Therefore, either the packet data modem exchange or the application layer should ensure proper delivery of indication packets when operating in a network environment that does not guarantee packet delivery.

The packet data modem exchange can ensure delivery of the indication packets by periodically retransmitting the indication packet until some expected packets are received. For example, in V.32bis relay, the call negotiator operating under the packet data modem exchange on the answer network gateway periodically retransmits ANSam answer tones from the answer modem to the call modem, until the calling modem connects to the line and transmits carrier state AA.

Alternatively, the packetization engine can embed the indication information directly into the packet header. In this approach, an alternate packet format is utilized to include the indication information. During modem handshaking, indication packets transmitted across the packet based network include the indication information, so that the system does not rely on the successful transmission of individual indication packets. Rather, if a given packet is lost, the next arriving packet contains the indication information in the packet header. Both methods increase the traffic across the network. However, it is preferable to periodically retransmit the indication packets because it has less of a detrimental impact on network traffic.

The rate negotiator 8520 synchronizes the connection rates at the network gateways. The rate negotiator receives rate control codes 8520a from the local modem via the data pump state machine 8522 and rate control codes 8520b from the remote modem via the depacketizing engine 8508. The rate negotiator 8520 also forwards the remote rate control codes 8520a received from the remote modem to the local modem via commands sent to the data pump state machine 8522. The rate negotiator 8520 forwards the local rate control codes 8520c received from the local modem to the remote modem via the packetization engine 8506. Based on the exchanged rate codes the rate negotiator 8520 establishes a common data rate between the calling and answering modems. During the data rate exchange procedure, the jitter buffer 8510 should be disabled by the rate negotiator 8520 to prevent data transmission between the call and answer modems until the data rates are successfully negotiated.

Similarly error control (V.42) and data compression (V.42bis) modes should be synchronized at each end of the packet based network. Error control logic 8524 receives local error control messages 8524a from the data pump receiver 8504 and forwards those V.14/V.42 negotiation messages 8524d to the remote modem via the packetization engine 8506. In addition, error control logic 8524 receives remote V.14/V.42 indications 8524b from the depacketizing engine 8508 and forwards those V.14/V.42 indications 8524c to the local modem. With the V.14/V.42 indications from the local and remote modems, the error control logic 8524 can negotiate a common standard to ensure that the network gateways utilize a common error protocol. In addition, error control logic 8524 communicates the negotiated error control protocol 8524(e) to the spoofing logic 8516 to ensure data mode spoofing is in accordance with the negotiated error control mode.

V.42 is a standard error correction technique using advanced cyclical redundancy checks and the principle of automatic repeat requests (ARQ). In accordance with the V.42 standard, transmitted data signals are grouped into blocks and cyclical redundancy calculations add error checking words to the transmitted data signal stream. The receiving modem calculates new error check information for the data signal block and compares the calculated information to the received error check information. If the codes match, the received data signals are valid and another transfer takes place. If the codes do not match, a transmission error has occurred and the receiving modem requests a repeat of the last data block. This repeat cycle continues until the entire data block has been received without error.

Various voiceband data modem standards exist for error correction and data compression. V.42bis and MNP5 are examples of data compression standards. The handshaking sequence for every modem standard is different so that the packet data modem exchange should support numerous data transmission standards as well as numerous error correction and data compression techniques.

An exemplary data relay is disclosed U.S. patent application Ser. No. 09/522,185, entitled "Voice and Data Exchange Over a Packet Based Network," the contents of which has been previously incorporated herein by reference.

9. Power Management

Traditional solutions for Internet and telephony service delivery over HFC networks require the installation of at least two different electronic devices in the subscribers' premises. The described exemplary network gateway provides a method for combining the functionality of these electronic devices into a single device that is capable of delivering both services at a reduced cost. For example, because the described exemplary network gateway combines many functions on a single device, a significant reduction in the number of required inputs/outputs (I/Os) may be achieved, which dramatically reduces the amount of power consumed.

However, coaxial cable in a HFC network may significantly attenuate a transmitted signal. Conventionally, amplifiers are spaced along the coaxial cable throughout a HFC network to provide necessary signal enhancement. Other active devices such as for example fiber nodes may also be present in an HFC network. Failure of the primary power source in such a system removes power from these active devices, effectively shutting down the HFC network. Such a network failure is unacceptable for voice over cable applications that require strict system availability. For example when lifeline telephony service is delivered, the service availability performance is specified to be greater than 99.999%. This availability translates to system outages of less than fifty two minutes per year.

Based on studies of the HFC plant availability, the largest single factor contributing to system unavailability is the power source. Therefore, standby power systems are typically utilized to provide auxiliary power to active network components as well as to certain customer premise equipment in the event of failure of the primary source of power. Standby power system typically utilize a mix of local power generators and batteries to provide lifeline services during commercial power outages. Following failure of the primary source, the standby system delivers power immediately to avoid disruption of service over the CATV network.

However, standby power systems that can operate in the face of a commercial power outage requires additional capitol investment for batteries and generators to operate the network when commercial power is not available. The capitol and incremental cost of this power and delivery equipment is largely proportional to the amount of power that must be delivered during the power outage. Therefore, to reduce the cost of maintaining a standby power system, service providers attempt to minimize the overall power load of equipment coupled to a HFC network.

An exemplary embodiment of the present invention therefore, includes a method to manage the power in a population of network gateways for the purpose of minimizing the total aggregate power requirement of the supplemental power source. The specific details of managing a single unit are presented. However, one of skill in the art will appreciate that the described exemplary power management technique is not limited to a single network gateway. Rather the described exemplary power management method may be used to manage the power of a plurality of network gateways so as to further reduce the supplemental power requirements of the network.

Given a population of network gateways coupled to an HFC system, individual network gateways may operate in any of a plurality of operational states. For example, a network gateway may be ready to deliver voice or data service but have no subscriber activity at a particular time, i.e. a ready but idle state. Alternatively, a network gateway may be delivering data services but no voice services or voice services but no data services. The power consumed by the network gateway when delivering voice services is proportional to the number of telephony circuits in use. In addition, the network gateway may also deliver both data and voice service simultaneously. The power consumed in this power state is also dependent upon the number of telephony circuits in use.

The operational states of the network gateway are listed in Table 2 in the order of increasing power consumption such that the simultaneous delivery of voice and data services results in the greatest power consumption. The total power delivered to the network is the sum of the power consumed by each element in the network. In the described exemplary power management system and method it is assumed that at any give time many of the units within a gateway population are in the lowest power active but idle state.

The described exemplary power management solution is transparent to the service management systems that control the operational behavior of the network gateway. However, information delivered by these systems may be used to minimize the total power consumed by the network gateway. For example, the DOCSIS registration process may identify the active ports used to deliver service to the subscriber. The information that identifies the active ports also identifies by inference which ports are not active. The inactive ports may be placed in a low power state. In addition, the DOCSIS protocol specifically requires that the network gateway be available at all times to respond to control messages issued by the CMTS. Further, the PacketCable protocol also includes numerous performance standards for responding to control messages. The described exemplary power management method preferably complies with the PacketCable performance requirements.

Referring to FIG. 68, the described exemplary power management method models the network gateway as a combination of its component parts. In operation, an exemplary power management system may dynamically control the power consumption of each component part of the power management model. The power consumption of the component parts may be modified in accordance with the occurrence of events that change the existing power state of the system and hence each part. The power management behavior of each of the component parts may be described in terms of one or more of the following:

Provisioned—Power Management resulting from data sent from the management system. In the described exemplary embodiment, the MIPS core may interpret messages such as for example, simple network management protocol (SNMP) messages, DOCSIS registration TLVs or other information to derive the appropriate power state for a particular interface. For example, in operation the network gateway may receive a message such as, for example, activate the HPNA interface. Conventionally the message does not provide a direct indication of the appropriate power state for that device. In the described embodiment the MIPS core may interpret this message to determine that a communication for a device coupled to the HPNA interface is forthcoming and that the HPNA interface needs to be in an active or high power state. In this instance, if the HPNA interface is inactive the MIPS core may communicate a signal to the HPNA interface to return it to full power. Similarly, if an interface is off and not being used the power management system may determine that the interface may be placed into a low power state.

State—One of the four previously described power states. In the described exemplary embodiment, some power states may have sub states. For example, the power level of the voice and data processor, the audio processor and the analog front end depend upon the actual number of telephony circuits that are active. For example, referring to Table 2 below the hook state of the individual telephony lines coupled to the network gateway, (four in this embodiment) dictate, in part at least, the power state of the voice and data processor, the audio processor and each of the ADC/DAC pairs in the analog front end.

TABLE 2

| Hook State | Voice and Data Processor | Audio Processor | ADC/DAC1 | ADC/DAC2 | ADC/DAC3 | ADC/DAC4 |
|---|---|---|---|---|---|---|
| All Lines On Hook | Low Power State | Low Power State | Low Power State | Low Power State | Low Power State | Low Power State |
| Line 1 Off Hook | Active | Active | Active | Low Power State | Low Power State | Low Power State |
| Line 2 Off Hook | Active | Active | Low Power State | Active | Low Power State | Low Power State |
| Line 3 Off Hook | Active | Active | Low Power State | Low Power State | Active | Low Power State |
| Line 4 Off Hook | Active | Active | Low Power State | Low Power State | Low Power State | Active |

Thus if each of the telephony lines coupled to the network gateway are on hook the voice and data processor, audio processor and each of the ADC/DAC coupled to the individual lines may be in a low power state. However, in the described exemplary embodiment, the voice and data processor and audio processor are placed into an active state if any one of the lines goes off hook. Similarly, the ADC/DAC pair coupled to an individual lines is commanded into an active state when its corresponding line goes off hook.

Cyclical—Recurring behavior may or may not be dependent on state. For example, in the described exemplary embodiment the MIPS core includes the ability to enter a low power state when all listed processing tasks are completed or a low processing load is occurring. This behavior is cyclical or recurring but at an irregular interval or cycle. In the described exemplary embodiment, the component part transitions to a low power state each time the cyclical condition exists, regardless of external activity.

It should be noted that in embodiments of the present invention, management of the system's clock rate may be utilized to implement one or more of the power management techniques described herein. For example, since virtually all CMOS semiconductors consume power directly proportional to clock rate, the clock rate of each component of a network gateway in accordance with embodiments of the present invention may be adjusted for the performance required. For instance, when a phone conversation is initiated, the clock rate of the necessary components may be increased to meet the processing demands, but when the phone service is terminated, the clock rate can be minimized.

In operation, the network gateway manages the low power mode or sleep state of the network gateway. The MIPS core 9000 monitors the activity of the network gateway peripherals such as for example the USB MAC, Ethernet or hook detection circuitry (not shown). Activity monitoring procedures vary in accordance with the interface at issue. For example, packet interfaces, such as, Ethernet or USB simply reset a timer each time a packet is received or transmitted via the interface. If the timer expires, and remains expired because no packets have arrived, the interface is said to be inactive. Traditional telephony interfaces on the other hand are in the active state when the handset is off hook or not in the cradle. If the handset is on hook or in the cradle, the interface is in the inactive or idle state.

a. CPU and Memory

The CPU and memory component part 9000 includes the MIPS core 128 (see FIG. 3) and its internal CACHE memory and external FLASH and SDRAM memories. In the described exemplary embodiment there is no provisioned behavior for this part, i.e. the power requirements for the CPU and memory are based solely on an internal knowledge of the current processing load. However, the MIPS core may include one or more clock rates for each of the power states. In operation the lowest clock rate is set in the active but idle clock state and the highest clock rate is set in power state four when the network gateway is simultaneously delivering both data and voice service.

The CPU and memory include an idle process loop that is entered when all processing tasks are completed. In the described exemplary embodiment, the CPU and memory component includes a sleep instruction that may be used to place the CPU into a low power state when in the idle process loop. When no tasks are ready to run, the CPU is not permitted to poll or monitor continuously at this priority. In the described exemplary embodiment, each of the periodically polled functions are scheduled by a timer for execution at the low priority.

b. DOCSIS Interface

Conventional power management techniques typically realize power savings by disabling the tuning and demodulation circuits of the DOCSIS interface 9002. When returning to the full power active state, the equipment whose demodulation circuits have been disabled must re-synchronize to the CMTS to resume accurate bi-directional communications over the HFC network. Therefore, applications that have strict latency requirements may not be supported by such conventional systems. In the described exemplary embodiment the forward tuning path and demodulation circuits of the network gateway are disabled in the lowpower state and two way communications are suspended. The described exemplary network gateway utilizes a secondary, low power out of band receiver 9004 to receive and process asynchronous wake-up commands from an out of band generator in the CMTS (not shown). In one embodiment, the network gateway sets a wake up timer prior to entering the low power state. Expiration of the timer terminates the low power state, returning the network gateway to full power, active operation. In an exemplary embodiment, the duration of the wake up timer may be designed to provide on the order of about a 90% sleep interval and a 10% active interval. A low power sleep interval may be in the range of about 1-4 seconds.

In the described exemplary embodiment, network gateway reduces its average power by continuously establishing a low power state. Network gateway returns to an active state when the sleep timer expires. However, upon returning to the active state network gateway monitors the downstream traffic for local commands as well as the activity level of locally attached devices. In addition, when in sleep state the out of band receiver may communicate interrupts to MIPS core when service is needed.

In operation the MIPS core stores the operating frequency, equalization coefficients, data rate and modulation format under use by the upstream modulator and demodulation circuits at the time the low power state was initiated. The state information may be used to reduce the time required to reacquire synchronization when the network gateway returns to normal power operation. In the described exemplary embodiment, the MIPS core transmits write control register values via the ISB to each peripheral that place the DOCSIS interface into a low power mode. In the described exemplary embodiment the MIPS core deactivates the following downstream demodulator components the AGC, carrier loop, baud loop and equalizer. Further details of an exemplary, method for reducing the power requirements of the DOCSIS interface without introducing significant latency into the system is described in commonly owned co-pending U.S. patent Ser. No. 09/654,109; entitled "METHOD AND APPARATUS FOR LATENCY REDUCTION IN LOW POWER TWO WAY COMMUNICATIONS EQUIPMENT APPLICATIONS IN HYBRID FIBER COAX PLANTS" filed Aug. 31, 2000, the content of which is incorporated herein by reference.

c. Ethernet MAC and PHY

In the described exemplary embodiment, the Ethernet MAC and PHY 9006 and 9008 respectively, may be provisioned to the OFF state when the subscriber contract does not allow its use. When provisioned to the OFF state, the interface and all associated equipment are set to the low power mode without regard for fast recovery. When provisioned to the ON state, the interface is available for use for subscriber traffic. In the described exemplary embodiment the Ethernet MAC/PHY interface includes an intermediate power state that is entered when a low traffic rate, defined as a predetermined traffic threshold or period of inactivity, is detected. In one embodiment the MIPS core monitors the activity level of the Ethernet interface and when the traffic level falls below a predetermined threshold commands the Ethernet interface into the intermediate power state. In the described exemplary embodiment, the MIPS core transmits write control register values via the ISB to the Ethernet MAC/PHY to command it into a low power mode. The interface state may be recovered using the wake on LAN protocol.

d. HPNA MAC/PHY

In the described exemplary embodiment, the HPNA MAC and PHY 9010 may be provisioned to the OFF state when the subscriber contract does not allow its use. When provisioned to the OFF state, the interface and all associated equipment are set to the low power mode without regard for fast recovery. When provisioned to the ON state, the interface is available for use for subscriber traffic. In the described exemplary embodiment the HPNA MAC/PHY interface includes an intermediate power state that is entered when a low traffic rate, defined as a predetermined traffic threshold or period of inactivity, is detected. In the described exemplary embodiment, the MIPS core transmits write control register values via the ISB to the HPNA MAC/PHY to command it into a low power mode. The interface state may be recovered using the wake on LAN protocol.

e. USB MAC and Transceiver

In the described exemplary embodiment, the USB MAC 9012 and transceiver 9014 may be provisioned to the OFF state when the subscriber contract does not allow its use. When provisioned to the OFF state, the interface and all associated equipment are set to the low power mode without regard for fast recovery. In the described exemplary embodiment, the off line times mandated by a particular subscriber contract may be locally stored. When the local clock of the network gateway corresponds to the off line times the MIPS core transmits write control register values via the ISB to the USB MAC and transceiver to command them into a low power mode. When provisioned to the ON State, the interface is available to process subscriber traffic. The interface state may be recovered using the wake on LAN protocol.

f. Voice and Data Processor

The described exemplary power management system utilizes multiple methods to control the power consumption of the voice and data processor 9020. For example the clock rate of the voice and data processor may be used to control the power consumption of the voice and data processor. In addition, the described exemplary power management system includes means to disable the entire block and establish the minimum operating power mode for the block.

The described exemplary power management system sets the clock rate of the voice and data processor as a function of the Hook State of the phone lines connected to the local SLICs. In the described exemplary embodiment, there are four clock rates defined, these rates correspond to the number of off hook telephone lines. The slowest rate is defined for one line off hook and the fastest rate is defined for four lines off hook. Further, a minimum power state is set when all lines are on hook.

In the described exemplary power management system the DSP clock rate may be further adjusted in accordance with the type of compression algorithm used for each off hook line. The call connection algorithm monitors and tracks the compression algorithm used of each call. The described exemplary power management system may then assign a line weight factor for each off hook line in accordance with the compression algorithm associated with each call. The power management system then sums the line weight factor for each active call to determine the clock rate for the voice and data processor.

For example, in the described exemplary power management system, there are four DSP clock settings, namely full rate, half rate, quarter rate and zero. In one embodiment the power management system assigns a line weight factor of one to each G.728 channel and a line weight factor of 0.25 for each G.711 channel. In the described exemplary power management system, the sum of the line weight factors for all channels, rounded to the next whole integer value, equals the clock rate. Therefore, in the described exemplary embodiment, a sum of one is quarter clock rate a sum of two is half clock rate and a sum of three or four is a full clock rate. Thus, if there are one, two, three or four G.711 channels operating simultaneously, the sum of the channel weights is rounded to one and the voice and data clock rate is set to quarter rate. If there is one G.728 channel and one G.711 channel, the sum is 1.25 rounded to 2 and the clock rate of the voice and data processor is set to half rate. In the described exemplary embodiment, all channels are on hook, the sum of the weighting factors is zero and the voice and data processor can be disabled, maximizing the power savings.

Alternatively, the voice and data processor may be run at the maximum clock rate, allowing the processor to complete a given task with the same number of instruction but in a shorter period of time. The voice and data processor includes an idle process loop that is entered when all processing tasks are completed. In the described exemplary embodiment, the voice and data processor includes a sleep instruction that may be used to place the CPU into a low power state when in the idle process loop. In the described exemplary embodiment, when the MIPS core detects the occurrence of an event such as for example, a line going off hook, the MIPS core issues an interrupt to the voice and data processor to return it to a full power operating state.

g. Audio Processor

The audio processor 9022 is a common processing element for any active voice channel. In the described exemplary embodiment, the audio processor has two power states, namely on and off. In the described exemplary embodiment the audio processor is on when any voice channel is active. The audio processor may be off when all the voice channels are on hook. In one embodiment the audio processor state may follow the state of the voice and data processor module. In this embodiment, when the voice and data processor is in the off state, the audio processor may also be in the off state. Otherwise, the audio processor is in the on state.

In the described exemplary embodiment the MIPS core monitors activity state of the voice and data processor. When all voice channels are inactive the MIPS core transmits write control register values via the ISB to the audio processor commanding it into a low power mode. When the MIPS core detects the occurrence of an event such as for example, a line going off hook, the MIPS core issues an interrupt to the audio processor to return it to a full power operating state.

h. Analog Front End ADC/DAC

In the described exemplary network gateway the analog front end interfaces the voice and data processor with external telephony devices via external SLICs 9026(*a-d*). The analog front end includes an ADC/DAC 9024(*a-d*) pair for each voice channel. The ADC/DAC pair has two power states, namely on and off. In the described exemplary embodiment, the ADC/DAC pair is active or in the on state when the associated voice channel is active. The ADC/DAC pair may be off when the associated voice circuit is in the on hook state or when the associated SLIC is provisioned in the off state.

In the described exemplary embodiment the MIPS core monitors the hook state of each of the local telephony lines. The MIPS core transmits write control register values via the ISB to a particular ADC/DAC pair when the associated voice circuit is in the on hook state, commanding it into a low power mode. When the MIPS core detects that the associated voice circuit goes off hook the MIPS core issues an interrupt to the particular ADC/DAC pair to return it to a full power operating state.

C. CONCLUSION

Although a preferred embodiment of the present invention has been described, it should not be construed to limit the scope of the appended claims. For example, the present invention can be implemented by both a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A cable modem, comprising:
a network port configured to interface with a cable head end;
a telephony port configured to interface with a telephony device;
a data port configured to interface with a data terminal; and
a processor, coupled to each of the ports, configured to:
differentiate between a voice signal associated with a voice call and a voice signal associated with a machine call,
determine whether a voice signal received from the network port is destined for the data port or the telephony port based on whether the voice signal received from the network port is associated with the voice call or the machine call, and
send the voice signal received from the network port to one of the data port and the telephony port based on such determination,
wherein the processor comprises:
an echo canceller operable to cancel a cable head end echo on a voice signal received from the telephony port, wherein the echo canceller comprises:
a filter operable to adaptively filter the voice signal received from the network port, based on adaptation coefficients, to determine the cable head end echo,
a speech detector operable to detect whether speech is present on the voice signal received from the telephony port, wherein the adaptation coefficients are held constant when the speech is detected to be present, and wherein the adaptation coefficients are adapted when the speech is not detected to be present, and
a subtractor operable to subtract the cable head end echo from the voice signal received from the telephony port after the adaptation coefficients are held constant.

2. The cable modem of claim 1 further comprising:
a transceiver coupled between the processor and the network port.

3. The cable modem of claim 2, wherein the transceiver comprises:
a media access controller (MAC) coupled to the processor,
a modulator disposed in circuit between the MAC and the network port, and
a demodulator disposed in circuit between the MAC and the network port.

4. The cable modem of claim 1 further comprising:
a voice circuit coupled between the telephony port and the processor.

5. A gateway, comprising:
a network port configured to interface with a cable head end;
a telephony port configured to interface to a telephony device;
a data port configured to interface to a data terminal;
a processor coupled to each of the ports; and
a transceiver disposed in circuit between the processor and the network port, the transceiver being configured:
to transmit and receive a packet of voice signals and a packet of data signals,
to differentiate between a packet of voice signals associated with a voice call and a packet of voice signals associated with a machine call,
to determine whether a packet of voice signals received from the network port is destined for the data port or the telephony port based on whether the packet of voice signals received from the network is associated with the voice call or associated with the machine call, and
to relay a payload of the packet of voice signals received from the network port to one of the data port and telephony port based on such determination,
wherein the transceiver comprises:
an echo canceller operable to cancel a cable head end echo on the voice signals received from the processor, wherein the echo canceller comprises:
a filter operable to adaptively filter the voice signals received from the network port, based on adaptation coefficients, to determine the cable head end echo,
a speech detector operable to detect whether speech is present on the voice signals received from the processor, wherein the adaptation coefficients are held constant when the speech is detected to be present, and wherein the adaptation coefficients are adapted when the speech is not detected to be present, and
a subtractor operable to subtract the cable head end echo from the voice signals received from the processor after the adaptation coefficients are held constant.

6. The gateway of claim 5, wherein the transceiver comprises:
a media access controller (MAC) coupled to the processor,
a modulator disposed in circuit between the MAC and the network port, and
a demodulator disposed in circuit between the MAC and the network port.

7. The gateway of claim 5, further comprising:
a voice circuit coupled between the telephony port and the processor.

8. A method of processing signals, comprising:
exchanging a voice signal, including a voice signal associated with a voice call and a voice signal associated with a machine call, between a cable head end and a telephony device;
exchanging a data signal between the cable head end and a data terminal, the data signal including the voice signal associated with the machine call; and
wherein exchanging the voice signal comprises:
canceling a cable head end echo on a voice signal flowing from the telephony device to the cable head end, the canceling the cable head end echo comprising:

adaptively filtering a received signal from the cable head end based on adaptation coefficients to determine a cable head end echo, detecting whether speech is present on the voice signal flowing from the telephony device to the cable head end, holding the adaptation coefficients constant when the speech is detected to be present, converging the adaptation coefficients when the speech is not detected to be present, and subtracting the cable head end echo from the voice signal flowing from the telephony device after the adaptation coefficients are held constant.

9. The method of claim 8, further comprising:
demodulating voice signals flowing from the cable head end to the telephony device and the data terminal; and
modulating voice signals flowing from the telephony device and the data terminal to the cable head end.

10. The method of claim 8, wherein the exchanging data signals comprises:
receiving a data signal from the cable head end; and
transmitting the data signal to the data terminal over a local area network.

11. The method of claim 8, wherein the exchanging voice signals comprises:
receiving a first voice signal from the cable head end; and
transmitting the first voice signal to the telephony device over a telephone line.

12. The method of claim 11, wherein the exchanging voice signals comprises:
exchanging a second voice signal between the cable head end and a second telephony device, exchanging the second signal comprising:
receiving the second voice signal from the cable head end; and
transmitting the second voice signal to the second telephony device over a local area network.

13. The method of claim 8, wherein the canceling the cable head end echo comprises:
delaying subtracting the cable head end echo from the voice signal flowing from the telephony device for a time after the detection of the speech.

14. The method of claim 8, wherein the detecting whether the speech is present comprises:
estimating an absolute value of a cable head end signal parameter;
estimating a maximum parameter of the voice signal flowing from the telephony device;
comparing the absolute value of the cable head end signal parameter to the estimated maximum parameter of the voice signal flowing from the telephony device; and
detecting the speech on the voice signal flowing from the telephony device based on the comparison.

15. The method of claim 8, wherein the canceling the cable head end echo comprises:
pre-conditioning the voice signal flowing from the telephony device prior to the detecting whether the speech is present.

16. The method of claim 15, wherein the preconditioning the voice signal flowing from the telephony device comprises:
adaptively filtering the cable head end signal; and
subtracting the adaptively filtered cable head end signal from the voice signal flowing from the telephony device.

17. The method of claim 8, wherein the exchanging voice signal comprises:
synchronizing the voice signal between the cable head end and the telephony device.

18. The method of claim 17, wherein the synchronizing the voice signal comprises:
generating an error signal based on a function of a difference between a cable head end clock and a voice exchange clock; and
fractionally resampling an exchanged voice signal based on a function of the error signal.

19. The method of claim 18, wherein generating the error signal comprises:
driving a first counter with the cable head end clock,
driving a second counter with the voice exchange clock, and
dividing an output of the first counter by an output of the second counter to generate the error signal.

20. The method of claim 19, wherein the synchronizing the voice signal comprises:
fractionally up-sampling the exchanged voice signal by the error signal when the output of the first counter exceeds the output of the second counter.

21. The method of claim 19, wherein the synchronizing the voice signal comprises:
fractionally down-sampling the exchanged voice signal by the error signal when the output of the first counter is less than the output of the second counter.

22. The method of claim 19, wherein the synchronizing voice signal comprises:
filtering the output of the first counter; and
filtering the output of the second counter; and
wherein the dividing comprises dividing a filtered output of the first counter by a filtered output of the second counter.

23. The method of claim 8, further comprising:
determining whether a received voice signal is associated with the voice call or associated with the machine call; and
decimating the received voice signal based on the determining.

24. The method of claim 23, wherein the decimating of the received voice signal is performed using a minimum phase filter if the received voice signal is associated with the voice call.

25. The method of claim 23, wherein the decimating of the received voice signal is performed using a linear phase filter if the received voice signal is associated with the machine call.

26. A cable modem, comprising:
a first network port configured to interface with a cable head end;
a second network port configured to interface with a local area network, the local area network comprising a packet based network, the packet based network being configured to transmit a voice signal packet;
a telephony port configured to interface with a telephony device; and
a processor, coupled to each of the ports, configured to
differentiate a voice signal packet associated with a voice call from a voice signal packet comprising data superimposed on a voiceband signal,
determine whether a voice signal packet received from the first network port is destined for the second network port or the telephony port based on whether the voice signal packet received from the first network port is associated with the voice call or the voice signal packet received from the first network port comprises the data superimposed on the voiceband signal, and send the voice signal packet received from the first network port to one of the second network port and telephony port based on such determination, wherein the processor comprises:
an echo canceller operable to cancel a cable head end echo on a voice signal packet received from the telephony port, wherein the echo canceller comprises:
a filter operable to adaptively filter the voice signal packet received from the first network port, based on adaptation coefficients, to determine the cable head end echo,
a speech detector operable to detect whether speech is present on the voice signal packet received from the telephony port, wherein the adaptation coefficients are held constant when the speech is detected to be present, and wherein the adaptation coefficients are adapted when the speech is not detected to be present, and
a subtractor operable to subtract the cable head end echo from the voice signal packet received from the telephony port after the adaptation coefficients are held constant.

27. The cable modem of claim 26, further comprising:
a modulator configured to modulate the voice signal packet received from the first network port at a frequency above a frequency of the voiceband signal.

28. The cable modem of claim 26, wherein the packet based network comprises:
a twisted pair telephone line.

29. The cable modem of claim 26, wherein the packet based network is configured to operate in accordance with a protocol for home communications over a twisted pair telephone line.

30. The cable modem of claim 26, wherein the packet based network comprises:
an Ethernet line.

31. The cable modem of claim 26, further comprising:
a transceiver coupled between the processor and the first network port.

32. The cable modem of claim 31, wherein the transceiver comprises:
a media access controller (MAC) coupled to the processor,
a modulator disposed in circuit between the MAC and the first network port, and
a demodulator disposed in circuit between the MAC and the first network port.

33. The cable modem of claim 26, further comprising:
a voice circuit coupled to the second network port and to the processor.

34. The cable modem of claim 26, further comprising:
a voice synchronizer configured to synchronize a voice signal communicated between the cable head end and the cable modem by generating an error signal based on a function of a difference between a cable head end clock and a local clock.

35. The cable modem of claim 34, further comprising:
a time stamp register,
wherein the cable modem is configured to synchronize telephony devices coupled to the local area network by periodically writing a value of the en-or signal into the time stamp register and transporting the value of the en-or signal over the second network port.

36. A gateway, comprising:
a first network port configured to interface with a cable head end;
a second network port configured to interface to a local area network;
a processor coupled to the first network port and to the second network port;
a transceiver, disposed in a circuit between the processor and the first network port, configured to transmit and receive packets of voice signals associated with voice calls and packets of data signals, the packets of data signals including voice signals associated with machine calls;
an encryption circuit coupled to the transceiver and to the processor; and
a voice circuit coupled to the second network port and to the processor,
wherein the processor is configured to
discriminate between the packets of voice signals associated with voice calls and the packets of data signals,
determine whether a received packet is destined for the first network port or the second network port based on whether the received packet is a packet of voice signals associated with a voice call or a packet of data signals, and
send the received packet to one of the first network port and the second network port based on the determination,
wherein the processor comprises:
an echo canceller operable to cancel a cable head end echo on a transmitted voice packet, wherein the echo canceller comprises:
a filter operable to adaptively filter the received packet, based on adaptation coefficients, to determine the cable head end echo,
a speech detector operable to detect whether speech is present on the transmitted voice packet, wherein the adaptation coefficients are held constant when the speech is detected to be present, and wherein the adaptation coefficients are adapted when the speech is not detected to be present, and
a subtractor operable to subtract the cable head end echo from the voice transmitted voice packet after the adaptation coefficients are held constant.

37. The gateway of claim 36, wherein the local area network comprises:
a packet based network.

38. The gateway of claim 37, wherein the packet based network comprises:
a twisted pair telephone line.

39. The gateway of claim 37, wherein the packet based network is configured to operate in accordance with a protocol for home communications over a twisted pair telephone line.

40. The gateway of claim 37, wherein the packet based network comprises:
an Ethernet line.

41. The gateway of claim 36, wherein the transceiver comprises:
a media access controller (MAC) coupled to the processor,
a modulator disposed in circuit between the MAC and the first network port, and
a demodulator disposed in circuit between the MAC and the first network port.

42. A method of processing signals, comprising:
exchanging voice signals between a cable head end and a local area network, comprising:
exchanging voice signals associated with voice calls between the cable head end and the local area network, and exchanging data signals between the cable head end and the local area network, the data signals including voice signals associated with machine calls;

classifying a received voice signal received from the local area network as a data signal or a voice signal associated with a voice call; and decimating the received voice signal in accordance with the classifying;

wherein the exchanging voice signals comprises:
synchronizing voice signals exchanged between the cable head end and the local area network, the synchronizing comprising:
generating an error signal based on a function of a difference between a cable head end clock and a voice exchange clock, and
fractionally resampling an exchanged voice signal based on a function of the error signal.

43. The method of claim 42, wherein the local area network comprises:
a packet based network.

44. The method of claim 43, wherein the packet based network comprises:
a twisted pair telephone line.

45. The method of claim 43, wherein the packet based network is configured to operate in accordance with a protocol for home communications over a twisted pair telephone line.

46. The method of claim 43, wherein the packet based network comprises:
an Ethernet line.

47. The method of claim 43, wherein the packet based network is configured to transmit a packet including a voice signal comprising data superimposed on a voiceband signal.

48. The method of claim 43, wherein the packet comprises:
data modulated at a frequency above a frequency of the voiceband signal.

49. The method of claim 42, further comprising:
demodulating a first data signal flowing from the cable head end to the local area network; and
modulating a second data signal flowing from the local area network to the cable head end.

50. The method of claim 42, wherein the exchanging the voice signals comprises:
canceling a cable head end echo on a voice signal flowing from the local area network to the cable head end.

51. The method of claim 50, wherein the canceling comprises:
adaptively filtering a received signal from the cable head end based on adaptation coefficients to determine a cable head end echo;
detecting whether speech is present on the voice signal flowing from the local area network to the cable head end;
holding the adaptation coefficients constant when the speech is present; and
subtracting the cable head end echo from the voice signal flowing from the local area network after the adaptation coefficients are held constant.

52. The method of claim 51, wherein the canceling comprises:
delaying the subtracting the cable head end echo from the voice signal flowing from the local area network for a time after the detection of speech.

53. The method of claim 51, wherein the detecting whether speech is present comprises:
estimating an absolute value of a cable head end signal parameter;
estimating a maximum parameter of the voice signal flowing from the local area network;
comparing the absolute value of the cable head end signal parameter to the estimated maximum parameter of the voice signal; and
detecting speech on the voice signal flowing from the local area network based on a function of the comparison.

54. The method of claim 51, wherein the canceling comprises:
pre-conditioning the voice signal flowing from the local area network prior to the detecting whether the speech is present.

55. The method of claim 52, wherein the preconditioning the voice signal comprises:
adaptively filtering the received signal from the cable head end and subtracting the adaptively filtered received signal from the voice signal flowing from the local area network.

56. The method of claim 42, wherein the generating the error signal comprises:
driving a first counter with the cable head end clock;
driving a second counter with the voice exchange clock; and
dividing an output of the first counter by an output of the second counter to generate the error signal.

57. The method of claim 56, wherein the synchronizing voice signals comprises:
fractionally up-sampling the exchanged voice signal by the error signal when the output of the first counter exceeds the output of the second counter.

58. The method of claim 56, wherein the synchronizing voice signals comprises:
fractionally down-sampling the exchanged voice signal by the error signal when the output of the first counter is less than the output of the second counter.

59. The method of claim 56, wherein the synchronizing voice signals comprises:
filtering the output of the first counter; and
filtering the output of the second counter,
wherein the dividing comprises dividing a filtered output of the first counter by a filtered output of the second counter.

60. The method of claim 42, further comprising:
periodically communicating a value of the error signal over the local area network.

61. The method of claim 42, further comprising:
communicating a timestamp report to a device coupled to the local area network; and
generating an offset value based on an offset between a cable modem clock and a local area network clock.

62. The method of claim 61, further comprising:
communicating a grant receive value to the device coupled to the local area network; and
communicating packets from the device to the cable modem in accordance with the grant receive value and the offset value, wherein the packets arrive at the cable modem prior to a subsequent upstream grant.

63. The method of claim 62, further comprising:
generating a packet assembly start time based on the offset value, the grant receive value, a packet assembly overhead, a queuing latency and a transmission time.

64. The method of claim 42, wherein the decimating comprises:
decimating a signal classified as a voice signal associated with a voice call with a minimum phase filter.

65. The method of claim 42, wherein the decimating comprises:
decimating a signal classified as a data signal with a linear phase filter.

66. A gateway, comprising:
a processor operable to exchange voice signals, including voice signals associated with voice calls, between a cable head end and a telephony device, the processor comprising:
an echo canceller operable to cancel a cable head end echo on a voice signal flowing from the telephony device to the cable head end, comprising:
a filter operable to adaptively filter a received signal from the cable head end based on adaptation coefficients to determine the cable head end echo,
a speech detector operable to detect whether speech is present on the voice signal flowing from the telephony device, wherein the adaptation coefficients are held constant when the speech is detected to be present, and wherein the adaptation coefficients are converged when the speech is not detected to be present, and
a subtractor operable to subtract the cable head end echo from the voice signal flowing from the telephony device after the adaptation coefficients are held constant; and
at least one circuit operable to exchange data signals between the cable head end and a data terminal, the data signals including voice signals associated with machine calls.

67. The gateway of claim 66, further comprising:
a demodulator operable to demodulate voice signal signals flowing from the cable head end to the telephony device and the data terminal; and
a modulator operable to modulate voice signals flowing from the telephony device and the data terminal to the cable head end.

68. The gateway of claim 66, wherein the at least one circuit comprises:
a receiver operable to receive a data signal from the cable head end; and
a transmitter operable to transmit the data signal to the data terminal over a local area network.

69. The gateway of claim 66, wherein the at least one circuit comprises:
a first receiver operable to receive a first voice signal from the cable head end; and
a first transmitter operable to transmit the first voice signal to the telephony device over a telephone line.

70. The gateway of claim 69, wherein the at least one circuit comprises:
a second receiver operable to receive the second voice signal; and
a second transmitter operable to transmit the second voice signal to the second telephony device over a local area network.

71. The gateway of claim 66, wherein the echo canceller comprises:
a delay operable to delay the cable head end echo, prior to being subtracted from the voice signal flowing from the telephony device, based on the detection of speech.

72. The gateway of claim 66, wherein the speech detector comprises:
a first estimator operable to estimate an absolute value of a cable head end signal parameter;
a second estimator operable to estimate a maximum parameter of the voice signal flowing from the telephony device,
a comparator operable to compare the absolute value of the cable head end signal parameter to the estimated maximum parameter of the voice signal flowing from the telephony device; and
a detector operable to detect the speech on the voice signal flowing from the telephony device based on the comparison.

73. The gateway of claim 66, wherein the echo canceller comprises:
a conditioning circuit operable to pre-condition the voice signal flowing from the telephony device prior to detecting whether the speech is present.

74. The gateway of claim 73, wherein the echo canceller comprises:
a second filter operable to adaptively filter the cable head end signal; and
a second subtractor operable to subtract the adaptively filtered cable head end signal from the voice signal flowing from the telephony device.

75. The gateway of claim 66, wherein the at least one circuit comprises:
a synchronizer operable to synchronize voice signals between the cable head end and the telephony device.

76. The gateway of claim 75, wherein the synchronizer comprises:
a generator operable to generate an error signal based on a function of a difference between a cable head end clock and a voice exchange clock; and
a sample rate converter operable to fractionally resample an exchanged voice signal based on a function of the error signal.

77. The gateway of claim 76, wherein the generator comprises:
a first counter driven by the cable head end clock;
a second counter driven by the voice exchange clock; and
a divider operable to divide an output of the first counter by an output of the second counter to generate the error signal.

78. The gateway of claim 77, wherein the synchronizer comprises:
an up-converter operable to fractionally up-sample the exchanged voice signal by the error signal when the output of the first counter exceeds the output of the second counter.

79. The gateway of claim 77, wherein the synchronizer comprises:
a down-converter operable to fractionally down-sample the exchanged voice signal by the error signal when the output of the first counter is less than the output of the second counter.

80. The gateway of claim 77, wherein the synchronizer comprises:
a first counter filter operable to filter the output of the first counter; and
a second counter filter operable to filter the output of the second counter,
wherein the divider is configured to divide the filtered output of the first counter by the filtered output of the second counter.

81. A gateway, comprising:
a processor operable to exchange voice signals between a cable head end and a local area network, comprising
at least one circuit operable to exchange voice signals associated with voice calls between the cable head end and the local area network and operable to exchange data signals between the cable head end and the local area network, wherein the data signals include voice signals associated with machine calls;

a classifier operable to classify a received voice signal received from the local area network as a data signal or a voice signal associated with a voice call; and a decimator operable to decimate the received voice signal in accordance with classifying, wherein the at least one circuit comprises:

a synchronizer operable to synchronize voice signals exchanged between the cable head end and the local area network, the synchronizer comprising:

a generator operable to generate an error signal based on a function of a difference between a cable head end clock and a voice exchange clock, and a sample rate converter operable to fractionally resample an exchanged voice signal based on a function of the error signal.

82. The gateway of claim 81, wherein the local area network comprises:

a packet based network.

83. The gateway of claim 82, wherein the packet based network comprises:

a twisted pair telephone line.

84. The gateway of claim 82, wherein the packet based network is configured to operate in accordance with a protocol for home communications over a twisted pair telephone line.

85. The gateway of claim 82, wherein the packet based network comprises:

an Ethernet line.

86. The gateway of claim 81, further comprising:

a demodulator operable to demodulate a first data signal flowing from the cable head end to the local area network; and a modulator operable to modulate a second voice signal flowing from the local area network to the cable head end.

87. The gateway of claim 81, wherein the at least one circuit comprises:

a receiver operable to receive data signals from a telephony device via the local area network; and a transmitter operable to transmit data signals to the telephony device via the local area network.

88. The gateway of claim 81, wherein the at least one circuit operable to comprises:

a first receiver operable to receive a first voice signal from the cable head end; and a first transmitter operable to transmit the first voice signal to the telephony device via the telephone line.

89. The gateway of claim 88, wherein the at least one circuit comprises:

a second receiver operable to receive the second voice signal from the cable head end; and a second transmitter operable to transmit the second voice signal to the second telephony device over the local area network.

90. The gateway of claim 81, wherein the at least one circuit comprises:

an echo canceller operable to cancel a cable head end echo on a voice signal flowing from the local area network to the cable head end.

91. The gateway of claim 90, wherein the echo canceller comprises:

a filter operable to adaptively filter a received signal from the cable head end based on adaptation coefficients to determine a cable head end echo;

a speech detector operable to detect whether speech is present on the voice signal flowing from the local area network to the cable head end, wherein the adaptation coefficients are held constant when the speech is present; and a subtractor operable to subtract the cable head end echo from the voice signal flowing from the local area network after the adaptation coefficients are held constant.

92. The gateway of claim 91, wherein the echo canceller comprises:

a delay operable to delay the cable head end echo, prior to being subtracted from the voice signal flowing from the telephony device, based on the detection of speech.

93. The gateway of claim 91, wherein the speech detector comprises:

a first estimator operable to estimate an absolute value of a cable head end signal parameter;

a second estimator operable to estimate a maximum parameter of the voice signal flowing from the telephony device, a comparator operable to compare the absolute value of the cable head end signal parameter to the estimated maximum parameter of the voice signal flowing from the telephony device; and a detector operable to detect the speech on the voice signal flowing from the telephony device based on a function of the comparison.

94. The gateway of claim 91, wherein the echo canceller comprises:

a conditioning circuit operable to pre-condition the voice signal flowing from the telephony device prior to detecting whether the speech is present.

95. The gateway of claim 94, wherein the echo canceller comprises:

a second filter operable to adaptively filter the cable head end signal; and a second subtractor operable to subtract the adaptively filtered cable head end signal from the voice signal flowing from the telephony device.

96. The gateway of claim 81, wherein the generator comprises:

a first counter driven by the cable head end clock;

a second counter driven by the voice exchange clock; and a divider operable to divide an output of the first counter by an output of the second counter to generate the error signal.

97. The gateway of claim 96, wherein the synchronizer comprises:

an up-converter operable to fractionally up-sample the exchanged voice signal by the error signal when the output of the first counter exceeds the output of the second counter.

98. The gateway of claim 96, wherein the synchronizer comprises:

a down-converter operable to fractionally down-sample the exchanged voice signal by the error signal when the output of the first counter is less than the output of the second counter.

99. The gateway of claim 96, wherein the synchronizer comprises:

a first counter filter operable to filter the output of the first counter; and a second counter filter operable to filter the output of the second counter, wherein the divider is configured to divide the filtered output of the first counter by the filtered output of the second counter.

100. A cable modem, comprising:

a network port configured to interface with a cable head end;

a telephony port configured to interface with a telephony device;

a data port configured to interface with a data terminal;

a processor, coupled to each of the ports, configured to:
differentiate between a voice signal associated with a voice call and a voice signal associated with a machine call,
determine whether a voice signal received from the network port is destined for the data port or the telephony port based on whether the voice signal received from the network port is associated with the voice call or the machine call, and
send the voice signal received from the network port to one of the data port and the telephony port based on such determination;

a decimator operable to decimate the received voice signal in accordance with the differentiation by the processor; and a synchronizer operable to synchronize voice signals exchanged between the cable head end and the telephony device, the synchronizer comprising:
a generator operable to generate an error signal based on a function of a difference between a cable head end clock and a voice exchange clock, and
a sample rate converter operable to fractionally resample an exchanged voice signal based on a function of the error signal.

101. A gateway, comprising:

a network port configured to interface with a cable head end;

a telephony port configured to interface to a telephony device;

a data port configured to interface to a data terminal;

a processor coupled to each of the ports;

a transceiver disposed in circuit between the processor and the network port, the transceiver being configured:
to transmit and receive a packet of voice signals and a packet of data signals,
to differentiate between a packet of voice signals associated with a voice call and a packet of voice signals associated with a machine call,
to determine whether a packet of voice signals received from the network port is destined for the data port or the telephony port based on whether the packet of voice signals received from the network is associated with the voice call or associated with the machine call, and
to relay a payload of the packet of voice signals received from the network port to one of the data port and telephony port based on such determination;

a decimator operable to decimate the received packet of voice signals in accordance with the differentiation by the transceiver; and a synchronizer operable to synchronize voice signals exchanged between the cable head end and the telephony device, the synchronizer comprising:
a generator operable to generate an error signal based on a function of a difference between a cable head end clock and a voice exchange clock, and
a sample rate converter operable to fractionally resample an exchanged voice signal based on a function of the error signal.

102. A cable modem, comprising:

a first network port configured to interface with a cable head end;

a second network port configured to interface with a local area network, the local area network comprising a packet based network, the packet based network being configured to transmit a voice signal packet;

a telephony port configured to interface with a telephony device;

a processor, coupled to each of the ports, configured to
differentiate a voice signal packet associated with a voice call from a voice signal packet comprising data superimposed on a voiceband signal,
determine whether a voice signal packet received from the first network port is destined for the second network port or the telephony port based on whether the voice signal packet received from the first network port is associated with the voice call or the voice signal packet received from the first network port comprises the data superimposed on the voiceband signal, and
send the voice signal packet received from the first network port to one of the second network port and telephony port based on such determination;

a decimator operable to decimate the received voice signal packet in accordance with the differentiation by the processor; and a synchronizer operable to synchronize voice signals exchanged between the cable head end and the telephony device, the synchronizer comprising:
a generator operable to generate an error signal based on a function of a difference between a cable head end clock and a voice exchange clock, and
a sample rate converter operable to fractionally resample an exchanged voice signal based on a function of the error signal.

103. A gateway, comprising:

a first network port configured to interface with a cable head end;

a second network port configured to interface to a local area network;

a processor coupled to the first network port and to the second network port;

a transceiver, disposed in a circuit between the processor and the first network port, configured to transmit and receive packets of voice signals associated with voice calls and packets of data signals, the packets of data signals including voice signals associated with machine calls;

an encryption circuit coupled to the transceiver and to the processor; and a voice circuit coupled to the second network port and to the processor, wherein the processor is configured to
discriminate between the packets of voice signals associated with voice calls and the packets of data signals,
determine whether a received packet is destined for the first network port or the second network port based on whether the received packet is a packet of voice signals associated with a voice call or a packet of data signals, and send the received packet to one of the first network port and the second network port based on the determination;
a decimator operable to decimate the received packet of voice signals in accordance with the differentiation by the processor; and
a synchronizer operable to synchronize voice signals exchanged between the cable head end and the local area network, the synchronizer comprising:

a generator operable to generate an error signal based on a function of a difference between a cable head end clock and a local area network clock, and
a sample rate converter operable to fractionally resample an exchanged voice signal based on a function of the error signal.

* * * * *